US012687922B2

(12) United States Patent
Hylak et al.

(10) Patent No.: US 12,687,922 B2
(45) Date of Patent: Jul. 21, 2026

(54) METHODS FOR DISPLAYING AND REARRANGING OBJECTS IN AN ENVIRONMENT

(71) Applicant: Apple Inc., Cupertino, CA (US)

(72) Inventors: Benjamin Hylak, San Francisco, CA (US); Benjamin H. Boesel, Jackson, WY (US); Danielle M. Price, Los Gatos, CA (US); Stephen O. Lemay, Palo Alto, CA (US); Zoey C. Taylor, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/645,292

(22) Filed: Apr. 24, 2024

(65) Prior Publication Data

US 2024/0361835 A1 Oct. 31, 2024

Related U.S. Application Data

(60) Provisional application No. 63/505,689, filed on Jun. 1, 2023, provisional application No. 63/498,131, filed on Apr. 25, 2023.

(51) Int. Cl.
*G06F 3/01* (2006.01)
*G06T 19/00* (2011.01)

(52) U.S. Cl.
CPC .............. *G06F 3/013* (2013.01); *G06T 19/00* (2013.01); *G06T 2200/24* (2013.01)

(58) Field of Classification Search
CPC ..... G06F 3/013; G06T 19/00; G06T 2200/24; G06T 19/20; G06T 19/003
See application file for complete search history.

(56) References Cited

U.S. PATENT DOCUMENTS

| | | |
|---|---|---|
| 1,173,824 A | 2/1916 | Mckee |
| 5,015,188 A | 5/1991 | Pellosie et al. |
| 5,422,812 A | 6/1995 | Knoll et al. |
| 5,483,261 A | 1/1996 | Yasutake |
| 5,488,204 A | 1/1996 | Mead et al. |
| 5,515,488 A | 5/1996 | Hoppe et al. |
| 5,524,195 A | 6/1996 | Clanton et al. |

(Continued)

FOREIGN PATENT DOCUMENTS

| | | |
|---|---|---|
| CA | 3033344 A1 | 2/2018 |
| CN | 102298493 A | 12/2011 |

(Continued)

OTHER PUBLICATIONS

Corrected Notice of Allowability received for U.S. Appl. No. 17/932,999, mailed on Feb. 20, 2025, 2 pages.

(Continued)

*Primary Examiner* — Abdul-Samad A Adediran
(74) *Attorney, Agent, or Firm* — Kubota & Basol LLP

(57) ABSTRACT

In some embodiments, a computer system selectively recenters virtual content to a viewpoint of a user. In some embodiments, a computer system selectively recenters virtual content and/or gathers the virtual content. In some embodiments, a computer system presents virtual content with a first spatial arrangement when an input corresponds to a recentering operation and presents the virtual content with a second spatial arrangement when the input corresponds to a gathering operation.

38 Claims, 51 Drawing Sheets

(56) References Cited

U.S. PATENT DOCUMENTS

| | | | |
|---|---|---|---|
| 5,610,828 A | 3/1997 | Kodosky et al. |
| 5,731,805 A | 3/1998 | Tognazzini et al. |
| 5,737,553 A | 4/1998 | Bartok |
| 5,740,440 A | 4/1998 | West |
| 5,751,287 A | 5/1998 | Hahn et al. |
| 5,758,122 A | 5/1998 | Corda et al. |
| 5,794,178 A | 8/1998 | Caid et al. |
| 5,809,267 A | 9/1998 | Moran et al. |
| 5,825,352 A | 10/1998 | Bisset et al. |
| 5,835,079 A | 11/1998 | Shieh |
| 5,877,766 A | 3/1999 | Bates et al. |
| 5,880,411 A | 3/1999 | Gillespie et al. |
| 5,900,849 A | 5/1999 | Gallery |
| 5,933,143 A | 8/1999 | Kobayashi |
| 5,990,886 A | 11/1999 | Serdy et al. |
| 6,061,060 A | 5/2000 | Berry et al. |
| 6,078,310 A | 6/2000 | Tognazzini |
| 6,108,004 A | 8/2000 | Medl |
| 6,112,015 A | 8/2000 | Planas et al. |
| 6,154,559 A | 11/2000 | Beardsley |
| 6,167,433 A | 12/2000 | Maples et al. |
| 6,188,391 B1 | 2/2001 | Seely et al. |
| 6,295,069 B1 | 9/2001 | Shirur |
| 6,310,610 B1 | 10/2001 | Beaton et al. |
| 6,323,846 B1 | 11/2001 | Westerman et al. |
| 6,426,745 B1 | 7/2002 | Isaacs et al. |
| 6,456,296 B1 | 9/2002 | Cataudella et al. |
| 6,570,557 B1 | 5/2003 | Westerman et al. |
| 6,584,465 B1 | 6/2003 | Zhu et al. |
| 6,677,932 B1 | 1/2004 | Westerman |
| 6,690,387 B2 | 2/2004 | Zimmerman et al. |
| 6,714,201 B1 | 3/2004 | Grinstein et al. |
| 6,750,873 B1 | 6/2004 | Bernardini et al. |
| 6,756,997 B1 | 6/2004 | Ward et al. |
| 7,015,894 B2 | 3/2006 | Morohoshi |
| 7,035,903 B1 | 4/2006 | Baldonado |
| 7,046,927 B2 | 5/2006 | Dalton et al. |
| 7,096,120 B2 | 8/2006 | Hull |
| 7,134,130 B1 | 11/2006 | Thomas |
| 7,137,074 B1 | 11/2006 | Newton et al. |
| 7,184,064 B2 | 2/2007 | Zimmerman et al. |
| 7,230,629 B2 | 6/2007 | Reynolds et al. |
| 7,298,370 B1 | 11/2007 | Middler et al. |
| 7,580,576 B2 | 8/2009 | Wang et al. |
| 7,614,008 B2 | 11/2009 | Ording |
| 7,633,076 B2 | 12/2009 | Huppi et al. |
| 7,634,718 B2 | 12/2009 | Nakajima |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,706,579 B2 | 4/2010 | Oijer |
| 7,721,226 B2 | 5/2010 | Barabe et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,341,541 B2 | 12/2012 | Holecek et al. |
| 8,381,135 B2 | 2/2013 | Hotelling et al. |
| 8,436,872 B2 | 5/2013 | Wright et al. |
| 8,479,122 B2 | 7/2013 | Hotelling et al. |
| 8,593,558 B2 | 11/2013 | Gardiner et al. |
| 8,724,856 B1 | 5/2014 | King |
| 8,730,156 B2 | 5/2014 | Weising et al. |
| 8,767,045 B2 | 7/2014 | Kitazato et al. |
| 8,793,620 B2 | 7/2014 | Stafford |
| 8,793,729 B2 | 7/2014 | Adimatyam et al. |
| 8,803,873 B2 | 8/2014 | Yoo et al. |
| 8,805,690 B1 | 8/2014 | Lebeau et al. |
| 8,866,880 B2 | 10/2014 | Tan et al. |
| 8,896,632 B2 | 11/2014 | Macdougall et al. |
| 8,947,323 B1 | 2/2015 | Raffle et al. |
| 8,970,478 B2 | 3/2015 | Johansson |
| 8,970,629 B2 | 3/2015 | Kim et al. |
| 8,994,718 B2 | 3/2015 | Latta et al. |

| | | | |
|---|---|---|---|
| 9,007,301 B1 | 4/2015 | Raffle et al. |
| 9,108,109 B2 | 8/2015 | Pare et al. |
| 9,158,115 B1 | 10/2015 | Worley et al. |
| 9,164,975 B2 | 10/2015 | Milewski et al. |
| 9,183,672 B1 | 11/2015 | Hickman et al. |
| 9,185,062 B1 | 11/2015 | Yang et al. |
| 9,189,611 B1 | 11/2015 | Wssingbo |
| 9,196,072 B2 | 11/2015 | Oh et al. |
| 9,201,500 B2 | 12/2015 | Srinivasan et al. |
| 9,214,137 B2 | 12/2015 | Bala et al. |
| 9,222,787 B2 | 12/2015 | Blumenberg et al. |
| 9,230,368 B2 | 1/2016 | Keane et al. |
| 9,237,334 B2 | 1/2016 | Cheng et al. |
| 9,241,149 B2 | 1/2016 | Redmann |
| 9,245,388 B2 | 1/2016 | Poulos et al. |
| 9,256,785 B2 | 2/2016 | Qvarfordt |
| 9,293,118 B2 | 3/2016 | Matsui |
| 9,294,757 B1 | 3/2016 | Lewis et al. |
| 9,298,334 B1 | 3/2016 | Zimmerman et al. |
| 9,316,827 B2 | 4/2016 | Lindley et al. |
| 9,348,458 B2 | 5/2016 | Hotelling et al. |
| 9,383,189 B2 | 7/2016 | Bridges et al. |
| 9,384,594 B2 | 7/2016 | Maciocci et al. |
| 9,396,580 B1 | 7/2016 | Nowrouzezahrai et al. |
| 9,400,559 B2 | 7/2016 | Latta et al. |
| 9,426,193 B2 | 8/2016 | Goodman |
| 9,436,357 B2 | 9/2016 | Pallakoff et al. |
| 9,437,047 B2 | 9/2016 | Chang et al. |
| 9,448,635 B2 | 9/2016 | Macdougall et al. |
| 9,448,687 B1 | 9/2016 | Mckenzie et al. |
| 9,465,479 B2 | 10/2016 | Cho et al. |
| 9,491,374 B1 | 11/2016 | Avrahami et al. |
| 9,519,371 B2 | 12/2016 | Nishida |
| 9,526,127 B1 | 12/2016 | Taubman et al. |
| 9,544,257 B2 | 1/2017 | Ogundokun et al. |
| 9,563,331 B2 | 2/2017 | Poulos et al. |
| 9,575,559 B2 | 2/2017 | Andrysco |
| 9,588,651 B1 | 3/2017 | Buchanan et al. |
| 9,612,722 B2 | 4/2017 | Miller et al. |
| 9,619,105 B1 | 4/2017 | Dal Mutto |
| 9,619,519 B1 | 4/2017 | Dorner |
| 9,672,588 B1 | 6/2017 | Doucette et al. |
| 9,681,112 B2 | 6/2017 | Son |
| 9,684,372 B2 | 6/2017 | Xun et al. |
| 9,704,230 B2 | 7/2017 | Hofmann et al. |
| 9,734,402 B2 | 8/2017 | Jang et al. |
| 9,778,814 B2 | 10/2017 | Ambrus et al. |
| 9,779,512 B2 | 10/2017 | Tomlin et al. |
| 9,829,708 B1 | 11/2017 | Asada |
| 9,851,866 B2 | 12/2017 | Goossens et al. |
| 9,864,498 B2 | 1/2018 | Olsson et al. |
| 9,870,130 B2 | 1/2018 | Schubert et al. |
| 9,886,087 B1 | 2/2018 | Wald et al. |
| 9,911,232 B2 | 3/2018 | Shapira et al. |
| 9,933,833 B2 | 4/2018 | Tu et al. |
| 9,933,937 B2 | 4/2018 | Lemay et al. |
| 9,934,614 B2 | 4/2018 | Ramsby et al. |
| 9,952,042 B2 | 4/2018 | Abovitz et al. |
| 10,026,209 B1 | 7/2018 | Dagley et al. |
| 10,049,460 B2 | 8/2018 | Romano et al. |
| 10,101,803 B2 | 10/2018 | Faaborg et al. |
| 10,139,985 B2 | 11/2018 | Mildrew et al. |
| 10,163,198 B2 | 12/2018 | Rochford et al. |
| 10,175,483 B2 | 1/2019 | Salter et al. |
| 10,186,086 B2 | 1/2019 | Giraldi et al. |
| 10,192,347 B2 | 1/2019 | Bui et al. |
| 10,203,762 B2 | 2/2019 | Bradski et al. |
| 10,203,764 B2 | 2/2019 | Katz et al. |
| 10,210,664 B1 | 2/2019 | Chaturvedi |
| 10,303,427 B2 | 5/2019 | Shintani et al. |
| 10,307,671 B2 | 6/2019 | Barney et al. |
| 10,318,034 B2 | 6/2019 | Hauenstein et al. |
| 10,331,205 B2 | 6/2019 | Kim et al. |
| 10,339,721 B1 | 7/2019 | Dascola et al. |
| 10,353,532 B1 | 7/2019 | Holz et al. |
| 10,373,381 B2 | 8/2019 | Nuernberger et al. |
| 10,394,320 B2 | 8/2019 | George-Svahn et al. |
| 10,401,958 B2 | 9/2019 | Peana et al. |
| 10,424,124 B2 | 9/2019 | Takahashi |

(56) References Cited

U.S. PATENT DOCUMENTS

| | | | |
|---|---|---|---|
| 10,431,216 B1 | 10/2019 | Lemon et al. |
| 10,448,189 B2 | 10/2019 | Link |
| 10,484,641 B2 | 11/2019 | Zhou et al. |
| 10,488,941 B2 | 11/2019 | Lam et al. |
| 10,499,044 B1 | 12/2019 | Giokaris et al. |
| 10,530,731 B1 | 1/2020 | Wu et al. |
| 10,534,439 B2 | 1/2020 | Raffa et al. |
| 10,540,005 B2 | 1/2020 | Yoon et al. |
| 10,545,584 B2 | 1/2020 | Tome et al. |
| 10,564,714 B2 | 2/2020 | Marggraff et al. |
| 10,565,448 B2 | 2/2020 | Bell et al. |
| 10,565,761 B2 | 2/2020 | Deluca et al. |
| 10,573,067 B1 | 2/2020 | Naik et al. |
| 10,630,803 B2 | 4/2020 | Hwang et al. |
| 10,642,368 B2 | 5/2020 | Chen |
| 10,645,332 B2 | 5/2020 | Zhang |
| 10,664,043 B2 | 5/2020 | Ikuta et al. |
| 10,664,048 B2 | 5/2020 | Cieplinski et al. |
| 10,664,050 B2 | 5/2020 | Alcaide et al. |
| 10,671,241 B1 | 6/2020 | Jia et al. |
| 10,671,243 B2 | 6/2020 | Ryu et al. |
| 10,678,403 B2 | 6/2020 | Duarte et al. |
| 10,691,216 B2 | 6/2020 | Geisner et al. |
| 10,698,562 B1 | 6/2020 | Zhou et al. |
| 10,699,488 B1 | 6/2020 | Terrano |
| 10,701,661 B1 | 6/2020 | Coelho et al. |
| 10,708,965 B1 | 7/2020 | Subramanian et al. |
| 10,712,900 B2 | 7/2020 | Osman et al. |
| 10,732,721 B1 | 8/2020 | Clements |
| 10,754,434 B2 | 8/2020 | Hall et al. |
| 10,762,716 B1 | 9/2020 | Paul et al. |
| 10,768,421 B1 | 9/2020 | Rosenberg et al. |
| 10,768,693 B2 | 9/2020 | Powderly et al. |
| 10,776,933 B2 | 9/2020 | Faulkner |
| 10,846,864 B2 | 11/2020 | Kim et al. |
| 10,852,814 B1 | 12/2020 | Caron et al. |
| 10,861,242 B2 | 12/2020 | Lacey et al. |
| 10,877,645 B2 | 12/2020 | Lee et al. |
| 10,885,701 B1 | 1/2021 | Patel |
| 10,890,967 B2 | 1/2021 | Stellmach et al. |
| 10,922,744 B1 | 2/2021 | Mahajan |
| 10,929,099 B2 | 2/2021 | Querze et al. |
| 10,936,148 B1 | 3/2021 | Merkl et al. |
| 10,956,724 B1 | 3/2021 | Terrano |
| 10,983,663 B2 | 4/2021 | Iglesias |
| 11,003,308 B1 | 5/2021 | Dryer et al. |
| 11,017,611 B1 | 5/2021 | Mount et al. |
| 11,023,035 B1 | 6/2021 | Atlas et al. |
| 11,055,920 B1 | 7/2021 | Bramwell et al. |
| 11,079,995 B1 | 8/2021 | Hulbert et al. |
| 11,082,463 B2 | 8/2021 | Felman |
| 11,095,857 B1 | 8/2021 | Krol et al. |
| 11,112,875 B1 | 9/2021 | Zhou et al. |
| 11,126,850 B1 | 9/2021 | Ichim et al. |
| 11,132,162 B2 | 9/2021 | Bar-zeev et al. |
| 11,132,840 B2 | 9/2021 | Sarangdhar et al. |
| 11,138,798 B2 | 10/2021 | Paul et al. |
| 11,146,909 B1 | 10/2021 | Pinto et al. |
| 11,175,791 B1 | 11/2021 | Patnaikuni et al. |
| 11,176,755 B1 | 11/2021 | Tichenor et al. |
| 11,182,964 B2 | 11/2021 | Palangie et al. |
| 11,199,898 B2 | 12/2021 | Blume et al. |
| 11,200,742 B1 | 12/2021 | Post et al. |
| 11,204,678 B1 | 12/2021 | Baker et al. |
| 11,232,643 B1 | 1/2022 | Stevens et al. |
| 11,243,734 B2 | 2/2022 | Boissière et al. |
| 11,249,556 B1 | 2/2022 | Schwarz et al. |
| 11,262,885 B1 | 3/2022 | Burckel |
| 11,266,919 B2 | 3/2022 | Bear et al. |
| 11,294,472 B2 | 4/2022 | Tang et al. |
| 11,294,475 B1 | 4/2022 | Pinchon et al. |
| 11,307,653 B1 | 4/2022 | Qian et al. |
| 11,340,756 B2 | 5/2022 | Faulkner et al. |
| 11,343,420 B1 | 5/2022 | Herz et al. |
| 11,347,319 B2 | 5/2022 | Goel et al. |
| 11,348,300 B2 | 5/2022 | Zimmermann et al. |
| 11,348,316 B2 | 5/2022 | Burns et al. |
| 11,379,033 B2 | 7/2022 | O'hern et al. |
| 11,380,323 B2 | 7/2022 | Shin et al. |
| 11,382,611 B1 | 7/2022 | Westling et al. |
| 11,406,896 B1 | 8/2022 | Cheung et al. |
| 11,409,363 B2 | 8/2022 | Chen et al. |
| 11,416,080 B2 | 8/2022 | Heo et al. |
| 11,432,095 B1 | 8/2022 | Satongar et al. |
| 11,461,973 B2 | 10/2022 | Pinchon |
| 11,496,571 B2 | 11/2022 | Berliner et al. |
| 11,500,510 B2 | 11/2022 | Tokuchi et al. |
| 11,531,402 B1 | 12/2022 | Stolzenberg |
| 11,531,459 B2 | 12/2022 | Poupyrev et al. |
| 11,557,102 B2 | 1/2023 | Palangie et al. |
| 11,567,625 B2 | 1/2023 | Faulkner et al. |
| 11,573,363 B2 | 2/2023 | Zou et al. |
| 11,574,452 B2 | 2/2023 | Berliner et al. |
| 11,599,239 B2 | 3/2023 | Rockel et al. |
| 11,604,080 B2 | 3/2023 | Paoletti et al. |
| 11,615,596 B2 | 3/2023 | Faulkner et al. |
| 11,641,460 B1 | 5/2023 | Geusz et al. |
| 11,669,155 B2 | 6/2023 | Bowman et al. |
| 11,689,632 B2 | 6/2023 | Raisher et al. |
| 11,720,171 B2 | 8/2023 | Pastrana Vicente et al. |
| 11,726,577 B2 | 8/2023 | Katz |
| 11,730,226 B2 | 8/2023 | Stolarz et al. |
| 11,733,824 B2 | 8/2023 | Iskandar et al. |
| 11,743,215 B1 | 8/2023 | Murillo et al. |
| 11,762,457 B1 | 9/2023 | Ikkai et al. |
| 11,762,473 B2 | 9/2023 | Cipoletta et al. |
| 11,768,544 B2 | 9/2023 | Schwarz et al. |
| 11,768,546 B1 | 9/2023 | Poulos et al. |
| 11,842,454 B1 | 12/2023 | Lin et al. |
| 11,847,748 B2 | 12/2023 | Liu et al. |
| 11,861,056 B2 | 1/2024 | Burns et al. |
| 11,861,136 B1 | 1/2024 | Faulkner et al. |
| 11,868,582 B2 | 1/2024 | Kim et al. |
| 11,875,013 B2 | 1/2024 | Lemay et al. |
| 11,875,162 B2 | 1/2024 | Garstenauer et al. |
| 11,886,643 B2 | 1/2024 | Irie et al. |
| 11,899,845 B2 | 2/2024 | Chung et al. |
| 11,909,453 B2 | 2/2024 | Javaudin et al. |
| 11,914,759 B2 | 2/2024 | Klein et al. |
| 11,922,588 B2 | 3/2024 | Fillhardt et al. |
| 11,928,263 B2 | 3/2024 | Jung et al. |
| 11,934,569 B2 | 3/2024 | Pastrana Vicente et al. |
| 11,948,263 B1 | 4/2024 | Rudman et al. |
| 11,954,242 B2 | 4/2024 | Dascola et al. |
| 11,972,092 B2 | 4/2024 | Zurmoehle et al. |
| 11,983,326 B2 | 5/2024 | Lacey |
| 11,988,832 B2 | 5/2024 | Singh et al. |
| 11,989,965 B2 | 5/2024 | Tarighat Mehrabani |
| 11,995,301 B2 | 5/2024 | Hylak et al. |
| 12,020,387 B2 | 6/2024 | Maharaja |
| 12,023,579 B2 | 7/2024 | Azmandian et al. |
| 12,032,803 B2 | 7/2024 | Pastrana Vicente et al. |
| 12,062,127 B2 | 8/2024 | Park et al. |
| 12,099,653 B2 | 9/2024 | Chawda et al. |
| 12,099,695 B1 | 9/2024 | Smith et al. |
| 12,112,011 B2 | 10/2024 | Smith et al. |
| 12,113,948 B1 | 10/2024 | Smith et al. |
| 12,118,200 B1 | 10/2024 | Shutzberg et al. |
| 12,154,236 B1 | 11/2024 | Herman et al. |
| 12,182,325 B2 | 12/2024 | Calderone et al. |
| 12,236,546 B1 | 2/2025 | Lipton |
| 12,254,127 B2 | 3/2025 | Burns et al. |
| 12,321,515 B2 | 6/2025 | Calderone et al. |
| 12,394,167 B1 | 8/2025 | Scully et al. |
| 12,408,804 B2 | 9/2025 | Schneider et al. |
| 2001/0047250 A1 | 11/2001 | Schuller et al. |
| 2002/0015024 A1 | 2/2002 | Westerman et al. |
| 2002/0024675 A1 | 2/2002 | Foxlin |
| 2002/0030692 A1 | 3/2002 | Griesert |
| 2002/0044152 A1 | 4/2002 | Abbott et al. |
| 2002/0065778 A1 | 5/2002 | Bouet et al. |
| 2003/0038754 A1 | 2/2003 | Goldstein et al. |
| 2003/0151611 A1 | 8/2003 | Turpin et al. |
| 2003/0222924 A1 | 12/2003 | Baron |

(56) References Cited

U.S. PATENT DOCUMENTS

| | | |
|---|---|---|
| 2004/0059784 A1 | 3/2004 | Caughey |
| 2004/0104806 A1 | 6/2004 | Yui et al. |
| 2004/0230912 A1 | 11/2004 | Clow et al. |
| 2004/0243926 A1 | 12/2004 | Trenbeath et al. |
| 2005/0044510 A1 | 2/2005 | Yi |
| 2005/0062738 A1 | 3/2005 | Handley et al. |
| 2005/0073136 A1 | 4/2005 | Larsson et al. |
| 2005/0100210 A1 | 5/2005 | Rice et al. |
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0175218 A1 | 8/2005 | Vertegaal et al. |
| 2005/0190059 A1 | 9/2005 | Wehrenberg |
| 2005/0198143 A1 | 9/2005 | Moody et al. |
| 2005/0216866 A1 | 9/2005 | Rosen et al. |
| 2005/0231532 A1 | 10/2005 | Suzuki et al. |
| 2005/0248299 A1 | 11/2005 | Chemel et al. |
| 2006/0017692 A1 | 1/2006 | Wehrenberg et al. |
| 2006/0028400 A1 | 2/2006 | Lapstun et al. |
| 2006/0033724 A1 | 2/2006 | Chaudhri et al. |
| 2006/0034590 A1 | 2/2006 | Teramoto |
| 2006/0080702 A1 | 4/2006 | Diez et al. |
| 2006/0156228 A1 | 7/2006 | Gallo et al. |
| 2006/0197753 A1 | 9/2006 | Hotelling |
| 2006/0256083 A1 | 11/2006 | Rosenberg |
| 2006/0283214 A1 | 12/2006 | Donadon et al. |
| 2007/0172112 A1 | 7/2007 | Paley et al. |
| 2007/0259716 A1 | 11/2007 | Mattice et al. |
| 2008/0132249 A1 | 6/2008 | Hamilton |
| 2008/0181502 A1 | 7/2008 | Yang |
| 2008/0186255 A1 | 8/2008 | Cohen et al. |
| 2008/0211771 A1 | 9/2008 | Richardson |
| 2008/0222710 A1 | 9/2008 | Blagsvedt et al. |
| 2008/0310707 A1 | 12/2008 | Kansal et al. |
| 2009/0037844 A1 | 2/2009 | Kim et al. |
| 2009/0049408 A1 | 2/2009 | Naaman et al. |
| 2009/0064035 A1 | 3/2009 | Shibata et al. |
| 2009/0146779 A1 | 6/2009 | Kumar et al. |
| 2009/0146961 A1 | 6/2009 | Cheung et al. |
| 2009/0164219 A1 | 6/2009 | Yeung et al. |
| 2009/0231356 A1 | 9/2009 | Barnes et al. |
| 2009/0254843 A1 | 10/2009 | Van et al. |
| 2009/0319181 A1 | 12/2009 | Khosravy et al. |
| 2009/0326810 A1 | 12/2009 | Callaghan et al. |
| 2010/0097375 A1 | 4/2010 | Tadaishi et al. |
| 2010/0115459 A1 | 5/2010 | Kinnunen et al. |
| 2010/0150526 A1 | 6/2010 | Rose et al. |
| 2010/0177049 A1 | 7/2010 | Levy et al. |
| 2010/0185949 A1 | 7/2010 | Jaeger |
| 2010/0188503 A1 | 7/2010 | Tsai et al. |
| 2010/0188572 A1 | 7/2010 | Card |
| 2010/0208033 A1 | 8/2010 | Edge et al. |
| 2010/0269145 A1 | 10/2010 | Ingrassia et al. |
| 2010/0293504 A1 | 11/2010 | Hachiya |
| 2010/0302245 A1 | 12/2010 | Best |
| 2010/0328432 A1 | 12/2010 | Tanaka |
| 2010/0332196 A1 | 12/2010 | Fisker et al. |
| 2011/0018895 A1 | 1/2011 | Buzyn et al. |
| 2011/0018896 A1 | 1/2011 | Buzyn et al. |
| 2011/0029185 A1 | 2/2011 | Aoki et al. |
| 2011/0032365 A1 | 2/2011 | Yett |
| 2011/0066981 A1 | 3/2011 | Chmielewski et al. |
| 2011/0098029 A1 | 4/2011 | Rhoads et al. |
| 2011/0142321 A1 | 6/2011 | Huffman |
| 2011/0156879 A1 | 6/2011 | Matsushita et al. |
| 2011/0164163 A1 | 7/2011 | Bilbrey et al. |
| 2011/0169927 A1 | 7/2011 | Mages et al. |
| 2011/0175932 A1 | 7/2011 | Yu et al. |
| 2011/0216060 A1 | 9/2011 | Weising et al. |
| 2011/0243448 A1 | 10/2011 | Kawabuchi et al. |
| 2011/0254865 A1 | 10/2011 | Yee et al. |
| 2011/0289691 A1 | 12/2011 | Laflèche et al. |
| 2011/0304557 A1 | 12/2011 | Wilburn et al. |
| 2011/0310001 A1 | 12/2011 | Madau et al. |
| 2011/0320969 A1 | 12/2011 | Hwang et al. |
| 2012/0038751 A1 | 2/2012 | Yuan et al. |
| 2012/0066638 A1 | 3/2012 | Ohri |
| 2012/0075496 A1 | 3/2012 | Akifusa et al. |
| 2012/0086624 A1 | 4/2012 | Thompson et al. |
| 2012/0113223 A1 | 5/2012 | Hilliges et al. |
| 2012/0124525 A1 | 5/2012 | Kang |
| 2012/0131631 A1 | 5/2012 | Bhogal et al. |
| 2012/0151416 A1 | 6/2012 | Bell et al. |
| 2012/0170089 A1 | 7/2012 | Kim et al. |
| 2012/0170840 A1 | 7/2012 | Caruso et al. |
| 2012/0184372 A1 | 7/2012 | Laarakkers et al. |
| 2012/0194547 A1 | 8/2012 | Johnson et al. |
| 2012/0218395 A1 | 8/2012 | Andersen et al. |
| 2012/0223885 A1 | 9/2012 | Perez |
| 2012/0249416 A1 | 10/2012 | Maciocci et al. |
| 2012/0249741 A1 | 10/2012 | Maciocci et al. |
| 2012/0256956 A1 | 10/2012 | Kasahara |
| 2012/0256967 A1 | 10/2012 | Baldwin et al. |
| 2012/0257035 A1 | 10/2012 | Larsen |
| 2012/0272179 A1 | 10/2012 | Stafford |
| 2012/0290401 A1 | 11/2012 | Neven |
| 2012/0304087 A1 | 11/2012 | Walkin et al. |
| 2013/0010062 A1 | 1/2013 | Redmann |
| 2013/0027860 A1 | 1/2013 | Masaki et al. |
| 2013/0088516 A1 | 4/2013 | Ota et al. |
| 2013/0093727 A1 | 4/2013 | Eriksson et al. |
| 2013/0127850 A1 | 5/2013 | Bindon |
| 2013/0147820 A1 | 6/2013 | Kalai et al. |
| 2013/0148850 A1 | 6/2013 | Matsuda et al. |
| 2013/0169533 A1 | 7/2013 | Jahnke |
| 2013/0190044 A1 | 7/2013 | Kulas |
| 2013/0191160 A1 | 7/2013 | Oran |
| 2013/0207963 A1 | 8/2013 | Stirbu et al. |
| 2013/0211843 A1 | 8/2013 | Clarkson |
| 2013/0212470 A1 | 8/2013 | Karunamuni et al. |
| 2013/0222227 A1 | 8/2013 | Johansson et al. |
| 2013/0222410 A1 | 8/2013 | Kameyama et al. |
| 2013/0229345 A1 | 9/2013 | Day et al. |
| 2013/0232430 A1 | 9/2013 | Reitan |
| 2013/0246955 A1 | 9/2013 | Schwesig et al. |
| 2013/0249922 A1 | 9/2013 | Hachiya |
| 2013/0263016 A1 | 10/2013 | Lehtiniemi et al. |
| 2013/0265227 A1 | 10/2013 | Julian |
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0293456 A1 | 11/2013 | Son et al. |
| 2013/0300648 A1 | 11/2013 | Kim et al. |
| 2013/0300654 A1 | 11/2013 | Seki |
| 2013/0307945 A1 | 11/2013 | Cheng et al. |
| 2013/0321462 A1 | 12/2013 | Salter et al. |
| 2013/0325326 A1 | 12/2013 | Blumenberg et al. |
| 2013/0326341 A1 | 12/2013 | Nonaka |
| 2013/0326364 A1 | 12/2013 | Latta et al. |
| 2013/0328925 A1 | 12/2013 | Latta et al. |
| 2013/0332890 A1 | 12/2013 | Ramic et al. |
| 2013/0335301 A1 | 12/2013 | Wong et al. |
| 2013/0342564 A1 | 12/2013 | Kinnebrew et al. |
| 2013/0342570 A1 | 12/2013 | Kinnebrew et al. |
| 2013/0345975 A1 | 12/2013 | Vulcano et al. |
| 2014/0002338 A1 | 1/2014 | Raffa et al. |
| 2014/0002444 A1 | 1/2014 | Bennett et al. |
| 2014/0024324 A1 | 1/2014 | Mumick |
| 2014/0028548 A1 | 1/2014 | Bychkov et al. |
| 2014/0040832 A1 | 2/2014 | Regelous |
| 2014/0049462 A1 | 2/2014 | Weinberger et al. |
| 2014/0063058 A1 | 3/2014 | Fialho et al. |
| 2014/0068692 A1 | 3/2014 | Archibong et al. |
| 2014/0071241 A1 | 3/2014 | Yang et al. |
| 2014/0075361 A1 | 3/2014 | Reynolds et al. |
| 2014/0078176 A1 | 3/2014 | Kim et al. |
| 2014/0092018 A1 | 4/2014 | Geithner |
| 2014/0104206 A1 | 4/2014 | Anderson |
| 2014/0108942 A1 | 4/2014 | Freeman et al. |
| 2014/0114845 A1 | 4/2014 | Rogers et al. |
| 2014/0125584 A1 | 5/2014 | Xun et al. |
| 2014/0125585 A1 | 5/2014 | Song et al. |
| 2014/0126782 A1 | 5/2014 | Takai et al. |
| 2014/0129990 A1 | 5/2014 | Xin et al. |

(56)                 References Cited

U.S. PATENT DOCUMENTS

| | | |
|---|---|---|
| 2014/0132499 A1 | 5/2014 | Schwesinger et al. |
| 2014/0132633 A1 | 5/2014 | Fekete et al. |
| 2014/0139426 A1 | 5/2014 | Kryze et al. |
| 2014/0164928 A1 | 6/2014 | Kim |
| 2014/0168267 A1 | 6/2014 | Kim et al. |
| 2014/0168453 A1 | 6/2014 | Shoemake et al. |
| 2014/0181683 A1 | 6/2014 | Lim et al. |
| 2014/0198017 A1 | 7/2014 | Lamb et al. |
| 2014/0232639 A1 | 8/2014 | Hayashi et al. |
| 2014/0237366 A1 | 8/2014 | Poulos et al. |
| 2014/0247208 A1 | 9/2014 | Henderek et al. |
| 2014/0247210 A1 | 9/2014 | Henderek et al. |
| 2014/0258942 A1 | 9/2014 | Kutliroff et al. |
| 2014/0267046 A1 | 9/2014 | Ellsworth et al. |
| 2014/0267400 A1 | 9/2014 | Mabbutt et al. |
| 2014/0268054 A1 | 9/2014 | Olsson et al. |
| 2014/0282272 A1 | 9/2014 | Kies et al. |
| 2014/0285641 A1 | 9/2014 | Kato et al. |
| 2014/0298273 A1 | 10/2014 | Blackstone et al. |
| 2014/0304612 A1 | 10/2014 | Collin |
| 2014/0320404 A1 | 10/2014 | Kasahara |
| 2014/0331187 A1 | 11/2014 | Hicks et al. |
| 2014/0333666 A1 | 11/2014 | Poulos et al. |
| 2014/0347391 A1 | 11/2014 | Keane et al. |
| 2014/0351727 A1 | 11/2014 | Danton et al. |
| 2014/0351753 A1 | 11/2014 | Shin et al. |
| 2014/0362111 A1 | 12/2014 | Kim |
| 2014/0363074 A1 | 12/2014 | Dolfing et al. |
| 2014/0368537 A1 | 12/2014 | Salter et al. |
| 2014/0368620 A1 | 12/2014 | Li et al. |
| 2014/0372957 A1 | 12/2014 | Keane et al. |
| 2014/0375541 A1 | 12/2014 | Nister et al. |
| 2014/0375683 A1 | 12/2014 | Salter et al. |
| 2015/0009118 A1 | 1/2015 | Thomas et al. |
| 2015/0035822 A1 | 2/2015 | Arsan et al. |
| 2015/0035832 A1 | 2/2015 | Sugden et al. |
| 2015/0042679 A1 | 2/2015 | Järvenpää |
| 2015/0058718 A1 | 2/2015 | Kim et al. |
| 2015/0067580 A1 | 3/2015 | Um et al. |
| 2015/0077335 A1 | 3/2015 | Taguchi et al. |
| 2015/0082180 A1 | 3/2015 | Ames et al. |
| 2015/0095844 A1 | 4/2015 | Cho et al. |
| 2015/0121466 A1 | 4/2015 | Brands et al. |
| 2015/0123890 A1 | 5/2015 | Kapur et al. |
| 2015/0123901 A1 | 5/2015 | Schwesinger et al. |
| 2015/0128075 A1 | 5/2015 | Kempinski |
| 2015/0131850 A1 | 5/2015 | Qvarfordt |
| 2015/0135108 A1 | 5/2015 | Pope et al. |
| 2015/0145887 A1 | 5/2015 | Forutanpour et al. |
| 2015/0149929 A1 | 5/2015 | Shepherd et al. |
| 2015/0149961 A1 | 5/2015 | Karakotsios |
| 2015/0153833 A1 | 6/2015 | Pinault et al. |
| 2015/0169506 A1 | 6/2015 | Leventhal et al. |
| 2015/0177937 A1 | 6/2015 | Poletto et al. |
| 2015/0187093 A1 | 7/2015 | Chu et al. |
| 2015/0193982 A1 | 7/2015 | Mihelich et al. |
| 2015/0199081 A1 | 7/2015 | Wheeler |
| 2015/0205106 A1 | 7/2015 | Norden |
| 2015/0212576 A1 | 7/2015 | Ambrus et al. |
| 2015/0220152 A1 | 8/2015 | Tait et al. |
| 2015/0221132 A1 | 8/2015 | Kruglick |
| 2015/0227285 A1 | 8/2015 | Lee et al. |
| 2015/0242095 A1 | 8/2015 | Sonnenberg |
| 2015/0253957 A1 | 9/2015 | Crocker |
| 2015/0254905 A1 | 9/2015 | Ramsby et al. |
| 2015/0255067 A1 | 9/2015 | White et al. |
| 2015/0262428 A1 | 9/2015 | Tatzgern et al. |
| 2015/0287403 A1 | 10/2015 | Holzer Zaslansky et al. |
| 2015/0312561 A1 | 10/2015 | Hoof et al. |
| 2015/0317831 A1 | 11/2015 | Ebstyne et al. |
| 2015/0317832 A1 | 11/2015 | Ebstyne et al. |
| 2015/0331240 A1 | 11/2015 | Poulos et al. |
| 2015/0331576 A1 | 11/2015 | Piya et al. |
| 2015/0332091 A1 | 11/2015 | Kim et al. |
| 2015/0350141 A1 | 12/2015 | Yang et al. |
| 2015/0370323 A1 | 12/2015 | Cieplinski et al. |
| 2015/0370404 A1 | 12/2015 | Hu et al. |
| 2015/0381974 A1 | 12/2015 | Hoffman et al. |
| 2016/0012642 A1 | 1/2016 | Lee et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0025971 A1 | 1/2016 | Crow et al. |
| 2016/0026242 A1 | 1/2016 | Burns et al. |
| 2016/0026243 A1 | 1/2016 | Bertram et al. |
| 2016/0026253 A1 | 1/2016 | Bradski et al. |
| 2016/0028961 A1 | 1/2016 | Thurairatnam |
| 2016/0041391 A1 | 2/2016 | Van et al. |
| 2016/0050642 A1 | 2/2016 | Brown et al. |
| 2016/0062636 A1 | 3/2016 | Jung et al. |
| 2016/0085301 A1 | 3/2016 | Lopez |
| 2016/0093108 A1 | 3/2016 | Mao et al. |
| 2016/0098093 A1 | 4/2016 | Cheon et al. |
| 2016/0098094 A1 | 4/2016 | Minkkinen |
| 2016/0098972 A1 | 4/2016 | Feit et al. |
| 2016/0127690 A1 | 5/2016 | Kaehler et al. |
| 2016/0133044 A1 | 5/2016 | Lynch |
| 2016/0133052 A1 | 5/2016 | Choi et al. |
| 2016/0171304 A1 | 6/2016 | Golding et al. |
| 2016/0179191 A1 | 6/2016 | Kim et al. |
| 2016/0179336 A1 | 6/2016 | Ambrus et al. |
| 2016/0188181 A1 | 6/2016 | Smith |
| 2016/0189426 A1 | 6/2016 | Thomas et al. |
| 2016/0193104 A1 | 7/2016 | Du |
| 2016/0196692 A1 | 7/2016 | Kjallstrom et al. |
| 2016/0210784 A1 | 7/2016 | Ramsby et al. |
| 2016/0216768 A1 | 7/2016 | Goetz et al. |
| 2016/0224122 A1 | 8/2016 | Dietz et al. |
| 2016/0225012 A1 | 8/2016 | Ha et al. |
| 2016/0225164 A1 | 8/2016 | Tomlin et al. |
| 2016/0227267 A1 | 8/2016 | Tsurutani et al. |
| 2016/0239165 A1 | 8/2016 | Chen et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0279516 A1 | 9/2016 | Gupta et al. |
| 2016/0291922 A1 | 10/2016 | Montgomerie et al. |
| 2016/0306434 A1 | 10/2016 | Ferrin |
| 2016/0309081 A1 | 10/2016 | Frahm et al. |
| 2016/0313890 A1 | 10/2016 | Walline et al. |
| 2016/0334940 A1 | 11/2016 | Kandadai et al. |
| 2016/0349063 A1 | 12/2016 | Maurer et al. |
| 2016/0350973 A1 | 12/2016 | Shapira et al. |
| 2016/0357266 A1 | 12/2016 | Patel et al. |
| 2016/0363774 A1 | 12/2016 | Kawasima |
| 2016/0370858 A1 | 12/2016 | Leppänen et al. |
| 2016/0373647 A1 | 12/2016 | García Morate et al. |
| 2016/0373714 A1 | 12/2016 | Lee et al. |
| 2016/0379409 A1 | 12/2016 | Gavriliuc et al. |
| 2017/0032568 A1 | 2/2017 | Gharpure et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0046872 A1 | 2/2017 | Geselowitz et al. |
| 2017/0052393 A1 | 2/2017 | Kweon |
| 2017/0052595 A1 | 2/2017 | Poulos et al. |
| 2017/0053383 A1 | 2/2017 | Heo |
| 2017/0060230 A1 | 3/2017 | Faaborg et al. |
| 2017/0061694 A1 | 3/2017 | Giraldi et al. |
| 2017/0090566 A1 | 3/2017 | George-svahn et al. |
| 2017/0109930 A1 | 4/2017 | Holzer et al. |
| 2017/0115728 A1 | 4/2017 | Park et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0146801 A1 | 5/2017 | Stempora |
| 2017/0147180 A1 | 5/2017 | Yoon et al. |
| 2017/0148339 A1 | 5/2017 | Van Curen et al. |
| 2017/0153866 A1 | 6/2017 | Grinberg et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |

(56) References Cited

U.S. PATENT DOCUMENTS

| | | |
|---|---|---|
| 2017/0178392 A1 | 6/2017 | Zuccarino et al. |
| 2017/0185276 A1 | 6/2017 | Lee et al. |
| 2017/0206691 A1 | 7/2017 | Harrises et al. |
| 2017/0206692 A1 | 7/2017 | Sheaffer et al. |
| 2017/0212583 A1 | 7/2017 | Krasadakis |
| 2017/0213388 A1 | 7/2017 | Margolis et al. |
| 2017/0214782 A1 | 7/2017 | Brinda |
| 2017/0221264 A1 | 8/2017 | Perry |
| 2017/0228130 A1 | 8/2017 | Palmaro |
| 2017/0236332 A1 | 8/2017 | Kipman et al. |
| 2017/0243352 A1 | 8/2017 | Kutliroff et al. |
| 2017/0251143 A1 | 8/2017 | Peruch et al. |
| 2017/0256096 A1 | 9/2017 | Faaborg et al. |
| 2017/0270715 A1 | 9/2017 | Lindsay et al. |
| 2017/0285737 A1 | 10/2017 | Khalid et al. |
| 2017/0287215 A1 | 10/2017 | Lalonde et al. |
| 2017/0287225 A1 | 10/2017 | Powderly et al. |
| 2017/0302903 A1 | 10/2017 | Ng et al. |
| 2017/0308163 A1 | 10/2017 | Cieplinski et al. |
| 2017/0315715 A1 | 11/2017 | Fujita et al. |
| 2017/0326457 A1 | 11/2017 | Tilton et al. |
| 2017/0344223 A1 | 11/2017 | Holzer et al. |
| 2017/0351094 A1 | 12/2017 | Poulos et al. |
| 2017/0357389 A1 | 12/2017 | Fleizach et al. |
| 2017/0357390 A1 | 12/2017 | Alonso Ruiz et al. |
| 2017/0358141 A1 | 12/2017 | Stafford et al. |
| 2017/0364198 A1 | 12/2017 | Yoganandan et al. |
| 2018/0005433 A1 | 1/2018 | Kohler et al. |
| 2018/0024681 A1 | 1/2018 | Bernstein et al. |
| 2018/0045963 A1 | 2/2018 | Hoover et al. |
| 2018/0046363 A1 | 2/2018 | Miller et al. |
| 2018/0075658 A1 | 3/2018 | Lanier et al. |
| 2018/0077383 A1 | 3/2018 | Akao et al. |
| 2018/0081519 A1 | 3/2018 | Kim |
| 2018/0084287 A1 | 3/2018 | Shimura |
| 2018/0088787 A1 | 3/2018 | Bereza et al. |
| 2018/0095542 A1 | 4/2018 | Mallinson |
| 2018/0095634 A1 | 4/2018 | Alexander |
| 2018/0095635 A1 | 4/2018 | Valdivia et al. |
| 2018/0095636 A1 | 4/2018 | Valdivia et al. |
| 2018/0095649 A1 | 4/2018 | Valdivia et al. |
| 2018/0101223 A1 | 4/2018 | Ishihara et al. |
| 2018/0103209 A1 | 4/2018 | Fischler et al. |
| 2018/0114364 A1 | 4/2018 | Mcphee et al. |
| 2018/0120944 A1 | 5/2018 | Wang et al. |
| 2018/0122043 A1 | 5/2018 | Energin et al. |
| 2018/0122138 A1 | 5/2018 | Piya et al. |
| 2018/0130255 A1 | 5/2018 | Hazeghi et al. |
| 2018/0136815 A1 | 5/2018 | Tomizuka et al. |
| 2018/0143693 A1 | 5/2018 | Calabrese et al. |
| 2018/0150204 A1 | 5/2018 | Macgillivray |
| 2018/0150997 A1 | 5/2018 | Austin |
| 2018/0157332 A1 | 6/2018 | Nie |
| 2018/0158222 A1 | 6/2018 | Hayashi |
| 2018/0165853 A1 | 6/2018 | Inagi et al. |
| 2018/0173404 A1 | 6/2018 | Smith |
| 2018/0181199 A1 | 6/2018 | Harvey et al. |
| 2018/0181272 A1 | 6/2018 | Olsson et al. |
| 2018/0183986 A1 | 6/2018 | Smith et al. |
| 2018/0188048 A1 | 7/2018 | Ding et al. |
| 2018/0188802 A1 | 7/2018 | Okumura |
| 2018/0190003 A1 | 7/2018 | Upadhyay et al. |
| 2018/0197336 A1 | 7/2018 | Rochford et al. |
| 2018/0197341 A1 | 7/2018 | Loberg et al. |
| 2018/0210628 A1 | 7/2018 | Mcphee et al. |
| 2018/0218214 A1 | 8/2018 | Pestun et al. |
| 2018/0220195 A1 | 8/2018 | Panchaksharaiah et al. |
| 2018/0239144 A1 | 8/2018 | Woods et al. |
| 2018/0247449 A1 | 8/2018 | Park et al. |
| 2018/0275753 A1 | 9/2018 | Publicover et al. |
| 2018/0286126 A1 | 10/2018 | Schwarz et al. |
| 2018/0288206 A1 | 10/2018 | Stimpson et al. |
| 2018/0300023 A1 | 10/2018 | Hein |
| 2018/0300952 A1 | 10/2018 | Evans et al. |
| 2018/0302687 A1 | 10/2018 | Bhattacharjee et al. |
| 2018/0315248 A1 | 11/2018 | Bastov et al. |
| 2018/0322701 A1 | 11/2018 | Pahud et al. |
| 2018/0330544 A1 | 11/2018 | Corso et al. |
| 2018/0330550 A1 | 11/2018 | Takahashi |
| 2018/0348010 A1 | 12/2018 | Coleman et al. |
| 2018/0348861 A1 | 12/2018 | Uscinski et al. |
| 2018/0348986 A1 | 12/2018 | Sawaki |
| 2018/0350099 A1 | 12/2018 | Yerkes et al. |
| 2018/0350119 A1 | 12/2018 | Kocharlakota et al. |
| 2018/0352374 A1 | 12/2018 | Ball et al. |
| 2019/0005055 A1 | 1/2019 | Andrew et al. |
| 2019/0012060 A1 | 1/2019 | Moore et al. |
| 2019/0018479 A1 | 1/2019 | Minami |
| 2019/0018498 A1 | 1/2019 | West et al. |
| 2019/0034076 A1 | 1/2019 | Vinayak et al. |
| 2019/0037137 A1 | 1/2019 | Toksvig et al. |
| 2019/0043259 A1 | 2/2019 | Wang et al. |
| 2019/0050062 A1 | 2/2019 | Chen et al. |
| 2019/0056785 A1 | 2/2019 | Suk |
| 2019/0065027 A1 | 2/2019 | Hauenstein et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0096134 A1 | 3/2019 | Amacker et al. |
| 2019/0101991 A1 | 4/2019 | Brennan |
| 2019/0102953 A1 | 4/2019 | Lindsay et al. |
| 2019/0130622 A1 | 5/2019 | Hoover et al. |
| 2019/0130633 A1 | 5/2019 | Haddad et al. |
| 2019/0130733 A1 | 5/2019 | Hodge |
| 2019/0138183 A1 | 5/2019 | Rosas et al. |
| 2019/0146128 A1 | 5/2019 | Cao et al. |
| 2019/0155495 A1 | 5/2019 | Klein et al. |
| 2019/0164340 A1 | 5/2019 | Pejic et al. |
| 2019/0172261 A1 | 6/2019 | Alt et al. |
| 2019/0172262 A1 | 6/2019 | Mchugh et al. |
| 2019/0180504 A1 | 6/2019 | Pomerantz et al. |
| 2019/0188895 A1 | 6/2019 | Miller et al. |
| 2019/0188918 A1 | 6/2019 | Brewer et al. |
| 2019/0204906 A1 | 7/2019 | Ross et al. |
| 2019/0212827 A1 | 7/2019 | Kin et al. |
| 2019/0213389 A1 | 7/2019 | Peruch et al. |
| 2019/0227763 A1 | 7/2019 | Kaufthal |
| 2019/0228503 A1 | 7/2019 | Tokuchi |
| 2019/0228589 A1 | 7/2019 | Dascola et al. |
| 2019/0238818 A1 | 8/2019 | Held et al. |
| 2019/0244434 A1 | 8/2019 | Pahud et al. |
| 2019/0251884 A1 | 8/2019 | Burns et al. |
| 2019/0258365 A1 | 8/2019 | Zurmoehle et al. |
| 2019/0265828 A1 | 8/2019 | Hauenstein et al. |
| 2019/0266774 A1 | 8/2019 | Sommerlade et al. |
| 2019/0277651 A1 | 9/2019 | Ruikar |
| 2019/0278432 A1 | 9/2019 | Bennett et al. |
| 2019/0279407 A1 | 9/2019 | Mchugh et al. |
| 2019/0287307 A1 | 9/2019 | Rogers et al. |
| 2019/0294312 A1 | 9/2019 | Rohrbacher |
| 2019/0302977 A1 | 10/2019 | Pendergast et al. |
| 2019/0310757 A1 | 10/2019 | Lee et al. |
| 2019/0311547 A1 | 10/2019 | Ohmori |
| 2019/0324529 A1 | 10/2019 | Stellmach et al. |
| 2019/0325654 A1 | 10/2019 | Stisser et al. |
| 2019/0332244 A1 | 10/2019 | Beszteri et al. |
| 2019/0332250 A1 | 10/2019 | Lee et al. |
| 2019/0333278 A1 | 10/2019 | Palangie et al. |
| 2019/0339770 A1 | 11/2019 | Kurlethimar et al. |
| 2019/0340816 A1 | 11/2019 | Rogers |
| 2019/0340832 A1 | 11/2019 | Srinivasan et al. |
| 2019/0346678 A1 | 11/2019 | Nocham |
| 2019/0346922 A1 | 11/2019 | Young et al. |
| 2019/0349575 A1 | 11/2019 | Knepper et al. |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0362560 A1 | 11/2019 | Choi et al. |
| 2019/0369569 A1 | 12/2019 | Olsen et al. |
| 2019/0370492 A1 | 12/2019 | Falchuk et al. |
| 2019/0371072 A1 | 12/2019 | Lindberg et al. |
| 2019/0371279 A1 | 12/2019 | Mak |

(56) References Cited

U.S. PATENT DOCUMENTS

| | | |
|---|---|---|
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2019/0392830 A1 | 12/2019 | Abdollahian |
| 2020/0004401 A1 | 1/2020 | Hwang et al. |
| 2020/0005539 A1 | 1/2020 | Hwang et al. |
| 2020/0012341 A1 | 1/2020 | Stellmach et al. |
| 2020/0020157 A1 | 1/2020 | Powers et al. |
| 2020/0026349 A1 | 1/2020 | Fontanel et al. |
| 2020/0026922 A1 | 1/2020 | Pekelny et al. |
| 2020/0038120 A1 | 2/2020 | Ziraknejad et al. |
| 2020/0043243 A1 | 2/2020 | Bhushan et al. |
| 2020/0045249 A1 | 2/2020 | Francois et al. |
| 2020/0048825 A1 | 2/2020 | Schultz et al. |
| 2020/0051527 A1 | 2/2020 | Ngo |
| 2020/0073521 A1 | 3/2020 | Peebler et al. |
| 2020/0081526 A1 | 3/2020 | Walker et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0097077 A1 | 3/2020 | Nguyen et al. |
| 2020/0098140 A1 | 3/2020 | Jagnow et al. |
| 2020/0098173 A1 | 3/2020 | Mccall |
| 2020/0099989 A1 | 3/2020 | Niemirska et al. |
| 2020/0106965 A1 | 4/2020 | Malia et al. |
| 2020/0112711 A1 | 4/2020 | Enriquez et al. |
| 2020/0117213 A1 | 4/2020 | Tian et al. |
| 2020/0126291 A1 | 4/2020 | Nguyen et al. |
| 2020/0126301 A1 | 4/2020 | Kim et al. |
| 2020/0128227 A1 | 4/2020 | Chavez et al. |
| 2020/0128232 A1 | 4/2020 | Hwang et al. |
| 2020/0129850 A1 | 4/2020 | Ohashi |
| 2020/0135141 A1 | 4/2020 | Day et al. |
| 2020/0159017 A1 | 5/2020 | Lin et al. |
| 2020/0201444 A1 | 6/2020 | Stoyles et al. |
| 2020/0214682 A1 | 7/2020 | Zaslavsky et al. |
| 2020/0218074 A1 | 7/2020 | Hoover et al. |
| 2020/0225735 A1 | 7/2020 | Schwarz |
| 2020/0225746 A1 | 7/2020 | Bar-zeev et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0226823 A1 | 7/2020 | Stachniak et al. |
| 2020/0242844 A1 | 7/2020 | Bae et al. |
| 2020/0257245 A1 | 8/2020 | Linville et al. |
| 2020/0257484 A1 | 8/2020 | Qian et al. |
| 2020/0267326 A1 | 8/2020 | Mm |
| 2020/0272303 A1 | 8/2020 | Jia et al. |
| 2020/0285314 A1 | 9/2020 | Cieplinski et al. |
| 2020/0286299 A1 | 9/2020 | Wang et al. |
| 2020/0301513 A1 | 9/2020 | Mejia Cobo |
| 2020/0318955 A1 | 10/2020 | Sharapov et al. |
| 2020/0319704 A1 | 10/2020 | Kathuria et al. |
| 2020/0322178 A1 | 10/2020 | Wang et al. |
| 2020/0322575 A1 | 10/2020 | Valli |
| 2020/0328913 A1 | 10/2020 | Wyas et al. |
| 2020/0356221 A1 | 11/2020 | Behzadi et al. |
| 2020/0357184 A1 | 11/2020 | Paul et al. |
| 2020/0357374 A1 | 11/2020 | Verweij et al. |
| 2020/0363867 A1 | 11/2020 | Azimi et al. |
| 2020/0371602 A1 | 11/2020 | Kanda |
| 2020/0371673 A1 | 11/2020 | Faulkner |
| 2020/0379626 A1 | 12/2020 | Guyomard et al. |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2020/0401687 A1 | 12/2020 | Mak |
| 2020/0410960 A1 | 12/2020 | Saito et al. |
| 2020/0412862 A1 | 12/2020 | Oh et al. |
| 2021/0011556 A1 | 1/2021 | Atlas et al. |
| 2021/0019036 A1 | 1/2021 | Wang et al. |
| 2021/0034163 A1 | 2/2021 | Goel et al. |
| 2021/0034319 A1 | 2/2021 | Wang et al. |
| 2021/0049826 A1 | 2/2021 | Takahashi |
| 2021/0055789 A1 | 2/2021 | Tsai et al. |
| 2021/0056748 A1 | 2/2021 | Pritchett |
| 2021/0067418 A1 | 3/2021 | Ely et al. |
| 2021/0074062 A1 | 3/2021 | Madonna et al. |
| 2021/0090222 A1 | 3/2021 | Lee et al. |
| 2021/0090337 A1 | 3/2021 | Ravasz et al. |
| 2021/0090348 A1 | 3/2021 | Croxford et al. |
| 2021/0096726 A1 | 4/2021 | Faulkner et al. |
| 2021/0097766 A1 | 4/2021 | Palangie et al. |
| 2021/0097776 A1 | 4/2021 | Faulkner et al. |
| 2021/0102820 A1 | 4/2021 | Le et al. |
| 2021/0103333 A1 | 4/2021 | Cieplinski et al. |
| 2021/0125414 A1 | 4/2021 | Berkebile |
| 2021/0132687 A1 | 5/2021 | Luo et al. |
| 2021/0134069 A1 | 5/2021 | Sorrento |
| 2021/0134248 A1 | 5/2021 | Wan et al. |
| 2021/0142552 A1 | 5/2021 | Kimura et al. |
| 2021/0158624 A1 | 5/2021 | Moon et al. |
| 2021/0165484 A1 | 6/2021 | Suguhara et al. |
| 2021/0165923 A1 | 6/2021 | Johnston |
| 2021/0166437 A1 | 6/2021 | Legendre et al. |
| 2021/0173340 A1 | 6/2021 | Kim |
| 2021/0173536 A1 | 6/2021 | Kondo |
| 2021/0191600 A1 | 6/2021 | Lemay et al. |
| 2021/0225043 A1 | 7/2021 | Tang et al. |
| 2021/0227601 A1 | 7/2021 | Eom et al. |
| 2021/0241483 A1 | 8/2021 | Dryer et al. |
| 2021/0248674 A1 | 8/2021 | Ogunbunmi |
| 2021/0272367 A1 | 9/2021 | Richter |
| 2021/0272537 A1 | 9/2021 | Mak |
| 2021/0279957 A1 | 9/2021 | Eder et al. |
| 2021/0279967 A1 | 9/2021 | Gernoth et al. |
| 2021/0286502 A1 | 9/2021 | Lemay et al. |
| 2021/0287439 A1 | 9/2021 | Goodrich et al. |
| 2021/0295592 A1 | 9/2021 | Von Cramon |
| 2021/0295602 A1 | 9/2021 | Scapel et al. |
| 2021/0303074 A1 | 9/2021 | Vanblon et al. |
| 2021/0303107 A1 | 9/2021 | Pla I Conesa et al. |
| 2021/0312684 A1 | 10/2021 | Zimmermann et al. |
| 2021/0312713 A1 | 10/2021 | Peri et al. |
| 2021/0312717 A1 | 10/2021 | Mao |
| 2021/0319617 A1 | 10/2021 | Ahn et al. |
| 2021/0326094 A1 | 10/2021 | Buerli et al. |
| 2021/0327140 A1 | 10/2021 | Rothkopf et al. |
| 2021/0331069 A1 | 10/2021 | Gustafson et al. |
| 2021/0333864 A1 | 10/2021 | Harvey et al. |
| 2021/0339134 A1 | 11/2021 | Knoppert |
| 2021/0350564 A1 | 11/2021 | Peuhkurinen et al. |
| 2021/0350604 A1 | 11/2021 | Pejsa et al. |
| 2021/0350634 A1 | 11/2021 | Major et al. |
| 2021/0352172 A1 | 11/2021 | Kim et al. |
| 2021/0358294 A1 | 11/2021 | Parashar et al. |
| 2021/0365108 A1 | 11/2021 | Burns et al. |
| 2021/0366440 A1 | 11/2021 | Burns et al. |
| 2021/0368136 A1 | 11/2021 | Chalmers et al. |
| 2021/0374221 A1 | 12/2021 | Markhasin et al. |
| 2021/0375022 A1 | 12/2021 | Lee et al. |
| 2021/0383097 A1 | 12/2021 | Guerard et al. |
| 2021/0400744 A1 | 12/2021 | Chen et al. |
| 2021/0402306 A1 | 12/2021 | Huang |
| 2021/0405760 A1 | 12/2021 | Schoen |
| 2022/0011577 A1 | 1/2022 | Lawver et al. |
| 2022/0011855 A1 | 1/2022 | Hazra et al. |
| 2022/0012002 A1 | 1/2022 | Bar-Zeev et al. |
| 2022/0027115 A1 | 1/2022 | Haapoja et al. |
| 2022/0028108 A1 | 1/2022 | Haapoja et al. |
| 2022/0030197 A1 | 1/2022 | Ishimoto |
| 2022/0070241 A1 | 3/2022 | Yerli |
| 2022/0076496 A1 | 3/2022 | Palangie et al. |
| 2022/0083145 A1 | 3/2022 | Matsunaga et al. |
| 2022/0083197 A1 | 3/2022 | Rockel et al. |
| 2022/0084279 A1 | 3/2022 | Lindmeier et al. |
| 2022/0086203 A1 | 3/2022 | Morris et al. |
| 2022/0086205 A1 | 3/2022 | Lebeau et al. |
| 2022/0091722 A1 | 3/2022 | Faulkner et al. |
| 2022/0091723 A1 | 3/2022 | Faulkner et al. |
| 2022/0092862 A1 | 3/2022 | Faulkner et al. |
| 2022/0100265 A1 | 3/2022 | Kies et al. |
| 2022/0100270 A1 | 3/2022 | Pastrana Vicente et al. |
| 2022/0101593 A1 | 3/2022 | Rockel et al. |

(56) References Cited

U.S. PATENT DOCUMENTS

| | | |
|---|---|---|
| 2022/0101612 A1* | 3/2022 | Palangie .................. G06T 19/20 |
| 2022/0104910 A1 | 4/2022 | Shelton et al. |
| 2022/0121275 A1 | 4/2022 | Balaji et al. |
| 2022/0121344 A1 | 4/2022 | Pastrana Vicente et al. |
| 2022/0122303 A1 | 4/2022 | Sasikumar et al. |
| 2022/0124286 A1 | 4/2022 | Punwani et al. |
| 2022/0130107 A1 | 4/2022 | Lindh |
| 2022/0130126 A1 | 4/2022 | Delgado et al. |
| 2022/0137701 A1 | 5/2022 | Bowman et al. |
| 2022/0137705 A1 | 5/2022 | Hashimoto et al. |
| 2022/0148257 A1 | 5/2022 | Boubekeur et al. |
| 2022/0155853 A1 | 5/2022 | Fan et al. |
| 2022/0155863 A1 | 5/2022 | Wang et al. |
| 2022/0155909 A1 | 5/2022 | Kawashima et al. |
| 2022/0157029 A1 | 5/2022 | Horita et al. |
| 2022/0157083 A1 | 5/2022 | Jandhyala et al. |
| 2022/0165013 A1 | 5/2022 | Velez et al. |
| 2022/0179503 A1 | 6/2022 | Timonen et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0198755 A1 | 6/2022 | Pinchon |
| 2022/0206298 A1 | 6/2022 | Goodman |
| 2022/0206588 A1 | 6/2022 | Canberk et al. |
| 2022/0207840 A1 | 6/2022 | Cansizoglu et al. |
| 2022/0214743 A1 | 7/2022 | Dascola et al. |
| 2022/0221976 A1 | 7/2022 | Agarwal et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0236801 A1 | 7/2022 | Serbanati et al. |
| 2022/0239718 A1 | 7/2022 | Song et al. |
| 2022/0244536 A1 | 8/2022 | Sha et al. |
| 2022/0245888 A1 | 8/2022 | Singh et al. |
| 2022/0253125 A1 | 8/2022 | Wallen et al. |
| 2022/0253136 A1 | 8/2022 | Holder et al. |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0277533 A1 | 9/2022 | Park |
| 2022/0279303 A1 | 9/2022 | Marculescu et al. |
| 2022/0286488 A1 | 9/2022 | Berliner et al. |
| 2022/0287676 A1 | 9/2022 | Steines et al. |
| 2022/0291808 A1 | 9/2022 | Stevens et al. |
| 2022/0292783 A1 | 9/2022 | Jayaram et al. |
| 2022/0292784 A1 | 9/2022 | Jayaram et al. |
| 2022/0292785 A1 | 9/2022 | Jayaram et al. |
| 2022/0295032 A1 | 9/2022 | Jayaram et al. |
| 2022/0295040 A1 | 9/2022 | Jayaram et al. |
| 2022/0295139 A1 | 9/2022 | Jayaram et al. |
| 2022/0301264 A1 | 9/2022 | O'leary et al. |
| 2022/0303680 A1 | 9/2022 | Ahmed et al. |
| 2022/0311950 A1 | 9/2022 | Ith et al. |
| 2022/0317776 A1 | 10/2022 | Sundstrom et al. |
| 2022/0319134 A1 | 10/2022 | Rodrigues et al. |
| 2022/0319453 A1 | 10/2022 | Llull et al. |
| 2022/0326837 A1* | 10/2022 | Dessero ................ G06T 19/003 |
| 2022/0335697 A1 | 10/2022 | Harding et al. |
| 2022/0350463 A1 | 11/2022 | Walkin et al. |
| 2022/0365595 A1 | 11/2022 | Cieplinski et al. |
| 2022/0365740 A1 | 11/2022 | Chang et al. |
| 2022/0374136 A1 | 11/2022 | Chang et al. |
| 2022/0382385 A1 | 12/2022 | Chen et al. |
| 2022/0383592 A1 | 12/2022 | Hare et al. |
| 2022/0391158 A1 | 12/2022 | Lemmens et al. |
| 2022/0392169 A1 | 12/2022 | Simpson et al. |
| 2022/0397962 A1 | 12/2022 | Goel et al. |
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0414999 A1 | 12/2022 | Ravasz et al. |
| 2022/0415094 A1 | 12/2022 | Kim et al. |
| 2023/0004216 A1 | 1/2023 | Rodgers et al. |
| 2023/0007335 A1 | 1/2023 | Gupta et al. |
| 2023/0008537 A1 | 1/2023 | Henderson et al. |
| 2023/0009683 A1 | 1/2023 | Biran et al. |
| 2023/0021861 A1 | 1/2023 | Fujiwara et al. |
| 2023/0027040 A1 | 1/2023 | Wang et al. |
| 2023/0030699 A1 | 2/2023 | Zion et al. |
| 2023/0031832 A1 | 2/2023 | Lipton et al. |
| 2023/0032545 A1 | 2/2023 | Mindlin et al. |
| 2023/0032771 A1 | 2/2023 | Zion et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0076326 A1 | 3/2023 | Xu et al. |
| 2023/0086766 A1 | 3/2023 | Olwal et al. |
| 2023/0092282 A1 | 3/2023 | Boesel et al. |
| 2023/0092874 A1 | 3/2023 | Krivoruchko et al. |
| 2023/0093979 A1 | 3/2023 | Stauber et al. |
| 2023/0094522 A1 | 3/2023 | Stauber et al. |
| 2023/0100610 A1 | 3/2023 | Pastrana Vicente et al. |
| 2023/0100689 A1 | 3/2023 | Chiu et al. |
| 2023/0103161 A1 | 3/2023 | Li et al. |
| 2023/0114080 A1 | 4/2023 | Yang et al. |
| 2023/0119162 A1 | 4/2023 | Lipton et al. |
| 2023/0120052 A1 | 4/2023 | Wallen et al. |
| 2023/0130520 A1 | 4/2023 | Kaptelinin |
| 2023/0133579 A1 | 5/2023 | Chang et al. |
| 2023/0152889 A1 | 5/2023 | Cieplinski et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168745 A1 | 6/2023 | Yoda |
| 2023/0168788 A1 | 6/2023 | Faulkner et al. |
| 2023/0176806 A1 | 6/2023 | Chen et al. |
| 2023/0185426 A1 | 6/2023 | Rockel et al. |
| 2023/0186577 A1 | 6/2023 | Rockel et al. |
| 2023/0206572 A1 | 6/2023 | Pazmino et al. |
| 2023/0206921 A1 | 6/2023 | Edelsburg et al. |
| 2023/0221833 A1 | 7/2023 | Holder et al. |
| 2023/0236660 A1 | 7/2023 | Kundu |
| 2023/0244857 A1 | 8/2023 | Weiss et al. |
| 2023/0259265 A1 | 8/2023 | Krivoruchko et al. |
| 2023/0260240 A1 | 8/2023 | Jayaram et al. |
| 2023/0266859 A1 | 8/2023 | Day et al. |
| 2023/0273706 A1 | 8/2023 | Smith et al. |
| 2023/0274504 A1 | 8/2023 | Ren et al. |
| 2023/0290042 A1 | 9/2023 | Casella et al. |
| 2023/0308610 A1 | 9/2023 | Henderson et al. |
| 2023/0308630 A1 | 9/2023 | Delgado |
| 2023/0314801 A1 | 10/2023 | Bove et al. |
| 2023/0315270 A1 | 10/2023 | Hylak et al. |
| 2023/0315385 A1 | 10/2023 | Akmal et al. |
| 2023/0316634 A1 | 10/2023 | Chiu et al. |
| 2023/0316658 A1 | 10/2023 | Smith et al. |
| 2023/0325003 A1 | 10/2023 | Gitter et al. |
| 2023/0325004 A1 | 10/2023 | Burns et al. |
| 2023/0325046 A1 | 10/2023 | De Almeida E De Vincenzo et al. |
| 2023/0333646 A1 | 10/2023 | Pastrana Vicente et al. |
| 2023/0334808 A1 | 10/2023 | Sundstrom et al. |
| 2023/0341932 A1 | 10/2023 | Silva et al. |
| 2023/0343049 A1 | 10/2023 | Boesel et al. |
| 2023/0350537 A1 | 11/2023 | Hylak et al. |
| 2023/0350539 A1 | 11/2023 | Owen et al. |
| 2023/0351702 A1 | 11/2023 | Tan et al. |
| 2023/0353398 A1 | 11/2023 | White |
| 2023/0359199 A1 | 11/2023 | Adachi et al. |
| 2023/0368475 A1 | 11/2023 | Chan et al. |
| 2023/0377259 A1 | 11/2023 | Becker et al. |
| 2023/0377268 A1 | 11/2023 | Hopkins et al. |
| 2023/0377295 A1 | 11/2023 | Angevine et al. |
| 2023/0377299 A1 | 11/2023 | Becker et al. |
| 2023/0377300 A1 | 11/2023 | Becker et al. |
| 2023/0384907 A1 | 11/2023 | Boesel et al. |
| 2023/0385532 A1 | 11/2023 | Mcveigh et al. |
| 2023/0388357 A1 | 11/2023 | Faulkner et al. |
| 2023/0394755 A1 | 12/2023 | Negoita et al. |
| 2023/0396854 A1 | 12/2023 | Sanders et al. |
| 2023/0400958 A1 | 12/2023 | Morrison et al. |
| 2024/0012530 A1 | 1/2024 | Lin et al. |
| 2024/0037886 A1 | 2/2024 | Chiu et al. |

(56) References Cited

U.S. PATENT DOCUMENTS

| | | | |
|---|---|---|---|
| 2024/0062279 A1 | 2/2024 | Scully et al. |
| 2024/0070948 A1 | 2/2024 | Bradley et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094866 A1 | 3/2024 | Lemay et al. |
| 2024/0094882 A1 | 3/2024 | Brewer et al. |
| 2024/0095984 A1 | 3/2024 | Ren et al. |
| 2024/0102821 A1 | 3/2024 | Vallet et al. |
| 2024/0103613 A1 | 3/2024 | Chawda et al. |
| 2024/0103616 A1 | 3/2024 | Yerkes et al. |
| 2024/0103636 A1 | 3/2024 | Lindmeier et al. |
| 2024/0103676 A1 | 3/2024 | Pastrana Vicente et al. |
| 2024/0103681 A1 | 3/2024 | Broughton et al. |
| 2024/0103684 A1 | 3/2024 | Yu et al. |
| 2024/0103685 A1 | 3/2024 | Pazmino et al. |
| 2024/0103686 A1 | 3/2024 | Pazmino et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104843 A1 | 3/2024 | Mckenzie et al. |
| 2024/0104870 A1 | 3/2024 | Fuste Lleixa et al. |
| 2024/0104873 A1 | 3/2024 | Pastrana Vicente et al. |
| 2024/0104875 A1 | 3/2024 | Couche et al. |
| 2024/0104876 A1 | 3/2024 | Couche et al. |
| 2024/0104877 A1 | 3/2024 | Henderson et al. |
| 2024/0111479 A1 | 4/2024 | Paul |
| 2024/0119682 A1 | 4/2024 | Rudman et al. |
| 2024/0126362 A1 | 4/2024 | Burns et al. |
| 2024/0135612 A1 | 4/2024 | Hold-geoffroy et al. |
| 2024/0152245 A1 | 5/2024 | Broughton et al. |
| 2024/0152256 A1 | 5/2024 | Dascola et al. |
| 2024/0185514 A1 | 6/2024 | Singh et al. |
| 2024/0192764 A1 | 6/2024 | Dascola et al. |
| 2024/0193892 A1 | 6/2024 | Lutter et al. |
| 2024/0200967 A1 | 6/2024 | Arroyo et al. |
| 2024/0203066 A1 | 6/2024 | Kawashima et al. |
| 2024/0205509 A1 | 6/2024 | Kim et al. |
| 2024/0221273 A1 | 7/2024 | Dusseau et al. |
| 2024/0221291 A1 | 7/2024 | Henderson et al. |
| 2024/0233097 A1 | 7/2024 | Ngo et al. |
| 2024/0233288 A1 | 7/2024 | Stauber et al. |
| 2024/0256032 A1 | 8/2024 | Holder et al. |
| 2024/0265656 A1 | 8/2024 | Victor-faichney et al. |
| 2024/0265796 A1 | 8/2024 | Ippadi Veerabhadre Gowda et al. |
| 2024/0272722 A1 | 8/2024 | Gitter et al. |
| 2024/0272782 A1 | 8/2024 | Pastrana Vicente et al. |
| 2024/0273838 A1 | 8/2024 | Palangie et al. |
| 2024/0281108 A1 | 8/2024 | Krivoruchko et al. |
| 2024/0281109 A1 | 8/2024 | Manjunath et al. |
| 2024/0291953 A1 | 8/2024 | Cerra et al. |
| 2024/0297919 A1 | 9/2024 | Berliner et al. |
| 2024/0302948 A1 | 9/2024 | Hylak et al. |
| 2024/0310971 A1 | 9/2024 | Kawashima et al. |
| 2024/0329797 A1 | 10/2024 | Hylak et al. |
| 2024/0338104 A1 | 10/2024 | Salter et al. |
| 2024/0338921 A1 | 10/2024 | Burgner et al. |
| 2024/0361832 A1 | 10/2024 | Calderone et al. |
| 2024/0361833 A1 | 10/2024 | Calderone et al. |
| 2024/0361901 A1 | 10/2024 | Ravasz et al. |
| 2024/0393876 A1 | 11/2024 | Chawda et al. |
| 2024/0402800 A1 | 12/2024 | Shutzberg et al. |
| 2024/0402821 A1 | 12/2024 | Meyer et al. |
| 2024/0403080 A1 | 12/2024 | Laurita et al. |
| 2024/0404206 A1 | 12/2024 | Chiu et al. |
| 2024/0404207 A1 | 12/2024 | Laurita et al. |
| 2024/0404232 A1 | 12/2024 | Rockwell et al. |
| 2024/0404233 A1 | 12/2024 | Boesel et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |
| 2025/0005855 A1 | 1/2025 | Holder et al. |
| 2025/0005864 A1 | 1/2025 | Dessero et al. |
| 2025/0008057 A1 | 1/2025 | Chiu et al. |
| 2025/0013343 A1 | 1/2025 | Smith et al. |
| 2025/0013344 A1 | 1/2025 | Smith et al. |
| 2025/0024008 A1 | 1/2025 | Cerra et al. |
| 2025/0028423 A1 | 1/2025 | Dessero et al. |
| 2025/0029319 A1 | 1/2025 | Boesel et al. |
| 2025/0029328 A1 | 1/2025 | Smith et al. |
| 2025/0031002 A1 | 1/2025 | Hawkins et al. |
| 2025/0036253 A1 | 1/2025 | Stauber et al. |
| 2025/0036255 A1 | 1/2025 | Pastrana Vicente et al. |
| 2025/0069328 A1 | 2/2025 | Herscher et al. |
| 2025/0077060 A1 | 3/2025 | Becker et al. |
| 2025/0077066 A1 | 3/2025 | Lutter |
| 2025/0078420 A1 | 3/2025 | Dessero et al. |
| 2025/0078429 A1 | 3/2025 | Dascola et al. |
| 2025/0103132 A1 | 3/2025 | Rickwald et al. |
| 2025/0104335 A1 | 3/2025 | Huang et al. |
| 2025/0104367 A1 | 3/2025 | Huang et al. |
| 2025/0106581 A1 | 3/2025 | Lutter et al. |
| 2025/0106582 A1 | 3/2025 | Lutter et al. |
| 2025/0110605 A1 | 4/2025 | Huang et al. |
| 2025/0111472 A1 | 4/2025 | Lutter et al. |
| 2025/0111605 A1 | 4/2025 | Huang et al. |
| 2025/0111622 A1 | 4/2025 | Stern et al. |
| 2025/0111626 A1 | 4/2025 | Deliz Centeno et al. |
| 2025/0117079 A1 | 4/2025 | Chiu et al. |
| 2025/0118038 A1 | 4/2025 | Sorrentino et al. |
| 2025/0130707 A1 | 4/2025 | Stauber et al. |
| 2025/0156031 A1 | 5/2025 | Holder et al. |
| 2025/0157136 A1 | 5/2025 | Lindmeier et al. |
| 2025/0165069 A1 | 5/2025 | Calderone et al. |
| 2025/0199656 A1 | 6/2025 | Lipton et al. |
| 2025/0200901 A1 | 6/2025 | Ren et al. |
| 2025/0209744 A1 | 6/2025 | Piemonte et al. |
| 2025/0209753 A1 | 6/2025 | Piemonte et al. |
| 2025/0224811 A1 | 7/2025 | Lindmeier et al. |
| 2025/0232541 A1 | 7/2025 | Chand et al. |
| 2025/0258577 A1 | 8/2025 | Palangie et al. |
| 2025/0278134 A1 | 9/2025 | Pastrana Vicente et al. |
| 2025/0278166 A1 | 9/2025 | Mckenzie et al. |
| 2025/0278907 A1 | 9/2025 | Pazmino et al. |
| 2025/0284344 A1 | 9/2025 | Sundstrom et al. |
| 2025/0291470 A1 | 9/2025 | Hylak et al. |

FOREIGN PATENT DOCUMENTS

| | | |
|---|---|---|
| CN | 104714771 A | 6/2015 |
| CN | 104981681 A | 10/2015 |
| CN | 105264461 A | 1/2016 |
| CN | 105264478 A | 1/2016 |
| CN | 106575149 A | 4/2017 |
| CN | 106990838 A | 7/2017 |
| CN | 108519818 A | 9/2018 |
| CN | 108563335 A | 9/2018 |
| CN | 108633307 A | 10/2018 |
| CN | 110413171 A | 11/2019 |
| CN | 110476142 A | 11/2019 |
| CN | 110543230 A | 12/2019 |
| CN | 110673718 A | 1/2020 |
| CN | 110830786 A | 2/2020 |
| CN | 111033572 A | 4/2020 |
| CN | 111213183 A | 5/2020 |
| CN | 111488056 A | 8/2020 |
| CN | 111580652 A | 8/2020 |
| CN | 111641843 A | 9/2020 |
| CN | 111913565 A | 11/2020 |
| CN | 112068757 A | 12/2020 |
| CN | 113168737 A | 7/2021 |
| CN | 109491508 B | 8/2022 |
| CN | 115309271 A | 11/2022 |
| CN | 116132905 A | 5/2023 |
| CN | 117043722 A | 11/2023 |
| CN | 117857981 A | 4/2024 |
| CN | 118102204 A | 5/2024 |
| DE | 102016125811 A1 | 11/2017 |
| DE | 102020101675 A1 | 7/2020 |

(56) References Cited

FOREIGN PATENT DOCUMENTS

| | | | |
|---|---|---|---|
| DE | 102020128536 | A1 | 5/2021 |
| EP | 0816983 | A2 | 1/1998 |
| EP | 1530115 | A2 | 5/2005 |
| EP | 1562021 | A1 | 8/2005 |
| EP | 2393056 | A1 | 12/2011 |
| EP | 2458486 | A1 | 5/2012 |
| EP | 2551763 | A1 | 1/2013 |
| EP | 2741175 | A2 | 6/2014 |
| EP | 2893297 | A1 | 7/2015 |
| EP | 2947545 | A1 | 11/2015 |
| EP | 3088997 | A1 | 11/2016 |
| EP | 3118722 | A1 | 1/2017 |
| EP | 3249497 | A1 | 11/2017 |
| EP | 3306444 | A1 | 4/2018 |
| EP | 3316075 | A1 | 5/2018 |
| EP | 3336805 | A1 | 6/2018 |
| EP | 3451135 | A1 | 3/2019 |
| EP | 3503101 | A1 | 6/2019 |
| EP | 3506151 | A1 | 7/2019 |
| EP | 3570144 | A1 | 11/2019 |
| EP | 3588255 | A1 | 1/2020 |
| EP | 3654147 | A1 | 5/2020 |
| EP | 4155867 | A1 | 3/2023 |
| EP | 3688726 | B1 | 8/2023 |
| GB | 2540791 | A | 2/2017 |
| JP | H064596 | A | 1/1994 |
| JP | H1051711 | A | 2/1998 |
| JP | H1078845 | A | 3/1998 |
| JP | H11289555 | A | 10/1999 |
| JP | 2000163031 | A | 6/2000 |
| JP | 2002342033 | A | 11/2002 |
| JP | 2004510239 | A | 4/2004 |
| JP | 2005215144 | A | 8/2005 |
| JP | 2005333524 | A | 12/2005 |
| JP | 2006004093 | A | 1/2006 |
| JP | 2006107048 | A | 4/2006 |
| JP | 2006146803 | A | 6/2006 |
| JP | 2006295236 | A | 10/2006 |
| JP | 2011203880 | A | 10/2011 |
| JP | 2012234550 | A | 11/2012 |
| JP | 2013178639 | A | 9/2013 |
| JP | 2013196158 | A | 9/2013 |
| JP | 2013254358 | A | 12/2013 |
| JP | 2013257716 | A | 12/2013 |
| JP | 2014021565 | A | 2/2014 |
| JP | 2014059840 | A | 4/2014 |
| JP | 2014071663 | A | 4/2014 |
| JP | 2014099184 | A | 5/2014 |
| JP | 2014514652 | A | 6/2014 |
| JP | 2014514653 | A | 6/2014 |
| JP | 2015056173 | A | 3/2015 |
| JP | 2015515040 | A | 5/2015 |
| JP | 2015118332 | A | 6/2015 |
| JP | 2015222565 | A | 12/2015 |
| JP | 2016096513 | A | 5/2016 |
| JP | 2016194744 | A | 11/2016 |
| JP | 2017027206 | A | 2/2017 |
| JP | 2017058528 | A | 3/2017 |
| JP | 2017126009 | A | 7/2017 |
| JP | 2017525002 | A | 8/2017 |
| JP | 2017531221 | A | 10/2017 |
| JP | 2018005516 | A | 1/2018 |
| JP | 2018005517 | A | 1/2018 |
| JP | 2018041477 | A | 3/2018 |
| JP | 2018514005 | A | 5/2018 |
| JP | 2018088118 | A | 6/2018 |
| JP | 2018101019 | A | 6/2018 |
| JP | 2018106499 | A | 7/2018 |
| JP | 6438869 | B2 | 12/2018 |
| JP | 2019040333 | A | 3/2019 |
| JP | 2019515361 | A | 6/2019 |
| JP | 2019169154 | A | 10/2019 |
| JP | 2019175449 | A | 10/2019 |
| JP | 2019527881 | A | 10/2019 |
| JP | 2019532382 | A | 11/2019 |
| JP | 2019536131 | A | 12/2019 |
| JP | 2020503595 | A | 1/2020 |
| JP | 2020086913 | A | 6/2020 |
| JP | 2022053334 | A | 4/2022 |
| JP | 2022175629 | A | 11/2022 |
| JP | 2023052278 | A | 4/2023 |
| KR | 20110017236 | A | 2/2011 |
| KR | 20110128487 | A | 11/2011 |
| KR | 20140097654 | A | 8/2014 |
| KR | 20160012139 | A | 2/2016 |
| KR | 20170027240 | A | 3/2017 |
| KR | 20180102171 | A | 9/2018 |
| KR | 20190100957 | A | 8/2019 |
| KR | 20200010296 | A | 1/2020 |
| KR | 20200035103 | A | 4/2020 |
| KR | 20200110788 | A | 9/2020 |
| KR | 20200135496 | A | 12/2020 |
| KR | 20210083016 | A | 7/2021 |
| KR | 20210123530 | A | 10/2021 |
| WO | 2010026519 | A1 | 3/2010 |
| WO | 2011008638 | A1 | 1/2011 |
| WO | 2012145180 | A1 | 10/2012 |
| WO | 2013169849 | A2 | 11/2013 |
| WO | 2013184447 | A2 | 12/2013 |
| WO | 2014105276 | A1 | 7/2014 |
| WO | 2014190106 | A1 | 11/2014 |
| WO | 2014203301 | A1 | 12/2014 |
| WO | 2015130150 | A1 | 9/2015 |
| WO | 2015192117 | A1 | 12/2015 |
| WO | 2015195216 | A1 | 12/2015 |
| WO | 2016014877 | A1 | 1/2016 |
| WO | 2016118344 | A1 | 7/2016 |
| WO | 2016126522 | A1 | 8/2016 |
| WO | 2017024142 | A1 | 2/2017 |
| WO | 2017088487 | A1 | 6/2017 |
| WO | 2018005557 | A1 | 1/2018 |
| WO | 2018046957 | A2 | 3/2018 |
| WO | 2018090060 | A1 | 5/2018 |
| WO | 2018106299 | A1 | 6/2018 |
| WO | 2018116556 | A1 | 6/2018 |
| WO | 2018125428 | A1 | 7/2018 |
| WO | 2018175735 | A1 | 9/2018 |
| WO | 2018213801 | A1 | 11/2018 |
| WO | 2019067902 | A1 | 4/2019 |
| WO | 2019074771 | A1 | 4/2019 |
| WO | 2019142560 | A1 | 7/2019 |
| WO | 2019152286 | A2 | 8/2019 |
| WO | 2019172678 | A1 | 9/2019 |
| WO | 2019213111 | A1 | 11/2019 |
| WO | 2019217163 | A1 | 11/2019 |
| WO | 2020066682 | A1 | 4/2020 |
| WO | 2020105349 | A1 | 5/2020 |
| WO | 2020121483 | A1 | 6/2020 |
| WO | 2020179027 | A1 | 9/2020 |
| WO | 2020247256 | A1 | 12/2020 |
| WO | 2021061349 | A1 | 4/2021 |
| WO | 2021061351 | A1 | 4/2021 |
| WO | 2021133053 | A1 | 7/2021 |
| WO | 2021173839 | A1 | 9/2021 |
| WO | 2021202783 | A1 | 10/2021 |
| WO | 2021203856 | A1 | 10/2021 |
| WO | 2022046340 | A1 | 3/2022 |
| WO | 2022055821 | A1 | 3/2022 |
| WO | 2022055822 | A1 | 3/2022 |
| WO | 2022066399 | A1 | 3/2022 |
| WO | 2022066535 | A2 | 3/2022 |
| WO | 2022067075 | A1 | 3/2022 |
| WO | 2022067343 | A2 | 3/2022 |
| WO | 2022072187 | A2 | 4/2022 |
| WO | 2022146936 | A1 | 7/2022 |
| WO | 2022146938 | A1 | 7/2022 |
| WO | 2022147146 | A1 | 7/2022 |
| WO | 2022164881 | A1 | 8/2022 |
| WO | 2022192040 | A1 | 9/2022 |
| WO | 2022204664 | A1 | 9/2022 |
| WO | 2022208797 | A1 | 10/2022 |
| WO | 2022225795 | A1 | 10/2022 |
| WO | 2023043646 | A1 | 3/2023 |

(56) References Cited

FOREIGN PATENT DOCUMENTS

| WO | 2023096940 A2 | 6/2023 |
| WO | 2023141535 A1 | 7/2023 |
| WO | 2024064373 A1 | 3/2024 |

OTHER PUBLICATIONS

Corrected Notice of Allowability received for U.S. Appl. No. 17/932,999, mailed on Jan. 23, 2025, 9 pages.

Final Office Action received for U.S. Appl. No. 18/157,040, mailed on Dec. 2, 2024, 25 pages.

International Search Report received for PCT Application No. PCT/US2022/076603, mailed on Jan. 9, 2023, 4 pages.

International Search Report received for PCT Application No. PCT/US2023/060943, mailed on Jun. 6, 2023, 7 pages.

International Search Report received for PCT Application No. PCT/US2024/030107, mailed on Oct. 23, 2024, 9 pages.

International Search Report received for PCT Application No. PCT/US2024/032314, mailed on Nov. 11, 2024, 6 pages.

International Search Report received for PCT Application No. PCT/US2024/032456, mailed on Nov. 14, 2024, 6 pages.

International Search Report received for PCT Patent Application No. PCT/US2023/074257, mailed on Nov. 21, 2023, 5 pages.

Non-Final Office Action received for U.S. Appl. No. 17/932,999, mailed on Feb. 23, 2024, 22 pages.

Non-Final Office Action received for U.S. Appl. No. 18/157,040, mailed on May 2, 2024, 25 pages.

Non-Final Office Action received for U.S. Appl. No. 18/988,115, mailed on Feb. 24, 2025, 40 pages.

Notice of Allowance received for U.S. Appl. No. 17/932,999, mailed on Sep. 12, 2024, 9 pages.

Restriction Requirement received for U.S. Appl. No. 17/932,999, mailed on Oct. 3, 2023, 6 pages.

Adding Environments, Available online at: https://manual.keyshot.com/manual/environments/adding-environments/, [retrieved on Jun. 9, 2023], 2 pages.

AquaSnap Window Manager: dock, snap, tile, organize [online], Nurgo Software, Available online at: <https://www.nurgo-software.com/products/aquasnap>, [retrieved on Jun. 27, 2023], 5 pages.

Area Light, Available online at: https://manual.keyshot.com/manual/materials/material-types/light-sources/area-light/, [retrieved on Jun. 9, 2023], 24 pages.

Artec Leo, Artec 3D [online], 2018 [retrieved on Apr. 25, 2024]. Retrieved from the Internet: <URL: https://artec3d.com/portable-3d-scanners/artec-leo>, 39 pages.

Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.

Curious Blocks Alternatives 12, progsoft [online]. Profsoft, Available Online at: <URL: https://progsoft.net/en/software/curious-blocks>, [retrieved on Apr. 25, 2024], 2024, 7 pages.

Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/EyeTracking/EyeTracking_Positioning.html>, 2 pages.

Feature Highlights, Available online at: https://manual.keyshot.com/manual/whats-new/feature-highlights/, [retrieved on Jun. 9, 2023], 28 pages.

Home | Virtual Desktop [online], Virtual Desktop, Available online at: <https://www.vrdesktop.net>, [retrieved on Jun. 29, 2023], 4 pages.

How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.

International Search Report received for PCT Patent Application No. PCT/US2024/026102, mailed on Aug. 26, 2024, 5 pages.

Kitasenju Design, X [online], X Corp., Available Online at: <URL: https://twitter.com/kitasenjudesign/status/1282665402812608513>, [retrieved on Apr. 25, 2024], 2024, 1 page.

Light Manager, Available online at: https://manual.keyshot.com/manual/lighting/lighting-manager/, [retrieved on Jun. 9, 2023], 3 pages.

MagicaVoxel 0.99.5 Review, YouTube [online], Google LLC, Available Online at: <URL: https://www.youtube.com/watch?v=WPPFnHQWwFk>, [retrieved on Apr. 25, 2024], 2024, 2 pages.

Open Source Voxel Editor for Windows, Mac, Linux, iOS, and Android, GOXEL [online]. Goxel by Guillaume Chereau, Available Online at: <URL: https://goxel.xyz/>, [retrieved on Apr. 25, 2024], 2024, 3 pages.

POP 2 3D Scanner (Infrared Light | Precision 0.05mm), REVPOINT [online]. Revopoint 3D, <URL: https://global.revopoint3d.com/products/face-3d-scanner-pop2 ?_ ga=2.182721893.277596832.1650264227-586470518.1640327512&ref=dh0L07OOzRuqo&utm_campaign=pop2_banner&utm_medium=referral&utm_source=Official_Website>, [retrieved on Apr. 25, 2024], 2014, 16 pages.

Reality Scan, Unreal Engine [online], [retrieved on Jun. 14, 2024]. Retrieved from the Internet: <URL: https://www.unrealengine.com/en-US/realityscan>, 11 pages.

RealityScan Available Now | Capture the World and Create Your Own, YouTube [online]. YouTube, Dec. 1, 2022 [retrieved on Jun. 14, 2024]. Retrieved from the Internet: <URL: https://www.youtube.com/watch?v=fXLOMOWWBJQ>, 2 pages.

ShareVOX, PHORIA [online]. PHORIA Pty Ltd, Available Online at: <URL: https://www.phoria.com.au/projects/sharevox/>, [retrieved on Apr. 25, 2024], 2024, 2 pages.

Sliders, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/README_Sliders.html>, 3 pages.

Spatial Audio Head Tracking on Apple Tv Automatically Resets when You Get up from the Couc . . . , AppleInsider [online]. Jun. 10, 2021 [retrieved on Dec. 20, 2024]. Retrieved from the Internet: <https://forums.appleinsider.com/discussion/222259/spatial-audio-head-tracking-on-apple-tv-automatically-resets-when-you-get-up-from-the-couc>, 2024, 6 pages.

VoxEdit Beta Tutorial—Introduction and How to Animate Voxel Creations, YouTube [online], Google LLC, Available Online at: <URL: https://www.youtube.com/watch?v=fqcArJWtyqM>, [retrieved on Apr. 25, 2024], 2024, 2 pages.

Voxel World Lens, Snapchat [online]. Snapchat Inc., Available Online at: <URL: https://www.snapchat.com/lens/689751dd6a7d446280d903d15d79f104?locale=en-US>, [retrieved on Apr. 25, 2024], 2024, 1 page.

Voxelize, Rossiev [online]. Denis Rossiev 2018-2024, Available Online at: <URL: https://www.rossiev.pro/voxelize/>, [retrieved on Apr. 25, 2024], 2024, 16 pages.

VR Design Best Practices, LeapMotion, Aug. 29, 2015, 31 pages.

Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.

Coloring a Point Cloud Using 3DF Zephyr Pro, Wayback Machine, https://web.archive.org/web/20170522233043/http://www.3dflow.net:80/technology/documents/3df-zephyr-tutorials/point-cloud-coloring-using-3df-zephyr/, May 22, 2017, 1 page.

Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.

Apple, "Use Message Effects with iMessage on Your iPhone, iPad, and iPod Touch", Apple Support, Available online at: <https://support.apple.com/en-us/HT206894>, [retrieved on Feb. 22, 2024], 5 pages.

Banta et al., "A Next-Best-View System for Autonomous 3-D Object Reconstruction", IEEE Transactions on Systems, Man, and Cybernetics—Part A: Systems and Humans vol. 30, No. 5, Sep. 30, 2000, pp. 589-598.

Berard Francois, "A Study on Two-Dimensional Scrolling with Head Motion", Clips-Imag Technical Report. France, Ref: <TR-

(56) References Cited

OTHER PUBLICATIONS

IMAG-CLIPS-IHM-199901>, Retrieved from: <http://iihm.imag.fr/publs/1999/TR199901_PWindowRate.pdf>, Retrieved on Dec. 26, 2024, Jan. 8, 1999, 7 pages.

Bermejo et al., "Exploring Button Designs for Mid-air Interaction in Virtual Reality: a Hexa-metric Evaluation of Key Representations and Multi-modal Cues", Proceedings of the ACM on Human-Computer Interaction, vol. 5, No. EICS, Article 194, May 27, 2021, 26 pages.

Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.

Bohn Dieter, "Rebooting WebOS: How LG Rethought the Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.

Bolt et al., "Two-Handed Gesture in Multi-Modal Natural Dialog", Uist '92, 5th Annual Symposium on User Interface Software and Technology. Proceedings of the ACM Symposium on User Interface Software and Technology, Monterey, Nov. 15-18, 1992, pp. 7-14.

Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.

Camalich Sergio, "CSS Buttons with Pseudo-elements", Available online at: <https://tympanus.net/codrops/2012/01/11/css-buttons-with-pseudo-elements/>, [retrieved on Jul. 12, 2017], Jan. 11, 2012, 8 pages.

Capturing Reality, "Data Sheet RealityCapture TARASQUE 1.2", Wayback Machine, https://web.archive.org/web/20220327110303/https://www.capturingreality.com/assets/Documents/datasheet_TARASQUE_1.2.pdf, Mar. 27, 2022, 5 pages.

Capturing Reality, "RealityCapture tutorial: Complete model in PPI", Youtube, https://www.youtube.com/watch?v=tw6wNNEbH_M, Oct. 14, 2021, 2 pages.

Cas and Chary XR, "Oculus Go & Your Phone as 2nd Controller!!—An Inexpensive Way to Play PC VR Games", posted on Mar. 8, 2019, https://www.youtube.com/watch?v=i_iRVa0kemw, 2019, 4 pages.

Chatterjee et al., "Gaze+Gesture: Expressive, Precise and Targeted Free-Space Interactions", ICMI '15, Nov. 9-13, 2015, 8 pages.

Choe et al., "Augmented-Reality-Based 3D Emotional Messenger for Dynamic User Communication with Smart Devices", Electronics, vol. 9, No. 1127, Jul. 10, 2020, 15 pages.

Dhakal et al., "SLAM-Share: Visual Simultaneous Localization and Mapping for Real-time Multi-user Augmented Reality", CoNEXT '22, Dec. 6-9, 2022, Roma, Italy, 14 pages.

Didehkhorshid et al., "Text Input in Virtual Reality Using a Tracked Drawing Tablet", HCII 2020, LNCS 12428, 2020, pp. 314-329.

Dudley et al., "Fast and Precise Touch-Based Text Entry for Head-Mounted Augmented Reality with Variable Occlusion", ACM Transactions on Computer-Human Interaction (TOCHI), vol. 25, No. 6, Article 30, Dec. 13, 2018, 40 pages.

Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.

Fatima et al., "Eye Movement Based Human Computer Interaction", 3rd International Conference on Recent Advances in Information Technology (RAIT), Mar. 3, 2016, pp. 489-494.

Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.

Ghosh et al., "NotifiVIR: Exploring Interruptions and Notifications in Virtual Reality", IEEE transactions on visualization and computer graphics, vol. 24, No. 4, Apr. 2018, pp. 1447-1456.

Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.

Headmaster Introduction, "If You Can Move Your Head, You Can Move Your World", Retrieved from: <https://www.microsoft.com/buxtoncollection/a/pdf/HeadMaster%20Introduction.pdf)>, Retrieved on Dec. 26, 2024, 4 pages.

Huang et al., "Proxy-Based Security Audit System for Remote Desktop Access", Computer Communications and Networks, ICCCN 2009. Proceedings of 18th International Conference on, IEEE, Piscataway, NJ, USA, Aug. 3, 2009, 5 pages.

Jones et al., "The Future of Virtual Museums: on-Line, Immersive, 3D Environments", ProQuest (Technology Collection Database, Dissertations and Theses Database): Technical Literature Search, Jul. 26, 2002, 12 pages.

Kim et al., "Pseudo-haptic Button for Improving User Experience of Mid-air Interaction in VR", International Journal of Human-Computer Studies, vol. 168, No. 102907, Aug. 9, 2022, 11 pages.

Kim et al., "Virtual Object Sizes for Efficient and Convenient Mid-air Manipulation", The Visual Computer, vol. 38, No. 9, Jul. 1, 2022, pp. 3463-3474.

Lachambre et al., "Unity Photogrammetry Workflow", https://unity3d.com/files/solutions/photogrammetry/Unity-Photogrammetry-Workflow_2017-07_v2.pdf, Jun. 23, 2017, pp. 55-64.

Lee et al., "A Multi-Touch Three Dimensional Touch-Sensitive Tablet", CHI'85 Proceedings, Apr. 1985, pp. 21-25.

Lee et al., "UbiPoint: Towards Non-intrusive Mid-Air Interaction for Hardware Constrained Smart Glasses", In Proceedings of the 11th ACM Multimedia Systems Conference, May 27, 2020, pp. 190-201.

Lin et al., "Towards Naturally Grabbing and Moving Objects in VR", IS&T International Symposium on Electronic Imaging and the Engineering Reality of Virtual Reality, 2016, 6 pages.

Lin et al., "Ubii: Physical World Interaction Through Augmented Reality", Publisher: IEEE, vol. 16, No. 3, DOI:10.1109/TMC.2016.2567378, May 13, 2016, pp. 872-885.

Locher et al., "Mobile Phone and Cloud—a Dream Team for 3D Reconstruction", 2016 IEEE Winter Conference on Applications of Computer Vision (WACV), 2016, pp. 1-8.

Lor Cas, "Reality Capture: Exporting Mesh", Youtube, https://www.youtube.com/watch?v=PdvTRa2B_s0, Dec. 10, 2020, 2 pages.

Macmostvideo, "A Beginner's Guide to Selecting Items on Your Mac (#1566)", Bibliographic Information, Jan. 4, 2018, Retrieved from <URL:https://www.youtube.com/watch?v=a6MDAuh7MOQ&ab_channel=macmostvideo/>, [retrieved on Feb. 19, 2025], Most relevant passage of the video is 00:10 to 00:30, 2 pages.

McGill et al., "Expanding the Bounds of Seated Virtual Workspaces", University of Glasgow, Available online at: <https://core.ac.uk/download/pdf/323988271.pdf>, [retrieved on Jun. 27, 2023], Jun. 5, 2020, 44 pages.

Medeiros et al., "Promoting Reality Awareness in Virtual Reality through Proxemics", IEEE Virtual Reality and 3D User Interfaces (VR), Mar. 27-Apr. 1, 2021, 11 pages.

Mendes et al., "Mid-Air Interactions Above Stereoscopic Interactive Tables", IEEE Symposium on 3D User Interfaces (3DUI), Mar. 29-30, 2014, pp. 3-10.

Metalnwood, "Using a Tablet for Touch Control, with VR Headset on. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.

Nunez Angulo et al., "Manual for the Design of Didactic Units in Augmented Reality Using the Cospaces EDU Application", 2020, 75 pages.

Pfeuffer et al., "Gaze + Pinch Interaction in Virtual Reality", In Proceedings of SUI '17, Brighton, United Kingdom, Oct. 16-17, 2017, pp. 99-108.

Pfeuffer et al., "Gaze and Touch Interaction on Tablets", UIST '16, Tokyo, Japan, ACM, Oct. 16-19, 2016, pp. 301-311.

Pfeuffer et al., "Gaze+touch vs. Touch: What's the Trade-off When Using Gaze to Extend Touch to Remote Displays?", Advances in Databases and Information Systems, Aug. 30, 2015, pp. 349-367.

(56)            References Cited

OTHER PUBLICATIONS

Process a 3D Scan With Projection in Reality Capture (RC), Wayback Machine, https://web.archive.org/web/20200116135047/http:/www.pi3dscan.com/index.php/instructions/item/process-a-3d-scan-with-projection-in-reality-capture-rc, Jan. 16, 2020, 1 page.
Qi et al., "PointNet++: Deep Hierarchical Feature Learning on Point Sets in a Metric Space", Stanford University, Jun. 7, 2017, 14 pages.
Ran et al., "Multi-User Augmented Reality with Communication Efficient and Spatially Consistent Virtual Objects", CoNEXT '20, Dec. 1-4, 2020, Barcelona, Spain, 13 pages.
Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.
Rubine Dean, "Combining Gestures and Direct Manipulation", CHI'92, May 3-7, 1992, pp. 659-660.
Rubine Deanh. , "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Schenk et al., "SPOCK: a Smooth Pursuit Oculomotor Control Kit", CHI'16 Extended Abstracts, San Jose, CA, USA, ACM, May 7-12, 2016, pp. 2681-2687.
Schubert Martin, "Design Sprints at Leap Motion: a Playground of 3D User Interfaces", Ultraleap for Developers [online]. Nov. 8, 2017 [retrieved on Mar. 21, 2025]. Retrieved from the Internet: <URL: https://blog.leapmotion.com/design-playground-3d-user-interfaces/>, 17 pages.
Schuetz Markus, "Interactive Exploration of Point Clouds", Technische Universitat Wien, reposiTUm, https://doi.org/10.34726/hss.2021.91668, Mar. 8, 2021, 119 pages.
Slambekova Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.
Speicher et al., "Pseudo-haptic Controls for Mid-air Finger-based Menu Interaction", CHI'19 Extended Abstracts, May 4-9, 2019, Conference on Human Factors in Computing Systems, May 2, 2019, pp. 1-6.
Strand Robin, "Surface Skeletons in Grids With Non-cubic Voxels", 2004 IEEE Xplore, Available Online at: <DOI: 10.1109/ICPR.2004.1334195>, Sep. 2004, 5 pages.

Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.
Tolle et al., "Design of Head Movement Controller System (HEMOCS) for Control Mobile Application through Head Pose Movement Detection", Retrieved from :<https://www.google.com/url?sa=t&source=web&rct=j&opi=89978449&url=https://online-journals.org/index.php/i-jim/article/download/5552/4029/19224&ved=2ahUKEwj-w86vga-HAxUJJDQIHYMNDNw4HhAWegQILhAB&usg=AOvVaw3HR1t7v8Rx7osc1lp0UfOh>, DOI: <httpdx.doi.org/10.3991/ijim.v10i3.5552>, Retrieved on Dec. 26, 2024, 2016, 5 pages.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Simple Modal Window With Background Blur Effect, Available online at: <http://web.archive.org/web/20160313233427/https://www.cssscript.com/simple-modal-window-with-background-blur-effect/>, Mar. 13, 2016, 5 pages.
Wood Tyriel, "The HoloLens 2 Tour!—Discovering a World of Holograms", YouTube [online]. YouTube, Mar. 23, 2021 [retrieved on Dec. 7, 2023], Retrieved from the Internet: <URL: https://www.youtube.com/watch?v=rMks7sMzPxI>, 2 pages.
Writtenhouse Sandy, "How to Use Live View on Google Maps", Available online at <https://www.lifewire.com/use-live-view-google-maps-5323691>, [Retrieved from Internet on Jun. 27, 2024], Jul. 5, 2022, 6 pages.
Yamada Yoshihiro, "How to Generate a Modal Window with ModalPopup Control", Available online at: <http://web.archive.org/web/20210920015801/https://atmarkit.itmedia.co.jp/fdotnet/dotnettips/580aspajaxmodalpopup/aspajaxmodalpopup.html>[Search Date Aug. 22, 2023], Sep. 20, 2021, 8 pages (1 page of English Abstract and 7 pages of Official Copy).
Yue et al., "Optimal Region Selection for Stereoscopic Video Subtitle Insertion", IEEE Transactions on Circuits and Systems for Video Technology, vol. 28, No. 11, Nov. 2018, 13 pages.
Zhuang et al., "Distributed Architecture for 3D Graphics Rendering in Collaborative System", Computer and Modernization, Issue 4, 2017, 5 pages (1 page of English Abstract and 4 pages of Official Copy).

* cited by examiner

Figure 1A

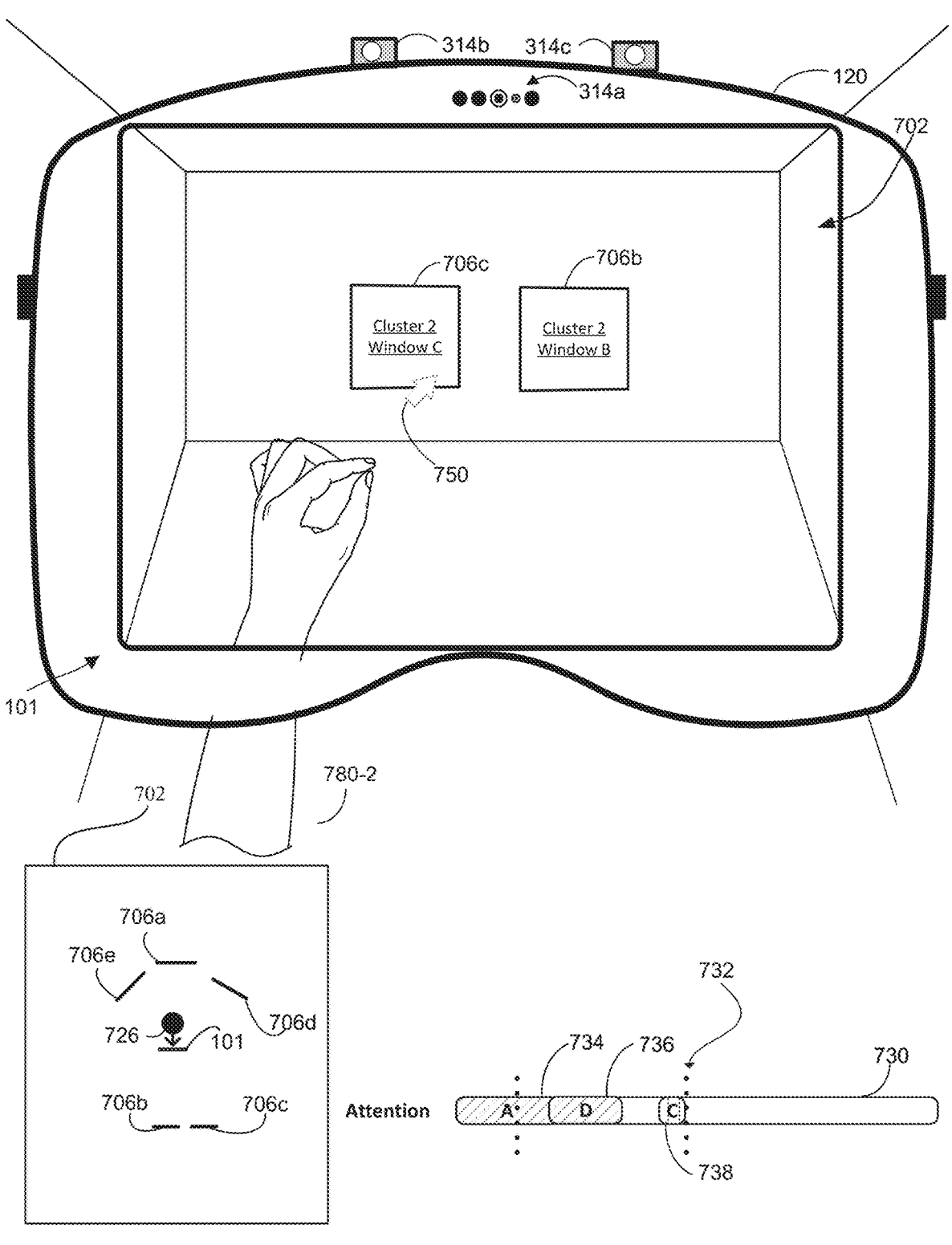
FIG. 7D1

800

While a three-dimensional environment is visible via the display generation component from a current viewpoint of a user, display, via the display generation component, at least a portion of a plurality of virtual objects that are available for viewing in the three-dimensional environment, the plurality of virtual objects including a first virtual object of a first set of one or more virtual objects and a second virtual object of a second set of one or more virtual objects          802a The first set of one or more of virtual objects have a first spatial arrangement relative to the current viewpoint          802b The second set of one or more virtual objects have a second spatial arrangement relative to the current viewpoint, different from the first spatial arrangement          802c Detect, via the one or more input devices, an event corresponding to a request to arrange one or more virtual objects relative to the current viewpoint of the user          802d In response to detecting the event while the three-dimensional environment is visible via the display generation component from the current viewpoint of the user:          802e In accordance with a determination that attention of the user of the computer system relative to the first set of one or more virtual objects satisfied one or more first criteria at a respective time corresponding to the event, display, via the display generation component, at least a portion of the first set of one or more virtual objects at a position within the three-dimensional environment that has a first updated spatial arrangement relative to the current viewpoint, different from the first spatial arrangement          802f In accordance with a determination that the attention of the user of the computer system relative to the one or more second virtual objects satisfied the one or more first criteria at the respective time corresponding to the event, display, via the display generation component, at least a portion of the second set of one or more virtual objects at a position within the three-dimensional environment that has a second updated spatial arrangement relative to the current viewpoint, different from the second spatial arrangement, wherein the position having the first updated spatial arrangement and the position having the second updated spatial arrangement are both in a same region of the three-dimensional environment relative to the current viewpoint          802g

FIG. 8A

A

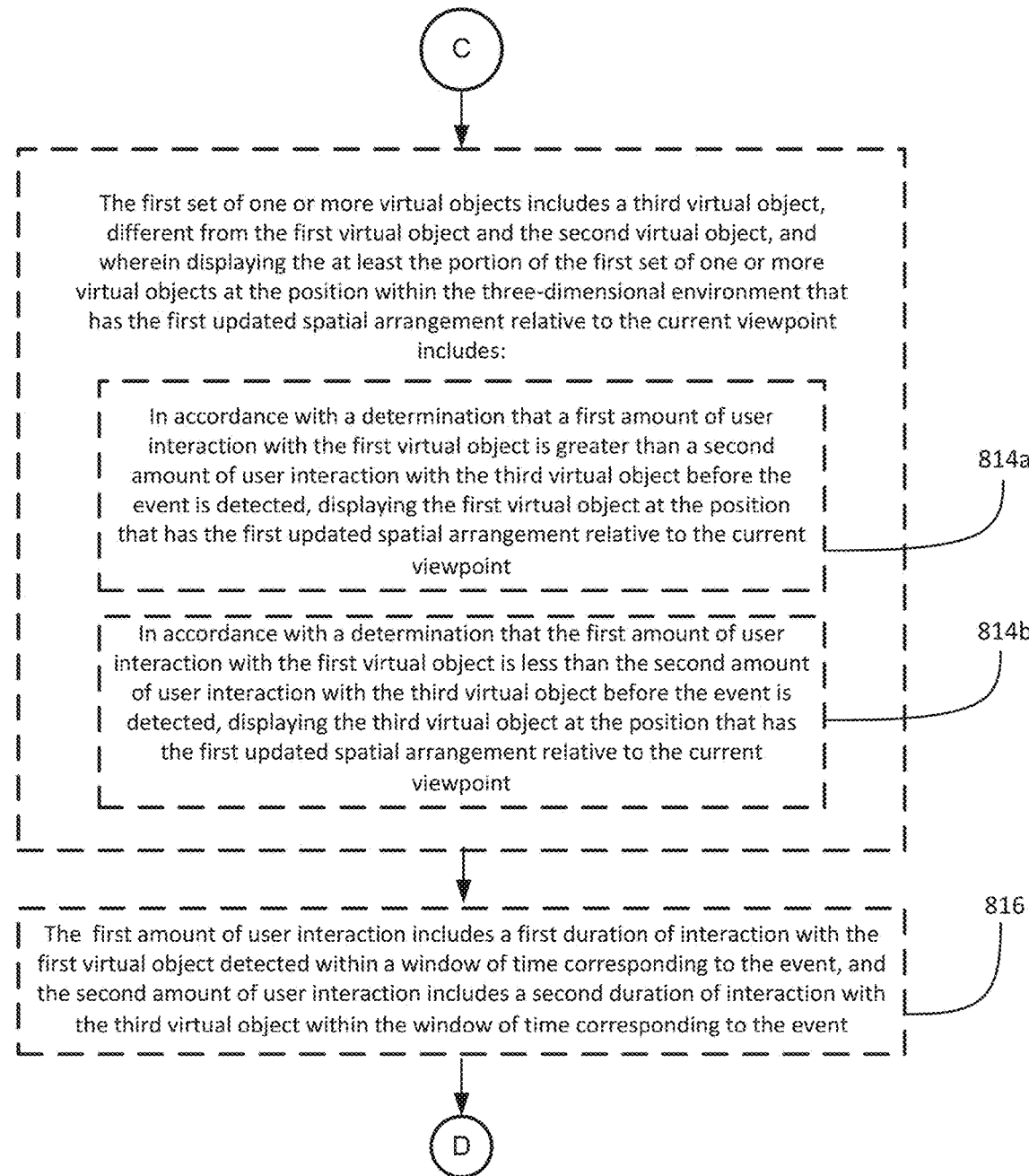

C

The first set of one or more virtual objects includes a third virtual object, different from the first virtual object and the second virtual object, and wherein displaying the at least the portion of the first set of one or more virtual objects at the position within the three-dimensional environment that has the first updated spatial arrangement relative to the current viewpoint includes:

In accordance with a determination that a first amount of user interaction with the first virtual object is greater than a second amount of user interaction with the third virtual object before the event is detected, displaying the first virtual object at the position that has the first updated spatial arrangement relative to the current viewpoint 814a In accordance with a determination that the first amount of user interaction with the first virtual object is less than the second amount of user interaction with the third virtual object before the event is detected, displaying the third virtual object at the position that has the first updated spatial arrangement relative to the current viewpoint 814b The first amount of user interaction includes a first duration of interaction with the first virtual object detected within a window of time corresponding to the event, and the second amount of user interaction includes a second duration of interaction with the third virtual object within the window of time corresponding to the event

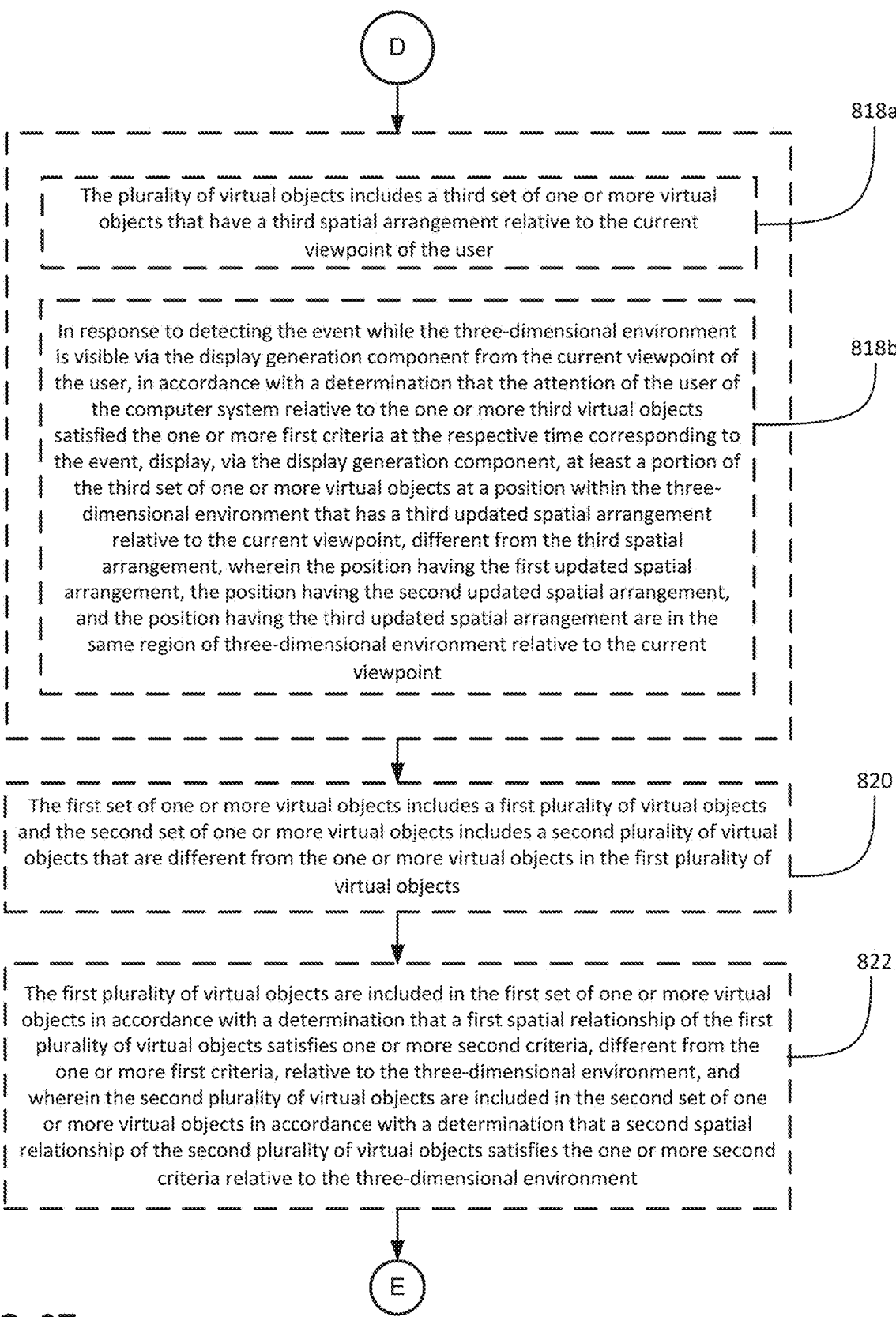

818a

The plurality of virtual objects includes a third set of one or more virtual objects that have a third spatial arrangement relative to the current viewpoint of the user 818b In response to detecting the event while the three-dimensional environment is visible via the display generation component from the current viewpoint of the user, in accordance with a determination that the attention of the user of the computer system relative to the one or more third virtual objects satisfied the one or more first criteria at the respective time corresponding to the event, display, via the display generation component, at least a portion of the third set of one or more virtual objects at a position within the three-dimensional environment that has a third updated spatial arrangement relative to the current viewpoint, different from the third spatial arrangement, wherein the position having the first updated spatial arrangement, the position having the second updated spatial arrangement, and the position having the third updated spatial arrangement are in the same region of three-dimensional environment relative to the current viewpoint

820

The first set of one or more virtual objects includes a first plurality of virtual objects and the second set of one or more virtual objects includes a second plurality of virtual objects that are different from the one or more virtual objects in the first plurality of virtual objects

822

The first plurality of virtual objects are included in the first set of one or more virtual objects in accordance with a determination that a first spatial relationship of the first plurality of virtual objects satisfies one or more second criteria, different from the one or more first criteria, relative to the three-dimensional environment, and wherein the second plurality of virtual objects are included in the second set of one or more virtual objects in accordance with a determination that a second spatial relationship of the second plurality of virtual objects satisfies the one or more second criteria relative to the three-dimensional environment

FIG. 8E

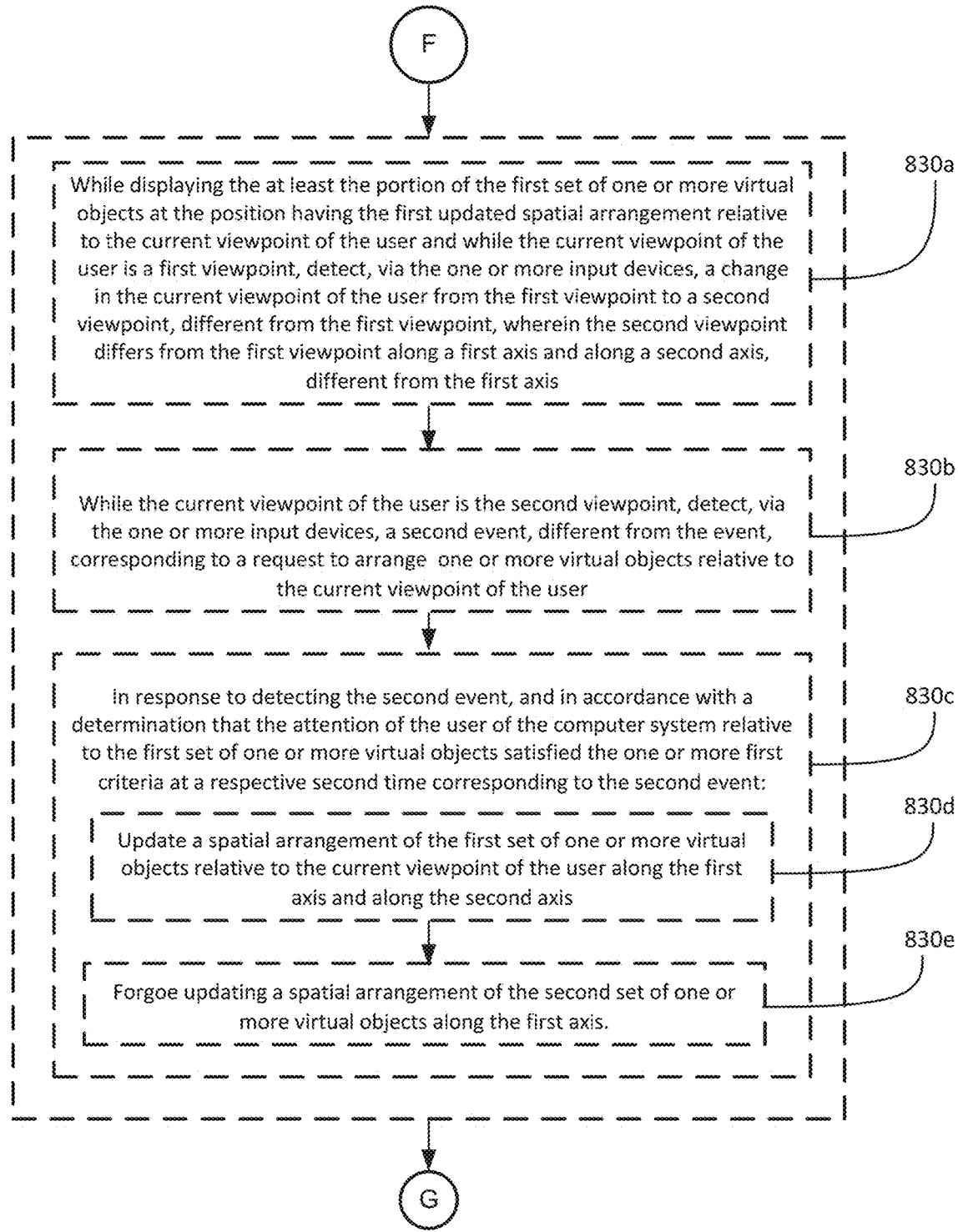

While displaying the at least the portion of the first set of one or more virtual objects at the position having the first updated spatial arrangement relative to the current viewpoint of the user and while the current viewpoint of the user is a first viewpoint, detect, via the one or more input devices, a change in the current viewpoint of the user from the first viewpoint to a second viewpoint, different from the first viewpoint, wherein the second viewpoint differs from the first viewpoint along a first axis and along a second axis, different from the first axis 830a While the current viewpoint of the user is the second viewpoint, detect, via the one or more input devices, a second event, different from the event, corresponding to a request to arrange one or more virtual objects relative to the current viewpoint of the user 830b In response to detecting the second event, and in accordance with a determination that the attention of the user of the computer system relative to the first set of one or more virtual objects satisfied the one or more first criteria at a respective second time corresponding to the second event:

830c

Update a spatial arrangement of the first set of one or more virtual objects relative to the current viewpoint of the user along the first axis and along the second axis 830d Forgoe updating a spatial arrangement of the second set of one or more virtual objects along the first axis.

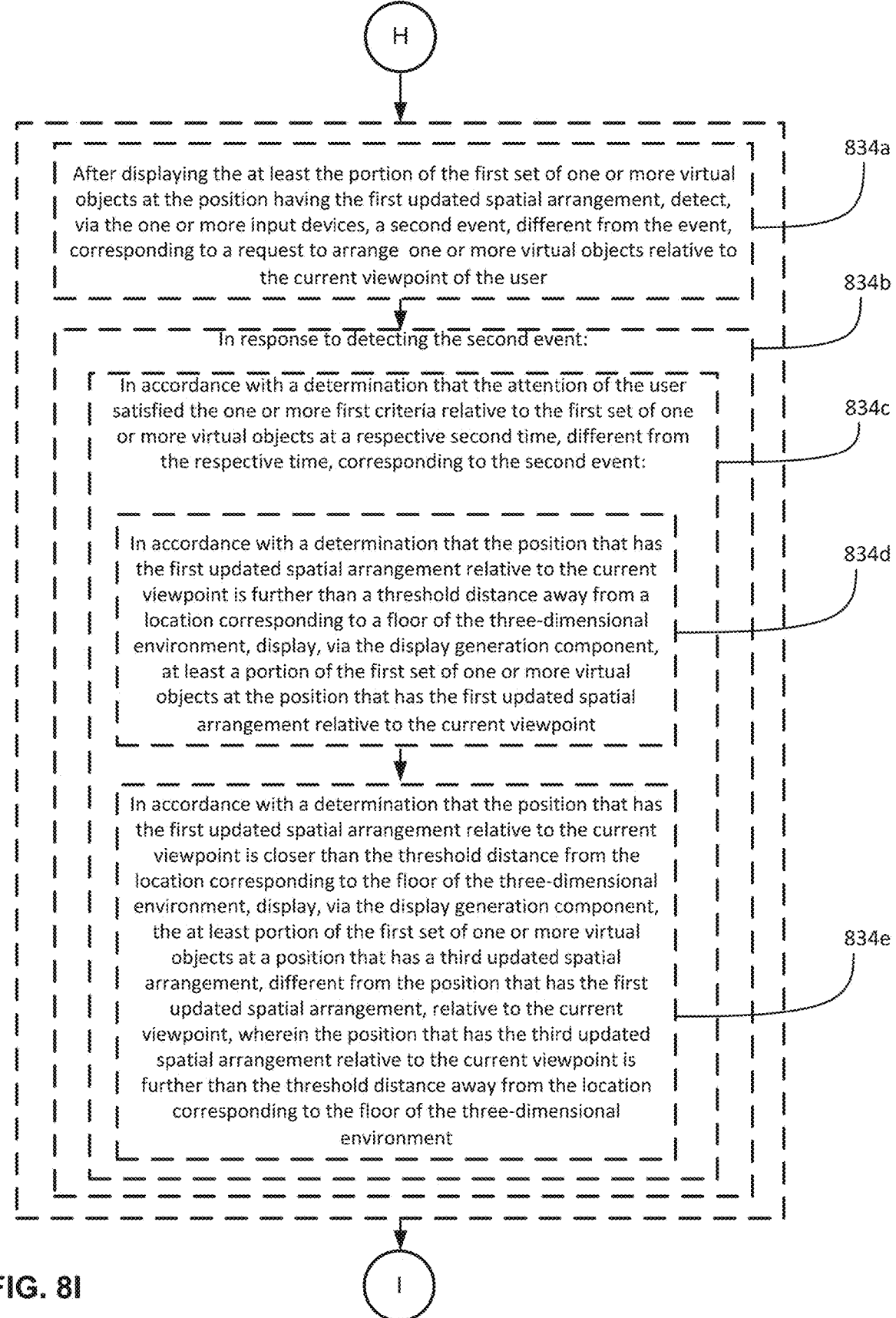

H

After displaying the at least the portion of the first set of one or more virtual objects at the position having the first updated spatial arrangement, detect, via the one or more input devices, a second event, different from the event, corresponding to a request to arrange one or more virtual objects relative to the current viewpoint of the user 834a In response to detecting the second event:

834b

In accordance with a determination that the attention of the user satisfied the one or more first criteria relative to the first set of one or more virtual objects at a respective second time, different from the respective time, corresponding to the second event:

834c

In accordance with a determination that the position that has the first updated spatial arrangement relative to the current viewpoint is further than a threshold distance away from a location corresponding to a floor of the three-dimensional environment, display, via the display generation component, at least a portion of the first set of one or more virtual objects at the position that has the first updated spatial arrangement relative to the current viewpoint 834d In accordance with a determination that the position that has the first updated spatial arrangement relative to the current viewpoint is closer than the threshold distance from the location corresponding to the floor of the three-dimensional environment, display, via the display generation component, the at least portion of the first set of one or more virtual objects at a position that has a third updated spatial arrangement, different from the position that has the first updated spatial arrangement, relative to the current viewpoint, wherein the position that has the third updated spatial arrangement relative to the current viewpoint is further than the threshold distance away from the location corresponding to the floor of the three-dimensional environment 834e

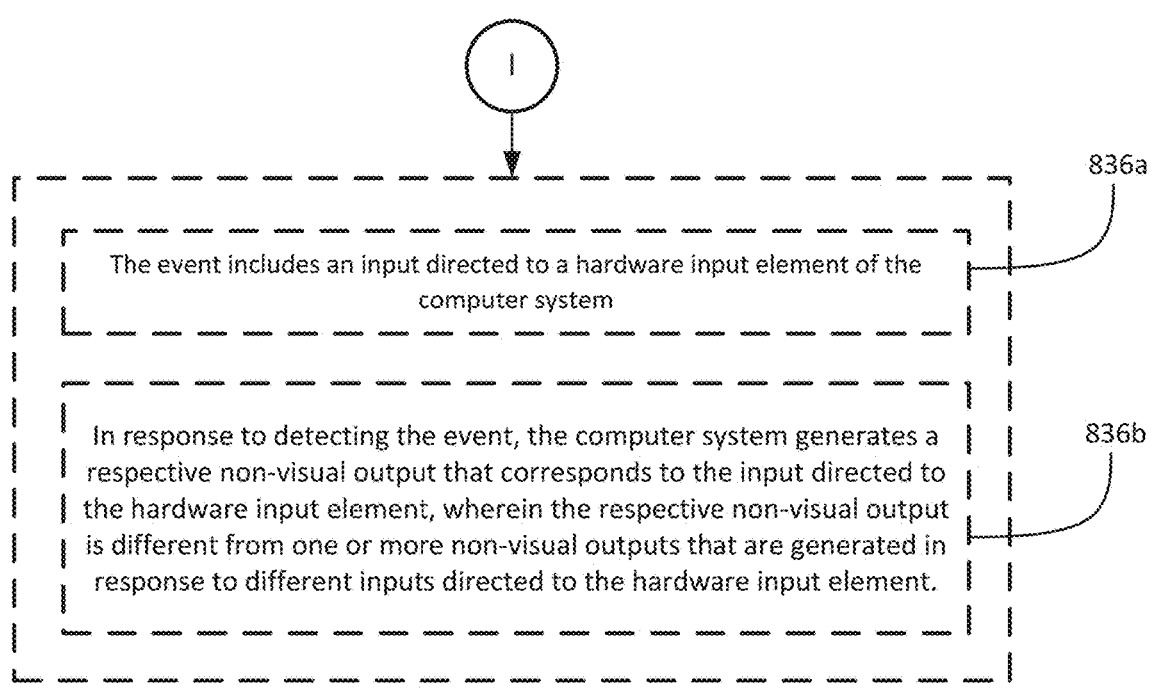

836a

The event includes an input directed to a hardware input element of the computer system 836b In response to detecting the event, the computer system generates a respective non-visual output that corresponds to the input directed to the hardware input element, wherein the respective non-visual output is different from one or more non-visual outputs that are generated in response to different inputs directed to the hardware input element.

FIG. 8J

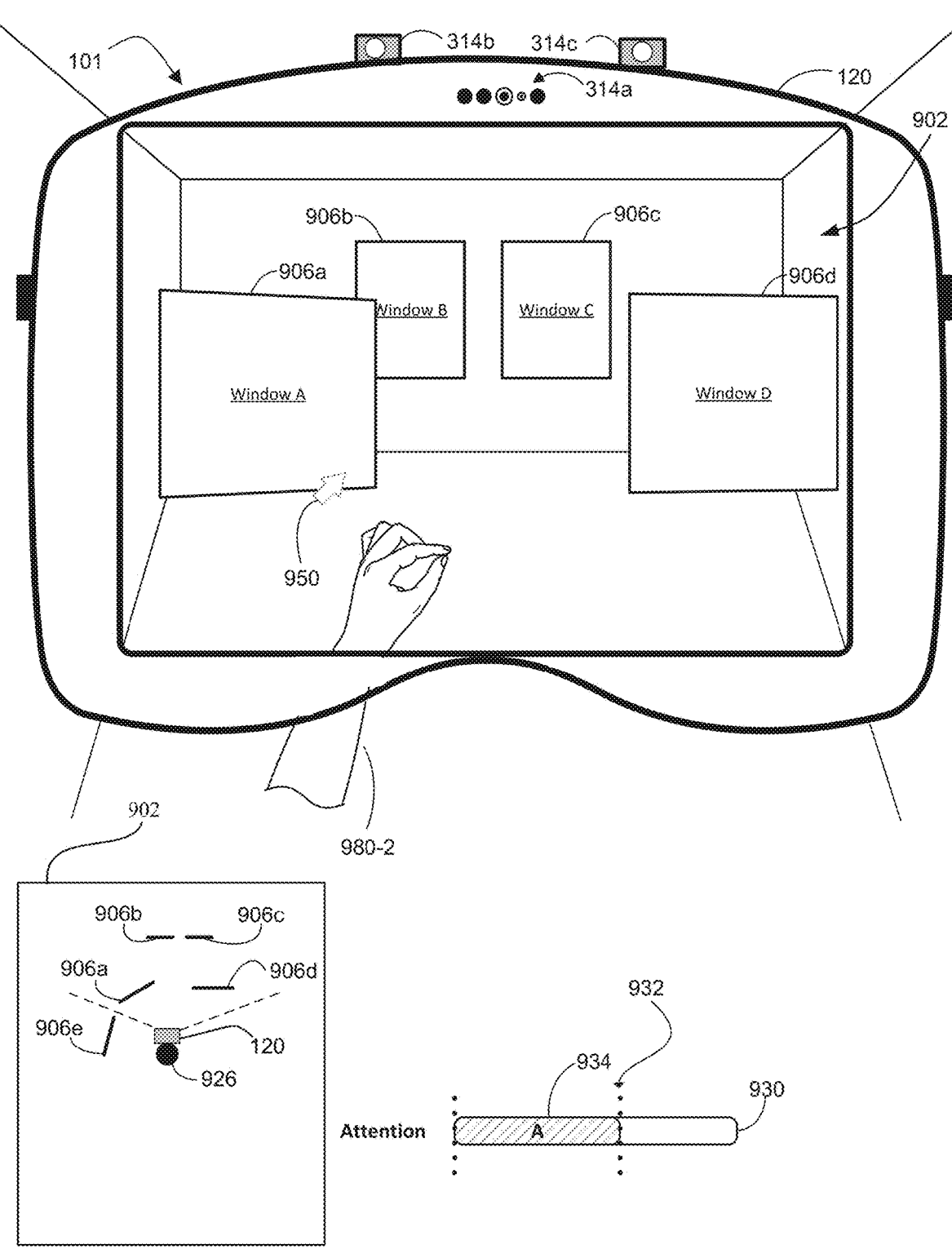
FIG. 9A1

1000

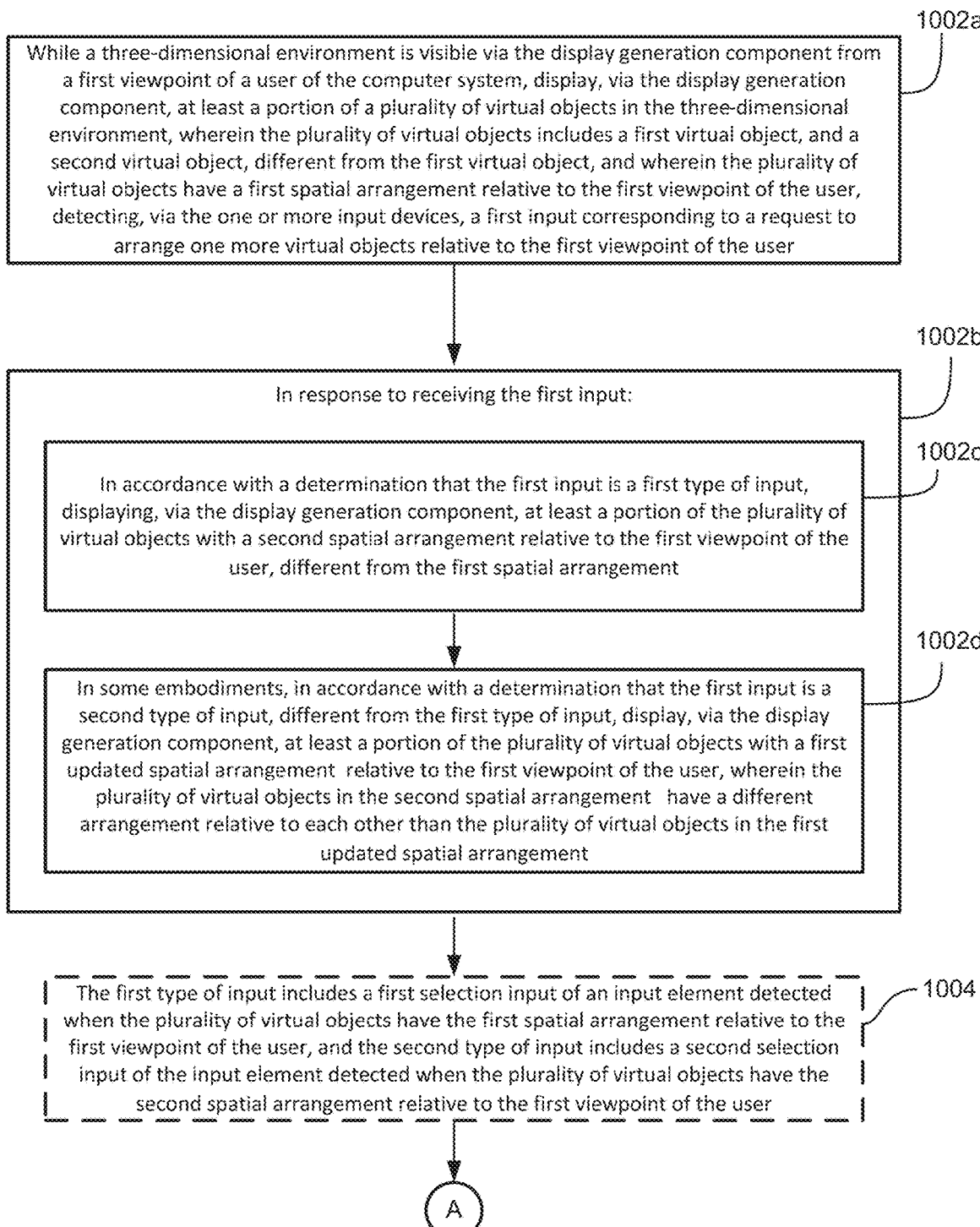

1002a

While a three-dimensional environment is visible via the display generation component from a first viewpoint of a user of the computer system, display, via the display generation component, at least a portion of a plurality of virtual objects in the three-dimensional environment, wherein the plurality of virtual objects includes a first virtual object, and a second virtual object, different from the first virtual object, and wherein the plurality of virtual objects have a first spatial arrangement relative to the first viewpoint of the user, detecting, via the one or more input devices, a first input corresponding to a request to arrange one more virtual objects relative to the first viewpoint of the user 1002b In response to receiving the first input:

1002c

In accordance with a determination that the first input is a first type of input, displaying, via the display generation component, at least a portion of the plurality of virtual objects with a second spatial arrangement relative to the first viewpoint of the user, different from the first spatial arrangement 1002d In some embodiments, in accordance with a determination that the first input is a second type of input, different from the first type of input, display, via the display generation component, at least a portion of the plurality of virtual objects with a first updated spatial arrangement relative to the first viewpoint of the user, wherein the plurality of virtual objects in the second spatial arrangement have a different arrangement relative to each other than the plurality of virtual objects in the first updated spatial arrangement

1004

The first type of input includes a first selection input of an input element detected when the plurality of virtual objects have the first spatial arrangement relative to the first viewpoint of the user, and the second type of input includes a second selection input of the input element detected when the plurality of virtual objects have the second spatial arrangement relative to the first viewpoint of the user

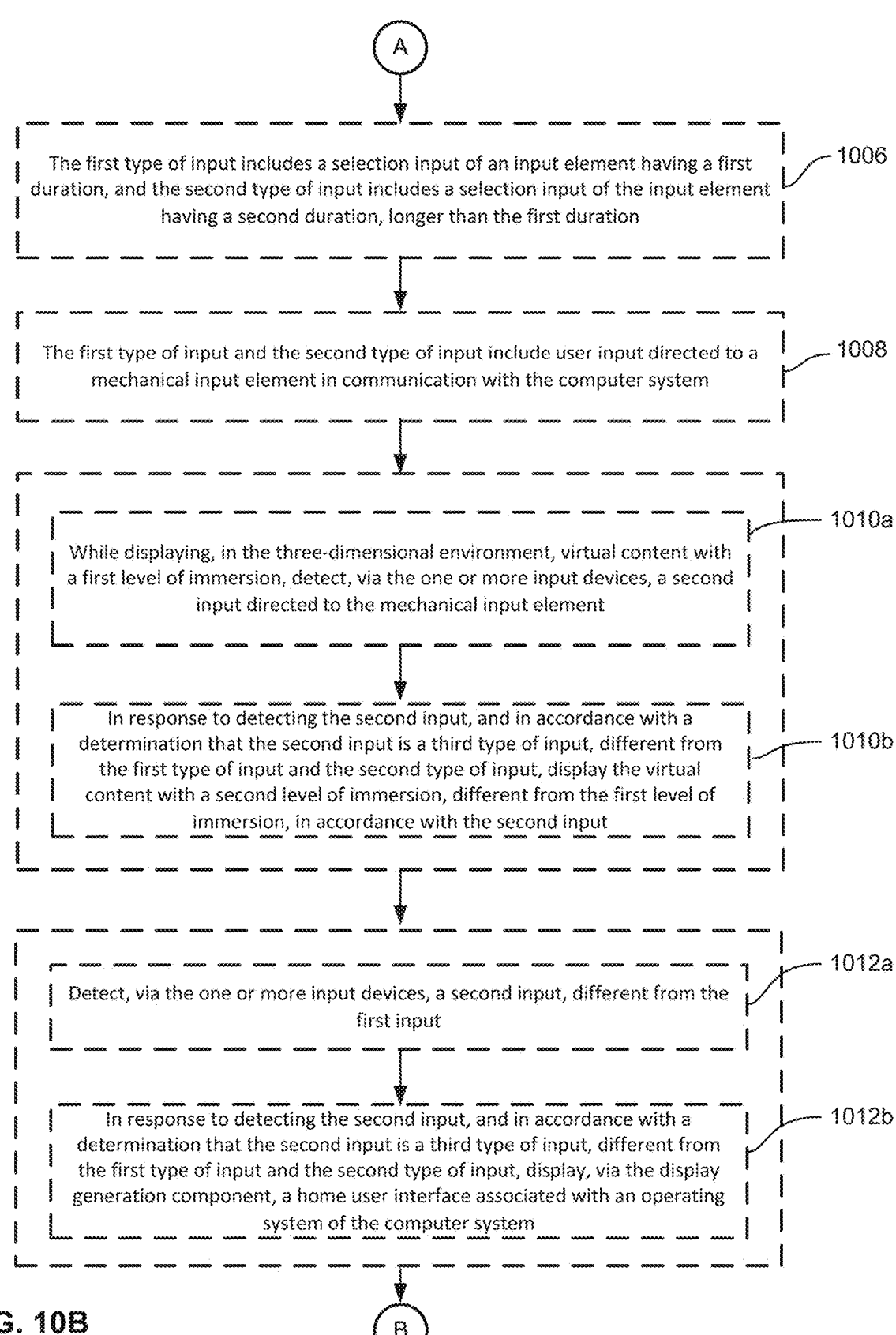

The first type of input includes a selection input of an input element having a first duration, and the second type of input includes a selection input of the input element having a second duration, longer than the first duration — 1006

The first type of input and the second type of input include user input directed to a mechanical input element in communication with the computer system — 1008

1010a

While displaying, in the three-dimensional environment, virtual content with a first level of immersion, detect, via the one or more input devices, a second input directed to the mechanical input element In response to detecting the second input, and in accordance with a determination that the second input is a third type of input, different from the first type of input and the second type of input, display the virtual content with a second level of immersion, different from the first level of immersion, in accordance with the second input — 1010b 1012a Detect, via the one or more input devices, a second input, different from the first input In response to detecting the second input, and in accordance with a determination that the second input is a third type of input, different from the first type of input and the second type of input, display, via the display generation component, a home user interface associated with an operating system of the computer system — 1012b

FIG. 10B

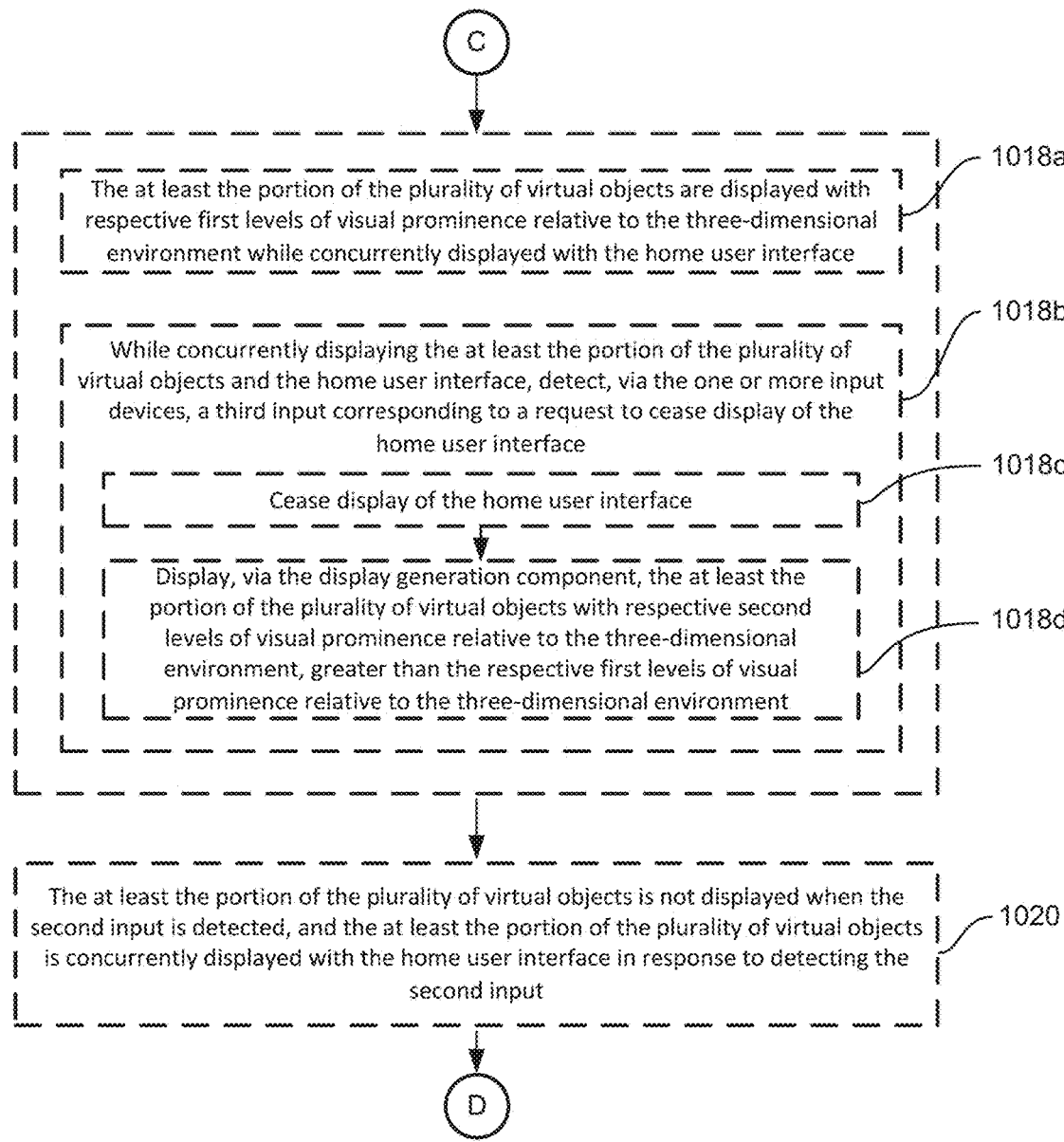

C

The at least the portion of the plurality of virtual objects are displayed with respective first levels of visual prominence relative to the three-dimensional environment while concurrently displayed with the home user interface ⟋ 1018a While concurrently displaying the at least the portion of the plurality of virtual objects and the home user interface, detect, via the one or more input devices, a third input corresponding to a request to cease display of the home user interface ⟋ 1018b Cease display of the home user interface ⟋ 1018c Display, via the display generation component, the at least the portion of the plurality of virtual objects with respective second levels of visual prominence relative to the three-dimensional environment, greater than the respective first levels of visual prominence relative to the three-dimensional environment ⟋ 1018d The at least the portion of the plurality of virtual objects is not displayed when the second input is detected, and the at least the portion of the plurality of virtual objects is concurrently displayed with the home user interface in response to detecting the second input ⟋ 1020

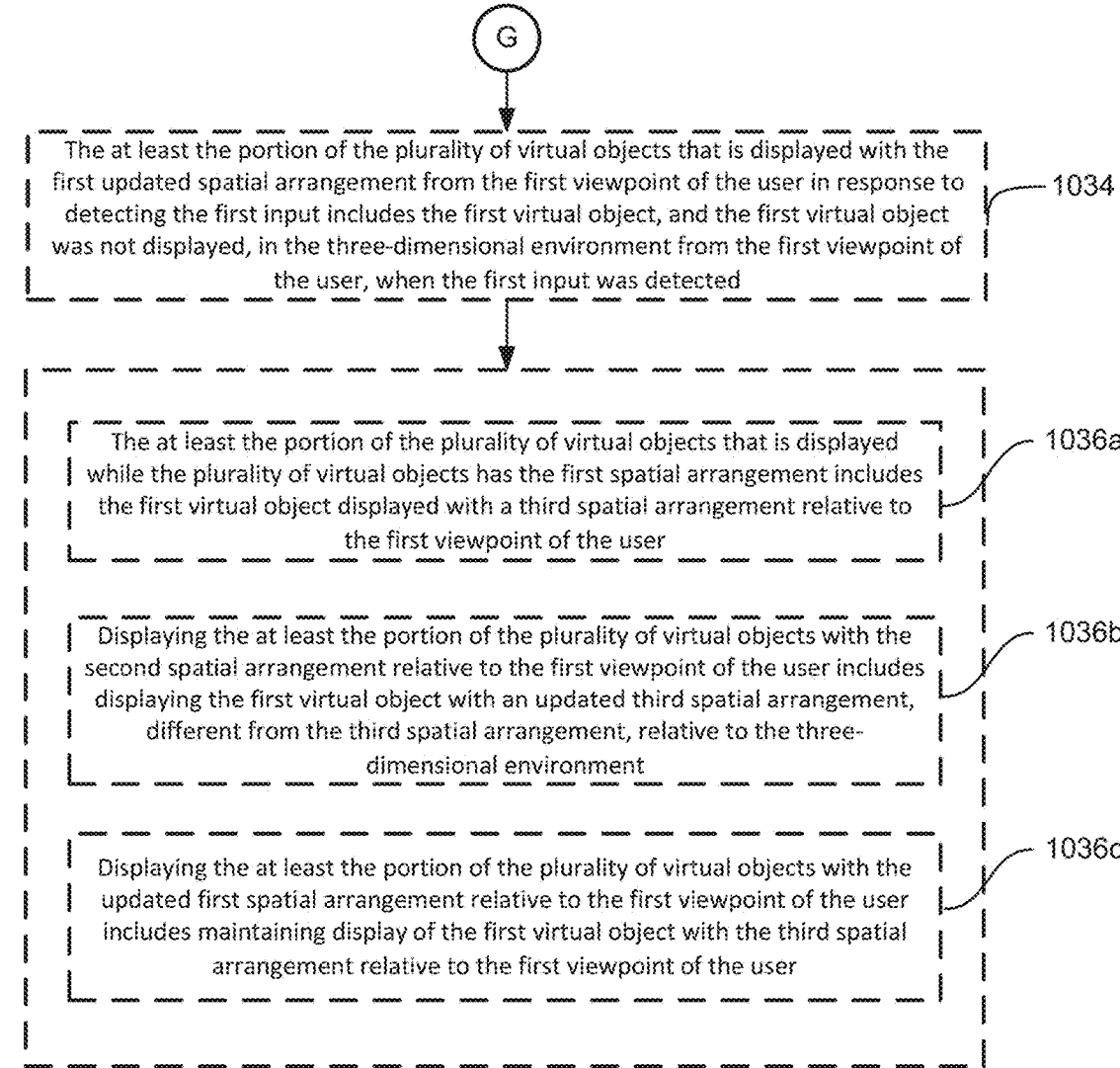

The at least the portion of the plurality of virtual objects that is displayed with the first updated spatial arrangement from the first viewpoint of the user in response to detecting the first input includes the first virtual object, and the first virtual object was not displayed, in the three-dimensional environment from the first viewpoint of the user, when the first input was detected — 1034

The at least the portion of the plurality of virtual objects that is displayed while the plurality of virtual objects has the first spatial arrangement includes the first virtual object displayed with a third spatial arrangement relative to the first viewpoint of the user — 1036a Displaying the at least the portion of the plurality of virtual objects with the second spatial arrangement relative to the first viewpoint of the user includes displaying the first virtual object with an updated third spatial arrangement, different from the third spatial arrangement, relative to the three-dimensional environment — 1036b Displaying the at least the portion of the plurality of virtual objects with the updated first spatial arrangement relative to the first viewpoint of the user includes maintaining display of the first virtual object with the third spatial arrangement relative to the first viewpoint of the user — 1036c

FIG. 10H

METHODS FOR DISPLAYING AND REARRANGING OBJECTS IN AN ENVIRONMENT

CROSS-REFERENCE TO RELATED APPLICATIONS

This application claims the benefit of U.S. Provisional Application No. 63/498,131, filed Apr. 25, 2023, and U.S. Provisional Application No. 63/505,689, filed Jun. 1, 2023, the contents of which are incorporated herein by reference in their entirety for all purposes.

TECHNICAL FIELD

The present disclosure relates generally to computer systems that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system selectively recenters virtual content to a viewpoint of a user of the computer system. In some embodiments, a computer system selectively recenters virtual content and/or gathers the virtual content.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8J is a flowchart illustrating an exemplary method of selectively recentering virtual content to a viewpoint of a user in accordance with some embodiments.

FIGS. 10A-10H is a flowchart illustrating an exemplary method of recentering or gathering one or more virtual objects to a viewpoint of a user in accordance with some embodiments.

DESCRIPTION OF EMBODIMENTS

Figure 1B:
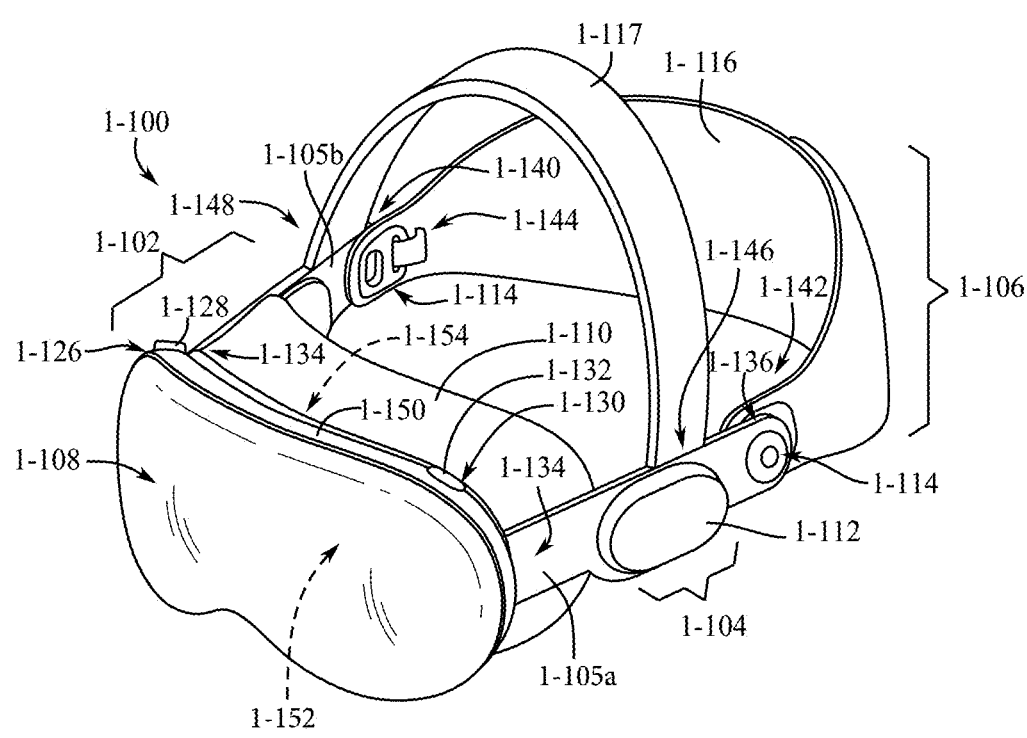
FIGS. 1B-1P are examples of a computer system for providing XR experiences in the operating environment of FIG. 1A.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system detects an event corresponding to a request to arrange virtual content relative to a viewpoint of a user of the computer system. In some embodiments, in response to detecting the event, the computer system recenters virtual object(s), displaying such virtual objects at an updated position corresponding to the viewpoint of the user. In some embodiments, the computer system determines attention of the user satisfied one or more criteria relative to a set of one or more virtual objects at a time corresponding to the event, and recenters such a set of one or more virtual objects to the updated position corresponding to the viewpoint of the user. In some embodiments, the computer system determines attention of the user satisfied one or more criteria relative to another set of one or more virtual objects at the time corresponding to the event, and recenters the other set of one or more virtual objects to the updated position corresponding to the viewpoint of the user.

In some embodiments, while displaying at least a portion of a plurality of virtual objects and while the plurality of virtual objects have a first spatial arrangement relative to a viewpoint of a user of a computer system, a computer system detects an input, and in accordance with a determination that a type of the input is a first type or a second type of input, displays at least a portion of a plurality of virtual objects with a spatial arrangement corresponding to the type of input. In some embodiments, when the type of input is the first type of input, the at least the portion of the plurality of virtual objects are displayed with a second spatial arrangement, different form the first spatial arrangement. In some embodiments, when the type of input is the first type of input, the computer system displays the plurality of virtual objects with a first updated spatial arrangement relative to the viewpoint of the user of the computer system.

Figure 1A:
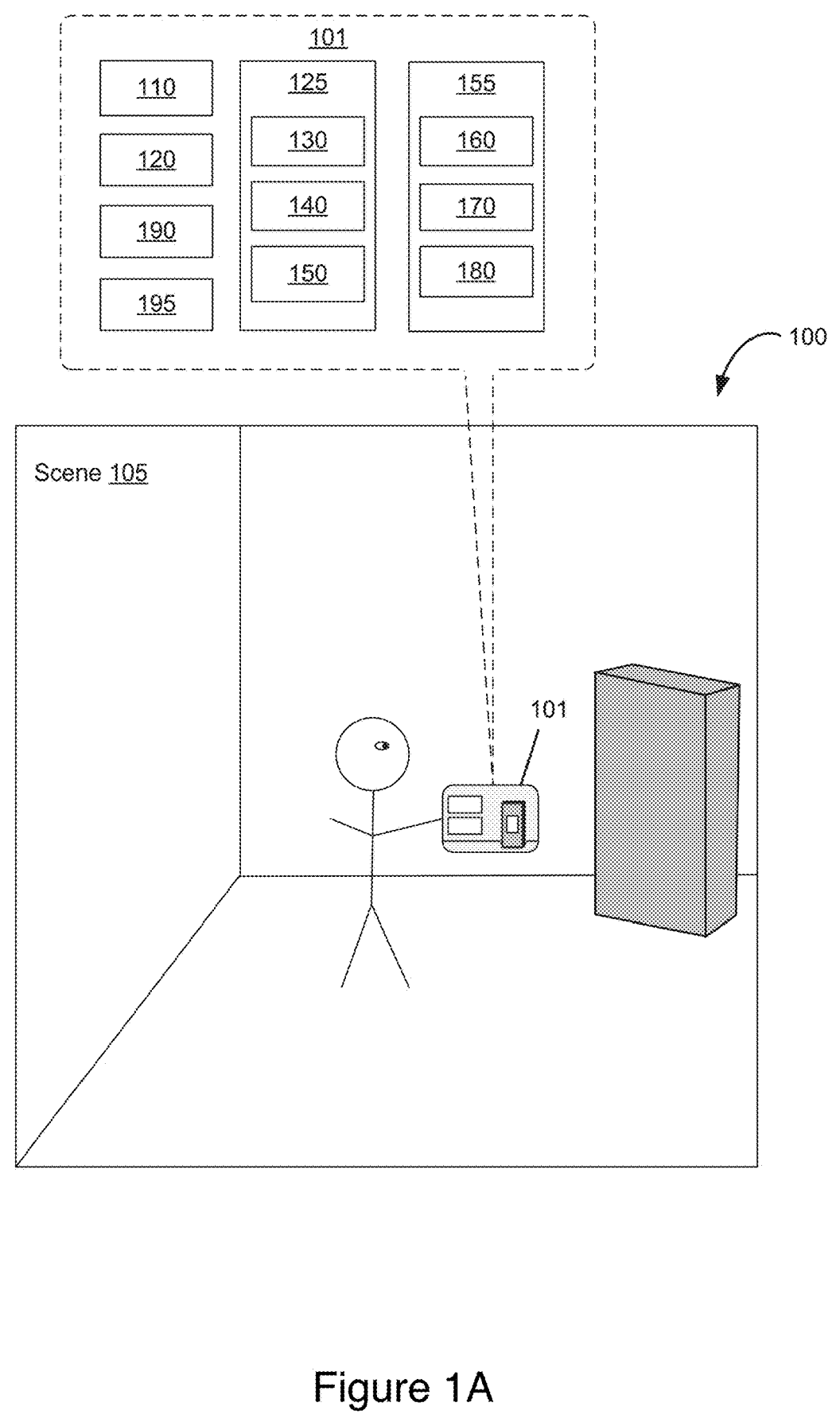

FIGS. 1A-6 provide a description of example computer systems for providing XR experiences to users (such as described below with respect to methods 800 and/or 1000). FIGS. 7A-7H illustrate examples of a computer system selectively recentering virtual content to a viewpoint of a user in accordance with some embodiments. FIGS. 8A-8J depict a flow diagram of methods of selectively recentering virtual content to a viewpoint of a user in accordance with some embodiments. The user interfaces in FIGS. 7A-7H are used to illustrate the processes in FIGS. 8A-8J. FIGS. 9A-9G illustrate examples of a computer system recentering or gathering one or more virtual objects to a viewpoint of a user in accordance with some embodiments. FIGS. 10A-10H depict a flow diagram of methods of recentering or gathering one or more virtual objects to a viewpoint of a user in accordance with some embodiments. The user interfaces in FIGS. 9A-9G are used to illustrate the processes in FIGS. 10A-10H.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less-precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1C:
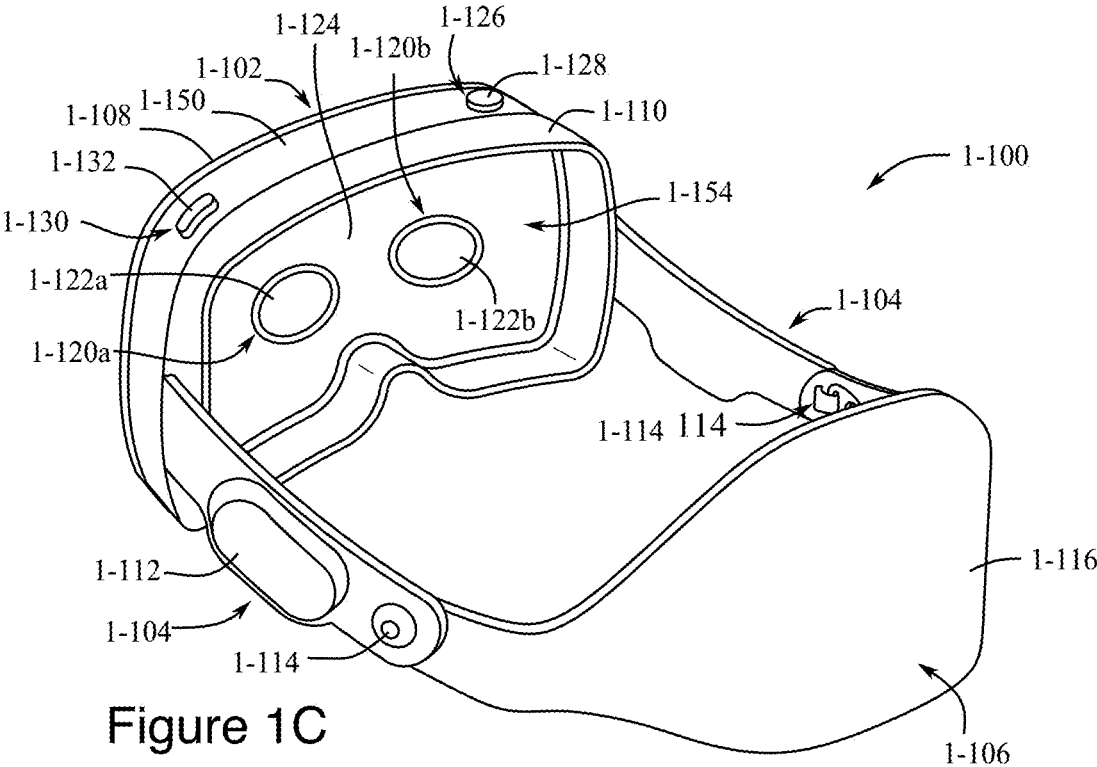
FIG. 1A is a block diagram illustrating an operating environment of a computer system for providing XR experiences in accordance with some embodiments.
Figure 1D:
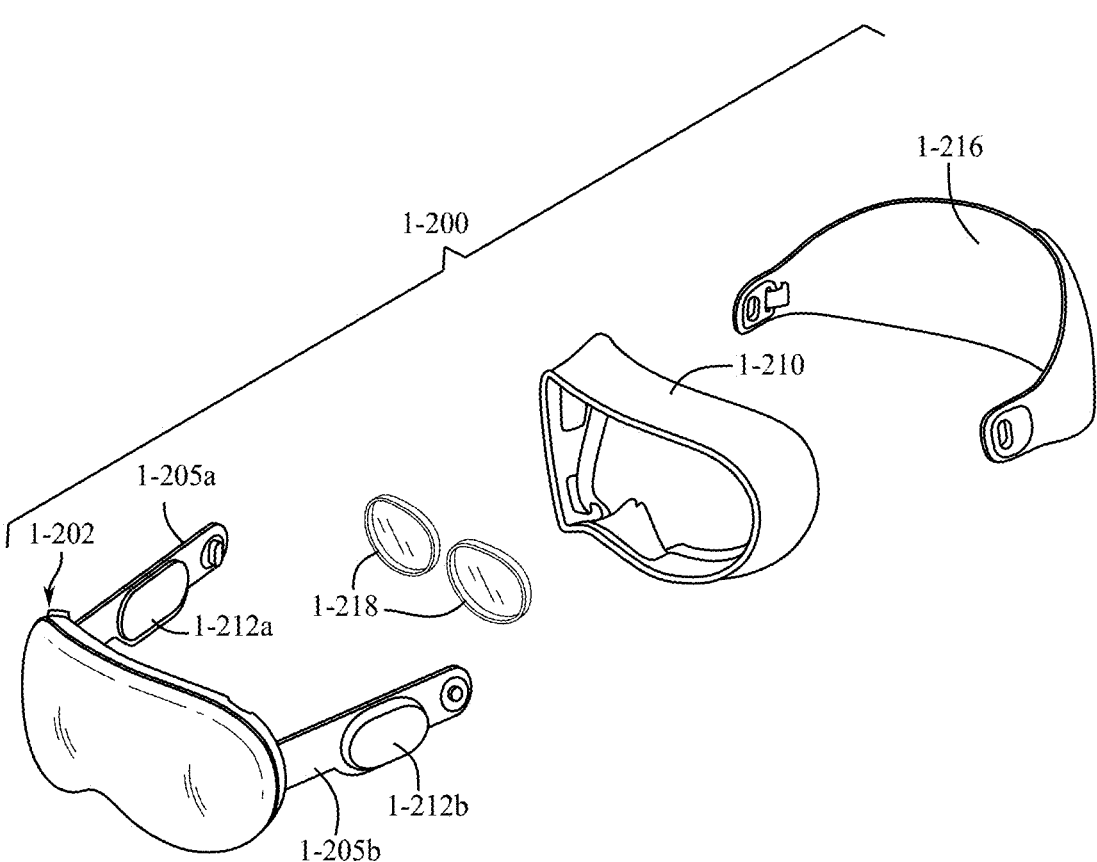
Figure 1E:
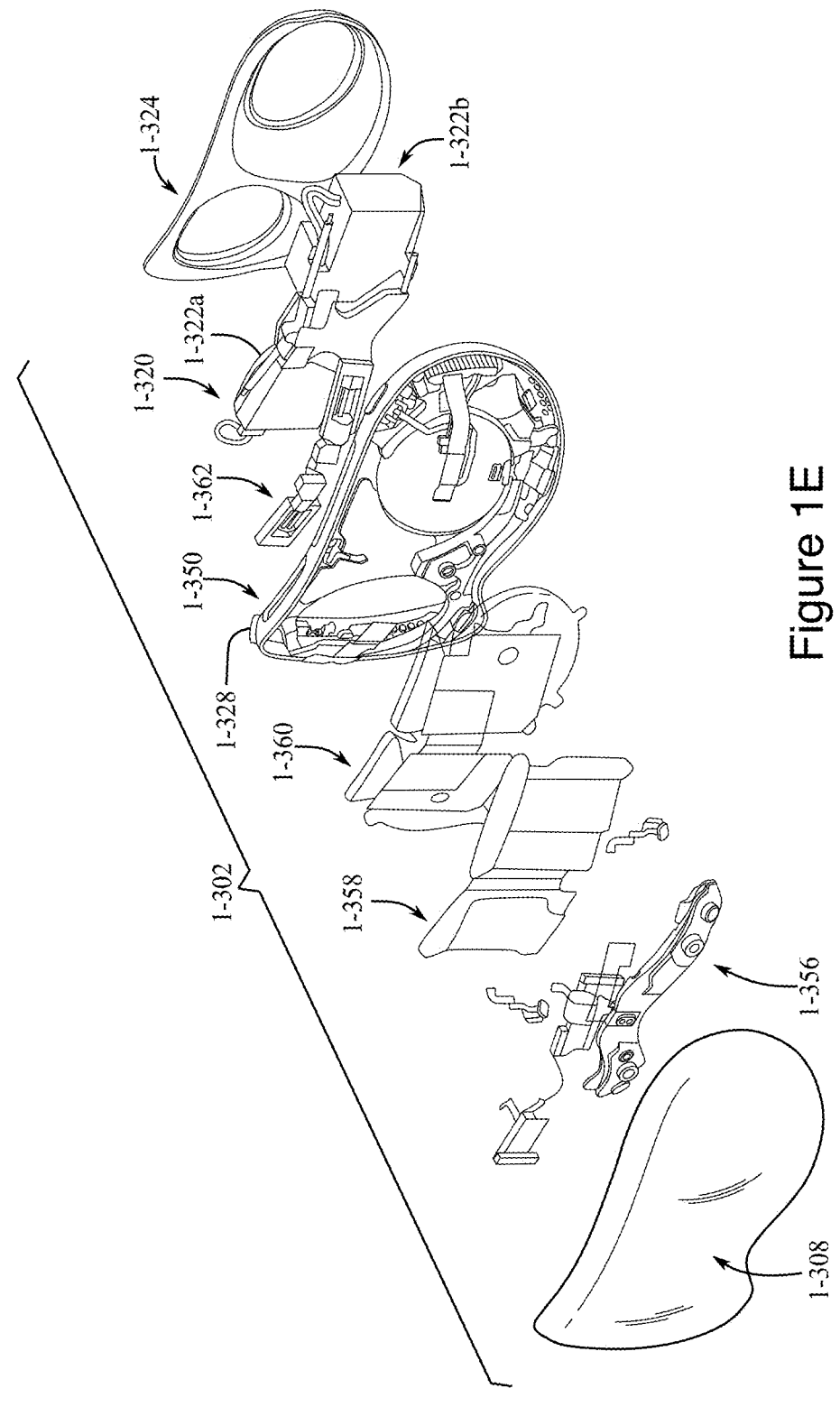
Figure 1F:
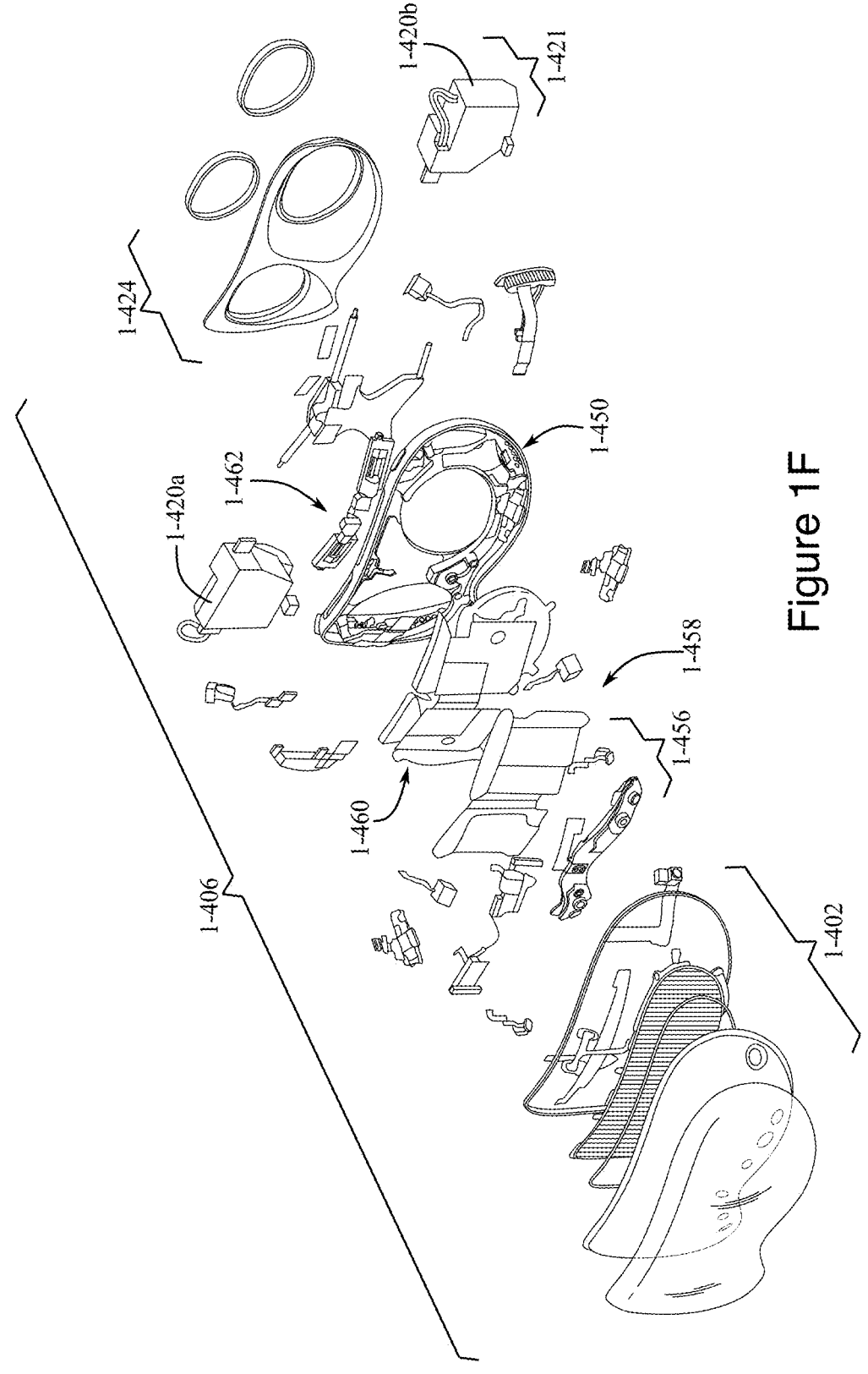
Figure 1G:
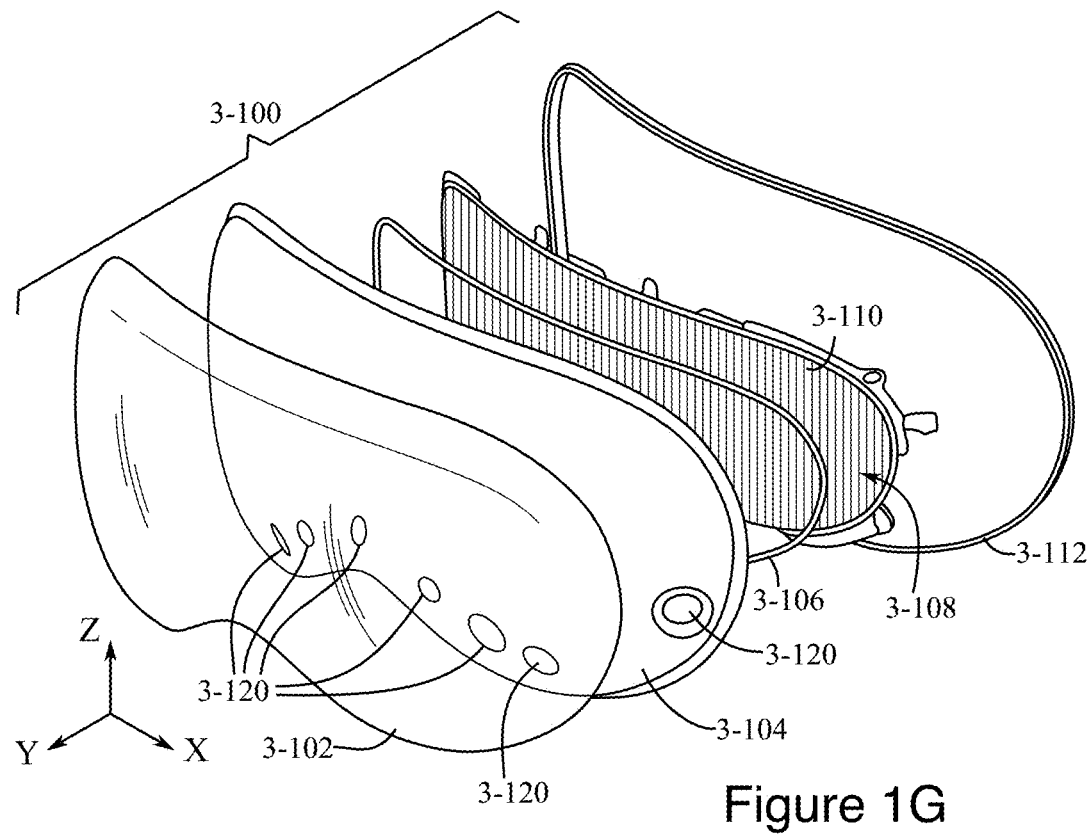
Figure 1H:
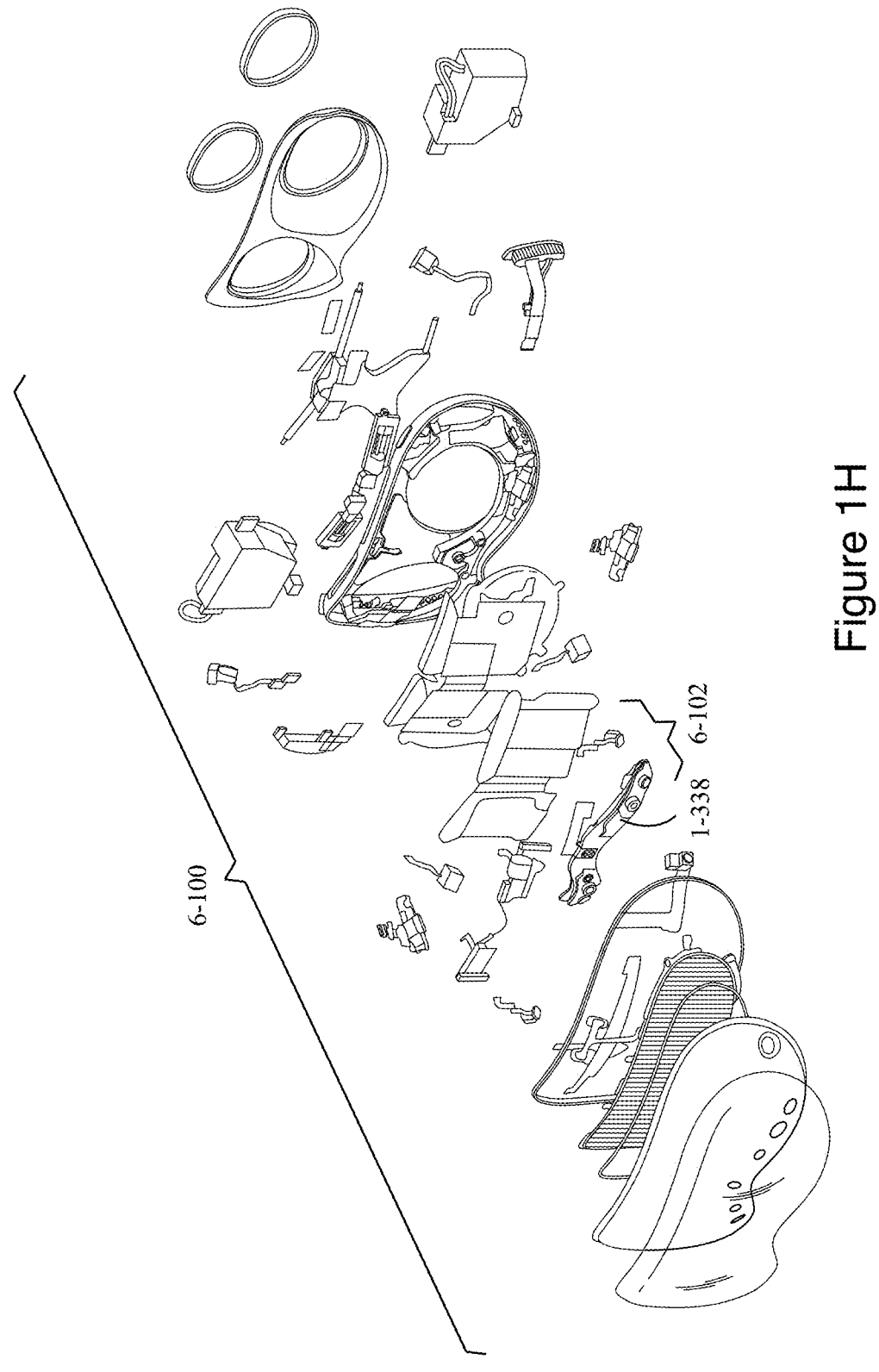
Figure 1I:
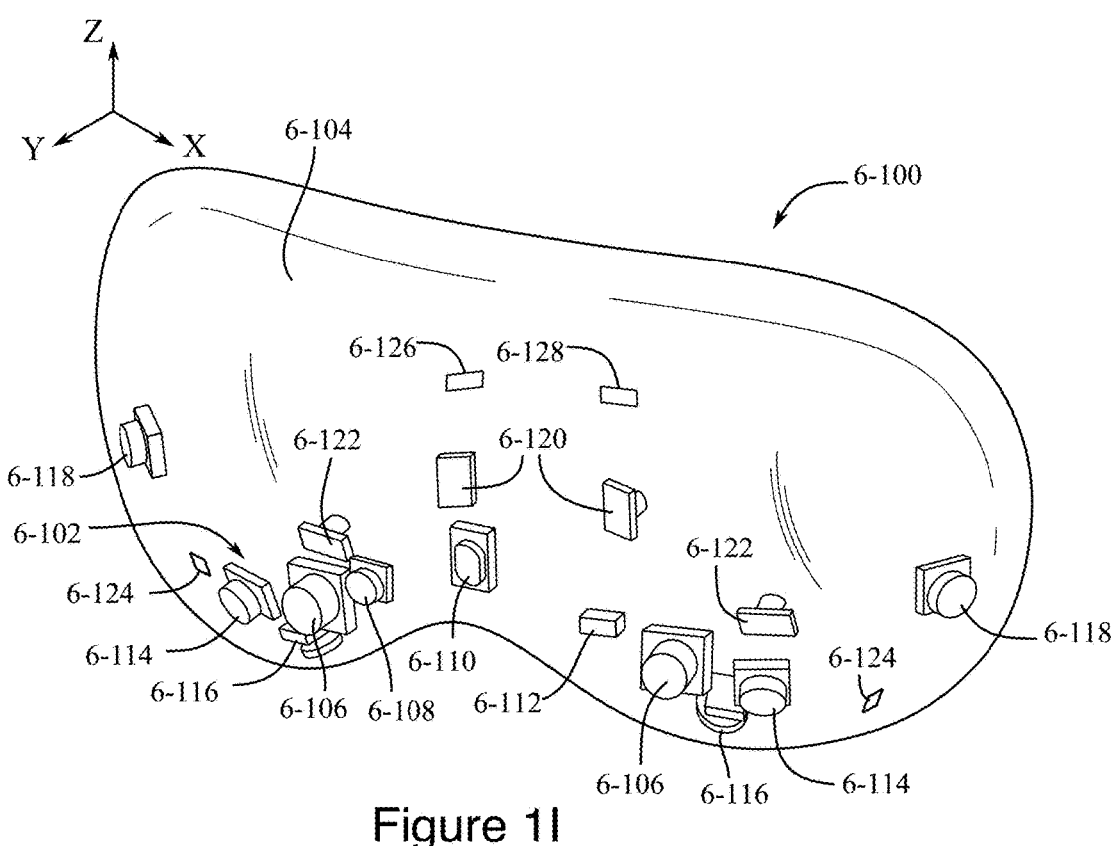
Figure 1J:
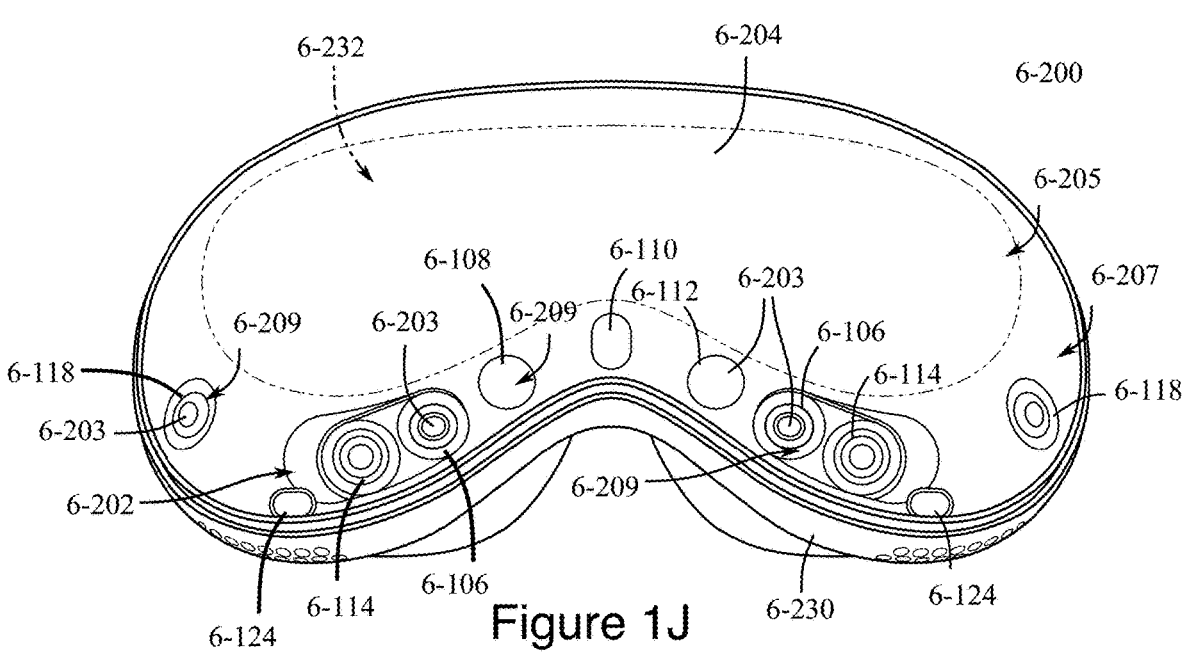
Figure 1K:
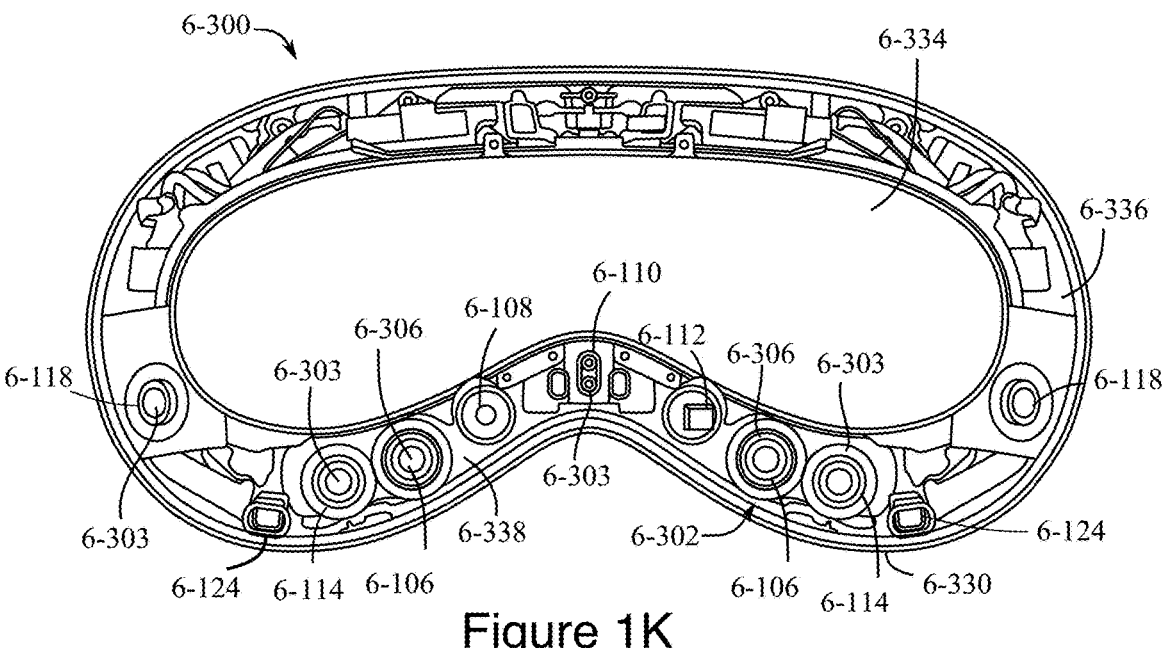
Figure 1L:
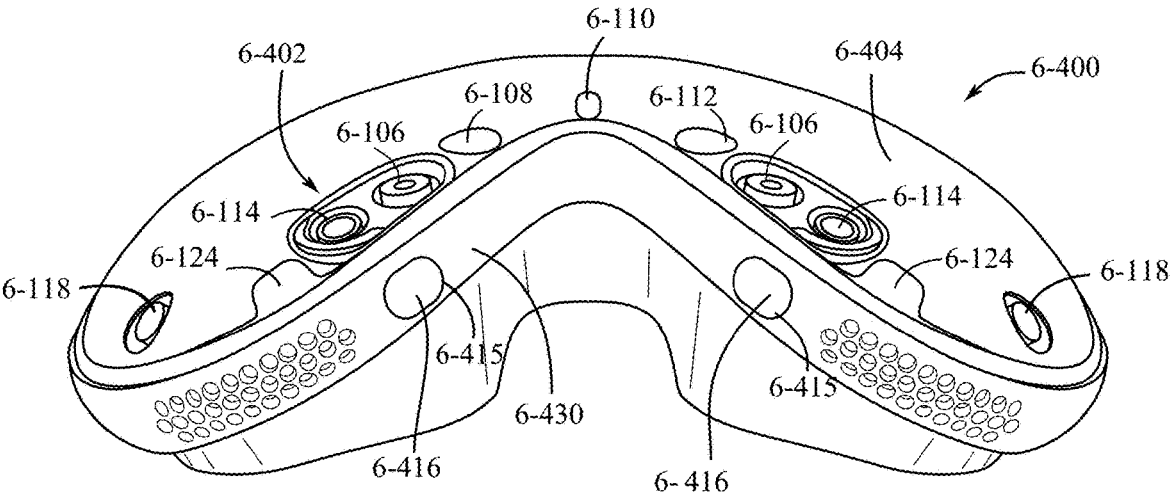
Figure 1M:
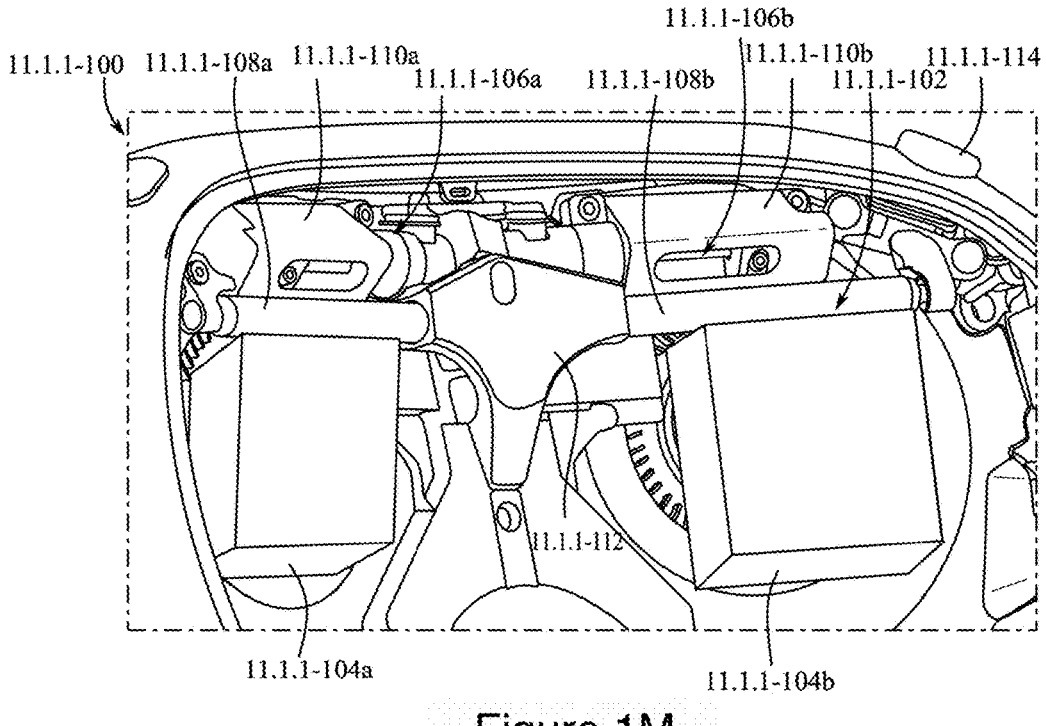
Figure 1N:
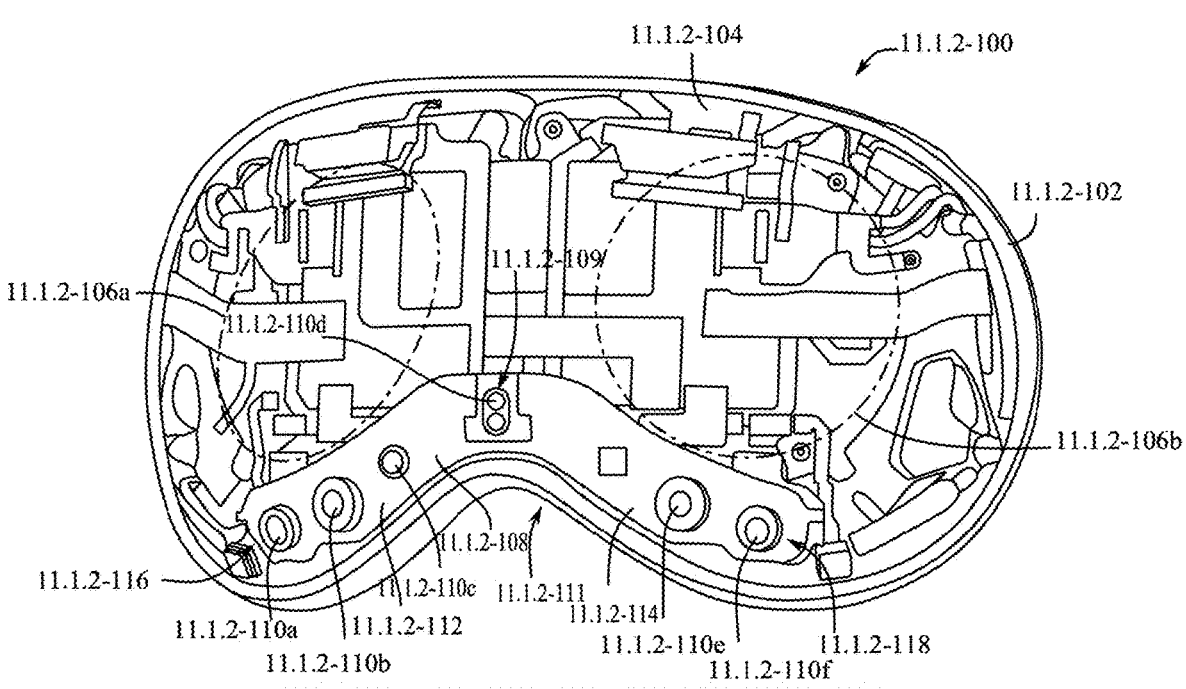
Figure 1O:
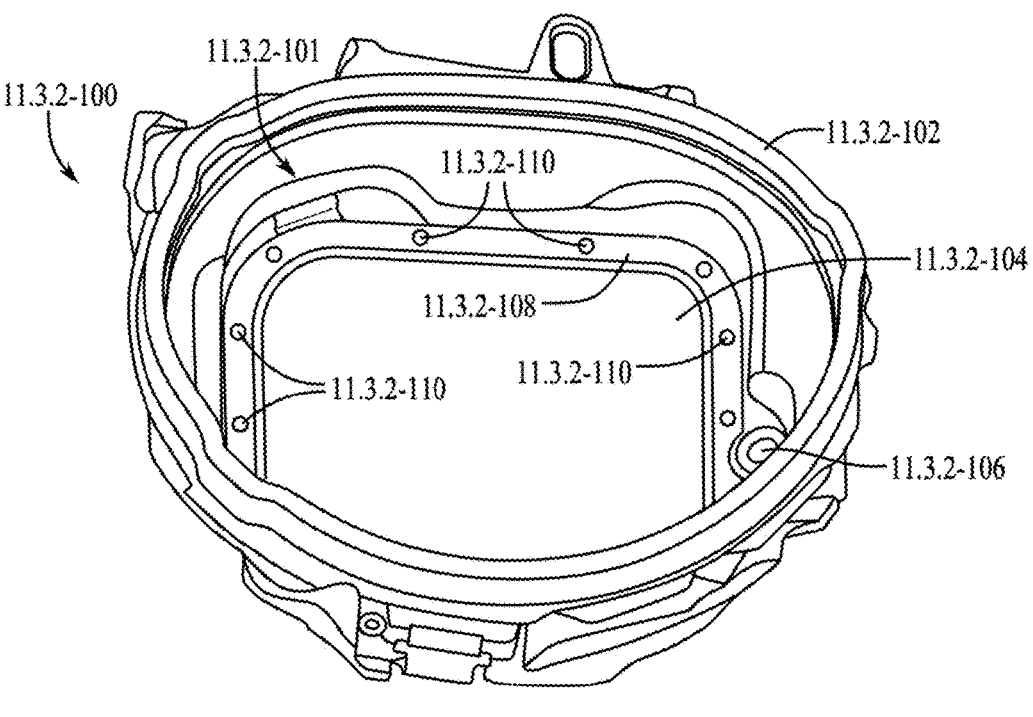
Figure 1P:
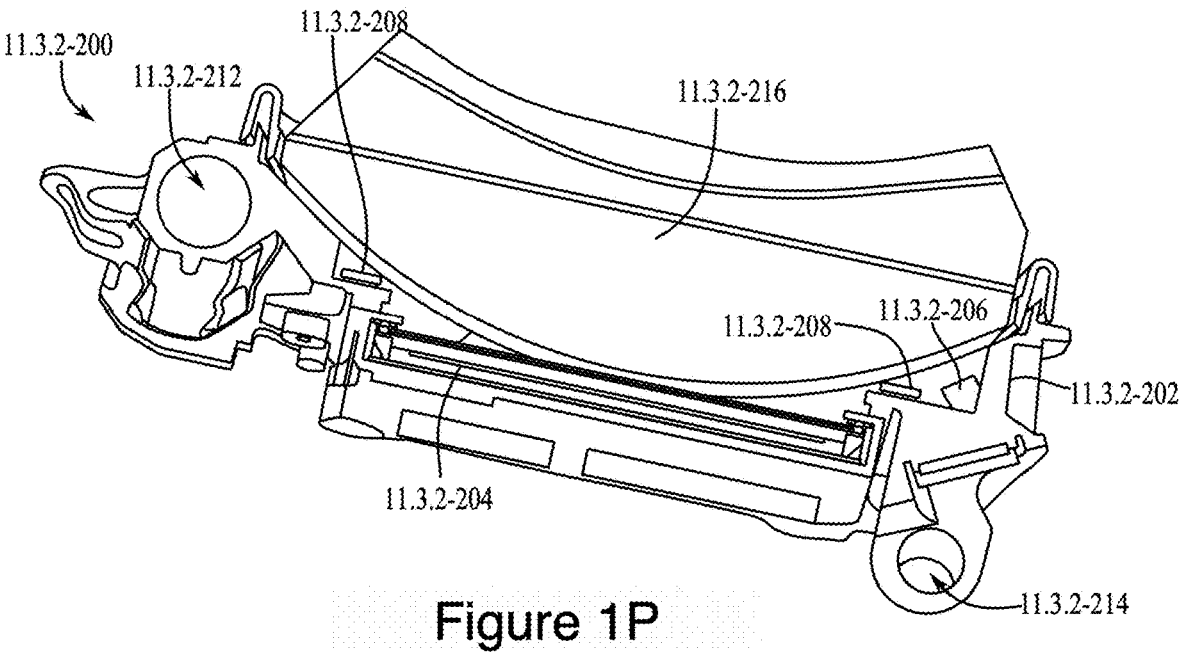

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps

1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120a-b. In at least one example, the curtain 1-124 can be clastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-IF and described herein. Likewise, any of the features, components, and/or parts, including the arrangements and configurations thereof shown and described with reference to FIGS. 1D-IF can be included, cither alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205a, 1-205b. The first securement strap 1-205a can include a first electronic component 1-212a and the second securement strap 1-205b can include a second electronic component 1-212b. In at least one example, the first and second straps 1-205a-b can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-IF and described herein. Likewise, any of the features, components, and/or parts, including the arrangements and configurations thereof shown and described with reference to FIGS. 1B, 1C, and 1E-IF can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and IF and described herein. Likewise, any of the features, components, and/or parts, including the arrangements and configurations thereof shown and described with reference to FIGS. 1B-1D and IF can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420a, 1-420b of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the checks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules

11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
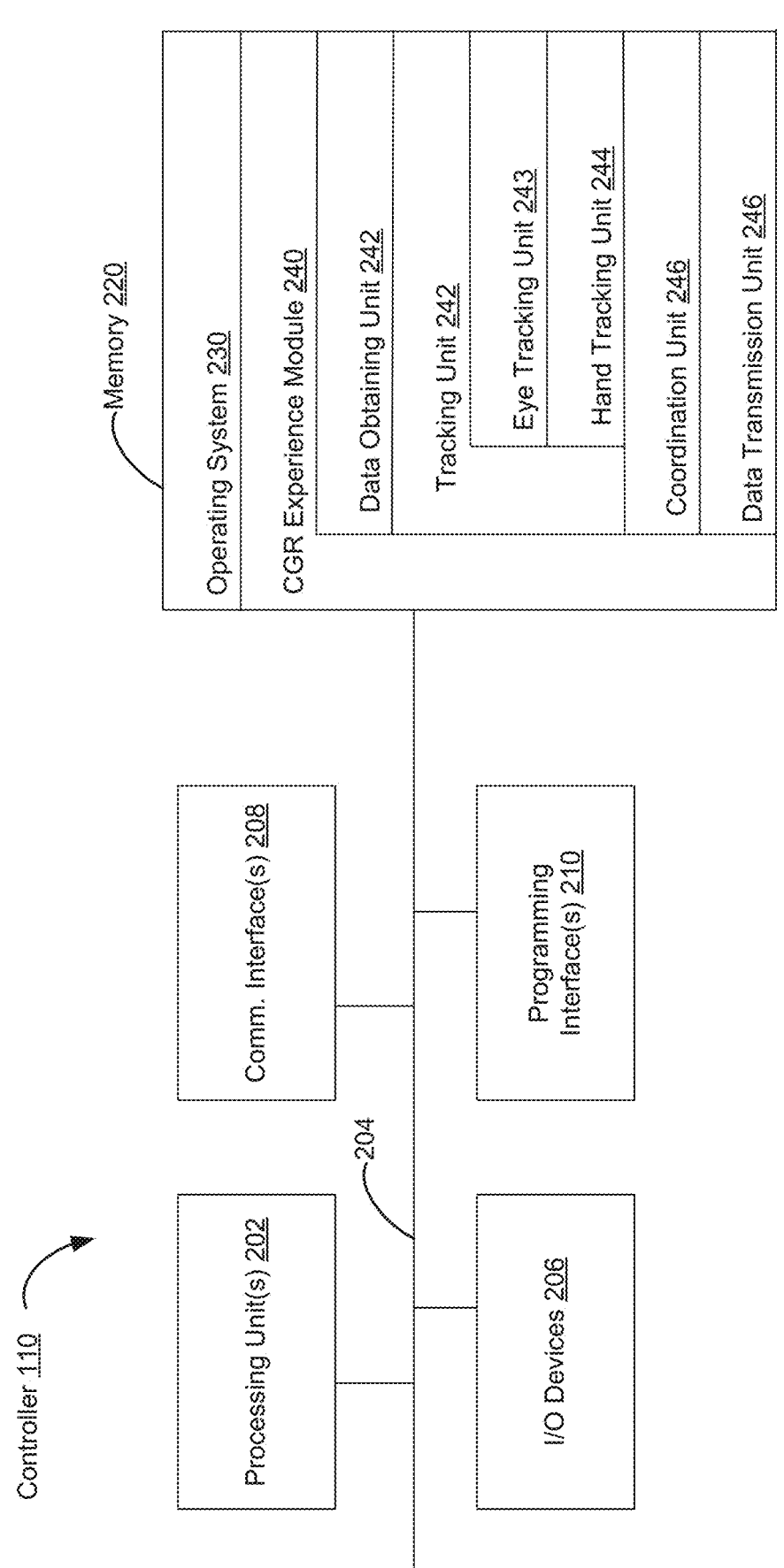
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
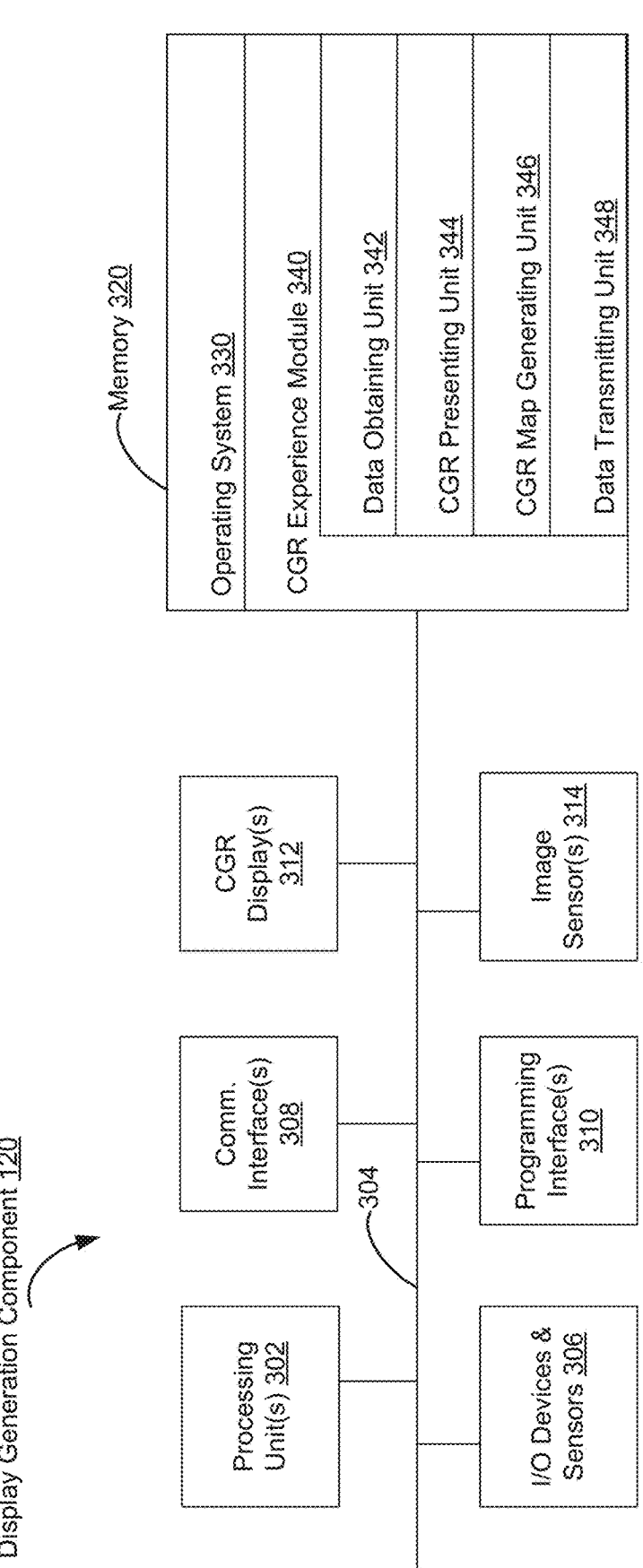
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
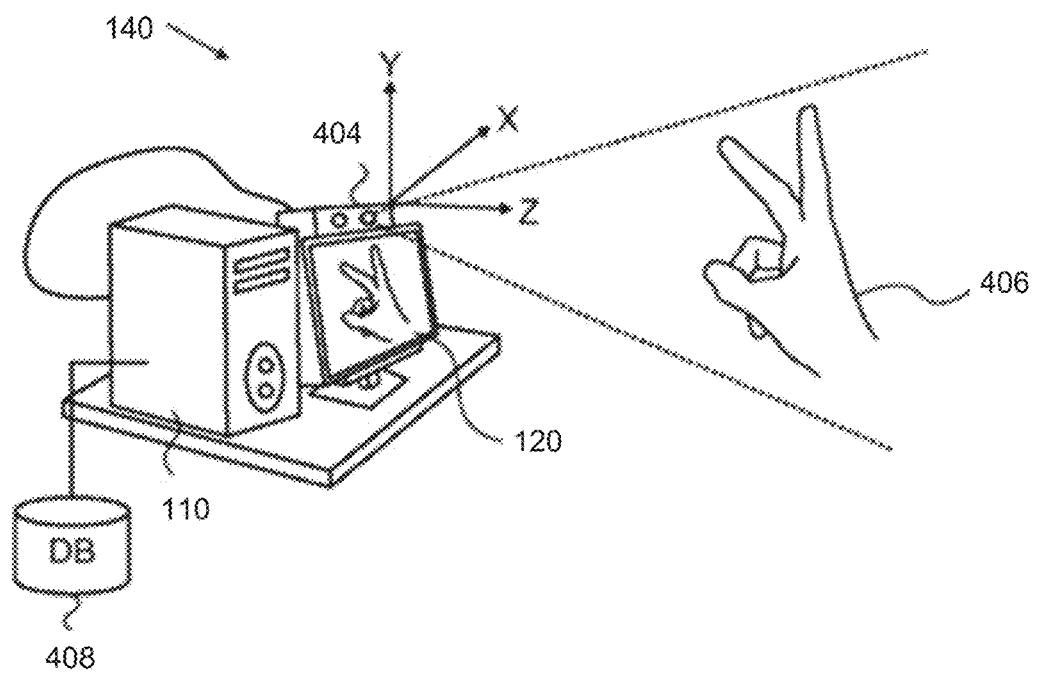
FIG. 4 is a block diagram illustrating a hand tracking unit of a computer system that is configured to capture gesture inputs of the user in accordance with some embodiments.
Figure 4:
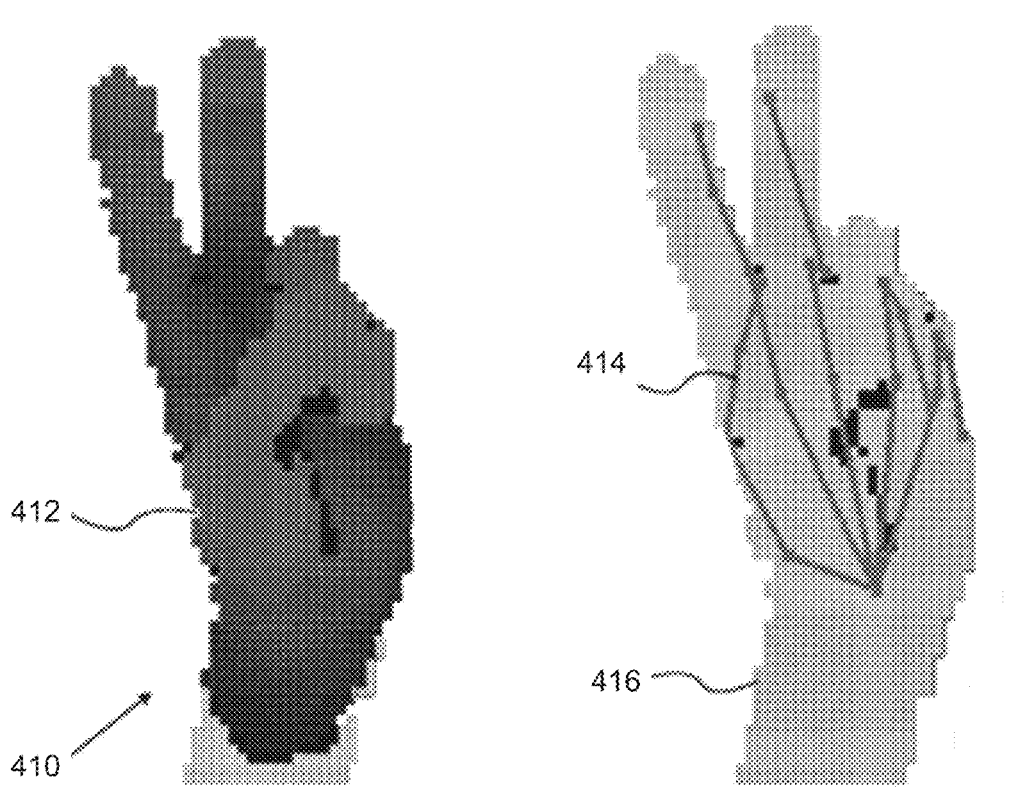

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
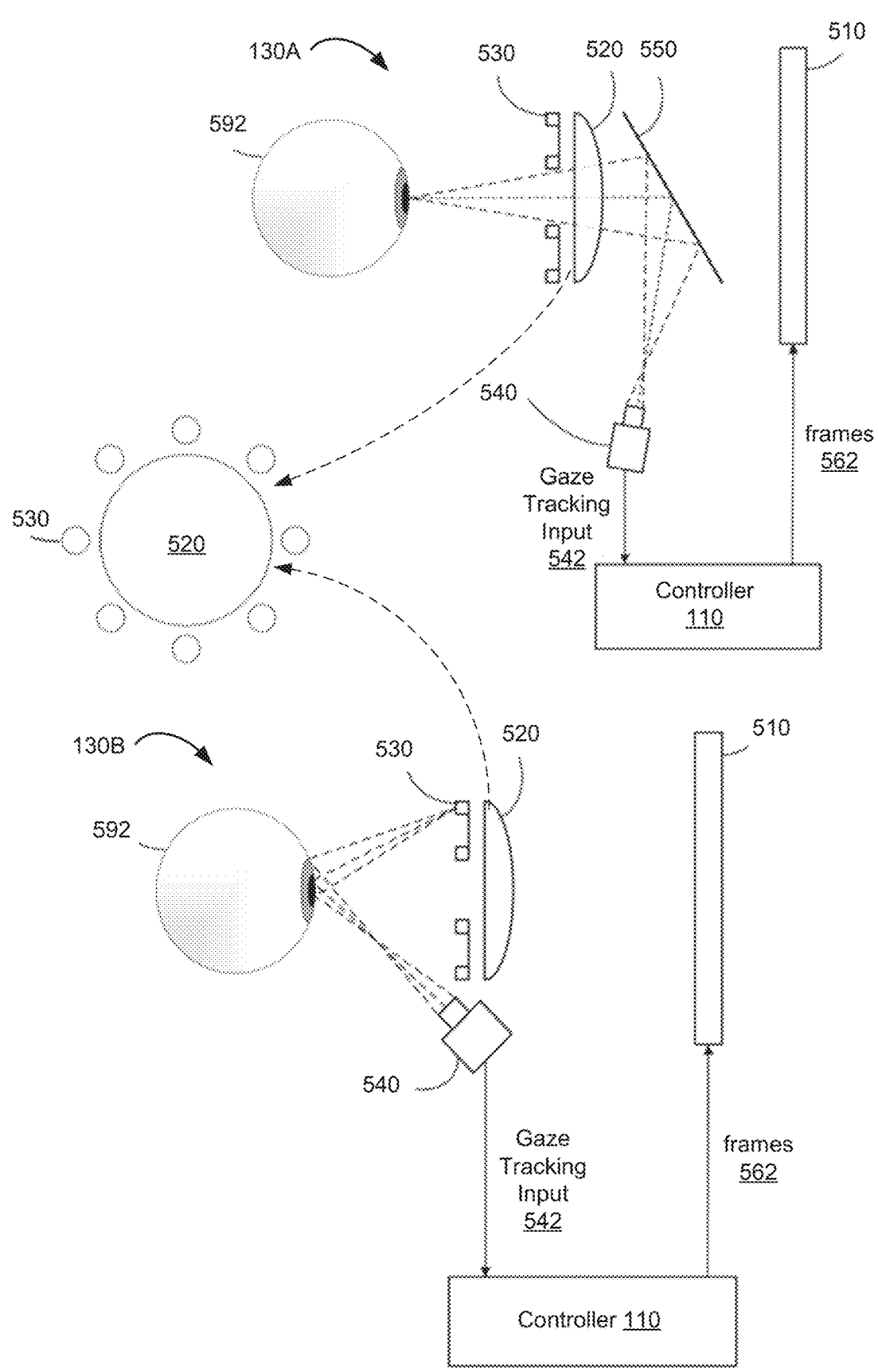
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
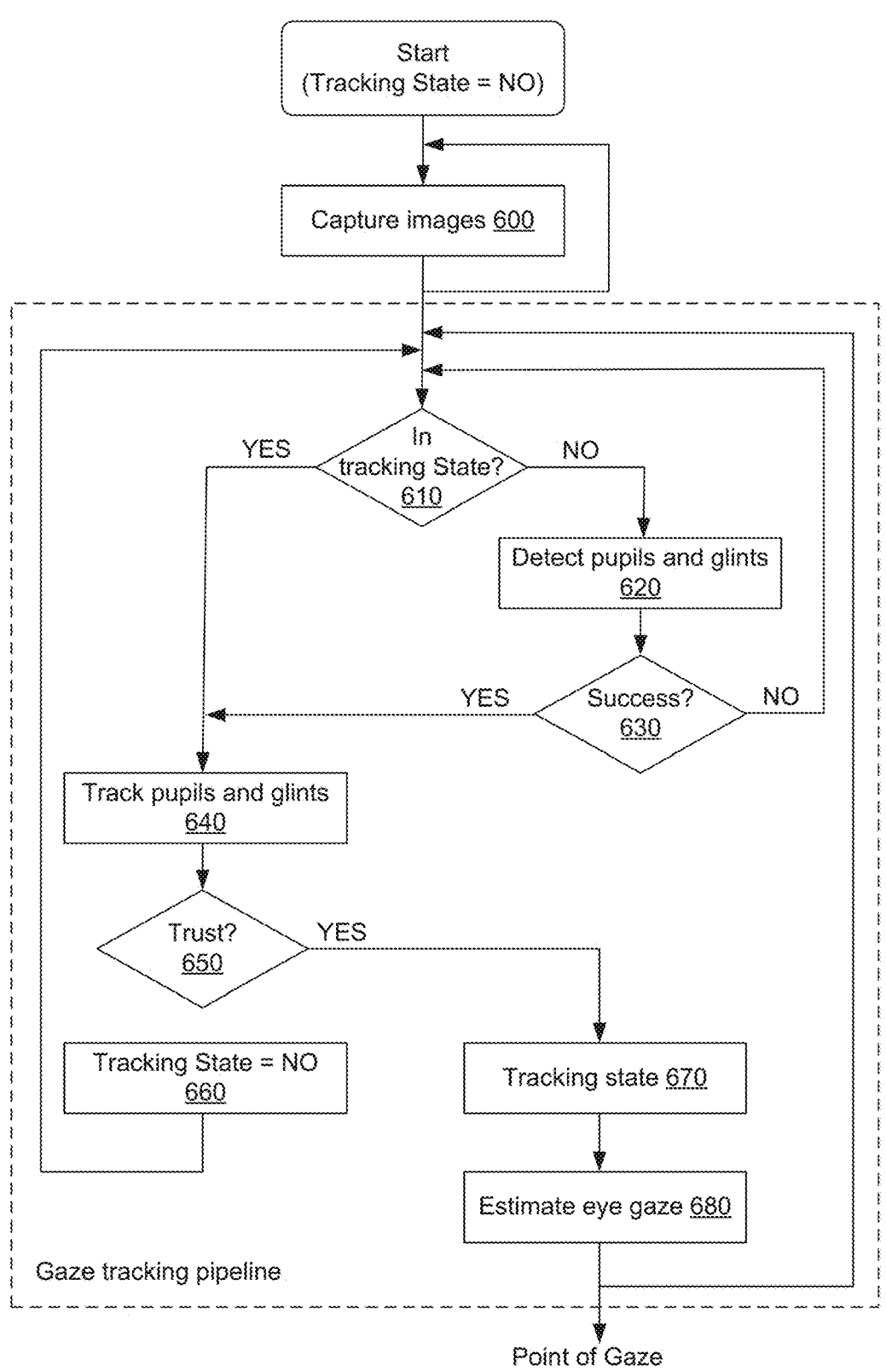
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7H illustrate examples of a computer system selectively recentering virtual content to a viewpoint of a user in accordance with some embodiments.

Figure 7A:
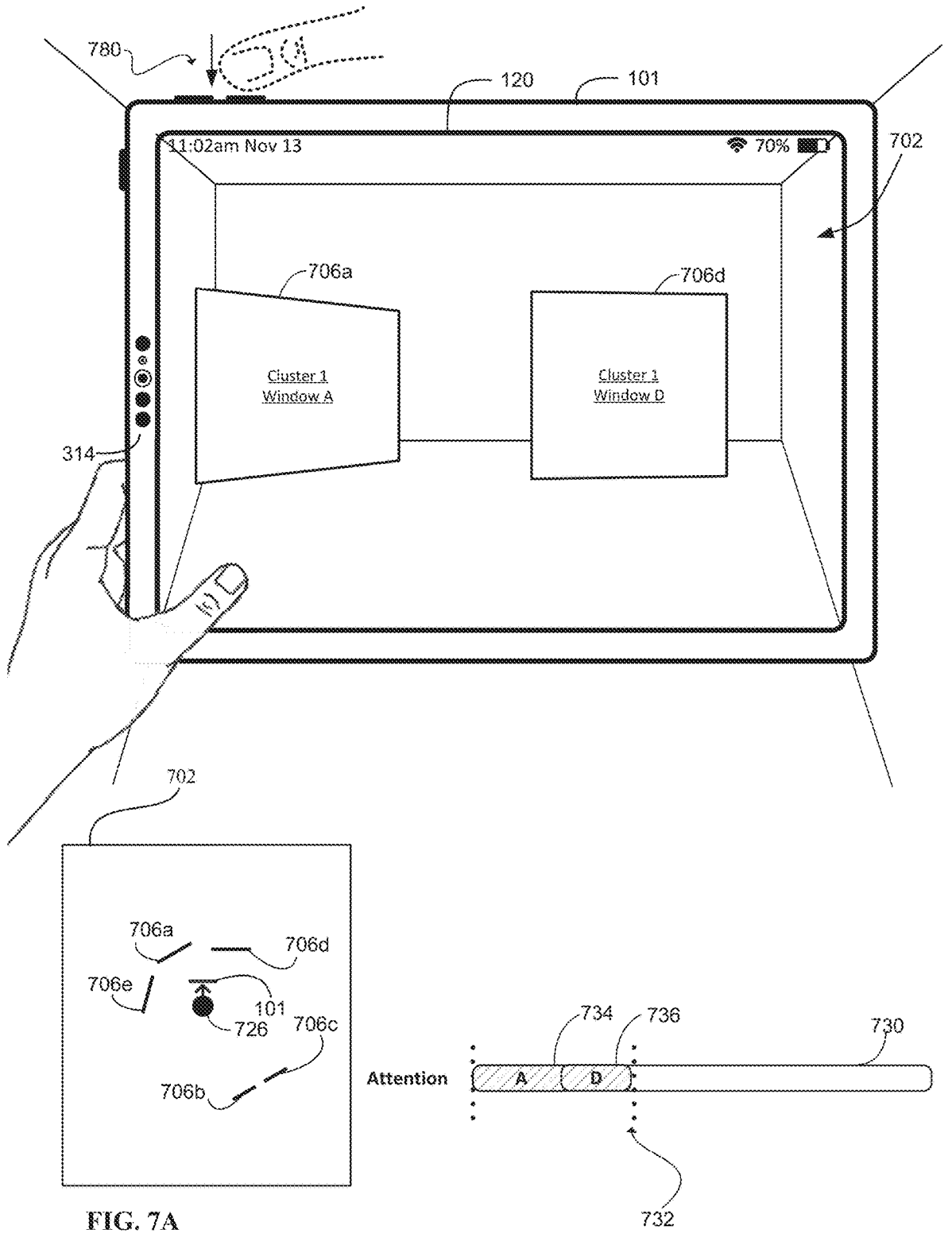
FIGS. 7A-7H illustrate examples of a computer system selectively recentering virtual content to a viewpoint of a user in accordance with some embodiments.

FIG. 7A illustrates a three-dimensional environment 702 visible via a display generation component (e.g., display generation component 120 of FIG. 1) of a computer system 101, the three-dimensional environment 702 visible from a viewpoint 726 of a user illustrated in the overhead legend (e.g., facing the back wall of the physical environment in which computer system 101 is located). As described above with reference to FIGS. 1-6, the computer system 101 optionally includes a display generation component 120 (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface and/or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 7A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 702 and/or the physical environment is visible in the three-dimensional environment 702 via the display generation component 120. For example, three-dimensional environment 702 visible via display generation component 120 includes representations of the physical floor and back and side walls of the room in which computer system 101 is located.

In FIG. 7A, three-dimensional environment 702 also includes virtual objects 706a and 706d that are visible from viewpoint 726, and virtual objects 706b, 706c, and 706e that are not visible from viewpoint 726 (e.g., not displayed). In FIG. 7A, objects 706a, 706b, 706c, 706d, and 706e are two-dimensional objects, but the examples of the disclosure optionally apply equally to three-dimensional objects. Virtual objects 706a, 706b, 706c, 706d, and 706c optionally are and/or include one or more of user interfaces of applications (e.g., messaging user interfaces or content browsing user interfaces), three-dimensional objects (e.g., virtual clocks, virtual balls, or virtual cars), and/or any other element displayed by computer system 101 that is not included in the physical environment of computer system 101.

In some embodiments, a plurality of virtual objects is included in a group of objects, referred to herein as a "group" and/or a "cluster" of virtual objects for convenience. For example, object 706a and object 706d are optionally included in a first cluster (e.g., "Cluster 1"). In some embodiments, objects that are not visible (e.g., not displayed) are included in clusters with objects that are displayed. For example, object 706e is included in the first cluster in addition to object 706a and 706d. Additionally, object 706b and 706c are optionally part of a second cluster (e.g., "Cluster 2"), and respectively not visible via display generation component 120 in FIG. 7A. In some embodiments, one or more first virtual objects are not visible and are included in a respective cluster (e.g., including or not including one or more second virtual objects that are visible). For example, a first virtual object of the one or more first virtual objects is optionally not visible because its position relative to viewpoint 726 of the user presents an apparent spatial and/or visual conflict (e.g., a physical object is positioned between viewpoint 726 and the position of the first virtual object, thus the computer system 101 does not display the first virtual object, and/or a second virtual object is similarly positioned between viewpoint 726 and the first virtual object, thus computer system 101 does not display the first virtual object (e.g., to simulate the appearance of a physical object obscuring the first virtual object)). In some embodiments, a second virtual object of the one or more first virtual objects is not visible because a position of the second virtual object is outside a visible portion of three-dimensional environment 702 that is visible at viewpoint 726 of the user (e.g., outside a field of view of imaging sensor(s) and/or a display generation component 120 of computer system 101 or outside of a portion of the field of view of imaging sensor(s) that is visible to a user of the device and/or displayed via the display generation component 120).

As described further with reference to method 800, in some embodiments, clusters of objects are determined (e.g., by computer system 101) based on respective virtual objects satisfying one or more criteria. For example, computer system 101 optionally groups object 706a, 706d, and 706e when the respective objects are within a threshold distance and/or a threshold angle of one another relative to viewpoint 726 of the user of the computer system. In some embodiments, the clusters are determined based on one or more user inputs expressly grouping virtual objects provided by a user of computer system 101, or are automatically determined by the computer system without one or more user inputs expressly grouping the virtual objects, such as grouping the virtual objects based on similar type(s) of applications associated with the respective objects, and/or determined based on a type and/or class of respective objects (e.g., two-dimensional, three-dimensional, related to system user interfaces, related to application user interfaces, and/or including and/or related to the same virtual content). In some embodiments, the clusters are determined based on a pattern of user behavior interacting with similar virtual objects, a previous grouping of virtual objects including similar content, based on a determination that such virtual objects have similar dimensions, and/or have a similar spatial arrangement relative to viewpoint 726 of the user (e.g., objects that are positioned in the three-dimensional environment relatively close to each other and closer to each other than to other objects outside of the group). In some embodiments, computer system 101 determines clusters in accordance with a determination that one or more objects were recent targets of attention of the user (e.g., attention was directed to such one or more objects). For example, computer system 101 optionally determines that within a threshold amount of time (e.g., 0.1, 0.5, 1, 5, 10, 50, 100, or 500 seconds), objects 706a, 706d, and/or 706e were recent targets of the user's attention. In some embodiments, the clustering of objects is determined based on one or more of the factors described with reference to method 800 (e.g., based on attention and distance, based on virtual content and viewing angle relative to viewpoint 726, based on dimensions of objects, and/or distance between respective virtual objects).

In some embodiments, computer system 101 performs one or more one or more rearrangement operations of clusters of virtual objects. In some embodiments, computer system 101 determines a target cluster of the one or more rearrangement operations in accordance with a determination that attention of the user satisfies and/or satisfied one or more criteria relative to the target cluster. For example, timeline 730—which indicates an elapsing of time leading up to a current time that is illustrated—illustrates recent targets of user attention leading up to the current time, including time period 734—indicative of an amount of time attention targeted (e.g., was directed to) object 706a—and time period 736—indicative of an amount of time attention targeted object 706d. As illustrated, attention (e.g., including gaze) of the user previously targeted object 706a for a first amount of time and object 706d for a second, relatively lesser amount of time, within window 732 of timeline 730. Window 732 illustrates a window of time (e.g., leading up to the current time) that is evaluated in order to determine a primary target of recent user attention (e.g., one or more virtual objects and/or clusters of virtual objects that were targeted by the user's attention for amounts of time greater than other virtual objects and/or clusters of virtual objects). The right-hand dashed line of window 732 corresponds to a current moment in time. Window 732 optionally corresponds to a threshold amount of time (e.g., 0.1, 0.5, 1, 5, 10, 50, 100, or 500 seconds), from a current time (e.g., the time that input 780 is received in FIG. 7A). In some embodiments, when attention is directed to objects included in a given cluster of virtual objects for a combined, first amount of time that is greater than a combined, second amount of time attention is directed to objects included in another cluster of virtual objects, computer system 101 determines the given cluster is the primary target of user attention within a window of time (e.g., window 732), and performs one or more recentering operations to improve visibility of objects within the given cluster. As described further with reference to method 800, recentering operations and recentered arrangements of virtual objects correspond to one or more operations performed to move recent one or more targets of user attention to a position with three-dimensional environment 702 determined based on an orientation of viewpoint 726 when one or more inputs requesting such recentering was detected (e.g., a position that is at a center relative to the field-of-view of the user at viewpoint 726). For example, because computer system 101 detects the first cluster (e.g., Cluster 1) was targeted for the most time within window 732 relative to alternative clusters such as the second cluster (e.g., Cluster 2, described at least with reference to FIG. 7D, and not yet shown), computer system 101 optionally determines that the first cluster—and not the second cluster—is the target of the one or more rearrangement operations (e.g., recentering operations). Further details related to the one or more criteria used to determine targets of rearrangement operation(s) are described with reference to method 800.

In some embodiments, computer system 101 performs one or more rearrangement operations relative to the targeted cluster of objects within three-dimensional environment 702. For example, computer system 101 optionally detects an input 780, optionally directed to a hardware control included in computer system 101 and/or corresponding to an air gesture performed by a body of the user of computer system 101 (e.g., an air pinch including contact between respective fingers of a hand of the user). In response to detecting the input 780, computer system 101 optionally initiates the one or more rearrangement operations relative to a targeted cluster of virtual objects. It is understood that input 780 is representative of any manner of suitable inputs. For example, computer system 101 optionally includes, is in communication with, and/or monitors one more hardware controls, such as one or more surfaces (e.g., touch-sensitive surfaces), one or more physical buttons, one or more rotational encoding devices, and/or one or more sensors to detect movement, pressure, and/or contact provided by a body of the user of computer system 101 with such hardware controls. For example, the computer system optionally detects a duration of a selection input (e.g., a pressing) of a physical button included in computer system 101, and optionally performs the one or more rearrangement operations in response to the selection of the physical button, and optionally further based on the duration of the selection (e.g., described further with reference to method 800).

Figure 7B:
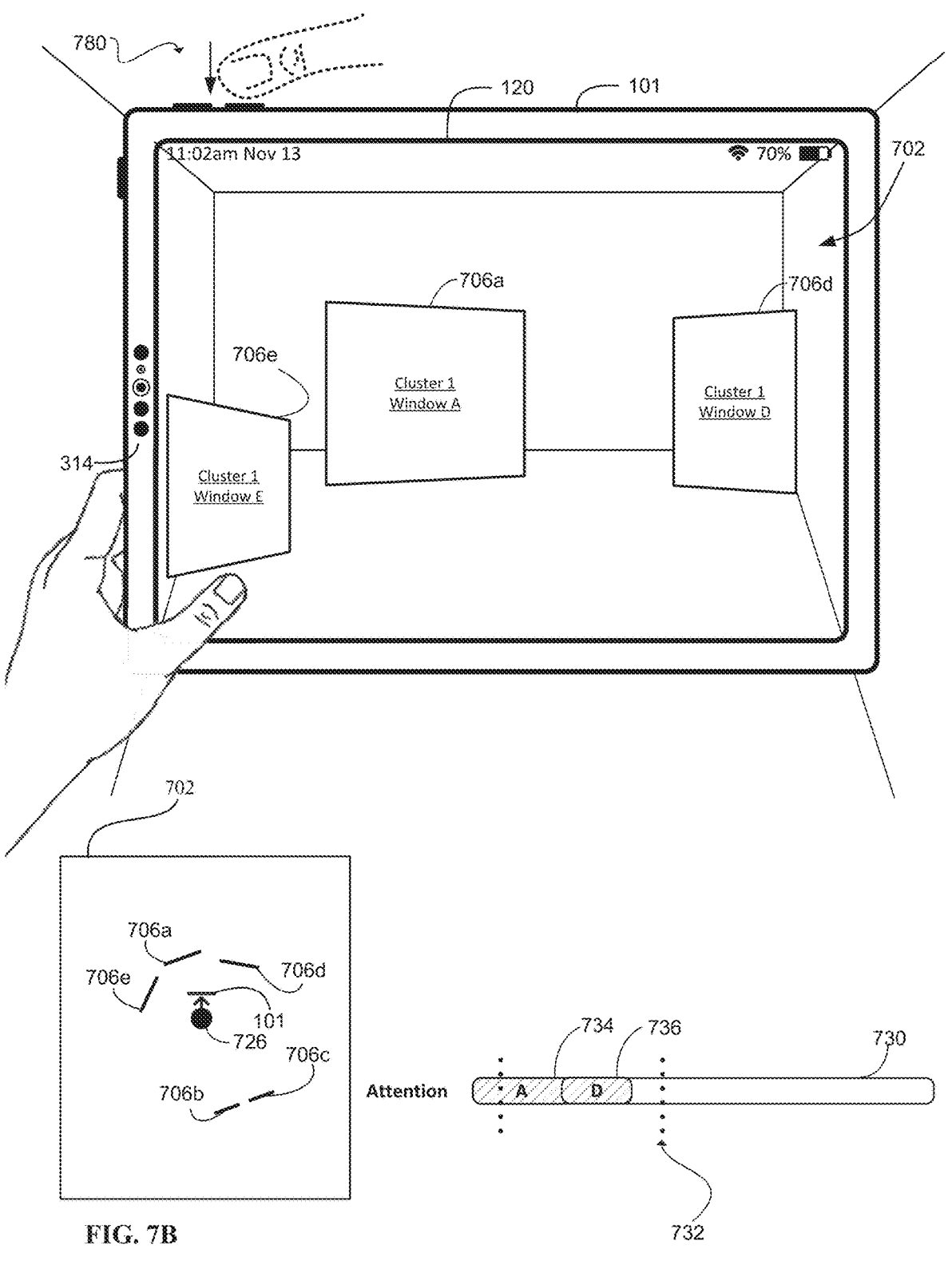

In response to detecting one or more inputs requesting rearrangement in FIG. 7A, computer system 101 optionally moves virtual objects within three-dimensional environment 702 to an updated arrangement as shown in FIG. 7B. For example, From FIG. 7A to FIG. 7B, computer system 101 determines that the first cluster (e.g., "Cluster 1") was the primary target of the user's attention when the rearrangement input was received (e.g., at range in times bound by window 732), rather than an alternative second cluster (e.g., "Cluster 2", not yet shown). In response to the rearrangement input, computer system 101 optionally moves object 706a, object 706b, object 706c, object 706d, and/or object 706e to updated positions within three-dimensional environment 702 while maintaining a relative distance between the respective objects and a relative angular relationship between the objects (e.g., based on viewing angle vectors extending from viewpoint 726 to centers of object 706a, object 706b, object 706c, object 706d, and/or object 706e). For example, in FIG. 7B, objects 706a and 706d are moved rightward relative to viewpoint 726, and their respective interactive surfaces (e.g., surfaces of objects included virtual content for viewing and interaction) are rotated. In some embodiments, in response to the rearrangement input, computer system 101 initiates and/or ceases display of one or more virtual objects. For example, object 706e is optionally newly displayed at and moved toward a leftward portion of viewpoint 726. As described previously, in some embodiments, the computer system 101 determines an initial position of a respective virtual object(s) targeted by user attention, and in accordance with a determination that the attention of the user satisfied one or more criteria at a respective time a recentering input is received, and in response to the recentering input, determines an updated position within three-dimensional environment 702 at which the respective virtual object(s) will be moved to (e.g., displayed), and moves the respective virtual object(s) to the updated position.

In some embodiments, the movement of objects as shown from FIG. 7A to FIG. 7B occurs concurrently, such that the objects appear to be translated and/or rotated by a same or similar amount simultaneously, allowing the user to visually track the movement of the respective objects during the rearrangement operations. In some embodiments, the movement is not animated, and the objects fade out from the positions as shown in FIG. 7A and fade into their updated positions as shown in FIG. 7B (e.g., the respective objects are decreased in opacity at positions shown in FIG. 7A, and increased in opacity at updated positions shown in FIG. 7B). In some embodiments, computer system 101 maintains a relative arrangement between a plurality of virtual objects within three-dimensional environment 702 when rearranging the plurality of virtual objects relative to viewpoint 726. For example, as shown in the overhead legend, the relative distance and/or angles between objects 706a-e are maintained from FIG. 7A to FIG. 7B, and are optionally centered on viewpoint 726.

In some embodiments, the updated positions and/or orientations of object 706a, object 706b, object 706c, object 706d, and/or object 706e are based on which respective objects of a primarily targeted cluster were target(s) of the user's attention within a window of time (e.g., window 732 of timeline 730) when the rearrangement input was received (e.g., within window 732 in FIG. 7A). For example, because object 706a and 706d were recent targets of user attention (e.g., attention was directed to object 706a and 706d recently) and are included in a first cluster, computer system 101 moved object 706a, object 706b, object 706c, object 706d, and/or object 706e to positions such that object 706a and 706d are highly visible from viewpoint 726.

As described further with reference to method 800, the computer system 101 optionally determines a "forward vector" relative to a targeted, primary cluster (e.g., Cluster 1) prior to and/or while performing one or more recentering operations. In some embodiments, the forward vector is determined in accordance with one or more weighting factors based on criteria associated with respective virtual objects, such as a size of the respective object, a total amount of time the respective object was a target of the user's attention during window 732, a distance of the respective object relative to viewpoint 726, and/or a viewing angle based on an angle determined based on a difference between a vector extending normal to a viewing surface of the respective virtual object and a vector extending from a center of viewpoint 726 (e.g., central to a head of the user). For example, because object 706a was a target of attention for a first time period 734, and object 706d was a target of attention for a second time period 736 that is relatively less than time period 734, computer system 101 optionally determines that object 706a is the primary target of the user's attention, and accordingly recenters object 706a, object 706b, object 706c, object 706d, and/or object 706e such that object 706a and object 706d are toward the center of the user's viewpoint 726. For example, the computer system 101 optionally determines an updated position at which object 706a and/or object 706d will be displayed, such as respective positions that are a similar or same distance relative to viewpoint 726 of the respective virtual objects when the recentering input 780 was received (e.g., the updated, respective distances are within a threshold distance (e.g., 0.001, 0.005, 0.01, 0.05, 0.1, 0.5, or 1 m) of the respective distances of the respective virtual objects before recentering input 780 was received), and/or having an updated angular relationship (e.g., exactly, or close-to aligned with a vector extending straight outward from viewpoint 726, parallel to a floor of three-dimensional environment 702 (e.g., the updated viewing angles are within a threshold angle (e.g., 0.01, 0.05, 0.1, 0.5, 1, 5, or 15 degrees) of the vector extending straight outward from viewpoint 726)), and moves virtual object 706a and 706d to their respective updates positions.

As an additional example, computer system 101 optionally determines angles formed between respective vectors extending from viewpoint 726 and respective vectors extending from object 706a and 706d (e.g., extending normal from respective interaction surfaces of such objects). Computer system 101 optionally weights (e.g., scales) a contribution of the respective angles used to determine the forward vector based on the relative proportion of time the respective objects were respectively targeted by attention of the user within window 732, and optionally determines a net forward angle of the targeted, recentered cluster (e.g., based on an addition of the weighted the respective angles). Additionally or alternatively, computer system 101 optionally performs similar operations to determine respective, weighted distances between objects 706a and 706d, and viewpoint 726, and determines a net forward distance between the viewpoint 726 and the targeted, recentered cluster (e.g., based on a difference and/or averaging of the weighted respective distances), and optionally moves the objects 706a-e in accordance with the net forward angle and the net forward distance. For example, the computer system 101 optionally determines a vector-referred to herein as a "forward vector" and/or a "net forward vector" that extends from a portion of viewpoint 726 (e.g., a center of the user's head) having a same distance as the net forward distance relative to viewpoint 726 and an angle relative to a vector extending outward from viewpoint 726 (e.g., parallel to the floor, centered with the user's head) that is the same as the net forward angle, and moves the virtual objects to an updated positions that are rotated relative to viewpoint 726 by the net forward angle. In some embodiments, computer system 101 also moves the virtual objects to updated distances relative to viewpoint 726 corresponding to a difference between their previous distances (e.g., before recentering inputs were received) and the net forward distance. Thus, computer system 101 moves recentered virtual objects to a depth that is the same or similar to the net forward distance, and to an updated angle the same or similar to the net forward angle, relative to viewpoint 726.

In some embodiments, computer system 101 detects an alternative input to recenter a plurality of virtual objects such that a respective virtual object is centered with the user's viewpoint 726. It is understood that description of recentering relative to the "forward vector" optionally has one or more characteristics of the recentering operations described in the embodiments that follow with reference to FIGS. 7C-7H, and that the recentering relative to a singular virtual object optionally has one or more characteristics of the recentering relative to the forward vector described previously.

Figure 7C:
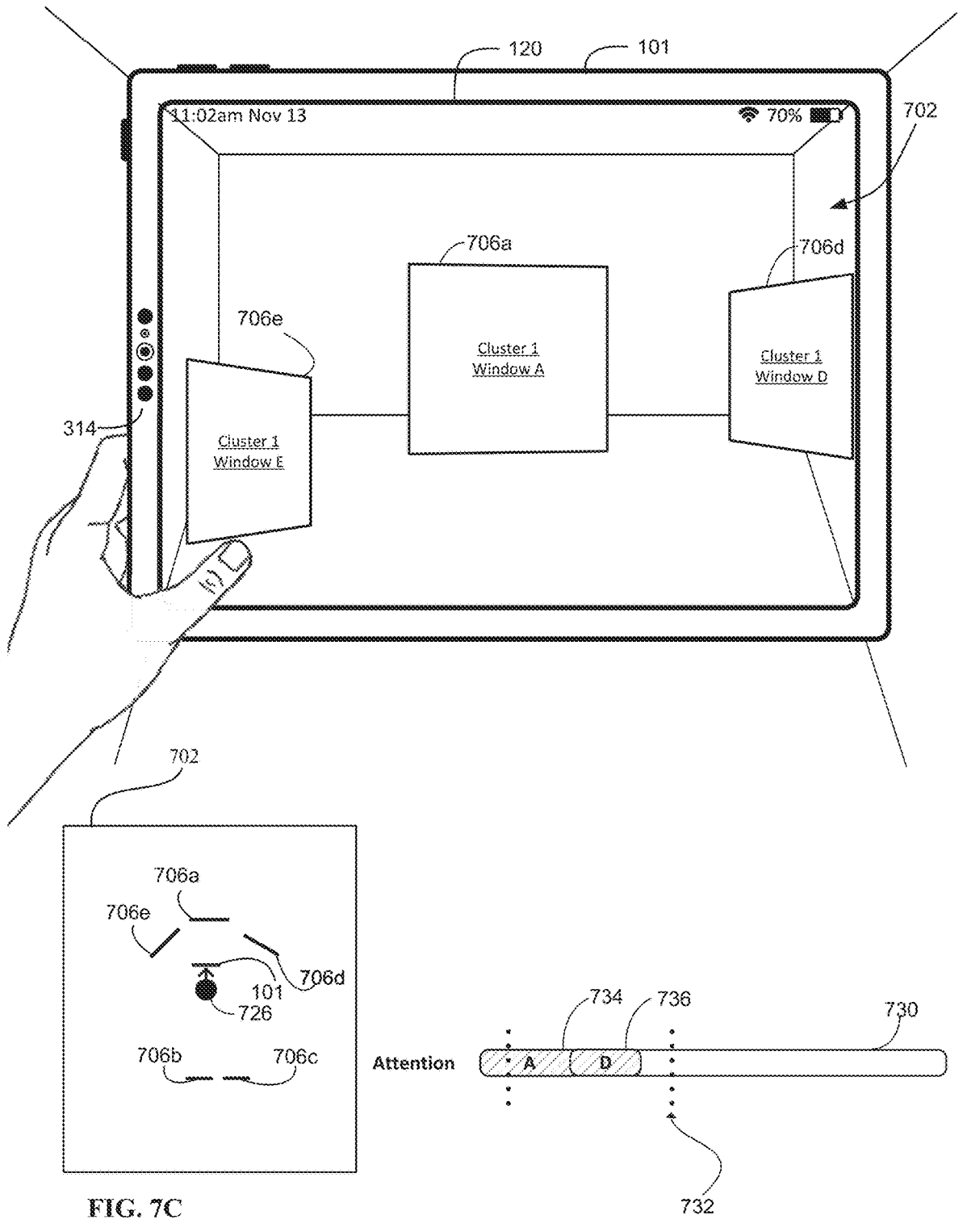

From FIG. 7A to FIG. 7C, computer system 101 recenters a plurality of virtual objects such that object 706a is centered with viewpoint 726 (e.g., corresponding to the "updated position" where virtual objects are moved to described previously, and as an alternative, non-limiting embodiment to the recentering illustrated from FIG. 7A to FIG. 7B). For example, after recentering the plurality of virtual objects, a vector normal extending from an interaction surface of object 706a is optionally parallel and/or overlapping with a vector extending normal from viewpoint 726, as shown in the overhead view 702 in FIG. 7C by the orientation of object 706a with viewpoint 726 (e.g., a vector extending from the center of the user's head). Additionally, object 706d and object 706e are optionally moved and rotated to updated positions and orientations relative to viewpoint 726, optionally maintaining a distance between the respective virtual objects and viewpoint 726, such that a spatial arrangement between the objects 706*a*, 706*d*, and 706*e* is maintained after the recentering.

Figure 7D:
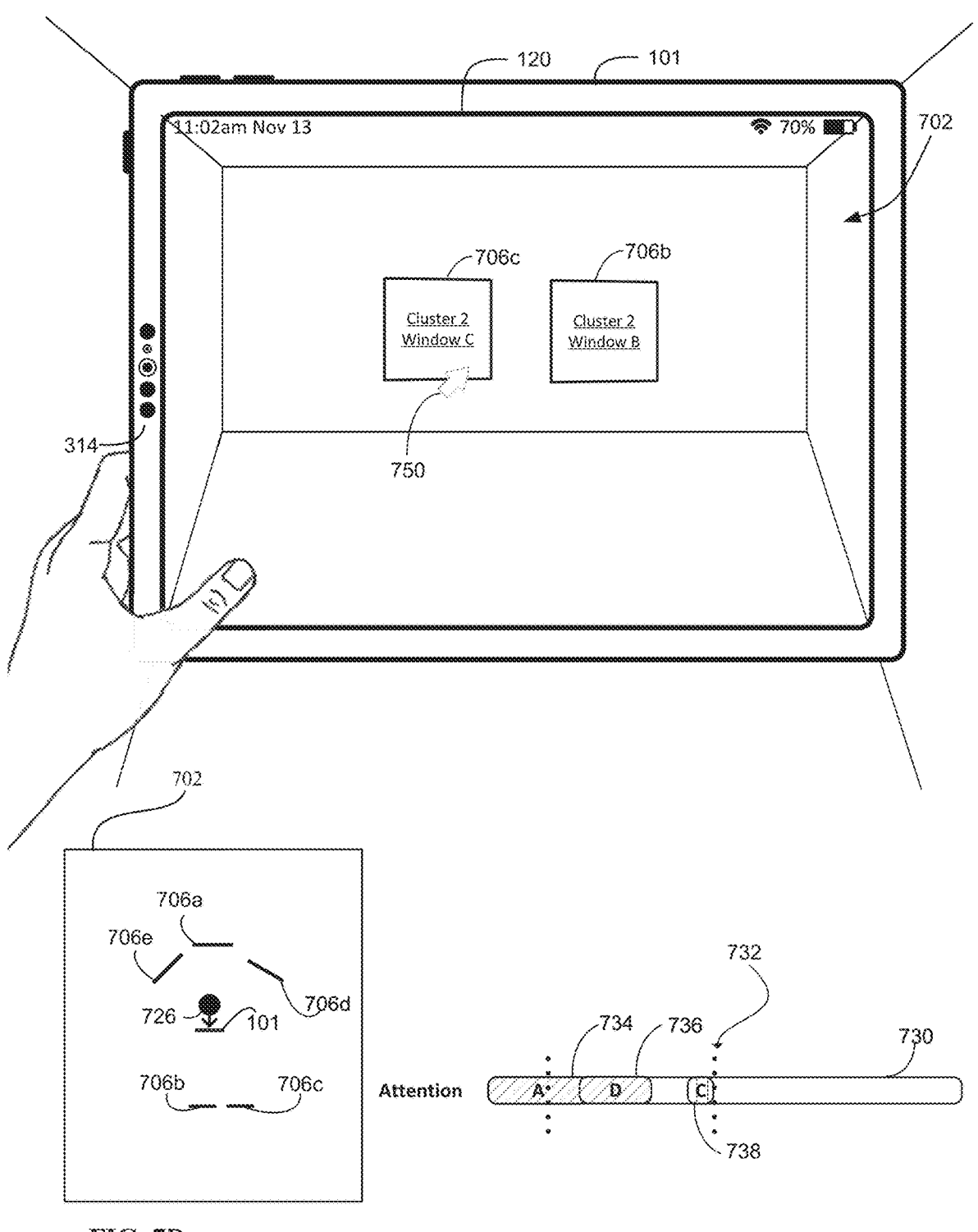

From FIG. 7C to FIG. 7D, the user moves within three-dimensional environment 702, thus changing viewpoint 726, bringing objects 706*b* and 706*c* into view. For example, in response to determining viewpoint 726 corresponds to the respective positions of objects 706*b* and 706*c* within three-dimensional environment 702, computer system 101 initiates display of objects 706*b* and 706*c* (e.g., because such virtual objects are within a field-of-view of the user and/or computer system 101 at the changed viewpoint 726). Similarly, in response to determining viewpoint 726 does not correspond to respective positions of objects 706*a*, 706*b*, and 706*e*, computer system 101 optionally ceases display of objects 706*a*, 706*b*, and 706*c* (e.g., because such virtual objects are not within a field-of-view of the user and/or computer system 101 at the changed viewpoint 726).

As described previously, computer system 101 is optionally configured to determine and track a target of attention of the user. For example, in FIG. 7D, cursor 750 is optionally indicative of such a detected target of the user's attention, and time period 738 optionally corresponds to a duration of time that cursor 750 was directed to respective one or more portions of object 706*c*. As indicated by the difference in fill pattern between time periods 734 and 736 (e.g., corresponding to Cluster 1) in contrast with time period 738 (e.g., corresponding to cluster 2), computer system 101 optionally detects an amount of time that the user's attention has targeted respective clusters of windows, as indicated by the width of time periods 734-738. From FIG. 7D to FIG. 7E, attention indicated by cursor 750 optionally dwells on object 706*c* for a period of time, as indicated by time period 738 in FIG. 7E.

Figure 7E:
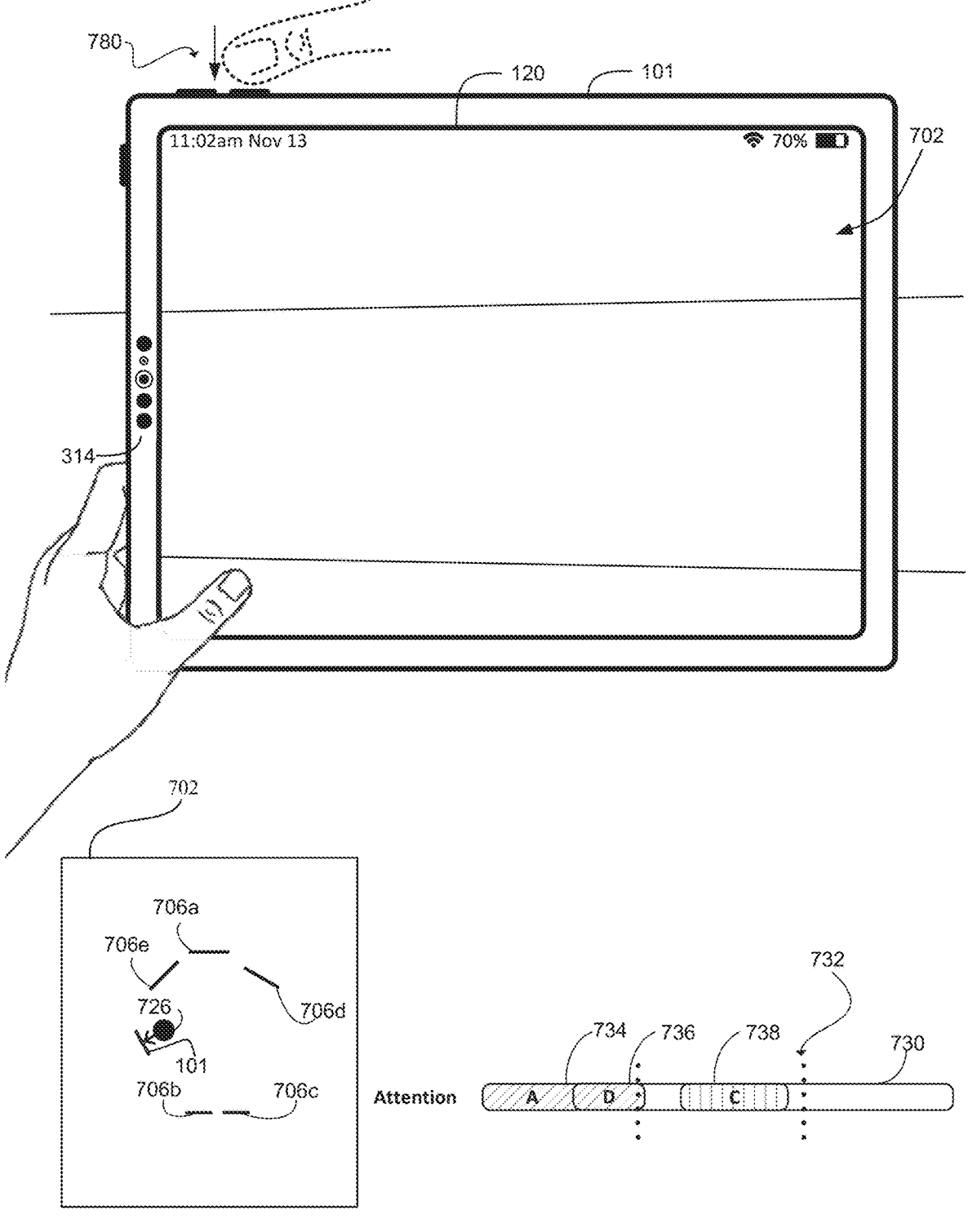

From FIG. 7D to FIG. 7E, after attention dwells on object 706*c*, viewpoint 726 changes due to movement of the user to a region of three-dimensional environment 702 not including a respective virtual object, and the viewpoint 726 of the user tilts backwards to an angle of elevation of viewpoint 726 higher than as illustrated in FIGS. 7A-7D (e.g., computer system 101 rotates along an axis parallel to the floor of three-dimensional environment 702 intersecting with computer system 101). In some embodiments, despite not displaying respective virtual objects, computer system 101 continues to determine and/or track recent targets of the user's attention. For example, time period 738, corresponding to an amount of time user attention targeted object 706*c*, has widened from FIG. 7D to FIG. 7E as the leading edge of window 732 advances (e.g., no respective virtual object is currently targeted by the user's attention in FIG. 7E). Also in FIG. 7E, a recentering input 780 is received corresponding to a request to recenter the virtual objects at the user's updated viewpoint.

FIG. 7D1 illustrates similar and/or the same concepts as those shown in FIG. 7D (with many of the same reference numbers). It is understood that unless indicated below, elements shown in FIG. 7D1 that have the same reference numbers as elements shown in FIGS. 7A-7H have one or more or all of the same characteristics. FIG. 7D1 includes computer system 101, which includes (or is the same as) display generation component 120. In some embodiments, computer system 101 and display generation component 120 have one or more of the characteristics of computer system 101 shown in FIGS. 7D and 7A-7H and display generation component 120 shown in FIGS. 1 and 3, respectively, and in some embodiments, computer system 101 and display generation component 120 shown in FIGS. 7A-7H have one or more of the characteristics of computer system 101 and display generation component 120 shown in FIG. 7D1.

In FIG. 7D1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 7A-7H.

In FIG. 7D1, display generation component 120 is illustrated as displaying content that optionally corresponds to the content that is described as being displayed and/or visible via display generation component 120 with reference to FIGS. 7A-7H. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 7D1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 7D1. Because display generation component 120 is optionally a head-mounted device, the field of view of display generation component 120 is optionally the same as or similar to the field of view of the user.

In FIG. 7D1, the user is depicted as performing an air pinch gesture (e.g., with hand 780-2) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 7A-7H. In some embodiments, computer system 101 responds to user inputs as described with reference to FIGS. 7A-7H.

In the example of FIG. 7D1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 7A-7H and/or described with reference to the corresponding method(s) are optionally implemented on computer system 101 and display generation unit 120 in a manner similar or analogous to that shown in FIG. 7D1.

Figure 7F:
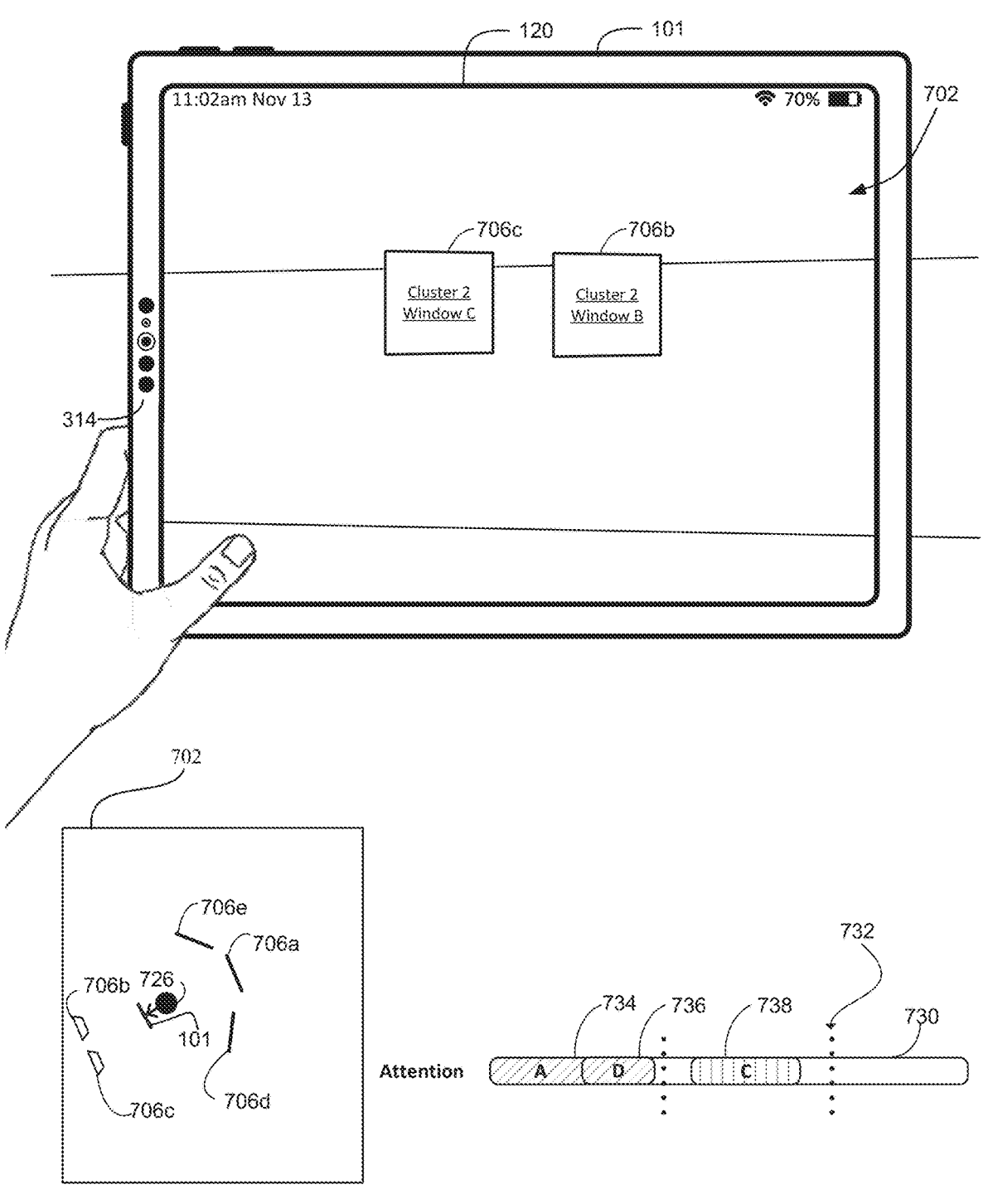

From FIG. 7E to FIG. 7F, a second cluster "Cluster 2" is recentered such that objects 706*b* and 706*c* are moved into view. As described previously, because respective object(s) of Cluster 2 were the primary target of the user's attention within window 732 (e.g., when the recentering input was received in FIG. 7E), objects 706*b* and 706*c* are determined to be the primary targets of the recentering operations. As shown in the overhead view 702, because an elevation angle of viewpoint 726 has increased relative to three-dimensional environment 702 (e.g., due to the user tilting computer system 101 backward), objects 706*b* and 706*c* are both elevated upward, and tilted "forward" such that interaction surfaces of objects 706*b* and 706*c* are directed downward, toward viewpoint 726. Thus, the updated position at which objects 706*b* and 706*c* are displayed are raised in accordance with the elevation angle of viewpoint 726. As further indicated in the overhead view, objects 706*b* and 706*c* are represented as trapezoids to indicate the downward tilt toward viewpoint 726. Objects 706*b* and 706*c* are also rotated along an axis that is perpendicular to the floor of three-dimensional environment 702, due to the rotation of viewpoint 726 along that axis. Additionally, objects 706*a*, 706*d*, and 706*e* are concurrently rotated along the axis perpendicular to the floor as shown in the overhead view legend, however, are not tilted toward viewpoint 726, because the first cluster was not the primary target of the recentering operations. Thus, in some embodiments, the computer system rotates the primary targets of the recentering operations along two or more axes, and rotates the secondary targets of the recentering operations along a first axis of the two or more axes without rotating the secondary target along a second axis of the two or more axes. As described previously with respect to other objects outside of a field-of-view while the user is at viewpoint 726, objects 706*a*, 706*e*, and 706*e*, are optionally not displayed because after the recentering operation, objects 706*a*, 706*d*, and 706*e* continue to correspond to positions of three-dimensional environment 702 outside the field-of-view of the user at viewpoint 726.

Figure 7G:
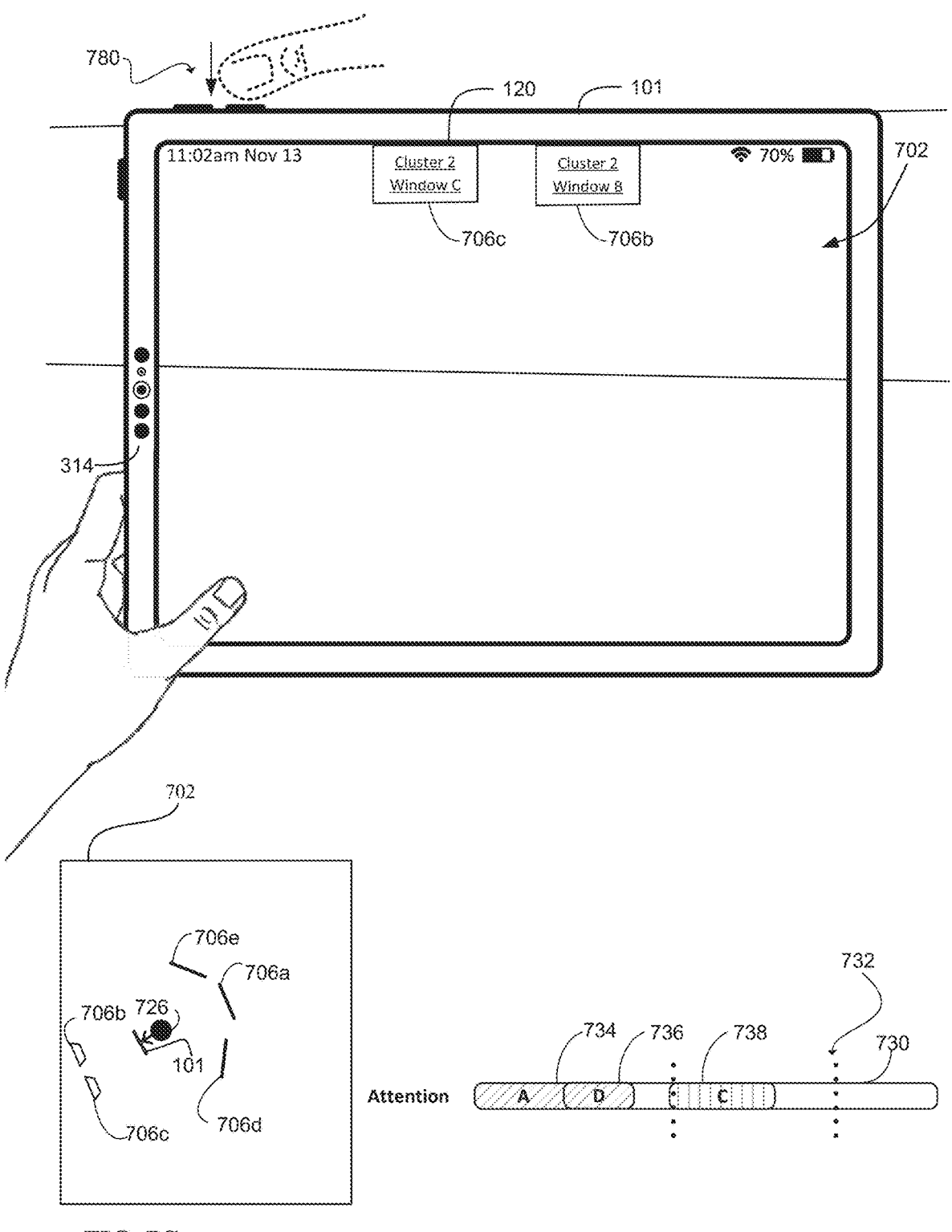

From FIG. 7F to FIG. 7G, the viewpoint 726 of the user tilts downward to a floor of three-dimensional environment 702. Accordingly, display of first, relatively higher portions of object 706*b* and 706*c* are ceased, and relatively lower portions of objects 706*b* and 706*c* are maintained. While viewpoint 726 assumes the downward tilt, 706*c* is the most recent target of user attention, as illustrated by time period 738 predominantly occupying window 732, and an additional recentering input 780 in FIG. 7G is received.

Figure 7H:
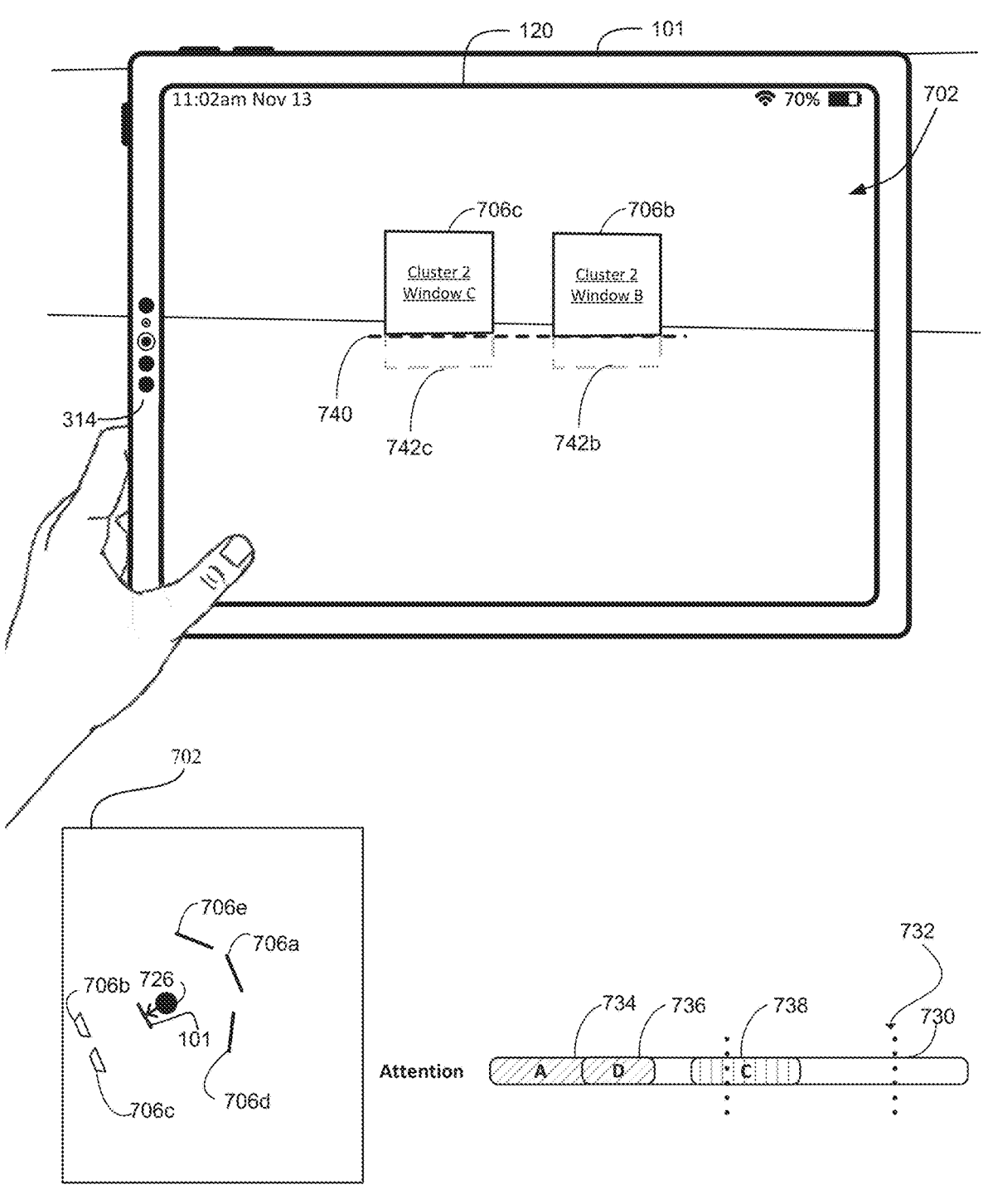
Figure 8B:
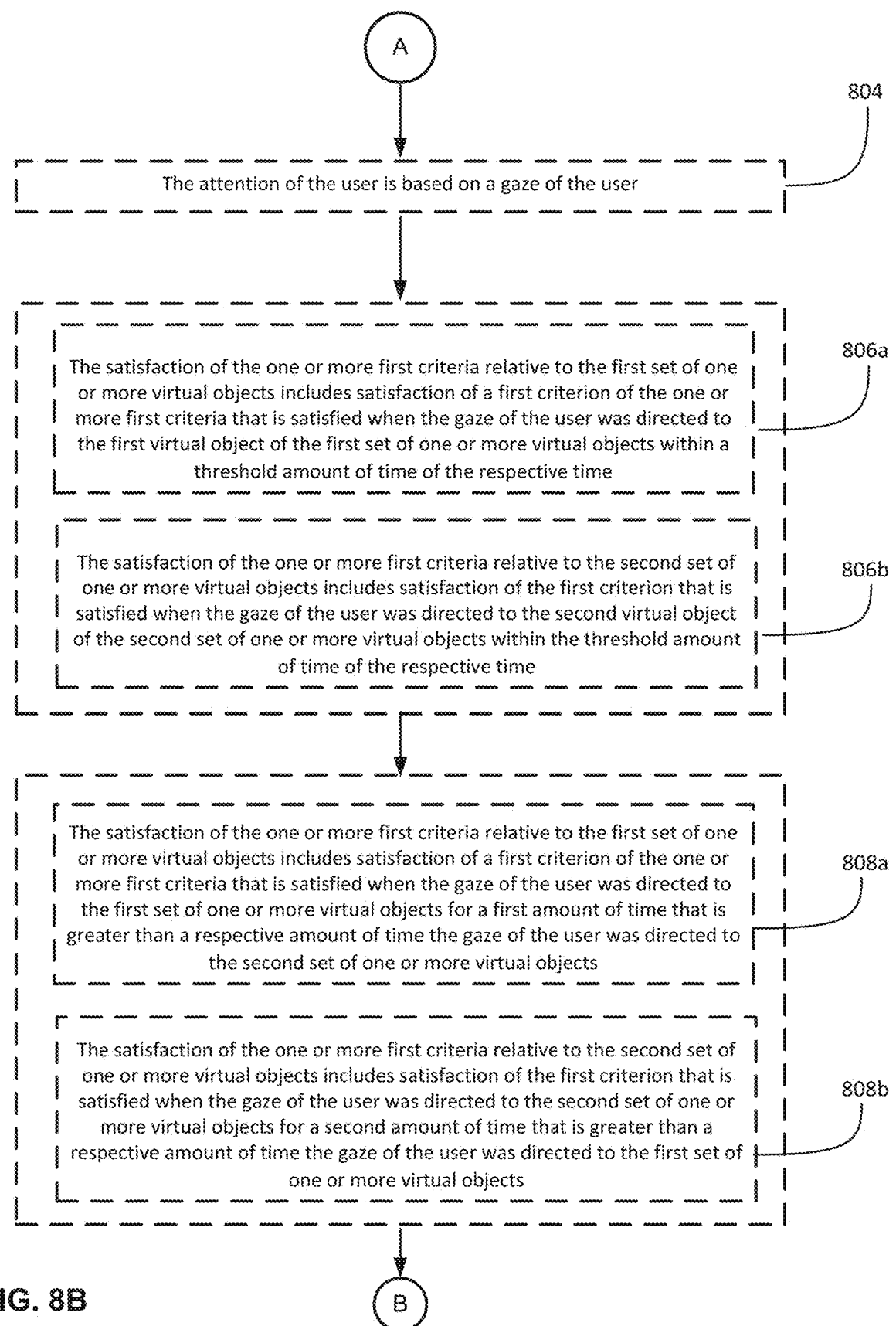
Figure 8C:
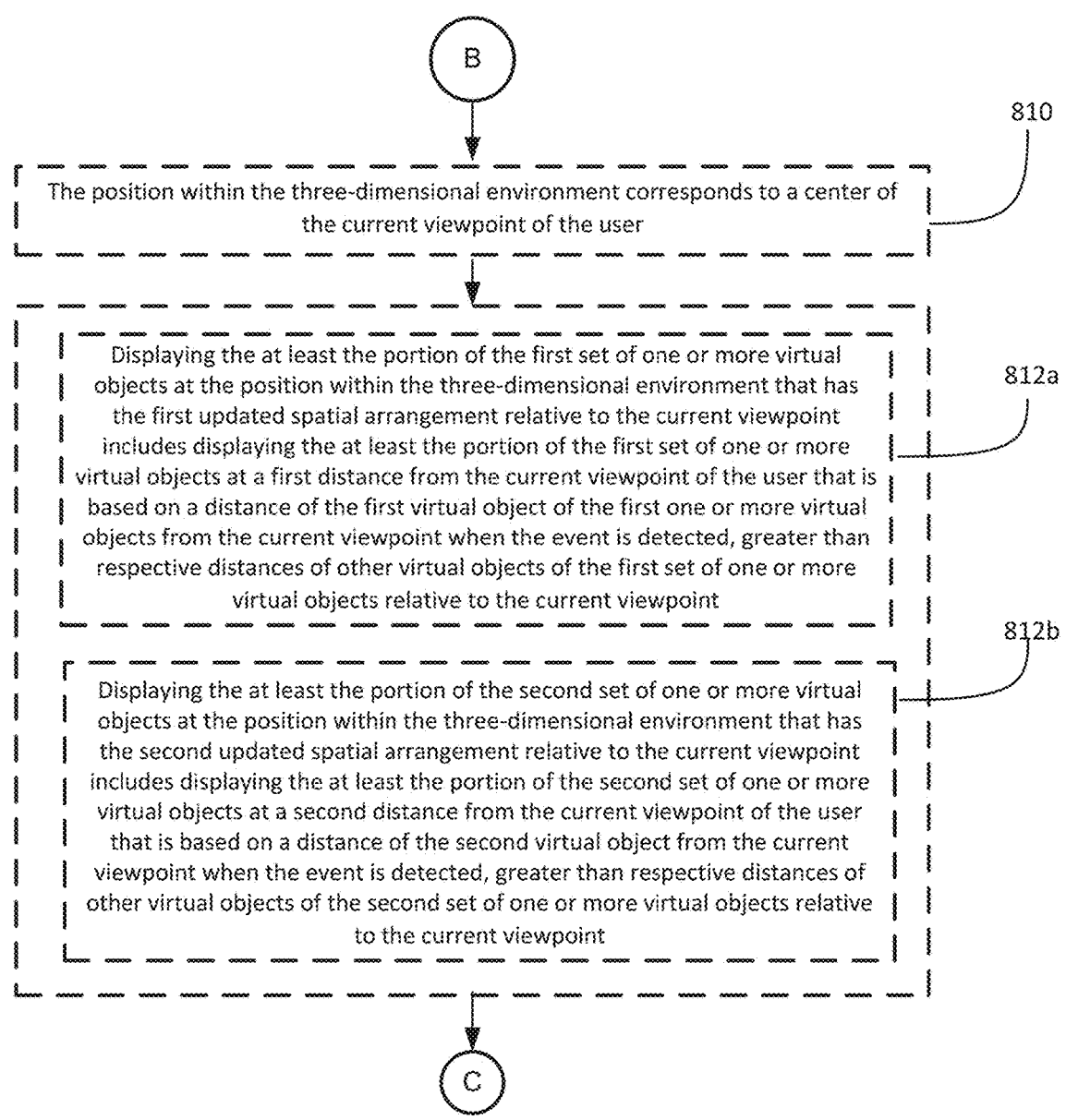
Figure 8F:
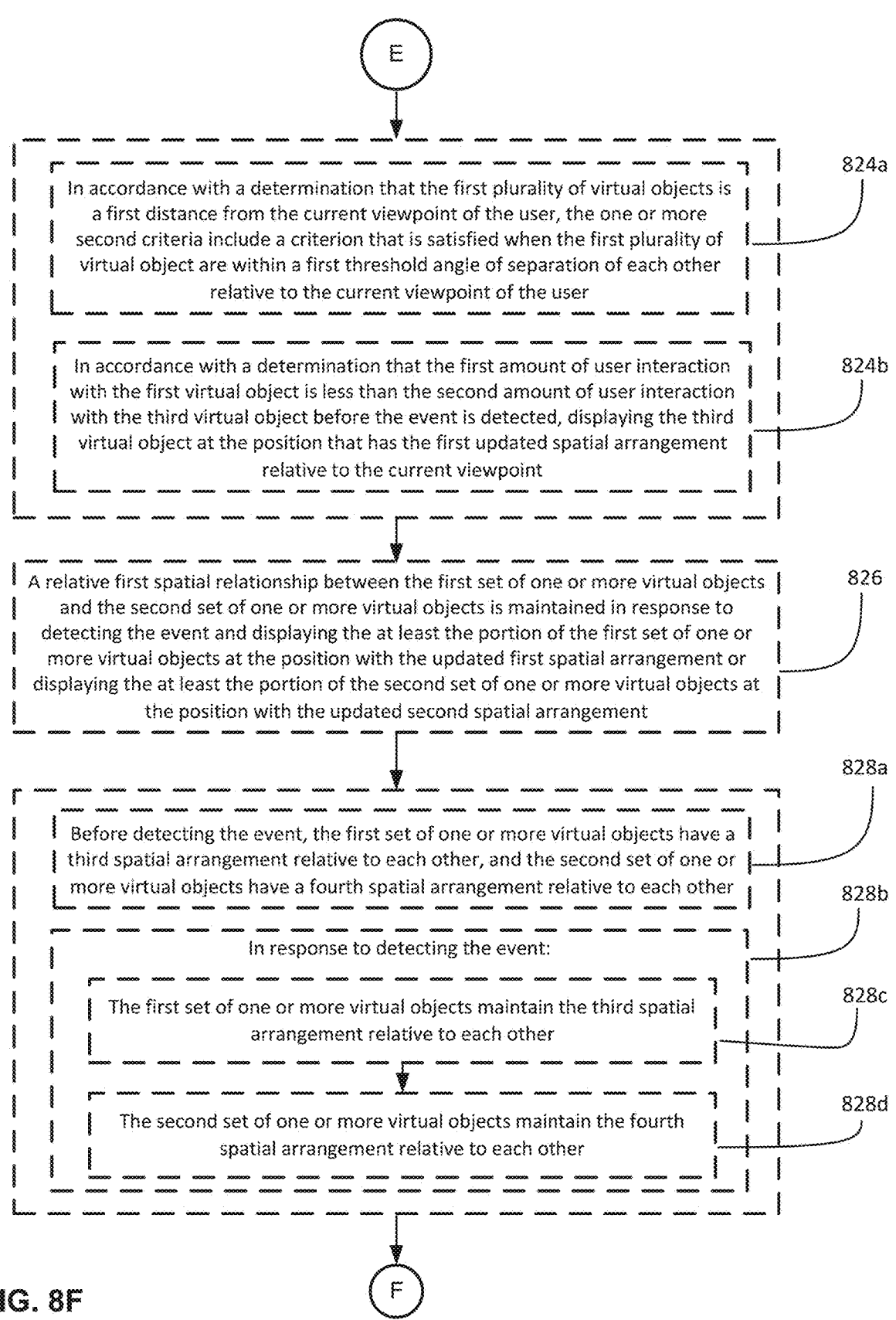
Figure 8H:
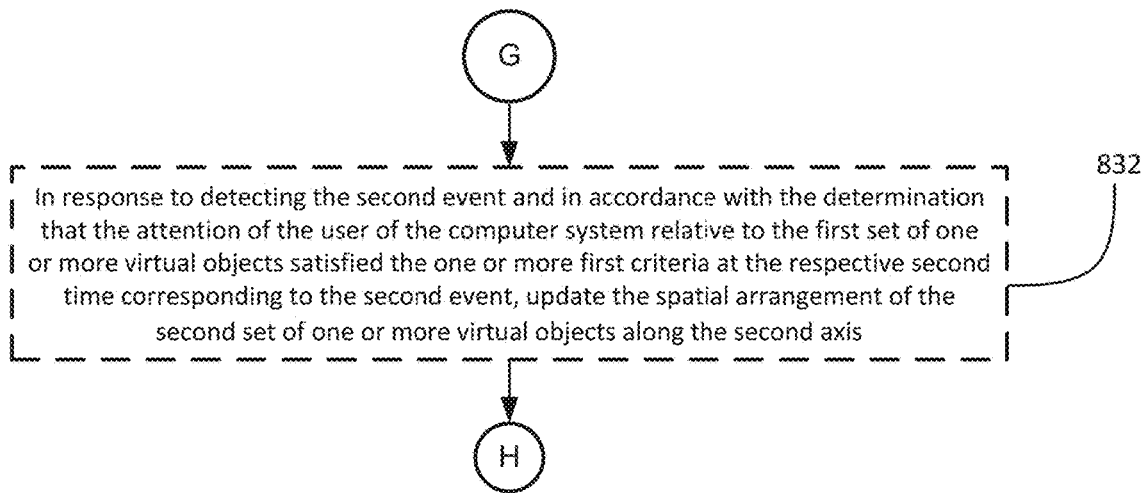

From FIG. 7G to FIG. 7H, objects 706*b* and 706*c* are recentered to a modified position relative to viewpoint 726. In particular, in some embodiments, computer system 101 determines one or more spatial thresholds relative to the three-dimensional environment 702 (e.g., a floor, a wall, one or more physical objects, and/or a ceiling), beyond which virtual content is not recentered. For example, as shown in FIG. 7H, threshold 740 indicates an elevation threshold relative to a floor of three-dimensional environment 702 and/or relative to a portion of a body of the user of computer system 101 (e.g., a head of the user, or a knee of the user), below which recentered objects 706*b* and 706*c* are not displayed. Frame 742*c*, for example, optionally corresponds to a requested, recentered location of object 706*c* that is below threshold 740. In response to determining the requested position of object 706*c* is beyond threshold 740, computer system 101 optionally forgoes display of object 706*c* at the position indicated by frame 742*c*, and instead displays object 706*c* at its position shown in FIG. 7H, thus displaying object 706*c* at an updated position relative to viewpoint 726 that is not beyond threshold 740. Similarly, frame 742*b* corresponds to a requested, recentered location of object 706*b* that is below threshold 740, and computer system 101 optionally displays object 706*b* at an updated position that is above threshold 740, relative to viewpoint

726. It is understood that frame 742*b* and frame 742*c* are illustrative of locations and/or volumes within three-dimensional environment 702 at which the object 706*b* and 706*c* would respectively be moved to, if such locations were not beyond threshold 740.

In some embodiments, frames 742*b* and 742*c* are not displayed. In some embodiments, frames 742*b* and/or 742*c* are displayed with an alternative visual appearance (e.g., a relatively lower opacity, lower saturation, lower contrast, and/or greater degree of blurring effect) concurrently with objects 706*b* and 706*c*. In some embodiments, computer system 101 displays the objects 706*b* and 706*c* instead of displaying frames 742*b* and 742*c* at the positions of frames 742*b* and 742*c*, and the computer system animates a translating of the objects toward threshold 740 until the objects appear as shown in FIG. 7H.

FIGS. 8A-8J is a flowchart illustrating an exemplary method of selectively recentering virtual content to a viewpoint of a user in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at a computer system, such as computer system 101 in FIG. 7A, in communication with one or more input devices, such as image sensors 314 of FIG. 3, and a display generation component, such as display generation component 120 in FIG. 7A. For example, a mobile device (e.g., a tablet, a smartphone, a media player, or a wearable device), or a computer or other electronic device. In some embodiments, the display generation component is a display integrated with the electronic device (optionally a touch screen display), external display such as a monitor, projector, television, or a hardware component (optionally integrated or external) for projecting virtual content or causing a virtual content to be visible to one or more users. In some embodiments, the one or more input devices include an electronic device or component capable of receiving a user input (e.g., capturing a user input and/nor detecting a user input) and transmitting information associated with the user input to the computer system. Examples of input devices include a touch screen, mouse (e.g., external), trackpad (optionally integrated or external), touchpad (optionally integrated or external), remote control device (e.g., external), another mobile device (e.g., separate from the computer system), a handheld device (e.g., external), a controller (e.g., external), a camera, a depth sensor, an eye tracking device, and/or a motion sensor (e.g., a hand tracking device, a hand motion sensor). In some embodiments, the computer system is in communication with a hand tracking device (e.g., one or more cameras, depth sensors, proximity sensors, touch sensors (e.g., a touch screen, trackpad)). In some embodiments, the hand tracking device is a wearable device, such as a smart glove. In some embodiments, the hand tracking device is a handheld input device, such as a remote control or stylus.

In some embodiments, while a three-dimensional environment, such as three-dimensional environment 702 in FIG. 7A, is visible via the display generation component from a current viewpoint (e.g., a first viewpoint) of a user, the computer system displays (802*a*), via the display generation component, at least a portion of a plurality of virtual objects that are available for viewing in the three-dimensional environment, such as object 706*a* and object 706*d* in FIG. 7A, the plurality of virtual objects including a first virtual object, such as object 706*a*, of a first set of one or more virtual objects, such as "Cluster 1" in FIG. 7A, and a second virtual object, such as object 706*b*, of a second set of one or more virtual objects, such as "Cluster 2" in FIGS. 7D and 7D1. For example, the three-dimensional environment is optionally a physical environment, a virtual environment (VR), an augmented reality (AR) environment, and/or an extended reality (XR) environment that is visible and/or displayed via the display generation of the computer system. Such display optionally includes presenting a view of the physical environment via a passive visual passthrough (e.g., one or more at least semi-transparent lenses), and/or presenting virtual content via the display generation component (e.g., projected onto an at least semi-transparent surface, using images captured using one or more imaging components such as cameras). The current viewpoint of the user optionally includes a position within the three-dimensional environment at which the computer system and/or the user of the computer system are located, and optionally includes a field-of-view of what is visible to the user (e.g., via one or more cameras, passive visual passthroughs such as lenses, and/or the user's eye(s)). In some embodiments, respective virtual object(s) of the first set of one or more virtual objects and/or the second set of one or more virtual objects include one or more user interfaces of software applications included in and/or in communication with the computer system, such as media playback, text editing, web browsing, and/or operating system control panel user interface(s). For example, the first virtual object is optionally a virtual window including a user interface of a media browsing application to stream and/or view media content, and the second virtual object is optionally a second virtual window including a user interface of a web browsing application. In some embodiments, the first virtual object is a two-dimensional, or nearly two-dimensional object (e.g., a flat, or nearly flat virtual window), and in some embodiments, the first virtual object is a three-dimensional object (e.g., a virtual model of a car, a nearly flat object including some degree of curvature, and/or a virtual geometric shape such as a virtual rectangular prism). In some embodiments, the second virtual object has one or more characteristics of the first virtual object.

In some embodiments, the first set of one or more virtual objects are associated with each other. For example, the computer system optionally determines that the first set of one or more virtual objects are part of a grouping of virtual objects. As additional examples, the computer system optionally determines that respective virtual objects of the set of first one or more virtual objects are two virtual windows presenting interactable views of a same web page or word processing document, are two instances of media provided from a shared photo and/or video software application, and/or are both of a class of virtual objects, such as a class of interactable visual representations of immersive visual experiences (e.g., icons that are selectable to enter an immersive visual experience presenting virtual content that consumes and/or is overlaid over representations of the user's physical environment). Based on such determinations, the computer system optionally logically groups the first set of one or more virtual objects, and is able to perform operations associated with some or all of the first one or virtual objects optionally concurrently.

In some embodiments, the virtual objects of a given group (e.g., the first set of one or more objects or the second set of one or more objects) are associated with a shared set of virtual content (e.g., a first and a second object presenting different views of the same web page), are of similar or the same types of virtual objects (e.g., both objects have the same or similar dimensions and/or sizes, include user interfaces for similar and/or the same software applications), and/or are grouped based on satisfaction of one or criteria. For example, the computer system optionally groups a respective first virtual object and a respective second virtual object of the first set of one or more virtual objects in accordance with a determination that the respective virtual objects satisfy one or more criteria, including a criterion that is satisfied when a virtual object has been a target of user interaction (e.g., user attention, user input, and/or recently displayed) within a threshold amount of time (e.g., 0.001, 0.01, 0.1, 1, 10, 100, or 500 seconds), satisfy a criterion that is satisfied when the respective first/second virtual objects were expressly grouped (e.g., grouped in response to detecting a request to define such a group), satisfy a criterion that is satisfied when the respective first and second objects are within a threshold distance of each other (e.g., 0.0001, 0.001, 0.01, 0.1, 1, or 10 m), and/or satisfy a criterion that is satisfied based on previous interactions with virtual content (e.g., based on a frequency of usage of similar virtual objects and/or software applications, in accordance with a determination that similar virtual objects including similar or the same virtual content were previously grouped together, and/or in accordance with a determination that the user has previously defined a grouping of such virtual objects). In some embodiments, the one or more second virtual objects have one or more characteristics of the one or more first virtual objects.

In some embodiments, one or more virtual objects included in the first set and/or the second set of objects are not displayed from a current viewpoint of the user, and are visible from another, updated viewpoint of the user. For example, a first virtual object is optionally positioned behind the current viewpoint of the user, and is optionally not visible until the computer system optionally detects a change viewpoint moving backward and/or rotating until the position of the first virtual object is within a field-of-view of the user. In some embodiments, all of the plurality of virtual objects are displayed in response to the current viewpoint changing such that the user's field-of-view includes all respective positions within the three-dimensional environment corresponding to the plurality of virtual objects.

In some embodiments, the first set of one or more of virtual objects have a first spatial arrangement relative to the current viewpoint (802*b*), such as the spatial arrangement of objects 706*a*, 706*d*, and 706*c* illustrated in the overhead view legend in FIG. 7A. For example, the first spatial arrangement optionally includes the respective position(s) and/or orientation(s) of the first set of one or more virtual objects relative to the current viewpoint. Additionally or alternatively, because the current viewpoint optionally has a spatial relationship relative to the three-dimensional environment, the first spatial arrangement optionally further corresponds to a spatial arrangement relative to the three-dimensional environment. As an example, the first spatial arrangement optionally includes the first virtual object of the first set of one or more virtual objects having a position and/or orientation such that the first virtual object is completely, partially, or not visible from the current viewpoint, and a third virtual object is completely, partially, or not visible from the current viewpoint, the virtual objects respectively having a distance from the current viewpoint, an elevation relative from the current viewpoint, and/or an orientation relative to the current viewpoint (e.g., an angling of the virtual object relative to the current viewpoint).

In some embodiments, the second set of one or more virtual objects have a second spatial arrangement relative to the current viewpoint, different from the first spatial arrangement (802c), such as the spatial arrangement of objects 706b and 706c illustrated in the overhead view legend in FIG. 7A. In some embodiments, the second spatial arrangement has one or more characteristics of the first spatial arrangement.

In some embodiments, the computer system detects (802d), via the one or more input devices, an event corresponding to a request to arrange (e.g., recenter) one or more virtual objects relative to the current viewpoint of the user, such as an event including input 780 in FIG. 7A (e.g., input corresponding to a request to update a spatial arrangement of one or more virtual objects relative to the current viewpoint of the user to satisfy a first set of one or more criteria that specify a range of distances or a range of orientations of the one or more virtual objects relative to the current viewpoint of the user, such as a "recentering" input, as described in more detail below and/or method 1000). For example, the event optionally includes an express user input requesting the arranging (e.g., recentering), a determination that one or more criteria are satisfied relative to the current viewpoint, the virtual object(s), and/or the three-dimensional environment, and/or an automatic requesting of the arranging (e.g., recentering). For example, the event optionally includes detecting a portion of the user's body contacting a surface (e.g., a touch sensitive surface) detected by and/or in communication with the computer system, detecting an air gesture (e.g., an air pinch gesture including contacting of the user's fingers, an air swiping gesture including movement of the user's finger(s) and/or hand(s), an air depinch of the user's fingers (e.g., movement of the user's fingers and/or finger tips away from each other), an air first including curling of the user's finger(s), and/or an air pointing gesture including a pointing of a finger) optionally while attention is directed to a respective virtual object or a position in the environment not including virtual content, an actuation of a physical and/or virtual button, and/or movement and/or selections of selectable options (e.g., buttons) detected at a second computer system, such as a stylus or other pointing device. Additionally or alternatively, the event optionally includes satisfaction of one or more criteria, including a criterion that is satisfied when virtual object(s) are presenting and/or have presented an apparent spatial conflict (e.g., when a first and a second virtual object occupy an overlapping portion of the three-dimensional environment) for greater than a threshold amount of time (e.g., 0.001, 0.01, 0.1, 1, 10, 100, 500, 1000, or 10000 seconds), and/or when the defined behavior of the virtual object is to proactively arrange itself relative to the user's current viewpoint (e.g., defined by an application developer of content included in the virtual object requesting that the virtual object follows the current user's viewpoint, avoids apparent collisions with other physical and/or virtual objects, and/or proactively arranges itself to improve visibility of the content). The event additionally or alternatively and optionally includes an automatic requesting of the arranging, such as an automatic arranging when the first and/or second one more virtual objects are initially displayed and/or when the user initially begins to view the three-dimensional environment via the display generation component.

In some embodiments, the event corresponding to the request to arrange the one or more virtual objects is or includes an input to arrange the virtual objects to satisfy one or more arrangement criteria. In some embodiments, the one or more arrangement criteria include criteria satisfied when an interactive portion of the virtual objects are oriented towards the viewpoint of the user, such as the surface of object 706a facing viewpoint 726 in FIG. 7A, the virtual objects do not obstruct the view of other virtual objects from the viewpoint of the user, such as the arrangement of object 706a and object 706d in FIG. 7A, the virtual objects are within a threshold distance (e.g., 10, 20, 30, 40, 50, 100, 200, 300, 400, 500, 1000 or 2000 centimeters) of the viewpoint of the user, such as the distance of object 706a in FIG. 7A relative to viewpoint 726, the virtual objects are within a threshold angle (e.g., 1, 3, 5, 10, 15, 30, 45, 60, 75, or 85 degrees) relative to a vector extending from the viewpoint of the user (e.g., a center of the user's eyes parallel to a physical ground), such as the angle of object 706a in FIG. 7A relative to viewpoint 726, and/or the virtual objects are within a threshold distance (e.g., 1, 5, 10, 20, 30, 40, 50, 100, 200, 300, 400, 500, 1000 or 2000 centimeters) of each other, such as the distance between object 706a and object 706d in FIG. 7A. In some embodiments, the event does not include an input that specifies or defines how the virtual objects are moved and/or reoriented other than initiating such movement and/or reorientation. In some embodiments, the event is different from an input requesting to update the positions of one or more objects in the three-dimensional environment (e.g., relative to the viewpoint of the user), such as inputs for manually moving the objects in the three-dimensional environment, such as inputs directly manipulating object 706a in FIG. 7A.

In some embodiments, in response to detecting the event while the three-dimensional environment is visible via the display generation component from the current viewpoint of the user (802e), in accordance with a determination that attention of the user of the computer system relative to the first set of one or more virtual objects satisfied one or more first criteria at a respective time corresponding to the event (e.g., at a time when the event was detected or a time prior to detecting the event), such as attention relative to object 706a in FIG. 7A and/or object 706d in FIG. 7A within window 732, the computer system displays (802f), via the display generation component, at least a portion of the first set of one or more virtual objects at a position within the three-dimensional environment that has a first updated spatial arrangement relative to the current viewpoint, different from the first spatial arrangement, such as the spatial arrangement of the position at which object 706a is displayed in FIG. 7B. In some embodiments, the computer system determines a previous target of the user's attention based on the satisfaction of the one or more first criteria. In some embodiments, the previous target of the user's attention corresponds to the first set of one or more virtual objects when the one or more first criteria are satisfied. For example, the one or more first criteria optionally include a criterion satisfied when the attention of the user currently targets and/or previously targeted a respective one or more of the one or more first virtual objects within a first threshold amount of time (e.g., 0.001, 0.01, 0.1, 1, 10, 100, 500, 1000, or 10000 seconds) of the event, a criterion satisfied when attention of the user previously targeted a plurality of virtual objects included in the one or more first virtual objects for a combined amount of time greater than a second threshold amount of time (e.g., 0.001, 0.01, 0.1, 1, 10, 100, 500, 1000, or 10000 seconds), optionally the same or different (e.g., greater or lesser) than the first threshold amount of time, and/or a criterion satisfied when the respective one or more virtual objects are the most recent virtual objects targeted by the attention of the user (e.g., attention of the user has not last-targeted a virtual object included in a different group of virtual objects). Thus, the computer system optionally determines that the first set of virtual objects satisfied the one or more first criteria at a respective time (e.g., recently and/or currently), and thereafter performs one or more recentering operations directed toward the first set of virtual objects.

In some embodiments, when the one or more first criteria are satisfied relative to the one or more first virtual objects, the computer system updates an arrangement of the one or more first virtual objects in response to the event. For example, the computer system optionally redefines respective position(s) and orientation(s) of the first set of one or more virtual objects relative to the current viewpoint-corresponding to the first updated spatial arrangement—in response to the event, such as the updated spatial arrangement of virtual objects 706a 706d, and 706e in FIG. 7C. In some embodiments, the first updated spatial arrangement includes a modified arrangement (e.g., positions and/or orientations) of the first set of one or more virtual objects relative to the current viewpoint compared to the first spatial arrangement, to satisfy the one or more arrangement criteria described previously. In some embodiments, respective virtual objects are made visible (e.g., are displayed) when the virtual objects are displayed with the first updated spatial arrangement because such objects are moved in response to the event, such as the display of virtual object 706e in FIG. 7C. For example, the first updated spatial arrangement optionally includes displaying and/or positioning the first set of one or more objects at a plurality of respective positions at least partially surrounding the current viewpoint, such that respective objects are optionally positioned at a fixed distance or a predetermined distance relative to the current viewpoint (e.g., based on and/or the same as the distance of the virtual objects relative to the current viewpoint while at the first spatial arrangement). In some embodiments, in response to displaying the one or more first virtual objects with the first updated spatial arrangement, the computer system displays the second set of one or more virtual objects with a second updated spatial arrangement (e.g., optionally the same as the second spatial arrangement) relative to the current viewpoint of the user, such as the spatial arrangement of virtual objects 706b and 706c in FIG. 7C.

In some embodiments, a portion of the first set of one or more objects are visible (e.g., displayed) via the display generation component at the position within the three-dimensional environment, such as a portion of the first virtual object and/or the entire first virtual object centered with the center of the user's current viewpoint, while other objects are not visible (e.g., not displayed) at the first updated spatial arrangement, such as the display of "Cluster 1" in FIG. 7C and the lack of display of "Cluster 2" in FIG. 7C. In response to detecting the current viewpoint of the user shift (e.g., rotate while remaining at a position within the three-dimensional environment), the computer system optionally displays and/or ceases display of the first set of one or more virtual objects based on the updated field-of-view at the shifted current viewpoint, such as in response to the changed viewpoint 726 in FIGS. 7D and 7D1.

In some embodiments, in accordance with a determination that the attention of the user of the computer system relative to the one or more second virtual objects satisfied the one or more first criteria at the respective time corresponding to the event, such as attention relative to object 706c as illustrated by time period 738 in FIG. 7F (e.g., at the time when the event was detected or the time prior to detecting the event), the computer system displays (802g), via the display generation component, at least a portion of the second set of one or more virtual objects at a position within the three-dimensional environment that has a second updated spatial arrangement relative to the current viewpoint, different from the second spatial arrangement, such as the position of object 706c and/or 706b in FIG. 7F, wherein the position having the first updated spatial arrangement and the position having the second updated spatial arrangement are both in a same region of the three-dimensional environment relative to the current viewpoint, such as a position within three-dimensional environment 702 at which object 706a—or alternatively, object 706b—is optionally displayed in accordance with attention satisfying the one or more first criteria relative to the respective objects in FIG. 7B. For example, the computer system optionally determines that the second set of virtual objects are the previous target of the user's attention based on satisfaction of the one or more first criteria, and displays at least a portion of the second set of one or more virtual objects at the position (e.g., surrounding, or partially surrounding) the current viewpoint of the user, including displaying the second virtual object at the position within the three-dimensional environment (e.g., centered, or nearly centered with the user's current viewpoint). For example, the one or more second virtual objects when displayed with the first updated spatial arrangement optionally satisfy the one or more arrangement criteria described previously. In some embodiments, the computer system displays the at least the portion of the first set of virtual objects (e.g., when the plurality of objects are arranged with the first updated spatial arrangement) or the at least the portion of the second set of virtual objects (e.g., when the plurality of objects are arranged with the second updated spatial arrangement) in the same region of the three-dimensional environment in accordance with a determination that attention of the user relative to the corresponding set of virtual objects satisfied the one or more criteria at the respective time corresponding to the event.

In some embodiments, the computer system alternatively displays the first set of virtual objects or the second set of virtual objects at a region of the three-dimensional environment when the respective set of virtual objects are targets of recentering operations, such as the display of objects 706a, 706d, and/or 706e in FIG. 7B. In addition or alternative to displaying a single virtual object at a position relative to the current viewpoint of the user (e.g., the first or the second virtual object), the computer system optionally determines a forward vector corresponding to a target set of the recentering operations, and optionally recenters the targeted set of virtual objects such that its respective forward vector is aligned with the region of the three-dimensional environment, such as shown by the arrangement of objects 706a, 706d, and/or 706e in FIG. 7B. For example, when the first set of virtual objects are optionally the target of the recentering operation, the computer system optionally determines one or more weighting factors for respective virtual objects included in the first set of virtual objects, optionally combines the weighting factors to determine the forward vector relative to the targeted set of virtual objects, and optionally recenters the virtual object such that the forward vector aligns, or nearly aligns with the current viewpoint of the user (e.g., a center of the current viewpoint), such as one or more weighting factors based on time period 734 and/or 736 within window 732 when recentering input 780 is received in FIG. 7A. In some embodiments, the weighting factors include a time that the attention of the user targeted respective objects (e.g., within the first threshold amount of time), a relative size of the respective objects relative to each other and/or the three-dimensional environment, content included within the respective virtual objects (e.g., media and/or operating system settings), an orientation of the respective objects relative to the current viewpoint of the user at the respective time the targeted set of objects satisfied the one or more first criteria, and/or some combination of the weighting factors described herein and/or other suitable weighting factors, such as one or more characteristics of the virtual objects 706*a-c* and/or attention of the user illustrated in FIG. 7A.

In some embodiments, in response to displaying the one or more second virtual objects with the first updated spatial arrangement, the computer system maintains the first spatial arrangement of the first set of one or more virtual objects, such as the maintaining of a spatial arrangement between objects 706*b* and 706*c* in FIG. 7C and the displaying of objects 706*a*, 706*d*, and 706*e* at a position having the updated spatial arrangement relative to viewpoint 726. Thus, in some embodiments, the computer system displays either the first set of one or more virtual objects or the second set of one or more virtual objects at the region of the three-dimensional environment having the first updated spatial arrangement in response to the event. In some embodiments, the second set of one or more virtual objects while displayed with the first updated spatial arrangement have one or more characteristics of the first set of one or more virtual objects while displayed with the first updated spatial arrangement, such as one or more characteristics of the objects 706*b* and 706*c* displayed at the position having the updated spatial arrangement in FIG. 7C. In some embodiments, in response to displaying the one or more second virtual objects with the first updated spatial arrangement, the computer system displays the one or more first virtual objects with a third updated spatial arrangement, different from the second updated spatial arrangement of the set of second virtual objects (e.g., optionally the same as the first spatial arrangement), such as a spatial arrangement that is different than the spatial arrangement of objects 706*a*, 706*d*, and 706*e* in FIG. 7C. Displaying first or second set of one or more virtual objects at a position within the three-dimensional environment based on user attention in response to an event reduces user input(s) to request similar movement(s) of respective virtual objects to assume the first updated spatial arrangement, and provides a flexible and predictable approach for rearranging one or more virtual objects of different groups of virtual objects relative to the user's current viewpoint, thereby reducing power consumption, processing time, and user effort required to perform such similar movement(s) of the respective virtual objects.

In some embodiments, the attention of the user is based on a gaze of the user (804), such as indicated by cursor 750 in FIGS. 7D and 7D1. For example, the computer system optionally includes and/or is in communication with one or more sensors configured to detect and/or track one or more eyes of the user (e.g., the one or more input devices). In some embodiments, when gaze of the user is directed to a virtual object, the computer system determines attention is directed to the virtual object. In some embodiments, the computer system detects that the gaze of the user is directed to a portion of the three-dimensional environment (e.g., via the one or more sensors, and/or in accordance with an indication of the direction of gaze communicated to the computer system). In some embodiments, the computer system determines gaze based on an orientation of one or more eyes of the user, a dwelling of eyes directed generally to a position within the three-dimensional environment (e.g., for a time greater than a threshold amount of time (e.g., 0.001, 0.01, 0.1, 1, 10, or 100 seconds), optionally tolerant of minor fluctuations in absolute eye position), a predicted target of the gaze based on a current velocity and/or acceleration of the eyes, and/or some combination of the factors described previously. In some embodiments, in accordance with a determination that the gaze of the user targets a virtual object, the computer system detects such targeting and records an amount of time the gaze of the user targets the virtual object. Determining attention based on gaze of the user improves consistency between what the user has recently looked at and the result of recentering operations, reducing the likelihood that less relevant virtual content is recentered and presented to the user and thereby reducing user input to manually move such less relevant virtual content.

In some embodiments, the satisfaction of the one or more first criteria relative to the first set of one or more virtual objects includes satisfaction of a first criterion of the one or more first criteria that is satisfied when the gaze of the user was directed to the first virtual object of the first set of one or more virtual objects within a threshold amount of time of the respective time (806*a*), such as attention relative to object 706*a* in FIG. 7C. For example, the computer system optionally determines that the gaze of the user was directed to one or more portions of the first virtual object within a threshold amount of time (e.g., e.g., 0.001, 0.01, 0.1, 1, 10, 100, 1000, or 10000 seconds) of the respective time (e.g., the time when the event is detected, or leading up to when the event is detected). In some embodiments, the computer system determines that the first set of one or more virtual objects satisfy the one or more first criteria when the first virtual object is the most recent target of the user's gaze prior to detecting the event. In some embodiments, the computer system determines that the attention of the user was directed to a respective virtual object before the threshold amount of time from the respective time, and does not include time that the attention of the user was directed to the respective virtual object before the threshold amount of time when determining whether the targeted object satisfied the first criterion.

In some embodiments, the satisfaction of the one or more first criteria relative to the second set of one or more virtual objects includes satisfaction of the first criterion that is satisfied when the gaze of the user was directed to the second virtual object of the second set of one or more virtual objects within the threshold amount of time of the respective time (806*b*), such as attention relative to object 706*c* in FIG. 7F. For example, the second virtual object optionally satisfied the one ore first criterion when the attention of the user was directed to one or more portions of the second virtual object within a threshold amount of time (e.g., similar or the same threshold amount of time described above) of the respective time. In some embodiments, when attention of the user was directed to the second virtual object before the threshold amount of time from the respective time, the computer system forgoes consideration of durations of time that the attention was directed to the second virtual object when determining whether the second virtual object satisfied the first criterion. Determining satisfaction of the first one or more criteria relative to a respective set of one or more virtual objects based on a threshold amount of time of the respective time improves the likelihood the target of the recentering operations described previously are based on a respective set of one or more virtual objects with which the user recently directed their attention to, thereby reducing the likelihood the user erroneously recenters virtual objects based on a less relevant cluster of one or more virtual objects.

In some embodiments, the satisfaction of the one or more first criteria relative to the first set of one or more virtual objects includes satisfaction of a first criterion of the one or more first criteria that is satisfied when the gaze of the user was directed to the first set of one or more virtual objects for a first amount of time that is greater than a respective amount of time the gaze of the user was directed to the second set of one or more virtual objects (808*a*), for example, as illustrated by time period 734 in FIG. 7B. For example, the first criterion is optionally satisfied when the gaze of the user targets one or more portions of the virtual objects included in the first set of virtual object(s) (e.g., a corner, a center, a border, and/or another portion of a body of the virtual object and/or of a respective one or more virtual objects included in the virtual object, such as a virtual object including a virtual car and text displayed above the virtual car) for an amount of time that is greater than an amount of time the attention of the user is directed to virtual objects included in alternative set(s) of virtual objects. To improve relevance of virtual content presented to the user as a result of a recentering operation, the computer system optionally determines a total duration of time attention of the user was directed respective sets of virtual object, optionally within a window of time (e.g., 0.001, 0.01, 0.1, 1, 10, 100, 1000, or 10000 seconds) of the respective time. In some embodiments, the window of time is measured relative to when the event is detected and/or relative to a time that precedes when the event is detected (e.g., leading up to the time the event is detected). In some embodiments, if the computer system determines that the attention of the user within the window of time was directed to objects within the first set of virtual objects more than respective amounts of time the attention was directed to alternative sets of virtual objects, the computer system determines that the first set of virtual object(s) is a primary target of the user's recent attention. Thus, in such an embodiment, the one or more first criteria are satisfied relative to the first set of virtual object(s) rather than the second set of virtual object(s). In some embodiments, the amount of time attention of the user is directed to the first set of virtual object(s) within the window of time is a sum or some weighted combination of the amount of time attention of the user was directed to respective objects included in the first set of virtual object(s).

In some embodiments, the satisfaction of the one or more first criteria relative to the second set of one or more virtual objects includes satisfaction of the first criterion that is satisfied when the gaze of the user was directed to the second set of one or more virtual objects for a second amount of time that is greater than a respective amount of time the gaze of the user was directed to the first set of one or more virtual objects (808*b*), for example, such as indicated by time period 738 in FIG. 7F. For example, the first criterion is optionally satisfied relative to the second set of virtual object(s) when the gaze of the user targets one or more portions of the second set of virtual object(s) similarly as described with reference to the first criterion relative to the first set of virtual object(s), however, based on an amount of time the attention was directed to the second set of virtual object(s) greater than to the first set of virtual object(s).

Satisfying the one or more first criteria relative to respective sets of virtual objects when gaze of the user is directed to a set of virtual objects improves consistency between what the user has recently, visually targeted, and what the previously described recentering operation(s) described will target, thus reducing the likelihood the user erroneously recenters virtual objects at an updated position different from a desired arrangement and reducing processing and power consumption required to perform and correct for such erroneous recentering operations.

In some embodiments, the position within the three-dimensional environment corresponds to a center of (or other predefined position relative to) the current viewpoint of the user (810), such as a center of object 706*a* in FIG. 7A. For example, the computer system optionally displays a primary target of the attention of the user at a relative center of the current viewpoint (e.g., a center of the field of view of the three-dimensional environment visible via the display generation component at the current viewpoint). In some embodiments, the computer system aligns a forward vector associated with a primarily targeted set of virtual object(s), described further with reference to step(s) 808, with a vector extending toward the relative center of the current viewpoint, and displays virtual object(s) at respective positions relative to the forward vector. In some embodiments, the computer system displays a virtual object at the center of the current viewpoint. For example, the computer system optionally displays the virtual object at a position extending from a coordinate axis established relative to the user's body (e.g., an apparent depth axis extending from a head of the user toward a back wall of the three-dimensional environment, centered on the user's head and/or eyes). Positioning virtual objects based on a center (or other predefined portion) of the current viewpoint of the users improves the likelihood relevant virtual content is presented near a center of a field-of-view of the user, thereby reducing additional user input to arrange the virtual objects as such.

In some embodiments, displaying the at least the portion of the first set of one or more virtual objects at the position within the three-dimensional environment that has the first updated spatial arrangement relative to the current viewpoint includes displaying the at least the portion of the first set of one or more virtual objects at a first distance from the current viewpoint of the user that is based on a distance of the first virtual object, such as object 706*a* in FIG. 7A, of the first one or more virtual objects from the current viewpoint when the event is detected, greater than respective distances of other virtual objects of the first set of one or more virtual objects relative to the current viewpoint (812*a*), such as the distance of object 706*a* in FIG. 7C. For example, when the first set of one or more virtual objects are the primary target of recentering operations (e.g., attention of the user relative to the first set of one or more virtual objects satisfied the one or more first criteria at the respective time), the computer system optionally determines a maximum effective distance between the virtual objects and the current viewpoint of the user (e.g., between all of the first set of virtual object(s) and/or between virtual objects that were recent targets of user attention), and determines an updated spatial arrangement of the virtual objects based on the maximum effective distance of the respective distances between the current viewpoint and the virtual objects. When the first virtual object, for example, is a first effective distance (e.g., a simulated distance measured from the current viewpoint of the user to a simulated position of the first virtual object within the three-dimensional environment), greater than respective effective distances of other virtual objects included in the first set of virtual object(s), the computer system optionally displays the updated spatial arrangement such that the forward vector described with reference to step(s) 802 has a magnitude distance corresponding to (e.g., the same as, or based on) the first effective distance of the first virtual object.

In some embodiments, when the computer system displays the first virtual object at the position having the updated spatial arrangement relative to the current viewpoint, the computer system displays the first virtual object relatively centered with the current viewpoint of the user, and at the maximum effective distance of the virtual objects of the first set of one or more virtual objects, relative to the current viewpoint.

In some embodiments, displaying the at least the portion of the second set of one or more virtual objects at the position within the three-dimensional environment that has the second updated spatial arrangement relative to the current viewpoint includes displaying the at least the portion of the second set of one or more virtual objects at a second distance from the current viewpoint of the user, such as the distance of object 706*b* in FIG. 7F, that is based on a distance of the second virtual object from the current viewpoint when the event is detected, greater than respective distances of other virtual objects of the second set of one or more virtual objects relative to the current viewpoint (812*b*), such as the distance of object 706*b* in FIG. 7E. For example, similarly as described with reference to the first set of one or more virtual objects, the computer system optionally determines a maximum effective distance of respective effective distances between the second set of one or more virtual objects and the current viewpoint, and recenters the second one or more virtual objects based on the maximum effective distance. Similarly as described above, the maximum effective distance is optionally used for determining a magnitude of a vector forward of the recentered arrangement and/or for determining a precise effective depth of a recentered virtual object relative to the current viewpoint.

In some embodiments, when a virtual object is relatively too far away, the computer system forgoes recentering its corresponding set of virtual object(s) based on the distance between the virtual object and the current viewpoint. For example, in accordance with a determination that the virtual object is first effective distance away from the current viewpoint greater than a threshold distance (e.g., an effective depth, (e.g., 0.0001, 0.001, 0.01, 0.1, 1, or 10 m)) from the current viewpoint of the user, the computer system optionally forgoes recentering the associated set of one or more virtual objects based on the first distance, and optionally recenters the set of one or more virtual objects based on an effective distance of a relatively closer virtual object of the set of one or more virtual objects. Displaying recentered one or more virtual objects at positions within the three-dimensional environment based on a relatively far away virtual object reduces the likelihood recentered arrangements of the one or more virtual objects are presented at viewing distances that are suboptimal for interacting with virtual content included in the one or more virtual objects, thereby reducing the need for express input to move the one or more virtual objects to change viewing distances to improve interactivity with the virtual content.

In some embodiments, the first set of one or more virtual objects includes a third virtual object, such as object 706*d* in FIG. 7A, different from the first virtual object and the second virtual object, and wherein displaying the at least the portion of the first set of one or more virtual objects at the position within the three-dimensional environment that has the first updated spatial arrangement relative to the current viewpoint includes (814*a*) (for example, the third virtual object has one or more characteristics of the first virtual object and/or the second virtual object) in accordance with a determination that a first amount of user interaction with the first virtual object is greater than a second amount of user interaction with the third virtual object before the event is detected, displaying the first virtual object at the position that has the first updated spatial arrangement relative to the current viewpoint (814*b*), such as the display of object 706*a* at the updated position as shown in FIG. 7C. For example, the computer system optionally determines that the user of the computer system interacted with the first virtual object more than the third virtual object within a window of time leading up to the detection of the event (e.g., having one or more characteristics of the window of time described with reference to step(s) 808), accordingly and optionally determines that the first virtual object is a primary target of the recentering operation, and optionally recenters the plurality of virtual objects based on the position of the first virtual object. As an additional example, the computer system optionally displays the first virtual object rather than the third virtual object at the position having the first updated spatial arrangement relative to the current viewpoint (e.g., at a recentered position).

In some embodiments, displaying the at least the portion of the first set of one or more virtual objects at the position within the three-dimensional environment that has the first updated spatial arrangement relative to the current viewpoint includes (814*a*) includes in accordance with a determination that the first amount of user interaction with the first virtual object is less than the second amount of user interaction with the third virtual object before the event is detected, displaying the third virtual object at the position that has the first updated spatial arrangement relative to the current viewpoint (814*c*), such as displaying object 706*d* at the position that object 706*a* occupies in FIG. 7C. For example, the computer system optionally determines that the user of the computer system interacted with the third virtual object relatively more than the first virtual object within the window of time leading up to the detection of the event, thus optionally determines that the third virtual object is a primary target of the recentering operation, and optionally recenters the plurality of virtual objects based on the position of the third virtual object (e.g., displays the third virtual object at the recentered position).

In some embodiments, the amount of user interaction with a virtual object is based on attention and/or gaze, as described with reference to steps 804-808. In some embodiments, the amount of user interaction is based on an amount of user input directed to the virtual object (e.g., moving the virtual object, selecting virtual content included in the virtual object, scaling the virtual object, and/or modifying the virtual content), such as input directed to objects 706*a*, 706*d*, and 706*e* in FIG. 7*a*. In some embodiments, the amount of user interaction is based on a pattern of user interaction with other virtual objects (e.g., other objects within its associated set of virtual objects) such as user interaction patterns associated with objects 706*a*, 706*d*, and 706*c* in FIG. 7*a*. In some embodiments, the amount of user interaction is based on an amount of vocal interaction with the virtual object (e.g., voice commands and/or conversation directed to another user of another computer system represented in and/or by the virtual object), such as voice commands directed to objects 706*a*, 706*d*, and 706*e* in FIG. 7*a*. In some embodiments, the computer system determines a greater amount of interaction with a first virtual object than a second virtual object when: a relatively greater number of inputs are directed to the first virtual object, a greater duration of inputs are directed to the first virtual object, a greater number of words spoken to another user represented by the first virtual object, the computer system performs a relatively greater amount of apparent movement of the first virtual object, and/or the computer system detects a relatively faster entry of user input directed to the first virtual object, compared to similar or different user interactions with the second virtual object, such as included in input(s) directed to objects 706a, 706d, and 706e in FIG. 7a.

In some embodiments, the computer system aligns a forward vector of a cluster (e.g., a set) of one or more virtual objects with a viewpoint vector (e.g., a vector extending from the current viewpoint of the user, such as the center of the user's viewpoint), such as parallel to the vector extending from viewpoint 726 in the overhead view in FIG. 7A. The net forward vector optionally refers to a vector extending from the current viewpoint of the user, and is optionally indicative of a position of the three-dimensional environment where one or more recentered objects will be displayed. For example, the computer system optionally determines that user interaction was primarily directed to the first virtual object for a first amount of time, and was directed to the third virtual object for a second, relatively lesser amount of time when the event is detected. In response to the event (and/or prior to the event), the computer system optionally determines a first vector between the first virtual object and the current viewpoint, such as a vector extending between object 706a and viewpoint 726 in FIG. 7A, and a second vector between the third virtual object and the current viewpoint, such as a vector extending between object 706d and viewpoint 726 in FIG. 7A, thereafter projecting the vectors onto respective planes associated with the current viewpoint to determine projected angles associated with each virtual object (e.g., a first plane parallel to the eyes of the user and/or a floor of the user, and a second and a third plane orthogonal to the first plane, such that the three planes are optionally mutually orthogonal), such as a plane parallel to a floor of three-dimensional environment 702 in FIG. 7A and/or the eyes of the user of computer system 101. In some embodiments, the computer system weights the respective, projected angles based on the amount of user interaction with their corresponding virtual object, and combines (e.g., sums) at least a portion of the weighted projected angles to determine constituent angles of the net forward vector relative to the current viewpoint. For example, because the user interacted with the first virtual object relatively more than the third virtual object, the computer system optionally determines the net forward vector angles are closer to projected angles of the first virtual object, rather than the second virtual object, such as the net forward vector angles causing the arrangement of virtual objects 706a and 706d in FIG. 7B. When recentering the virtual objects, the computer system optionally determines an amount of translation and/or rotation required of the net forward vector to make the net forward vector parallel (e.g., and/or overlapping) with the viewpoint vector, and translates and/or rotates the virtual objects within the three-dimensional environment based on the amount of translation and/or rotation, such as the net forward vector angles causing the arrangement of virtual objects 706a and 706d in FIG. 7B. Displaying respective virtual objects at an updated position in response to recentering operations and based on an amount of user interaction with the respective virtual objects reduces the likelihood that virtual objects the user does not wish to interact are displayed at a recentered position within the three-dimensional environment, thereby reducing input erroneously interacting with such objects, and reducing input required to move desired virtual objects within the current viewpoint of the user.

In some embodiments, the first amount of user interaction includes a first duration of interaction with the first virtual object detected within a window of time, such as window 732, corresponding to the event (e.g., leading up to the event), such as indicated by time period 734 in FIG. 7B, and the second amount of user interaction includes a second duration of interaction with the third virtual object within the window of time corresponding to the event (816), such as indicated by time period 736 in FIG. 7B within window 732. For example, the first and/or second amount of user interaction includes a sum or some combination of the time the user interacted with the first and/or third virtual object (e.g., a duration of gaze, a length of maintained input, an amount of time when the user was providing consecutive inputs, and/or a time that the user moved the virtual object), such as described with reference to steps 804-808. Determining an amount of interaction based on a duration of interaction improves the likelihood the recentering operations result in display of relevant virtual content with which the user desires interaction, thereby reducing the need for further input to move the virtual objects to similar positions relative to the current viewpoint of the user.

In some embodiments, the plurality of virtual objects includes a third set of one or more virtual objects that have a third spatial arrangement relative to the current viewpoint of the user (818a), such as a set of virtual objects similar to Cluster 1 and/or Cluster 2 in FIG. 7A and FIGS. 7D and 7D1, respectively. For example, the third set of one or more virtual objects and the third spatial arrangement have one more characteristics of the sets of one or more virtual objects and spatial arrangements described with reference to step(s) 802.

In some embodiments, in response to detecting the event while the three-dimensional environment is visible via the display generation component from the current viewpoint of the user, in accordance with a determination that the attention of the user of the computer system relative to the one or more third virtual objects satisfied the one or more first criteria at the respective time corresponding to the event, such as similarly to attention that satisfied the one or more first criteria relative to Cluster 1 in FIG. 7B (e.g., at the time when the event was detected or the time prior to detecting the event), the computer system displays (818b), via the display generation component, at least a portion of the third set of one or more virtual objects at a position within the three-dimensional environment that has a third updated spatial arrangement relative to the current viewpoint, different from the third spatial arrangement, wherein the position having the first updated spatial arrangement, the position having the second updated spatial arrangement, and the position having the third updated spatial arrangement are in the same region of three-dimensional environment relative to the current viewpoint, such as a position similar to the position of object 706a and/or object 706d in FIG. 7B. For example, when the computer system optionally determines that the third set of one or more virtual objects are recent targets of attention and/or interaction when the event is detected, the computer system optionally displays the third set of one or more virtual objects at a position within the three-dimensional environment with an updated spatial arrangement relative to a previous position within the three-dimensional environment (e.g., the previous position of the third set of one or more virtual objects when the event is detected), the same or similar as described with reference to step(s) 802. Recentering third set of one or more virtual objects to an updated position within the three-dimensional environment when attention of the user satisfied the one or more first criteria relative to the third set of one or more virtual objects provides flexibility of user input to selectively recenter different sets of virtual objects, thereby reducing user input to manually move the virtual objects to similar recentered arrangements.

In some embodiments, the first set of one or more virtual objects includes a first plurality of virtual objects, such as object 706a, object 706d, and object 706e in FIG. 7C, and the second set of one or more virtual objects includes a second plurality of virtual objects that are different from the one or more virtual objects in the first plurality of virtual objects (820), such as object 706b and object 706c in FIGS. 7D and 7D1. For example, the first set of virtual objects optionally include two or more virtual objects; similarly, the second set of virtual objects optionally include two or more virtual objects. Including a plurality of virtual objects in respective sets of virtual objects reduces user input to separately rearrange such virtual objects.

In some embodiments, the first plurality of virtual objects are included in the first set of one or more virtual objects in accordance with a determination that a first spatial relationship of the first plurality of virtual objects satisfies one or more second criteria, different from the one or more first criteria, relative to the three-dimensional environment (e.g., and/or relative to a viewpoint of the user), such as a spatial relationship between object 706a, object 706d, and object 706e in FIG. 7C, and wherein the second plurality of virtual objects are included in the second set of one or more virtual objects in accordance with a determination that a second spatial relationship of the second plurality of virtual objects satisfies the one or more second criteria relative to the three-dimensional environment (822), such as a spatial relationship between object 706b and object 706c in FIGS. 7D and 7D1. For example, the computer system optionally groups one or more virtual objects into the first set of one or more virtual objects and/or the second set of one or more virtual objects when the one or more virtual objects are relatively close together relative to the three-dimensional environment and/or apparently close together from the current viewpoint of the user. For example, the first set of one or more virtual objects are optionally grouped together when they are within a threshold distance (e.g., 0.0001, 0.001, 0.01, 0.1, 1, or 10 m) and/or are within an apparent angle threshold angle relative to the current viewpoint (e.g., 1, 3, 5, 10, 15, 30, 45, 60, 75, or 85 degrees), relative to the current viewpoint of the user and/or relative to another, adjacent virtual object. For example, the first set of virtual objects are optionally grouped together in accordance with a determination the respective virtual objects are within a first threshold distance of each other, and the second set of virtual objects are optionally grouped together in accordance with a determination that its respective virtual objects are the first threshold distance of each other, or a second threshold distance of each other, different from the first threshold distance. In some embodiments, such groupings are defined at least partially based on a spatial arrangement of the virtual objects relative to one another and the current viewpoint of the user, described further with reference to step(s) 824. In some embodiments, in accordance with a determination that the first spatial relationship of the first plurality of virtual objects do not satisfy the one or more second criteria, the computer system forgoes grouping of the first plurality of objects into the first set of one or more virtual objects, and in accordance with a determination that the second spatial relationship does not satisfy the one or more second criteria, the computer system optionally forgoes grouping of the second plurality of objects. In some embodiments, a respective spatial arrangement of a respective virtual object does not satisfy the one or more second criteria relative to the three-dimensional environment, and the computer system forgoes including the respective virtual object in a corresponding set of one or more virtual objects associated with the respective spatial arrangement. Including respective virtual objects in a respective set of one or more virtual objects based on a spatial arrangement of the one or more virtual objects reduces user input required to manually group the set of virtual objects and improves the likelihood that proximal virtual objects are recentered together due.

In some embodiments, in accordance with a determination that the first plurality of virtual objects is a first distance from the current viewpoint of the user, such as a distance between object 706a and viewpoint 726, the one or more second criteria include a criterion that is satisfied when the first plurality of virtual object are within a first threshold angle of separation of each other relative to the current viewpoint of the user (824a), such as an angle of separation relative to viewpoint 726 between object 706a and object 706d and/or object 706e. In some embodiments, the computer system determines distance between a plurality of virtual objects and the current viewpoint of the user based on an average distance between respective objects of the plurality of virtual objects and the current viewpoint, the distance of the furthest away respective object, the distance of the closest object, a median distance of the plurality of virtual objects, and/or some other weighted distance based on the respective distances of the plurality of virtual objects. Additionally or alternatively, the computer system optionally groups virtual objects based on an angle between the first viewpoint and one or more of the plurality of virtual objects. For example, the computer system optionally groups virtual objects that are far away from the current viewpoint of the user having a relatively narrow apparent angle (e.g., within 1, 3, 5, 10, 15, 30, 45, 60, 75, or 85 degrees) between the virtual objects in a respective set of virtual objects relative to the current viewpoint of the user, as compared to similar virtual objects of a different set of virtual objects relatively closer to the current viewpoint. In some embodiments, the angle between virtual objects corresponds to an angle that is formed between respective vectors extending from the first viewpoint of the user to a respective portion (e.g., a center) of a respective virtual object. In some embodiments, such an angle is determined based on a projection of the respective vectors (e.g., on to a plane associated with the current viewpoint of the user, such as a plane parallel to the floor of the environment and/or the eyes of the user). In some embodiments, in accordance with a determination that the first plurality of virtual objects is the first distance from the current viewpoint of the user, the one or more second criteria include a criterion that is satisfied when the first plurality of virtual objects are within a first threshold distance (e.g., 0.0001, 0.001, 0.01, 0.1, 1, or 10 m) of each other relative to the three-dimensional environment (optionally alternatively or in addition to the criterion that is satisfied when the first plurality of virtual object are within the first threshold angle of separation of each other relative to the current viewpoint of the user).

In some embodiments, in accordance with a determination that the first plurality of virtual objects is a second distance, less than the first distance, from the current viewpoint of the user, such as a distance of object 706a less than as shown in FIG. 7C, the one or more second criteria include a criterion that is satisfied when the first plurality of virtual object are within a second threshold angle of separation, greater than the first threshold angle of separation, of each other relative to the current viewpoint of the user (824*b*), such as an angle of separation greater than angles between object 706*a* and object 706*d* and/or object 706*e*. For example, when the first plurality of objects is relative closer to the current viewpoint of the user, the computer system optionally more generously groups the virtual objects together, despite a relatively greater angle of separation, because the first plurality of object are within a second threshold angle (e.g., 3, 5, 10, 15, 30, 45, 60, 75, 85, or 90 degrees) of each other. In some embodiments, in accordance with a determination that the first plurality of virtual objects is the second distance from the current viewpoint of the user, the one or more second criteria include a criterion that is satisfied when the first plurality of virtual objects are within a second threshold distance (e.g., 0.001, 0.01, 0.1, 1, 10, or 100 m) of each other relative to the three-dimensional environment, different from (e.g., greater than) the first threshold distance (optionally alternatively or in addition to the criterion that is satisfied when the first plurality of virtual object are within a second threshold angle of separation, greater than the first threshold angle of separation, of each other relative to the current viewpoint of the user). Including virtual objects in a set of virtual objects in accordance with a determination that the virtual objects are within a threshold angle of separation that is based on a distance between the current viewpoint and the virtual objects reduces the likelihood that the computer system includes unwanted virtual objects in a set of virtual objects, thereby reducing user input to modify groups to correct for such unwanted inclusion.

In some embodiments, a relative first spatial relationship between the first set of one or more virtual objects, such as the spatial arrangement of object 706*a*, object 706*d*, and object 706*e* in FIG. 7A, and the second set of one or more virtual objects, such as object 706*b* and object 706*c*, is maintained in response to detecting the event and displaying the at least the portion of the first set of one or more virtual objects at the position with the updated first spatial arrangement or displaying the at least the portion of the second set of one or more virtual objects at the position with the updated second spatial arrangement (826), such as the spatial arrangement of the objects in FIG. 7C. For example, the computer system optionally maintains a relative position and/or orientation between the plurality of virtual objects (e.g., the first and the second set of one or more virtual objects) when recentering the plurality of virtual objects. Maintaining a relative spatial relationship between the plurality of virtual objects reduces the likelihood the user of the computer system is unaware about an updated, relative position of a virtual object after recentering the plurality of virtual objects, thereby reducing user input to locate and/or move the plurality of virtual objects to locate a moved virtual object.

In some embodiments, before detecting the event, the first set of one or more virtual objects have a third spatial arrangement relative to each other, such as the spatial arrangement between objects 706*a*, object 706*d*, and object 706*e*, and the second set of one or more virtual objects have a fourth spatial arrangement relative to each other (828*a*), such as the spatial relationship between object 706*b* and object 706*c*. For example, the first set of virtual objects and the second set of virtual objects are respectively arranged with positions and/or orientations relative to other objects included in their respective set of virtual objects.

In some embodiments, in response to detecting the event (828*b*) the first set of one or more virtual objects maintain the third spatial arrangement relative to each other (828*c*), and the second set of one or more virtual objects maintain the fourth spatial arrangement relative to each other (828*d*), such as the spatial arrangement of objects displayed as shown in FIG. 7F. For example, the computer system maintains the positions and/or orientations between respective objects of a set of one or more virtual objects leading up to the event, and in response to recentering (e.g., in response to the event), even though the two sets of objects optionally change position and/or orientation, as a group, in the three-dimensional environment in response to detecting the event. Maintaining spatial arrangements between respective objects of a set of virtual objects reduces the likelihood the user of the computer system is unaware about an updated, relative position of a virtual object after recentering the plurality of virtual objects, thereby reducing user input to locate and/or move the plurality of virtual objects to locate a moved virtual object.

In some embodiments, while displaying the at least the portion of the first set of one or more virtual objects at the position having the first updated spatial arrangement relative to the current viewpoint of the user and while the current viewpoint of the user is a first viewpoint, such as how displayed in FIGS. 7D and 7D1, the computer system detects (830*a*), via the one or more input devices, a change in the current viewpoint of the user from the first viewpoint to a second viewpoint, different from the first viewpoint, wherein the second viewpoint differs from the first viewpoint along a first axis and along a second axis, different from the first axis, such as the change in viewpoint 726 from FIGS. 7D and 7D1 to FIG. 7E and/or FIG. 7F. For example, the computer system optionally detects a change in current viewpoint rotating along a first, second, and/or third axis, optionally extending relative to the user of the computer system. Such axes, for example, optionally correspond to a vertical axis extending from a floor to a ceiling of the three-dimensional environment, a depth axis extending from a wall behind the user's current viewpoint to a wall in front of the current viewpoint, and a horizontal axis extending from left to right relative to the current viewpoint, optionally mutually orthogonal with the vertical and the depth axes. In some embodiments, the computer system rotates and/or translates a set of one or more virtual objects that are a recent target of user attention along multiple axes in response to a recentering input, and rotates and/or translates an alternative set of one or more virtual objects along a first axis of the multiple axes in response to the recentering input, but does not rotate and/or translate the alternative set of one or more virtual objects along a second axis of the multiple axes. In some embodiments, the first, second, and/or third axes are mutually orthogonal. In some embodiments, the first, second, and/or third axes are centered on a portion of the user's body (e.g., a center of the head of the user, a center of the body of the user, and/or a hand of the user assuming a particular air pose). For example, the first, second, and/or third axes are optionally arranged such that a center of a head of the user is at the origin of the axes. In some embodiments, the first, second, and/or third axes are determined relative to the physical environment of the user.

In some embodiments, while the current viewpoint of the user is the second viewpoint, the computer system detects (830*b*), via the one or more input devices, a second event, different from the event, corresponding to a request to arrange (e.g., recenter) one or more virtual objects relative to the current viewpoint of the user, such as an event including input 780 in FIG. 7E. For example, the second event has one or more characteristics of the event described with reference to step(s) 802.

In some embodiments, in response to detecting the second event, and in accordance with a determination that the attention of the user of the computer system relative to the first set of one or more virtual objects satisfied the one or more first criteria at a respective second time corresponding to the second event (830c), such as indicated by time period 738 in FIG. 7E, (e.g., the attention satisfied the one or more first criteria at a respective second time similar to as described with reference to satisfaction of the one or more first criteria at the respective time with reference to step(s) 802) the computer system updates (830d) a spatial arrangement of the first set of one or more virtual objects relative to the current viewpoint of the user along the first axis and along the second axis, such as the spatial arrangement of object 706b and object 706c in FIG. 7F. For example, the computer system optionally rotates the first set of one or more virtual objects based on the change in current viewpoint along the first, second, and/or third axis described previously. When, for example, the current viewpoint rotates a first amount along the first axis and a second amount along the second axis, the computer system optionally displays a recentered object rotated by the first amount and/or the second amount at an updated position. In some embodiments, the computer system additionally translates the first set of one or more virtual objects along the first, second, and/or third axis based on a degree of translation of the current viewpoint. In some embodiments, the computer system forgoes (830c) updating a spatial arrangement of the second set of one or more virtual objects along the first axis, such as the spatial arrangement of object 706a, object 706d, and object 706c. For example, the computer system optionally does not rotate and/or translate the second set of one or more virtual objects along the first, second, and/or third axis. As an additional example, after the user of the computer system changes the current viewpoint along a first axis (e.g., an axis extending through a head of the user (e.g., vertically from a base of the user's head to the crown of the user's head)) and along a second axis (e.g., an axis extending through a head of the user (e.g., horizontally, from a first side of the user's head (e.g., from a first ear) to a second side of the user's head (e.g., to a second ear)), in response to detecting the second event when the first set of one or more virtual objects are the primary target of recentering operations, the computer system optionally rotates and/or translates the first set of one or more virtual objects along the first and the second axes. In contrast, in response to the second event, the computer system optionally forgoes rotating and/or translating the second set of one or more virtual objects along the second axis (e.g., the horizontal axis). As described with reference to step(s) 832, the computer system optionally rotates and/or translates the second set of one or more virtual objects along the first axis (e.g., the vertical axis) in response to the second event. It is understood that when user attention relative to another set of one or more virtual objects (e.g., the second set) satisfied the one or more criteria at the second respective time, the computer system optionally performs rotating and/or updating of the spatial arrangement of the alternative set of one or more virtual objects, and forgoes rotating and/or updating of the spatial arrangement of the first set of one or more virtual objects, similarly as described above with respect to the first set. Displaying a respective set of one or more virtual objects with an updated spatial arrangement along a first and a second axis while forgoing displaying another respective set of one or more virtual objects with an updated spatial arrangement along the first axis reduces the likelihood the computer system displays unwanted visual clutter that was not a primary target of recentering operations, thereby reducing processing to display the unwanted virtual objects with additional changes in spatial arrangement and reducing user input required to mitigate unwanted visual clutter.

In some embodiments, in response to detecting the second event, such as including detection of the input 780 in FIG. 7E, and in accordance with the determination that the attention of the user of the computer system relative to the first set of one or more virtual objects satisfied the one or more first criteria at the respective second time corresponding to the second event, such as similar to attention indicated by time period 738, the computer system updates (832) the spatial arrangement of the second set of one or more virtual objects along the second axis, such as the updated spatial arrangement of object 706a, object 706d, and object 706e. For example, as described with reference to step(s) 830, the computer system optionally rotates and/or translates the second set of virtual objects along the second axis (e.g., the horizontal axis) while forgoing rotation along the first axis (e.g., the vertical axis). Displaying a respective set of one or more virtual objects with an updated spatial arrangement along a first and a second axis while displaying another respective set of one or more virtual objects with an updated spatial arrangement along the second axis improves the visibility of the other set of one or more virtual objects with introducing unwanted visual clutter otherwise created by rotating the other set of one or more virtual objects along the first axis, thereby reducing user input required to mitigate such unwanted visual clutter.

In some embodiments after displaying the at least the portion of the first set of one or more virtual objects at the position having the first updated spatial arrangement, such as the display arrangement of virtual objects in FIG. 7F, the computer system detects (834a), via the one or more input devices, a second event, different from the event, corresponding to a request to arrange (e.g., recenter) one or more virtual objects relative to the current viewpoint of the user, such as an event including detecting input 780 in FIG. 7G. For example, the second event has one or more characteristics of the event described with reference to step(s) 802.

In some embodiments, in response to detecting the second event (834b), in accordance with a determination that the attention of the user satisfied the one or more first criteria relative to the first set of one or more virtual objects at a respective second time, different from the respective time, corresponding to the second event (834c), such as attention relative to object 706c as indicated by time period 738 in FIG. 7 (For example, similar to or the same as described with reference to satisfaction of the one or more first criteria at the respective time in step(s) 802), in some embodiments, in accordance with a determination that the position that has the first updated spatial arrangement relative to the current viewpoint is further than a threshold distance away from a location corresponding to a floor of the three-dimensional environment, such as a position corresponding to that of object 706c in FIG. 7H not closer than threshold 740 from the floor of the three-dimensional environment 902, the computer system displays (834d), via the display generation component, at least a portion of the first set of one or more virtual objects at the position that has the first updated spatial arrangement relative to the current viewpoint, such as object 706c in FIG. 7H. For example, when the recentered position (e.g., the position that has the first updated spatial arrangement relative to the current viewpoint) where the at least the portion of the first set of one or more virtual objects would be displayed is outside of a threshold distance (e.g., 0, 1, 5, 10, 20, 30, 40, 50, 100, 200, 300, 400, 500, 1000 or 2000 centimeters) of a physical floor of a physical environment of the user, the computer system optionally displays the at least portion of the first set of one or more virtual objects at that recentered position.

In some embodiments, in accordance with a determination that the position that has the first updated spatial arrangement relative to the current viewpoint is closer than the threshold distance from the location corresponding to the floor of the three-dimensional environment, such as the position indicated by frame 742c in FIG. 7H, the computer system displays (834c), via the display generation component, the at least portion of the first set of one or more virtual objects at a position that has a third updated spatial arrangement, different from the position that has the first updated spatial arrangement, such as a spatial arrangement of the position at which object 706c and/or object 706b are displayed relative to viewpoint 726, relative to the current viewpoint, wherein the position that has the third updated spatial arrangement relative to the current viewpoint is further than the threshold distance away from the location corresponding to the floor of the three-dimensional environment, such as the position of object 706c in FIG. 7H. For example, when a requested recentered position corresponds to a position within the threshold distance of the physical floor (e.g., when a portion of an object of the at least the portion of the first set of one or more virtual objects is within the threshold distance), the computer system optionally forgoes display of the at least the portion of the first set of one or more virtual objects at the originally requested, recentered position, and instead optionally displays the at least the portion of the first set of one or more virtual objects at a modified position (e.g., further from the floor and outside of the threshold distance of the floor). The modified position is optionally determined such that no portion of a respective object of the at least the portion of the first set of one or more virtual objects is within the threshold distance of the floor. For example, as described with reference to step(s) 830, the computer system optionally determines one or more axes such as a vertical axis extending from a floor of the three-dimensional environment toward a ceiling or sky of the three-dimensional environment, and the computer system optionally determines the modified position by translating the originally requested position (e.g., that would otherwise cause an apparent spatial conflict with the floor) along the vertical axis. In some embodiments, when the second set of one or more objects are the primary target of the recentering operation, and the computer system determines that a requested, recentered position of a portion of the second set of one or more virtual objects extends into the threshold distance relative to the physical floor, the computer system displays the portion of the second set of one or more virtual objects at a modified position, avoiding display of virtual content within the threshold distance from the floor. Displaying virtual objects at an updated position with a spatial arrangement that is not within a threshold distance of the floor of the physical environment reduces the likelihood virtual content is difficult to view and/or interact with, thereby reducing user input to resolve an unfavorable viewing position and reduces the likelihood of presenting an apparent spatial conflict between the virtual object and a representation of the physical floor and/or a virtual floor of the three-dimensional environment.

In some embodiments, the event includes an input directed to a hardware input element of the computer system (836a), such as input 780 in FIGS. 7A, 7B, 7E, and/or 7G and in some embodiments, in response to detecting the event, the computer system generates (836b) a respective non-visual output that corresponds to the input directed to the hardware input element, wherein the respective non-visual output is different from one or more non-visual outputs that are generated in response to different inputs directed to the hardware input element, described further with reference to method 1000 and/or FIGS. 9A-9G.

It should be understood that the particular order in which the operations in method 800 have been described is merely exemplary and is not intended to indicate that the described order is the only order in which the operations could be performed. One of ordinary skill in the art would recognize various ways to reorder the operations described herein.

FIGS. 9A-9G illustrate examples of a computer system recentering or gathering one or more virtual objects to a viewpoint of a user in accordance with some embodiments.

Figure 9A:
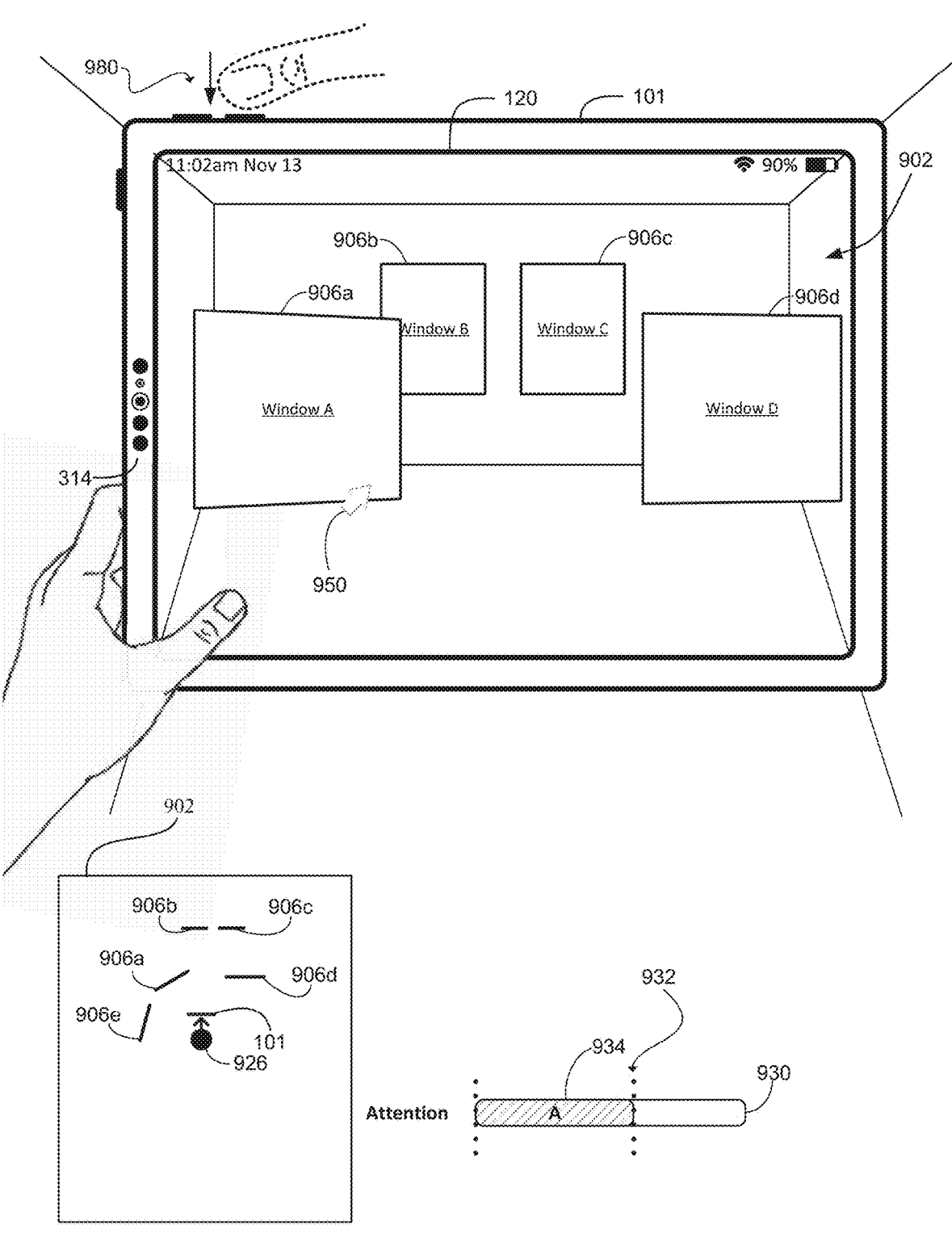
FIGS. 9A-9G illustrate examples of a computer system recentering or gathering one or more virtual objects to a viewpoint of a user in accordance with some embodiments.

FIG. 9A illustrates a three-dimensional environment 902 visible via a display generation component (e.g., display generation component 120 of FIG. 1) of a computer system 101, the three-dimensional environment 902 visible from a viewpoint 926 of a user illustrated in the profile view within the overhead legend (e.g., facing the back wall of the physical environment in which computer system 101 is located). As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 9A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 902 and/or the physical environment is visible in the three-dimensional environment 902 via the display generation component 120. For example, three-dimensional environment 902 visible via display generation component 120 includes representations of the physical floor and back and side walls of the room in which computer system 101 is located.

In FIG. 9A, three-dimensional environment 902 also includes virtual objects 906a, 906b, 906c, and 906d that are visible from viewpoint 926, and virtual object 906e that is not visible from viewpoint 926 (e.g., not displayed). In FIG. 9A, objects 906a, 906b, 906c, 906d, and 906e are two-dimensional objects, but the examples of the disclosure optionally apply equally to three-dimensional objects. Virtual objects 906a, 906b, 906c, 906d, and 906e are optionally one or more of user interfaces of applications (e.g., messaging user interfaces or content browsing user interfaces), three-dimensional objects (e.g., virtual clocks, virtual balls, and/or virtual cars) and/or any other element displayed by computer system 101 that is not included in the physical environment of computer system 101.

In some embodiments, computer system 101 detects an event, such an event including one or more inputs represented by input 980, including a request to arrange virtual content relative to viewpoint 926. For example, as described further with reference to method 1000, computer system 101 optionally detects one or more air gestures performed by a body of the user of computer system 101 (e.g., an air pinch gesture including a contact of fingers of the user's hand detected via image sensors 314), and/or one or more contacts with a surface (optionally concurrently, optionally with a touch-sensitive surface in communication with computer system 101 and/or a non-touch sensitive surface monitored by computer system 101), maintaining of the one or more contacts, and/or movement of the one or more contacts, one or more selection inputs directed to control circuitry (e.g., a mechanical button), and/or other physical manipulation of control circuitry (e.g., a rotating of the mechanical button or another button). In response to detecting the one or more inputs, computer system 101 optionally initiates one or more operations to rearrange (e.g., concurrently rearrange) the virtual content, including objects 906a, 906b, 906c, 906d, and 906c.

In some embodiments, in response to detecting the event, computer system 101 determines a target of the rearrangement operation(s). In some embodiments, the determining of the target of the rearrangement operation(s) has one or more characteristics of similar operations and determinations described with respect to method 800, such as one or more recentering operations. For example, computer system 101 optionally at least partially determines the target of the rearrangement operations based on recent one or more targets of the user's attention (e.g., virtual objects that attention of the user is and/or was directed to). Cursor 950, for example, is optionally indicative of attention of the user (e.g., including gaze of the user). Timeline 930 is optionally representative of the passing of time as the user interacts with three-dimensional environment 902, including window 932—corresponding to a period of time during timeline 930 leading up to the moment in time the event is detected—and indications of targets of attention, such as an amount of time represented by time period 934 during which object 906a is and/or was a recent target of the user's attention. In response to detecting input 980, computer system 101 optionally determines that attention of the user relative to object 906a satisfied one or more criteria (e.g., described further with reference to methods 800 and 1000) at a respective time (e.g., the respective time corresponding to and/or including the rightmost, dashed-line edge of window 932), and optionally initiates one or more rearrangement operations to modify the arrangement of virtual objects 906a, 906b, 906c, 906d, and 906e to improve visibility of object 906a (e.g., because attention of the user relative to object 906a satisfied the one or more criteria, described further with reference to methods 800 and/or 1000). It is understood that the computer system 101 is optionally configured to initiate the rearrangement operation(s) in response to detecting one or more other events, described further with reference to method 1000.

In some embodiments, computer system 101 detects one or more characteristics of the event, such as one or more characteristics of user input included in the event. For example, computer system 101 optionally detects input 980, corresponding to a selection of a mechanical control element (e.g., a button, joystick, an electromechanical crown button).

Input 980 optionally has one or more characteristics, including but not limited to a direction of manipulation of the hardware control (e.g., manipulating the crown clockwise or counterclockwise, and/or manipulating a joystick upward, downward, leftward, diagonally), and/or a magnitude of the manipulation and/or selection (e.g., an amount of pressure contacting a button or surface, a duration of the selection, and/or a rate of change of the input). Additionally or alternatively, the one or more characteristics of the input optionally include a duration of one or more selection inputs (e.g., maintenance of one more presses of the button, contacts with a trackpad, and/or of an air gesture (e.g., maintained contact between fingers in an air pinch pose)), a number of selection inputs received within a threshold amount of time (e.g., 0.001, 0.01, 0.1, 1, 10, or 100 seconds) and/or a variable window of time (e.g., consecutive presses of the button, contacts with the trackpad, and/or air pinches and air de-pinches (e.g., including a contacting and a separating of fingers of a hand). In some embodiments, the one or more inputs include some combination of the one or more inputs described herein, and the one or more characteristics of the one or more inputs include some combination of the one or more characteristics described herein. Such input(s) and characteristic(s) are further described with reference to method 1000. In some embodiments, the computer system is configured to perform rearrangement operations described with reference to FIGS. 9A-9G in response to and based on suitable additional or alternative events, inputs, and characteristics of such events and/or inputs not expressly described herein.

In some embodiments, computer system 101 initiates one or more different rearrangement operations (or other operations) based on the one or more characteristics of the event, such as the one or more characteristics of the input. For example, input 980 illustrated in FIG. 9A optionally includes a selection of mechanical, electromechanical, and/or virtual crown (e.g., a pressing and holding of a push button configured to optionally rotate) for a first period of time.

Figure 9B:
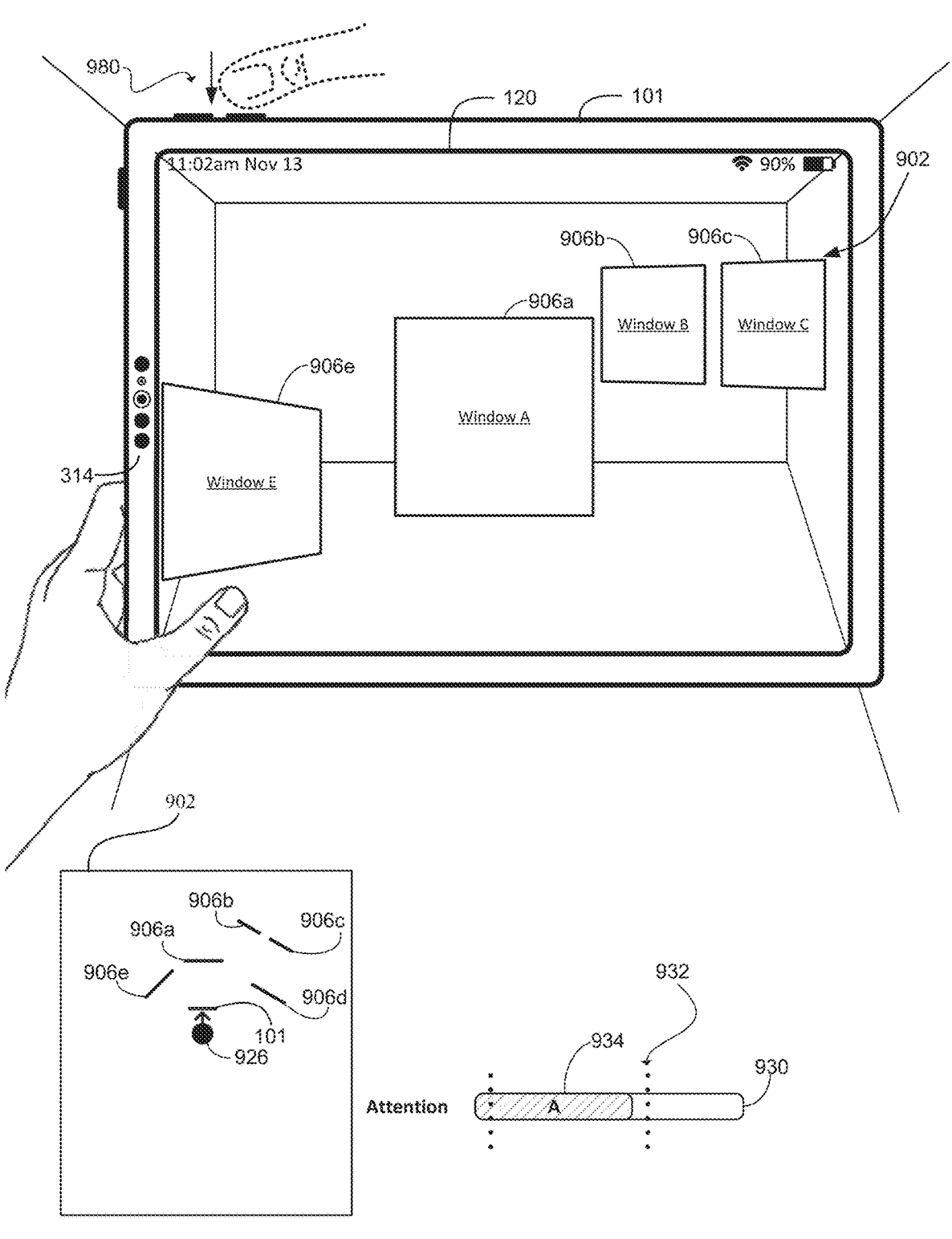

From FIG. 9A to FIG. 9B, in response to detecting an event including input 980 in FIG. 9A, and in accordance with a determination that the selection was maintained for the first period of time, computer system 101 initiates a recentering operation relative to objects 906a-906c (e.g., first one or more recentering operations), as described further with reference to method 800 and/or method 1000. In some embodiments, the recentering operations include moving object 906a to an updated position that is at a relative center of the user's field-of-view corresponding to viewpoint 926, in accordance with a determination object 906a satisfied the one or more criteria at respective time (e.g., object 906a was the primary target of the user's attention leading up to when the event was detected). In some embodiments, in addition to moving object 906a, computer system 101 concurrently moves object 906b and 906c to updated positions (e.g., to the right), additionally initiates display of and moves object 906e, and additionally moves and ceases display of object 906d. As illustrated in the overhead view, computer system 101 optionally maintains an understanding of respective positions of objects 906a-906e relative to three-dimensional environment 902 and/or viewpoint 926, independent of whether the respective object is displayed, not displayed, or partially displayed. In some embodiments, during the recentering operations, computer system 101 optionally maintains a relative arrangement of the objects 906a-906e between each other, and optionally translates and/or rotates the objects 906a-906e by a same magnitude and/or in a same direction relative to viewpoint 926, as illustrated by the similar and/or same relative arrangement of objects 906a-906e in the overhead view from FIG. 9A to FIG. 9B. In some embodiments, in conjunction with performing the recentering operations (e.g., an in response to detecting selection of a mechanical, electromechanical, and/or virtual crown such as a short press or a long press), the device generates a non-visual feedback (e.g., an audio, tactile and/or haptic output) indicating that the recentering operation was performed. In some embodiments, the non-visual feedback is generated in response to an input directed to a respective hardware control (e.g., a mechanical, electromechanical, and/or virtual crown) is the same as non-visual feedback generated by the device in response to other inputs corresponding to interaction with a respective hardware control. In some embodiments, the non-visual feedback is generated in response to an input directed to a respective hardware control (e.g., a mechanical, electromechanical, and/or virtual crown) is different from (e.g., in duration, amplitude, tone, frequency, and/or waveform) non-visual feedback generated by the device in response to other inputs corresponding to interaction with a respective hardware control. Examples of other inputs corresponding to interaction with a respective hardware control include: a short press which causes the device to perform a different operation (e.g., displaying a system user interface with a plurality of user interface objects that, when selected perform corresponding system operations) and corresponds to a non-visual feedback in response to the press input; a double press which causes the device to perform a different operation (e.g., hide one or more virtual elements, or optionally all virtual elements, to make additional elements of the physical element visible via optical or digital passthrough) and corresponds to a non-visual feedback in response to the first press, the second press or both presses; and/or a crown rotation (e.g., to increase or decrease a variable parameter such as display brightness, volume, and/or a degree of immersion of a virtual environment) and corresponds to a non-visual feedback in response to the rotation and/or multiple non-visual feedback components in response to continued rotation (e.g., based on a speed, duration, and/or magnitude of the rotation). In some embodiments, the non-visual feedback generated in conjunction with one or more recentering operations is generated in response to user input (e.g., one or more inputs 780 and/or 980 described with reference to methods 800 and 1000, respectively).

In some embodiments, after recentering objects 906a-e and while such objects are presented in the recentered arrangement illustrated in FIG. 9B, computer system 101 optionally detects an event including a consecutive, second request to recenter the objects. In response to the event, and in accordance with a determination that the primary target of the user's attention is the same when the first recentering request and the second recentering request are received (e.g., attention was directed to the same virtual objects, for relatively same proportions of time), computer system 101 optionally forgoes recentering of the objects 906a-e (e.g., because the objects 906a-e are already presented and/or centered upon the primary target of recent user attention).

In some embodiments, computer system 101 detects a second event that has one or more characteristics different from the previous event (e.g., the event that resulted in recentering of objects). As described previously, in response to detecting different one or more characteristics of respective input(s), computer system 101 optionally initiates one or more operations different from the recentering operations. For example, input 980 in FIG. 9B optionally includes selection of the electromechanical or virtual crown for a second period of time, different (e.g., greater and/or lesser) from the first period of time that caused initiation of the one or more recentering operations (e.g., different than input 980 in FIG. 9A). Additionally or alternatively, input(s) included in the second event optionally include a concurrent selection of multiple hardware or virtual controls that were not included in the input included in the first event (e.g., a concurrent contact between two fingers and a trackpad in communication with computer system 101 and/or a concurrent selecting of a first hardware button and a second hardware button) In some embodiments, the recentering event included input 980 in FIG. 9B optionally includes a concurrent selection of at least partially different hardware or virtual controls (e.g., concurrently selecting a first hardware button and a third hardware button) or a different number of concurrent contacts with a surface (e.g., recentering in response to a first finger contacting a trackpad, and performing other operation(s) as described further below in response to the first finger and a second finger contacting a trackpad) relative to the input(s) detected to initiate the recentering operations in FIG. 9A. It is understood that the embodiments described with reference to FIGS. 9A-9G optionally are triggered in response to any manner of suitable inputs and/or differentiated between (e.g., by computer system 101) via any suitable one or more characteristics of the input.

In response to detecting the second event including the input, computer system 101 optionally detects that object 906a satisfied the one or more criteria at a respective time (e.g., object 906a was the primary target of the user's attention (e.g., attention was directed to object 906a for a greater amount of time compared to other objects) within window 932 leading up to the time the event including the input 980 in FIG. 9B is detected), and initiates one or more rearrangement operations of objects 906a-906e, different from the recentering operations.

FIG. 9A1 illustrates similar and/or the same concepts as those shown in FIG. 9A (with many of the same reference numbers). It is understood that unless indicated below, elements shown in FIG. 9A1 that have the same reference numbers as elements shown in FIGS. 9A-9G have one or more or all of the same characteristics. FIG. 9A1 includes computer system 101, which includes (or is the same as) display generation component 120. In some embodiments, computer system 101 and display generation component 120 have one or more of the characteristics of computer system 101 shown in FIGS. 9A and 9A-9G and display generation component 120 shown in FIGS. 1 and 3, respectively, and in some embodiments, computer system 101 and display generation component 120 shown in FIGS. 9A-9G have one or more of the characteristics of computer system 101 and display generation component 120 shown in FIG. 9A1.

In FIG. 9A1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 9A-9G.

In FIG. 9A1, display generation component 120 is illustrated as displaying content that optionally corresponds to the content that is described as being displayed and/or visible via display generation component 120 with reference to FIGS. 9A-9G. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 9A1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 9A1. Because display generation component 120 is optionally a head-mounted device, the field of view of display generation component 120 is optionally the same as or similar to the field of view of the user.

In FIG. 9A1, the user is depicted as performing an air pinch gesture (e.g., with hand 980-2) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 9A-9G.

In some embodiments, computer system 101 responds to user inputs as described with reference to FIGS. 9A-9G.

In the example of FIG. 9A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 9A-9G and/or described with reference to the corresponding method(s) are optionally implemented on computer system 101 and display generation unit 120 in a manner similar or analogous to that shown in FIG. 9A1.

Figure 9C:
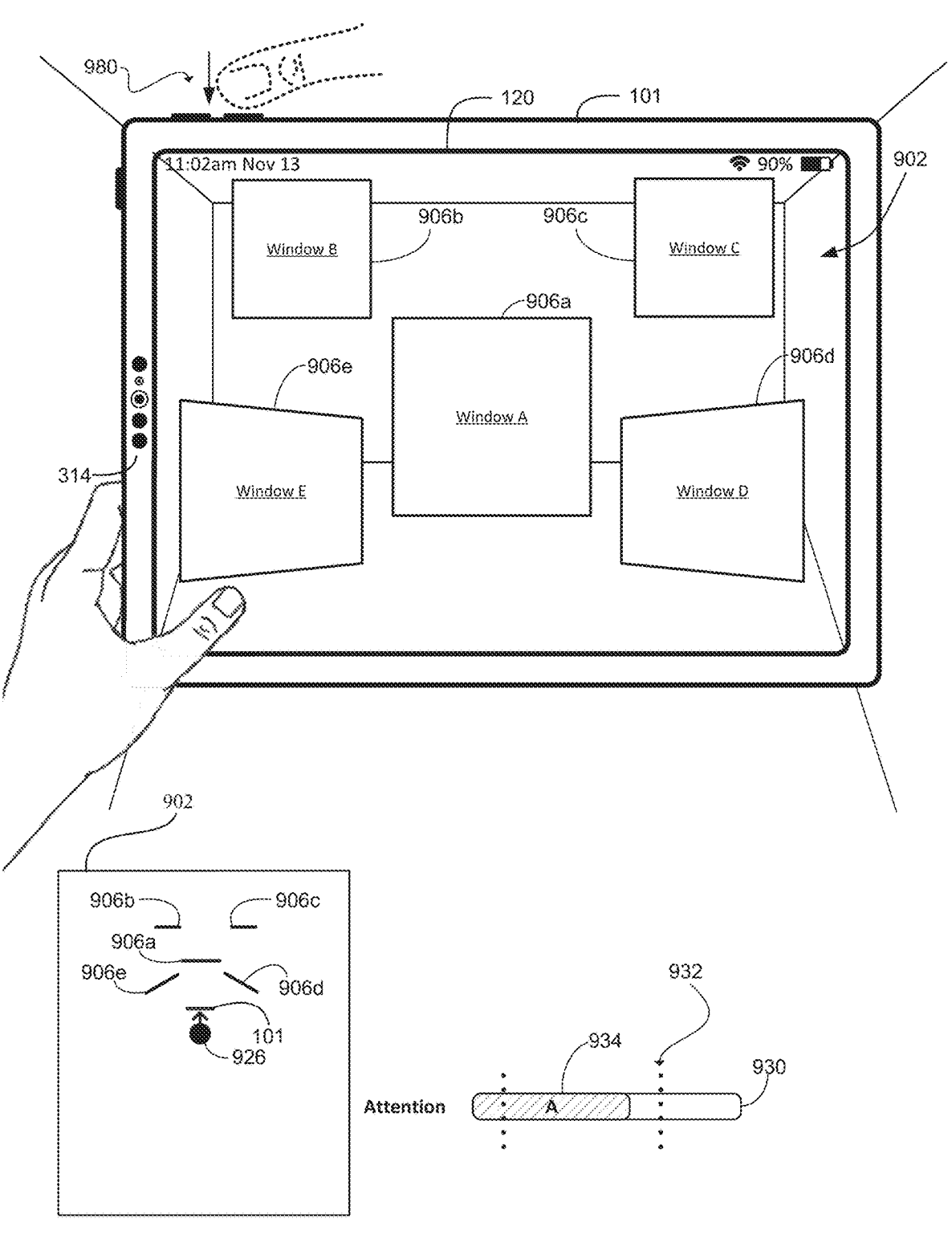

From FIG. 9B to FIG. 9C, computer system 101 rearranges objects 906*a*-906*e* to updated positions to improve visibility of respective virtual content included within objects 906*a*-906*c*. Rearranging virtual content (e.g., objects 906*a*-906*e*) such that the majority or all virtual objects are concurrently visible (e.g., displayed) by computer system 101 as shown in FIG. 9C is optionally referred to as "gathering" the virtual content. Similar or the same arrangements that are the result of the gathering are referred to herein as a "gathered" arrangements, and performing one or more operations to assume the gathered arrangement are referred to herein as one or more "gathering" operations associated with the virtual content.

For example, objects 906*b*-906*e* are displayed with updated positions and orientations relative to their previous arrangement illustrated in FIG. 9B. In some embodiments, computer system 101 gathers virtual objects such that the majority, or all of the virtual objects are at least partially visible relative to a current viewpoint of the user when one or more inputs initiating gathering are detected. For example, interactive surfaces (e.g., a surface of a virtual object including virtual content the user is able to view and/or interact, such as media, user interfaces, and/or artistic features of the virtual content) of objects 906*a*-*e* are concurrently visible after the gathering operation, as shown in FIG. 9C. In some embodiments, in response to a request to gather the virtual content, computer system 101 maintains display of one or more virtual objects at a position within three-dimensional environment. For example, from FIG. 9B to FIG. 9C, object 906*a* continues to be displayed at its position as shown in FIG. 9B, without being rotated or moved by computer system 101. In some embodiments, to accommodate an improved viewing arrangement of objects 906*a*-*e*, computer system 101 displays object 906*a* at an updated position and/or orientation in response to a request to gather objects 906*a*-*c*.

In some embodiments, computer system 101 changes a relative arrangement between gathered objects (e.g., virtual objects rearranged in response to gathering operations). For example, object 906*b* and object 906*c* are raised relative to a floor of three-dimensional environment 902 from FIG. 9B to FIG. 9C in response to detecting the one or more gathering inputs, and displayed at positions toward the left and the right of object 906*a*, respectively, rather than immediately next to each other (e.g., as previously arranged in FIG. 9B). Additionally or alternatively, objects 906*d* and 906*e* are optionally displayed closer together from one another (e.g., relative to as previously arranged in FIG. 9B) with an updated orientation, elevation, and apparent side-to-side position relative to viewpoint 926 and relative to object 906*a* in response to the request to gather objects 906*a*-*c*.

Similar to as described previously with reference to recentering of virtual objects, gathering of virtual objects is optionally based on a target of user's attention. For example, when input 980 in FIG. 9B is received, computer system 101 determines an amount of time attention of the user was directed to respective virtual objects within a window of time (e.g., extending backwards in time relative to when input 980 is received). Computer system 101 optionally determines that object 906*a* is a primary target of the gathering operation, for example, because attention of the user was primarily directed to object 906*a* within window 932, as indicated by the portion of time period 934 within window 932 and the lack of respective time periods within window 932 indicative of when the attention was directed to alternative virtual objects in FIG. 9B. In some embodiments, if attention was primarily directed to an alternative one or more objects (e.g., any one or more of objects 906*b*-*e* rather than object 906*a*) within window 932, computer system 101 optionally arranges the gathered objects with the alternative object(s) that were primary targets of user attention relatively closer to a center of the field-of-view of the user.

In some embodiments, computer system 101 gathers all available virtual content relative to viewpoint 926, independent of a grouping of the virtual objects. For example, as described with reference to method 800 and/or method 1000, computer system 101 optionally determines, receives, and/or previously received an indication of a grouping and/or clustering of virtual objects (e.g., based on a type of virtual content included in respective virtual objects of a group, a relative size, distance, and/or viewing angle of virtual content relative to viewpoint 926, and/or an express one or more inputs grouping virtual content). Computer system 101, for example, optionally determines a first group of objects (e.g., objects 906*a*-*c*) and a second group of objects (e.g., objects 906*d*-*c*) that are at least partially and optionally visible, or optionally not visible relative to viewpoint 926. In response to detecting one or more inputs requesting initiation of a gathering operation (e.g., similar or the same as the input gathering the virtual objects described previously), computer system 101 optionally moves objects 906*a-e* to an updated, gathered arrangement (e.g., as shown in FIG. 9C). In some embodiments, the relative position and/or orientation of virtual objects are determined based on the grouping of the virtual objects. For example, the virtual objects of respective groups are optionally displayed at a relatively same region of the three-dimensional environment 902 relative to viewpoint 926, and/or each group is displayed in a row and/or column relative to viewpoint 926.

In some embodiments, in response to detecting a third event, similar to the second event including the request to gather virtual objects, computer system 101 forgoes or modifies a gathered arrangement of the virtual objects. For example, in response to input 980 corresponding to a request for gathering of virtual objects in FIG. 9C, computer system 101 optionally forgoes performing an additional gathering of the objects 906*a-e*, because the objects are already presented with a gathered arrangement. Additionally or alternatively, computer system 101 optionally updates a relative arrangement of objects 906*a-e* in response to input 980 in FIG. 9C, continuing to present object 906*a-e* with an arrangement relative to viewpoint 926 to maintain visibility of interactive surfaces of such objects, but with modified positions and/or orientations relative to viewpoint 926 and each other. For example, in response to an additional one or more inputs initiating a gathering of the objects as shown in FIG. 9C (e.g., in response to input 980), computer system 101 optionally moves the objects to an updated arrangement to conform to a new primary target of attention of the user within window 932 of timeline 930 (e.g., if a user attention was primarily directed to an object other than object 906*a* within window 932). In the additionally updated arrangement, objects 906*a-e* are optionally displayed entirely within the field-of-view of the user at viewpoint 926, however with a different position and/or orientation than as shown in FIG. 9C, such as with object 906*b* near a relative center of the field-of-view of the user at viewpoint 926.

In some embodiments, in response to detecting a third event, different from respective event(s) including a request to recenter and/or gather the virtual objects, computer system 101 initiates a process to improve visibility of representations of a physical environment of the user of computer system 101. For example, the third event optionally includes detecting a rotation of an electromechanical or virtual crown button. In response to the rotating of the crown, computer system 101 optionally modifies a level of visual prominence of virtual content displayed via display generation component 120 with a magnitude corresponding to an amount of rotation of the crown and/or an increase or decrease of the level of visual prominence corresponding to a direction of the rotation. In some embodiments, computer system 101 modifies the level of visual prominence in response to and/or in accordance with a duration of a selection input (e.g., of the crown). For example, the change in level of visual prominence is predetermined and occurs in response to detecting the selection input maintained for an amount of time greater than a threshold amount of time (e.g., 0.001, 0.01, 0.1, 1, 10, 100, or 1000 seconds), and/or the level of visual prominence decreases or increases by an amount proportional to and/or based on the duration of the maintained selection input. As described previously, it is understood that input 980 optionally includes one or more inputs described previously with reference to the one or more characteristics of user input, such as the selection of the hardware control.

Figure 9D:
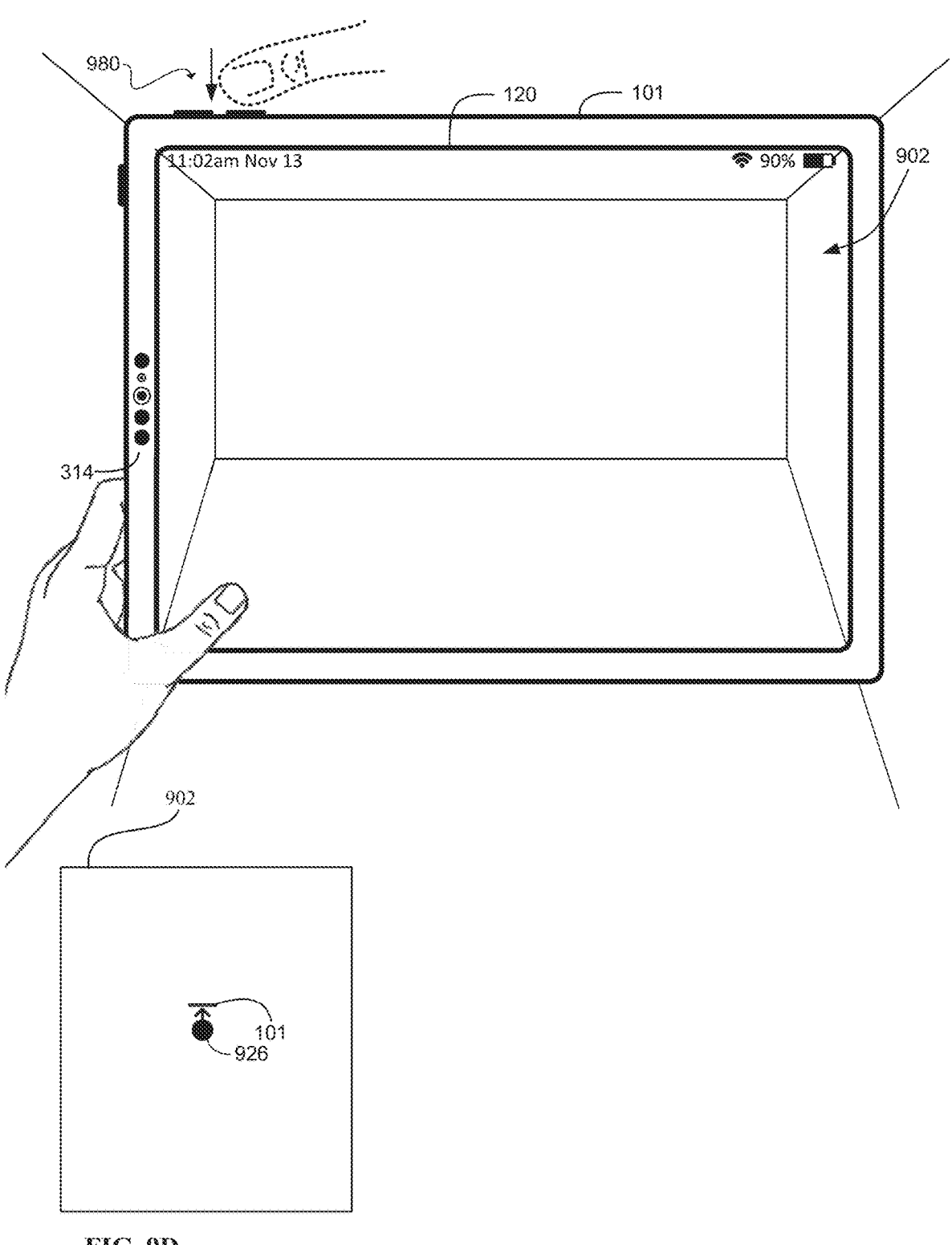

From FIG. 9C to FIG. 9D, in response to detecting an event including input 980 corresponding to a request to reduce the levels of visual prominence of objects 906*a-906e*, in FIG. 9C, computer system 101 optionally initiates one or more operations to reduce the levels of visual prominence of objects 906*a-906e*. For example, in response to detecting the event, and in accordance with a determination that a selection input directed to a hardware control is maintained for a period of time, different from a period of time associated with selection input(s) requesting a gathering and/or recentering of virtual content, computer system 101 modifies a level of visual prominence of objects 906*a-906e* relative to three-dimensional environment 902, described further with reference to method 1000.

In FIG. 9D, objects 906*a-e* have a reduced level of visual prominence in response to the input 980 received in FIG. 9C. As illustrated in FIG. 9D, the reduced level of visual prominence corresponds to a ceasing of display of the virtual objects. In some embodiments, the virtual objects are displayed with a modified visual appearance (e.g., a relatively lowered level of opacity, lower saturation, lower contrast, greater degree of a blurring effect, and/or greater radius of the blurring effect), described further with reference to method 1000. In some embodiments, in response to the input 980 detected in FIG. 9C, computer system 101 displays representations of a physical environment of the user of computer system 101, such as real-time or nearly real-time one or more images (e.g., video) collected by one or more cameras included in and/or in communication with computer system 101 that optionally were not displayed prior to reducing the level of visual prominence of virtual content (e.g., were not previously visible due to previously displayed virtual objects displayed within three-dimensional environment 902 at positions that were between viewpoint 926 and the representations of the physical environment, thereby obscuring the representations of the physical environment). In some embodiments, the representation of the physical environment corresponds to a view of the physical environment through a passive device (e.g., a lens, a film, a partially transparent screen) included in computer system 101, and/or a passive view of the physical environment via display generation component 120.

In some embodiments, computer system 101 detects an event (e.g., including input 980 in FIG. 9D) while virtual objects are not displayed and representations of the physical environment are fully visible, and in response to the event, displays a home user interface associated with computer system 101. For example, in FIG. 9D, input 980 includes a selection of a physical or virtual button consecutively (e.g., two, three, or four times) and/or a maintaining of a selection input for a period of time greater than a threshold amount of time (e.g., 0.001, 0.01, 0.1, 1, 10, or 100 seconds); in response to detecting input 980 in FIG. 9D, computer system 101 optionally concurrently displays objects 906*a-e* and the home user interface as shown in FIG. 9E.

In some embodiments, virtual objects are already displayed when a similar or the same event to the event described above (e.g., corresponding to input 980 when computer system 101 displays objects 906*a-e* as shown in FIG. 9C) is detected, and in response to the event, computer system 101 optionally displays the home user interface. For example, computer system 101 optionally initiates one or more operations to display a home user interface associated with an operating system of computer system 101. It is understood that description of similar event(s) and input(s) described with reference to FIG. 9D invoking the home user interface while virtual content is displayed with a reduced level of visual prominence similarly apply to invoking the home user interface in response to event(s) and/or input(s) such as input 980 illustrated in FIG. 9C.

Figure 9E:
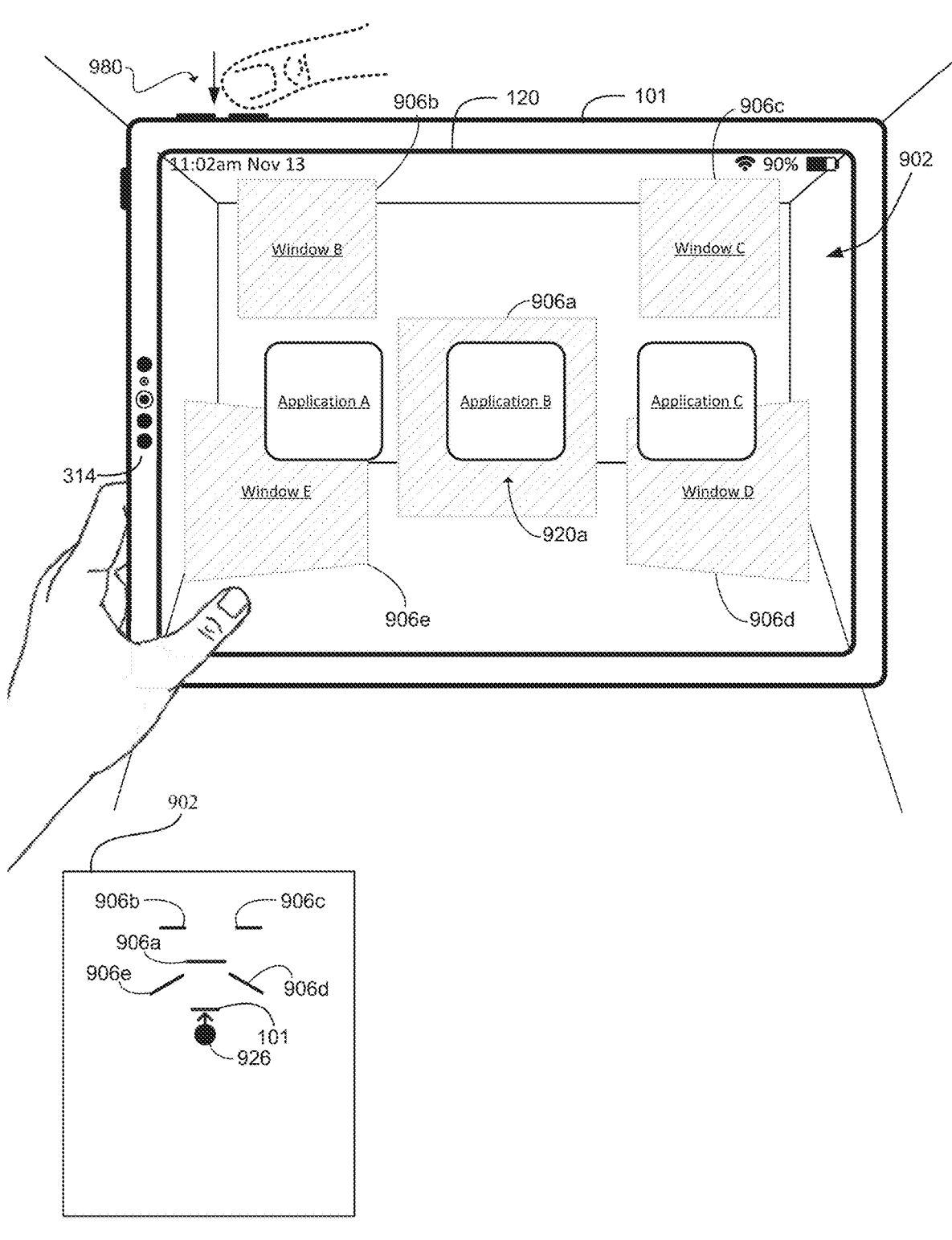

In FIG. 9E, computer system 101 concurrently displays a home user interface 920 and objects 906*a-e* in response to events including input 980 in FIG. 9C and/or in FIG. 9D, respectively corresponding to inputs requesting display of home user interface 920. In some embodiments, objects 906*a-e* are displayed at respective positions within the three-dimensional environment where such objects were previously displayed before their level of visual prominence was decreased (e.g., the same positions and/or orientations as illustrated in FIG. 9C). In some embodiments, the objects 906*a-e* are displayed with a relatively reduced visual prominence relative to the three-dimensional environment (e.g., a relatively lowered level of opacity, lower saturation, lower contrast, greater degree of a blurring effect, and/or greater radius of the blurring effect) while computer system 101 displays the home user interface 920 with a relatively higher level of visual prominence (e.g., a relatively higher level of opacity, higher saturation, higher contrast, lesser or no blurring effect, and a lesser radius of the blurring effect relative to three-dimensional environment 902). In some embodiments, home user interface 920 includes a plurality of representations of a plurality of software applications associated with an operating system of computer system 101 (e.g., included in memory included in computer system 101) and/or software applications that can be executed and/or are accessible using a current version of the operating system of computer system 101. In some embodiments, representations of the user's physical environment included in and/or corresponding to three-dimensional environment 902 are visible while objects 906*a-e* and home user interface 920 are concurrently displayed. In some embodiments, computer system 101 initiates one or more operations to launch software applications and/or communicate with the software applications in response to detecting a selection of a representation of a software application included in home user interface 920, described further with reference to method 1000.

In some embodiments, in response to detecting an event (e.g., including input 980 in FIG. 9E), computer system 101 displays immersive virtual content. For example, in FIG. 9E, input 980 includes a voice command, a rotating of an electromechanical or virtual crown button, selection of a physical or virtual button consecutively (e.g., two, three, four, or five times), and/or a maintaining of a selection input for an amount of time greater than a threshold amount of time (e.g., 0.001, 0.01, 0.1, 1, 10, or 100 seconds); in response to detecting the event including input 980 in FIG. 9E, computer system 101 optionally reduces a level of visual prominence of home user interface 920 and initiates display of such immersive virtual content.

Figure 9F:
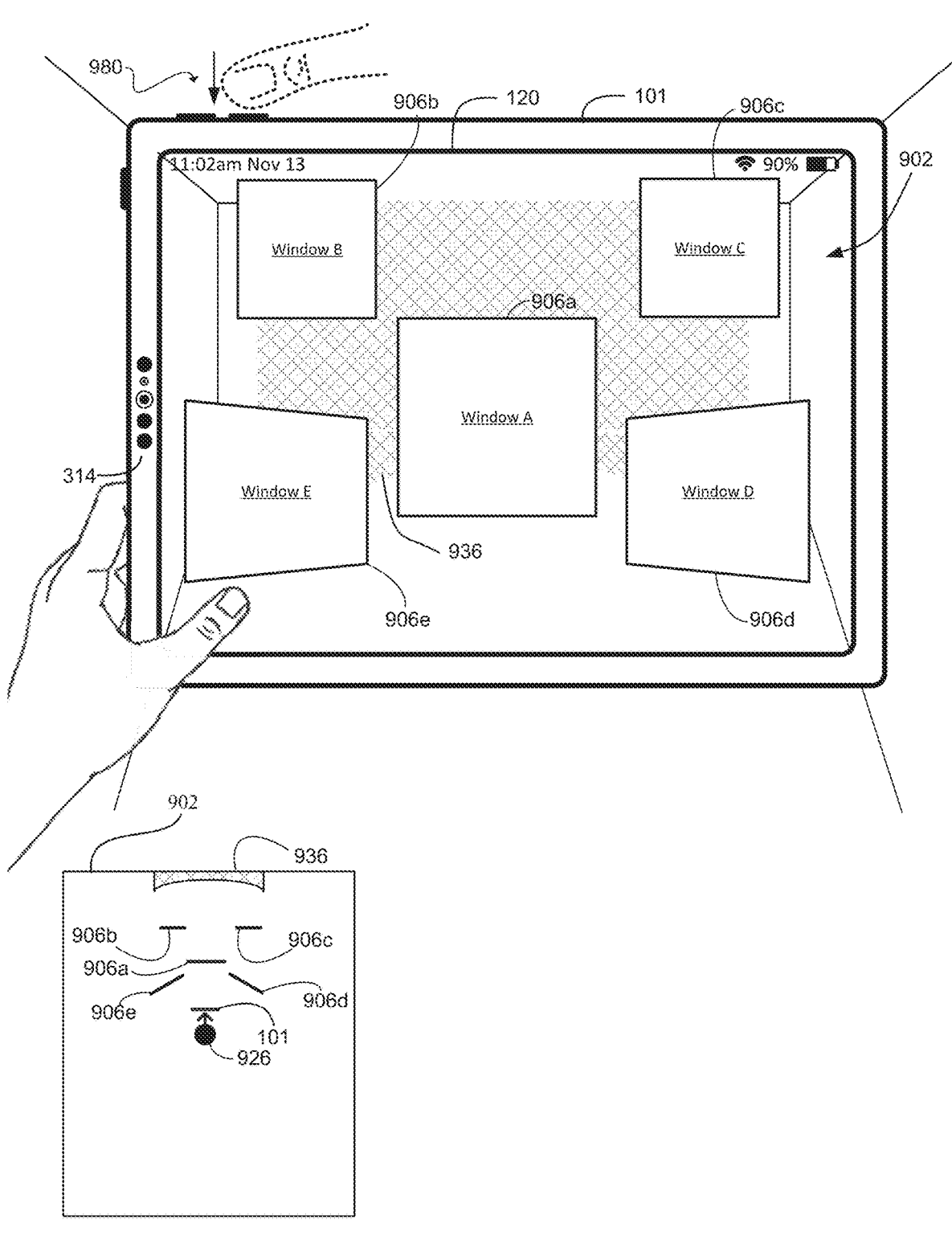

From FIG. 9E to FIG. 9F, computer system 101 ceases display of the home user interface, re-initiates display of objects 906*a-e* with a relatively increased level of visual prominence, and initiates display of immersive virtual content concurrent with objects 906*a-c*. As referred to herein, immersive virtual content includes virtual content displayed with a level of immersion greater than a threshold level of immersion, as described further with reference to method 1000. For example, the level of immersion includes a level of visual prominence relative to the three-dimensional environment as described previously. Displaying the immersive virtual content at the level of immersion greater than the threshold level of immersion optionally includes ceasing display of representations of the physical environment of the user and/or ceasing display of virtual content (e.g., objects)

not corresponding to the immersive virtual content at a region of the three-dimensional environment 902 where immersive virtual content is displayed, and/or ceasing display of virtual content that corresponds to a position within three-dimensional environment 902 that is behind regions of three-dimensional environment 902 where the immersive content is displayed relative to viewpoint 926. In some embodiments, displaying the immersive virtual content includes displaying the immersive virtual content with a level of opacity greater than a threshold level of opacity (e.g., 1%, 3%, 5%, 10%, 30%, 50%, 70%, or 90% opacity), reducing a level of visual prominence of representations of the physical environment (e.g., to a level of opacity less than a threshold level of opacity), and/or displaying the immersive virtual content at one or more regions of the three-dimensional environment 902 at a size greater than a threshold size relative to the three-dimensional environment. It is understood that description of immersive virtual content "consuming" the three-dimensional environment 902 optionally includes one or more of the foregoing embodiments, in any suitable combination.

In FIG. 9F, content 936 corresponds to and/or includes such immersive virtual content displayed in response to the event detected that includes input 980 in FIG. 9E. For example, in response to a voice command, computer system 101 optionally initiates display of content 936 at one or more regions of three-dimensional environment 902, as illustrated in the overhead view. Content 936 is optionally displayed with a level of opacity greater than a threshold opacity, and is optionally animated to gradually consume a relatively greater amount of the three-dimensional environment 902. For example, content 936 is optionally displayed with a relatively increasing apparent width (e.g., along an axis relative to viewpoint 926, such as an apparent lateral axis extending from the left to the right edges of display generation component 120), relatively increasing apparent height (e.g., along a second axis relative to viewpoint 926, such as an apparent vertical axis extending from the top to the bottom edges of display generation component 120), and/or a relatively increasing apparent depth (e.g., along a third axis relative to viewpoint 926, such as a depth axis extending from viewpoint 926 outward and in front of viewpoint 926). In some embodiments, the axes described previously are mutually orthogonal, and computer system 101 modifies a volume of the content 936 relative to the orthogonal, three-dimensional axes based on viewpoint 926. Optionally concurrently, computer system 101 also modifies the level of visual prominence of representations of the physical environment and/or the home user interface 920 illustrated in FIG. 9E.

In some embodiments, content 936 includes an at least partially virtual environment that the user can navigate. For example, computer system 101 optionally displays virtual textures overlaying portions of the user's physical environment, virtual skies, virtual objects included in the scene, virtual landmarks, virtual structures, virtual creatures, and/or virtual avatars. Such virtual environments optionally include environments, such as a moon environment, a beach environment, a forest environment, a theater environment, an office environment, and/or another suitable type of virtual environment. In some embodiments, content 936 is display concurrently with representations of the physical environment of the user not consumed by content 936.

In some embodiments, computer system 101 detects an event (e.g., including input 980 in FIG. 9E), and in response to the event, modifies the level of immersion of the immersive virtual content. For example, in FIG. 9F, input 980 optionally includes a rotating of an electromechanical or virtual crown button and/or a selection of a physical or virtual button consecutively (e.g., two, three, four, five, or six times); in response to detecting the event including input 980 in FIG. 9F, computer system 101 optionally modifies the level of immersion of the virtual content.

Figure 9G:
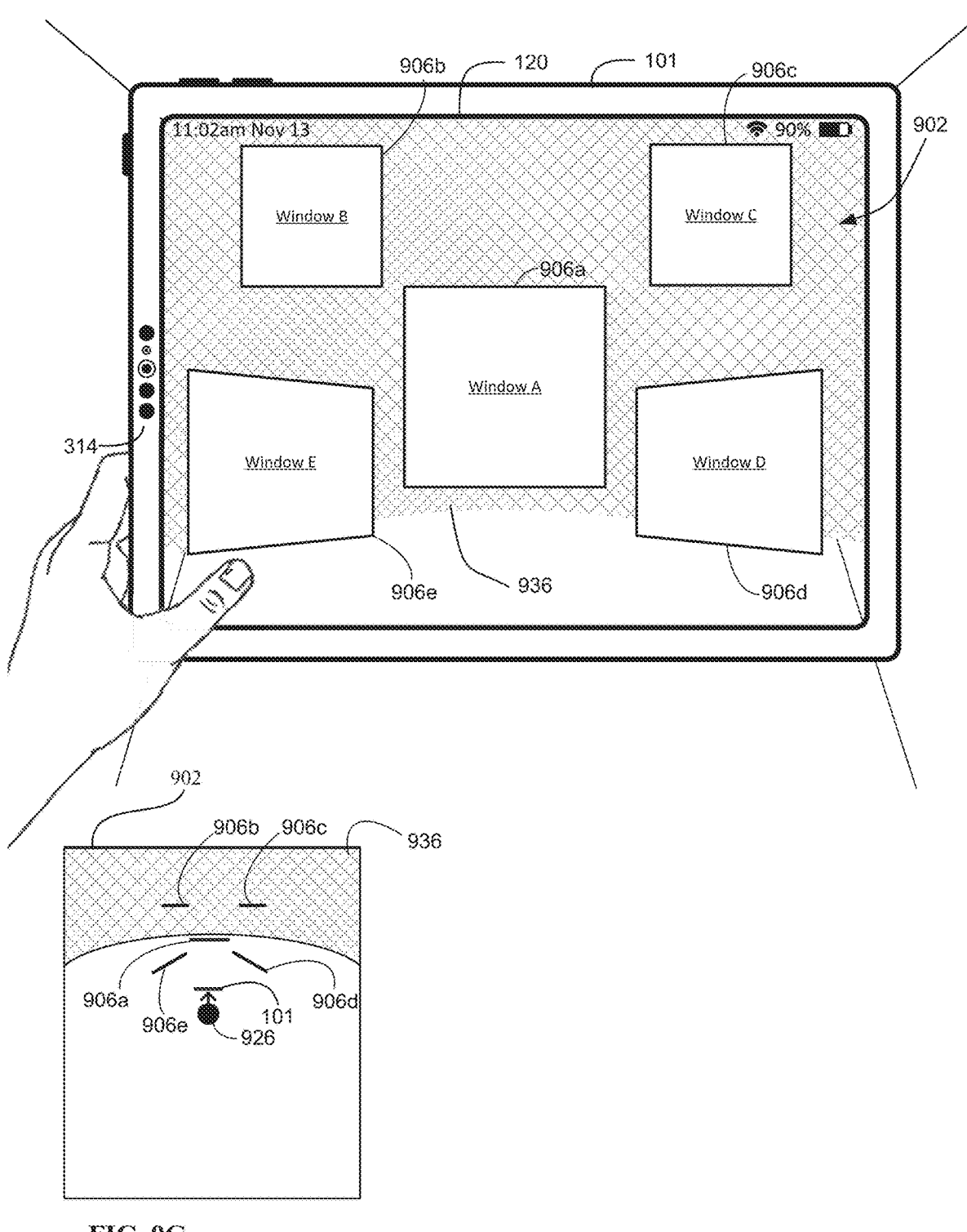
Figure 10C:
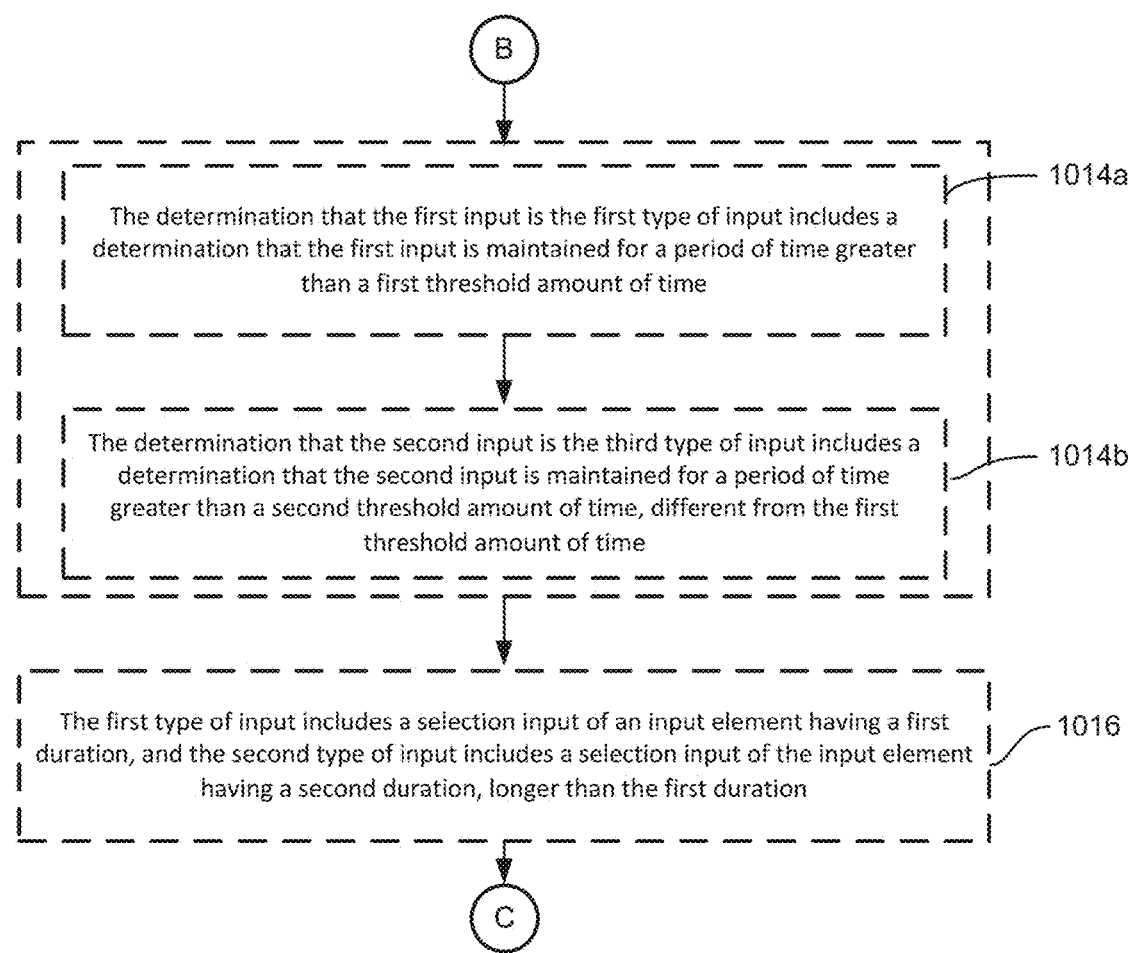
Figure 10E:
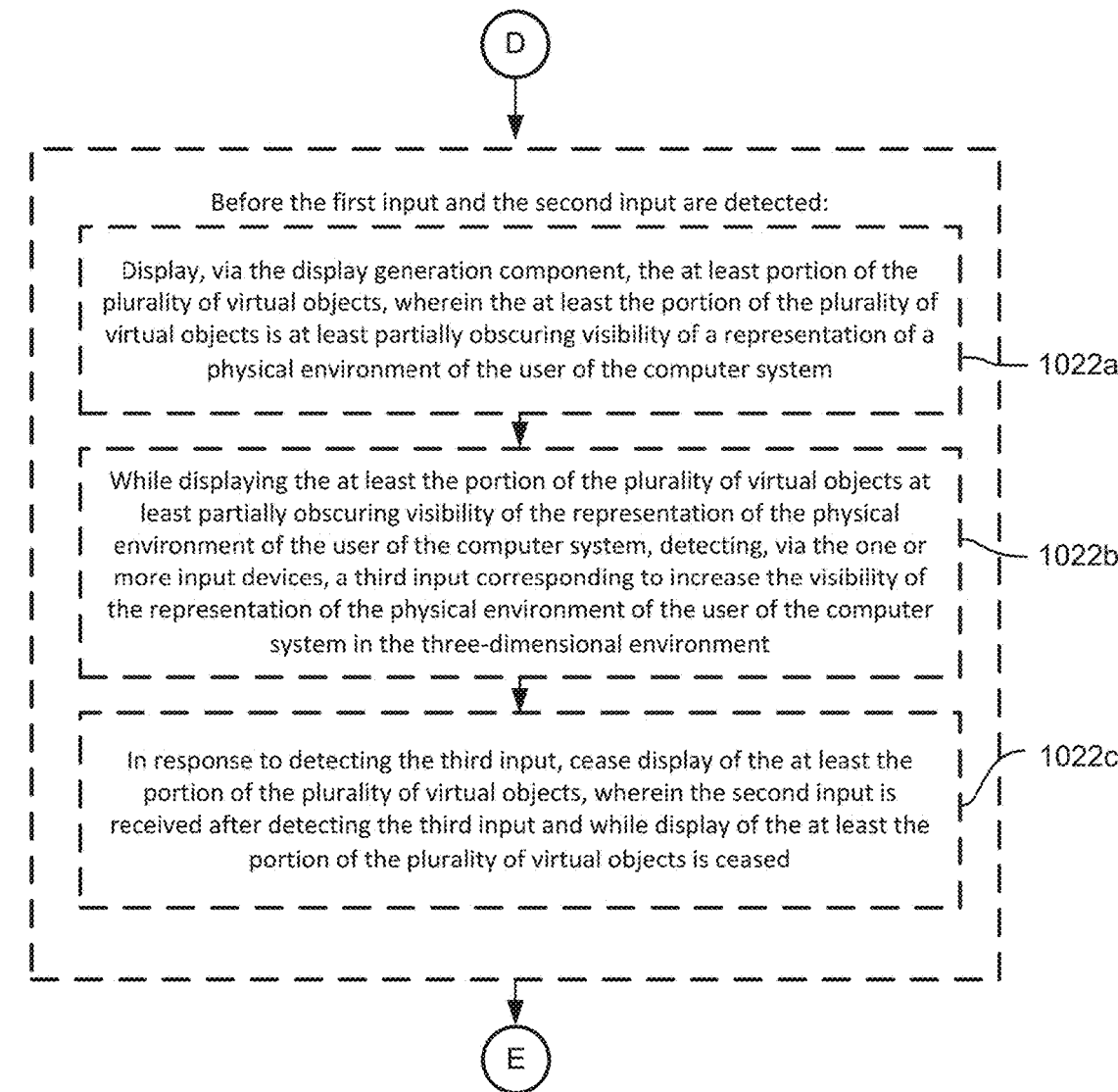
Figure 10F:
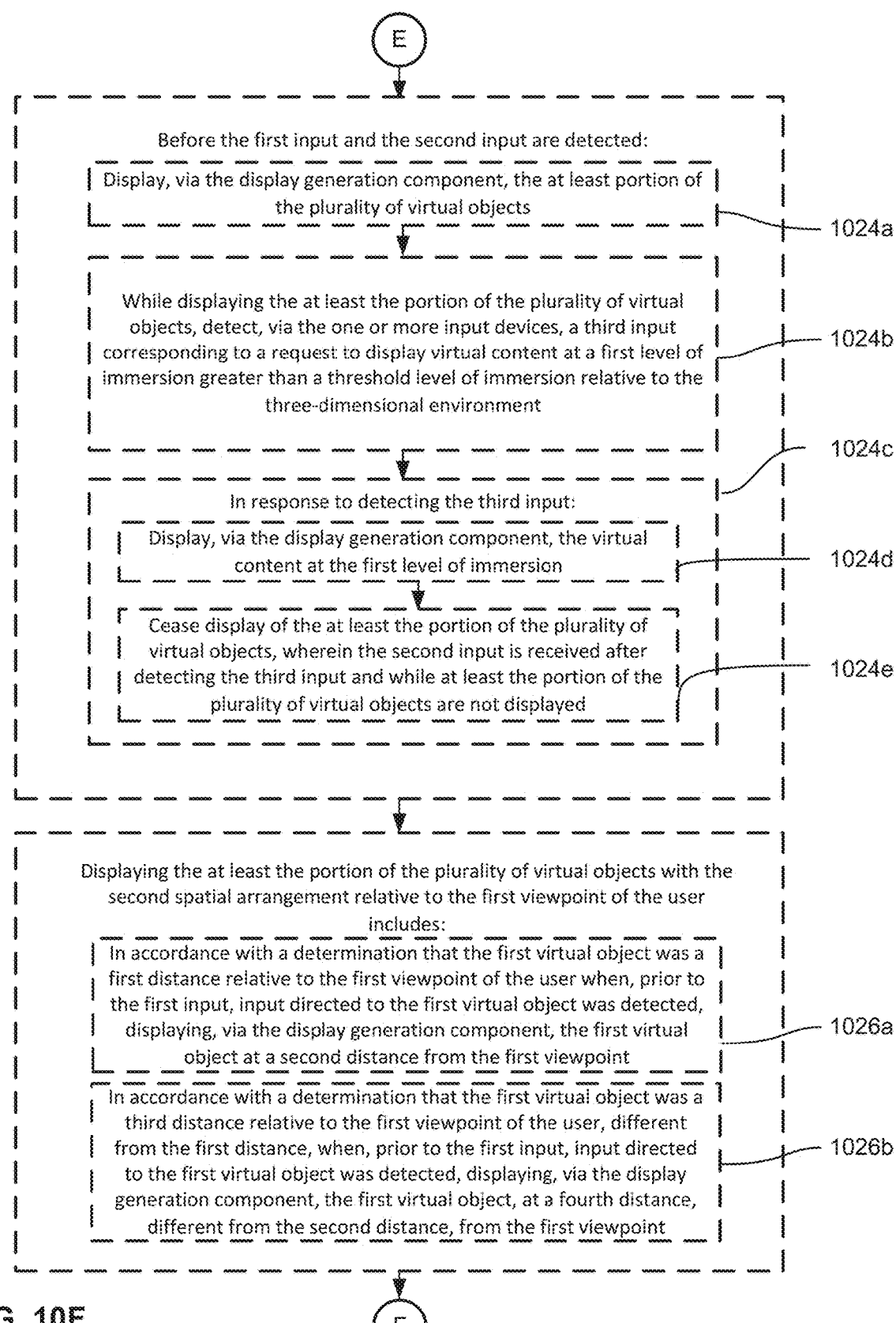
Figure 10G:
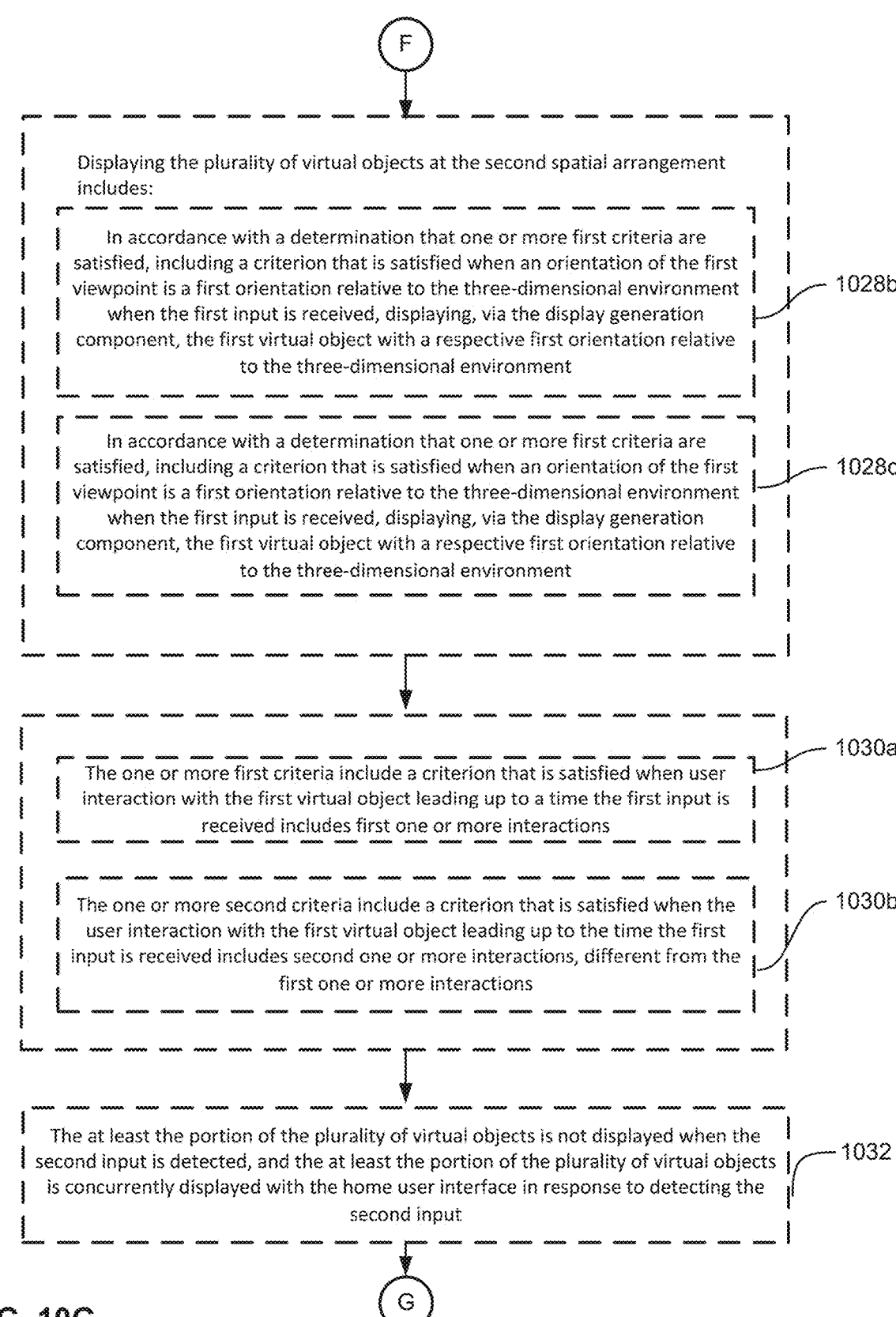

From FIG. 9F to FIG. 9G, computer system 101 increases the level of immersion of content 936. For example, content 936 optionally consumes a relatively greater volume of environment 902 as compared to in FIG. 9F (e.g., greater apparent width, height, and/or depth). In some embodiments, the increased immersion includes displaying additional portions of a virtual scene, such as a virtual tent of a virtual campground scene, where the virtual tent has a position within the virtual campground corresponding to a position within three-dimensional environment 902 not consumed by virtual content 936 in FIG. 9F. In some embodiments, the level of immersion from FIG. 9F to FIG. 9G increases automatically, and/or after the immersive virtual content 936 has been displayed for an amount of time consuming a first portion of three-dimensional environment 902—as shown in FIG. 9F—that is greater than a threshold amount of time (e.g., 0.001, 0.01, 0.1, 1, 10, 100, or 1000 seconds). For example, without detecting an express user input (e.g., without detecting input 980 in FIG. 9F), computer system 101 optionally performs the increasing of the level of immersion of content 936 to the level of immersion illustrated in FIG. 9G. In some embodiments, when content 936 is displayed at regions of three-dimensional environment 902 corresponding to objects 906a-e, computer system 101 maintains display of the objects 906a-e at their positions and/or orientations relative to three-dimensional environment 902 and/or viewpoint 926. Such immersive content 936 and interaction with virtual objects 906a-e are described further with reference to method 1000.

FIGS. 10A-10H is a flowchart illustrating an exemplary method of recentering or gathering one or more virtual objects to a viewpoint of a user in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, a method 1000 is performed at a computer system, such as computer system 101 in FIGS. 9A and 9A1, in communication with one or more input devices, such as image sensors in FIGS. 9A and 9A1, and a display generation component, such display generation component 120 in FIGS. 9A and 9A1. In some embodiments, the computer system, the one or more input devices, and the display generation component respectively have one or more characteristics of the computer system, the one or more input devices, and the display generation component described with reference to method 800.

In some embodiments, while a three-dimensional environment, such as three-dimensional environment 902 in FIGS. 9A and 9A1, is visible (e.g., optionally while one or more virtual objects of a plurality of virtual objects described further below are visible, or optionally while the one or more virtual objects are not visible) via the display generation component from a first viewpoint of a user of the computer system, such as viewpoint 926 in FIGS. 9A and 9A1, the computer system displays (1002a), via the display generation component, at least a portion of a plurality of virtual objects in the three-dimensional environment, such as objects 906a-d in FIGS. 9A and 9A1, wherein the plurality of virtual objects includes a first virtual object, such as object 906a in FIGS. 9A and 9A1, and a second virtual object, such as object 906b in FIGS. 9A and 9A1, different from the first virtual object, and wherein the plurality of virtual objects have a first spatial arrangement relative to the first viewpoint of the user, detecting, via the one or more input devices, a first input corresponding to a request to arrange (e.g., center) one more virtual objects relative to the first viewpoint of the user, such as input 980 in FIGS. 9A and 9A1. In some embodiments, the three-dimensional environment has one or more characteristics of the three-dimensional environment described with reference to method 800. Additionally or alternatively, the first viewpoint of the user of the computer system optionally has one or more characteristics of the current viewpoint and other viewpoint(s) described with reference to method 800. Additionally or alternatively, the first and/or the second virtual objects optionally have one or more characteristics of the virtual objects described with reference to method 800.

In some embodiments, one or more objects of the plurality of virtual objects are not displayed from a current viewpoint of the user, and are visible from another, updated viewpoint of the user. For example, a first virtual object is optionally positioned behind the current viewpoint of the user, and is optionally not visible until the computer system optionally detects a change viewpoint moving backward and/or rotating until the position of the first virtual object is within the field-of-view of the user. In some embodiments, all of the plurality of virtual objects are displayed in response to the current viewpoint changing such that the field-of-view includes all respective positions within the three-dimensional environment corresponding tot eh plurality of virtual object.

In some embodiments, one or more pluralities of virtual objects have spatial arrangements relative to a first viewpoint (e.g., a current viewpoint) of a user of the computer system, including positions and/or orientations of respective virtual objects included in a respective plurality of virtual objects. For example, a first virtual object and a second virtual object are optionally associated with one another (described further with reference to method 800, as related to grouping virtual objects and/or groups of virtual objects), optionally with a first spatial arrangement (e.g., position and/or orientation) relative to the first viewpoint.

In some embodiments, the computer system detects an input, such as detecting a portion of the user's body contacting a surface (e.g., a touch sensitive surface) detected by and/or in communication with the computer system, detecting an air gesture (e.g., an air pinch gesture including contacting of the user's fingers, an air swiping gesture including movement of the user's finger(s) and/or hand(s), an air depinching of the user's fingers (e.g., spreading of the fingers away from each other), an air first including curling of the user's finger(s), and/or an air pointing gesture including a pointing of a finger) optionally while attention is directed to a respective virtual object or a position in the environment not including virtual content, an actuation of a physical and/or virtual button, and/or movement and/or selections of selectable options (e.g., buttons) detected at a second computer system, such as a stylus or other pointing device. In some embodiments, a respective input is maintained (e.g., a contact of fingers during an air pinch, a pressing of a physical button, a sustained selection of a virtual button, and/or a sustained pointing of the user's finger).

In some embodiments, the first input has one or more of the characteristics of the event described with reference to method 800. In some embodiments, the input includes a request to concurrently and/or in rapid succession arrange the plurality of virtual objects. In some embodiments, the input includes a request to concurrently and/or in rapid succession modify positions and/or orientations of the plurality of virtual objects. For example, in response to a selecting of a virtual button, the computer system optionally arranges the plurality of virtual objects in a ring surrounding the current viewpoint and/or such that interactive portions (e.g., surfaces) of the plurality of virtual objects are all simultaneously visible from the current viewpoint, without requiring a plurality of discrete inputs to individually move the plurality of virtual objects to such an arrangement.

In some embodiments, in response to detecting the first input (1002b) in accordance with a determination that the first input is a first type of input (e.g., a recentering input), the computer system displays (1002c), via the display generation component, at least a portion of the plurality of virtual objects with a second spatial arrangement (e.g., a recentered spatial arrangement) relative to the first viewpoint of the user, different from the first spatial arrangement, such as the virtual objects having the spatial arrangement displayed in FIG. 9B. For example, the computer system optionally determines that the first type of input includes a request to change (e.g., recentering) the plurality of virtual objects in the three-dimensional environment while the relative position and/or orientation of respective virtual objects of the plurality of objects are maintained. In some embodiments, the first type of input corresponds to a rearranging of the plurality of virtual objects to satisfy one or more arrangement criteria, as described with reference to method 800. In some embodiments, the first input, the first type of input, and the second spatial arrangement have one or more characteristics of the event(s) and spatial arrangement(s) described with reference to method 800. In some embodiments, the rearrangement (e.g., recentering) of the plurality of virtual objects in response to the first input of the first type has one or more of the characteristics of the rearrangement of virtual object in response to the event described with reference to method 800. As an example, a first flat, or nearly flat virtual window is optionally facing and parallel to a second flat, or nearly flat virtual window, with a first distance between the first and the second virtual windows (e.g., corresponding to the second spatial arrangement). In response to detecting the first input, the computer system optionally moves the first virtual window such that a center of the first virtual window is aligned (e.g., centered) with a respective portion of the user's viewpoint, and moves the second virtual window to an updated position, maintaining the second distance and the orientation of the second virtual window relative to the first virtual window (e.g., maintaining the second spatial arrangement). In some embodiments, the orientation of one or more virtual objects included in the plurality of virtual objects are changed relative to the current viewpoint, and not changed relative to each other while displayed with the second spatial arrangement relative to each other. In some embodiments, one or more respective virtual objects of the plurality of virtual objects are not displayed while at the plurality of virtual objects have the second spatial arrangement.

In some embodiments, in accordance with a determination that the first input is a second type of input, different from the first type of input, the computer system displays (1002d), via the display generation component, at least a portion of the plurality of virtual objects with a first updated spatial arrangement (e.g., a grouped spatial arrangement) relative to the first viewpoint of the user, such as the spatial arrangement of virtual objects in FIG. 9C, wherein the plurality of virtual objects in the second spatial arrangement (e.g., the recentered spatial arrangement) have a different arrangement relative to each other than the plurality of virtual objects in the first updated spatial arrangement (e.g., the grouped spatial arrangement). For example, the computer system optionally displays all of the plurality of virtual objects when the first input includes a second type of input requesting gathering of the one or more virtual objects. In some embodiments, the computer system optionally changes a spatial arrangement of the plurality of virtual objects relative to each other in addition to changing the spatial arrangement relative to the current viewpoint of the user (e.g., different from the recentering arrangement described previously). For example, a plurality of virtual windows is optionally changed to face the current viewpoint of the user, and/or are arranged at respective and updated positions such that the plurality of virtual objects reduce apparent spatial and/or visual conflicts (e.g., when a first virtual object is intersecting or visually would block a second virtual object if replaced with a physical object). In some embodiments, all of the plurality of virtual objects are at least partially visible from the current viewpoint of the user while displayed with the first updated spatial arrangement relative to the first viewpoint of the user. Rearranging of the plurality of virtual objects is optionally referred to herein as a "grouped spatial arrangement". Displaying a plurality of virtual objects with an updated spatial arrangement relative to the current viewpoint of the user and/or each other based on a type of input provides flexibility for alternative arrangements of the plurality of virtual objects, reducing user input and processing required to process discrete movements of the plurality objects to form such an arrangement, and allows the user to leverage a previous understanding of the arrangement between virtual objects and/or modify the arrangement between the virtual objects when rearranging virtual objects.

In some embodiments, the first type of input includes a first selection input of an input element detected when the plurality of virtual objects have the first spatial arrangement relative to the first viewpoint of the user, such as input 980 in FIGS. 9A and 9A1, and the second type of input includes a second selection input of the input element detected when the plurality of virtual objects have the second spatial arrangement relative to the first viewpoint of the user (1004), such as input 980 in FIG. 9B. For example, the first type of input includes and/or corresponds to a selection input directed to a physical or virtual button. In some embodiments, the computer system differentiates between the first and the second type of input based on a determined arrangement of the plurality of virtual objects when the first input is received. For example, the second type of input is optionally a second selection input that is similar or the same as the first type of input (e.g., a 0.05, 0.1, 0.5, 1, 3, 5, 10, 30 or 60 second selection of the physical or virtual button), however, the second type of input is detected while the plurality of virtual objects with the second spatial arrangement (e.g., due to a previous input of the first type causing recentering of the plurality of virtual objects, and without detecting movement of the current viewpoint of the user nor movement of the plurality of virtual objects from the recentered arrangement). In some embodiments, when the first input is the second type of input (e.g., an input to recenter the plurality of virtual objects when the plurality of virtual objects is already recentered relative to the current viewpoint of the user), the computer system forgoes movement of virtual objects to a second, recentered arrangement because the plurality of virtual objects are already presented in a recentered arrangement relative to the first viewpoint of the user. In some embodiments, the first type of input and the second type of input are similar or the same, such as having a similar or a same duration of selection and/or directed to a similar or a same mechanical control element, such as a push button or a rotational crown button. In some embodiments, similar to as described above relative to recentering virtual objects, the computer system forgoes a second consecutive gathering operation when the plurality of virtual objects is already presented having a gathered spatial arrangement relative to the current viewpoint of the user at a time when the input requesting the second gathering is detected.

In some embodiments, the selection input is a physical input directed to a mechanical control element, such as a pressing of a physical button, pressing a surface (e.g., a touch sensitive or non-touch sensitive surface) with an amount of force greater than a threshold amount of force, pressing of a physical button for a period of time greater than a threshold amount of time (e.g., 0.001, 0.01, 0.1, 1, 10, or 100 seconds) and/or less than the threshold amount of time (e.g., 0.0001, 0.001, 0.01, 0.1, 1, 10, or 100 seconds). In some embodiments, the selection input includes detecting an air gesture (described further with reference to step(s) 1002) and/or maintenance of the air gesture for a period of time greater than a threshold amount of time (e.g., 0.001, 0.01, 0.1, 1, 10, or 100 seconds). Classifying a type of input based on whether an input selecting an input element is detected when the plurality of virtual objects has the first spatial arrangement or the second spatial arrangement relative to the first viewpoint of the user reduces the likelihood of redundant request to perform rearrangement operations (e.g., recentering).

In some embodiments, the first type of input includes a selection input of an input element having a first duration, such as a duration of input 980 in FIGS. 9A and 9A1, and the second type of input includes a selection input of the input element having a second duration, longer than the first duration (1006) such as a duration of input 980 in FIG. 9B. For example, the first type of input corresponds to a selection input described with reference to step(s) 1004 that is maintained for a first duration of time (e.g., 0.001, 0.01, 0.1, 1, or 10 seconds) and the second type of input corresponds to a similar or the same selection input that is maintained for a second duration of time, different from (e.g., longer than) the first duration of time (e.g., 0.0001, 0.001, 0.01, 0.1, 1, 10, or 100 seconds). Thus, in some embodiments, the computer system performs the recentering or the gathering operations in accordance with a determination that a mechanical input element is pressed, an air gesture is maintained, a surface is contacted, and/or a virtual button is selected (e.g., via a trackpad) for a particular amount of time corresponding to the respective rearrangement operations. It is understood that the computer system optionally detects additional or alternative suitable inputs, and differentiates the types of input based on the duration of a respective, suitable input.

Classifying a type of input of the first input based on a duration of a selection input simplifies user interaction by reducing an array of types of inputs directed to different buttons and/or user interface elements required to perform different rearrangement operations of virtual objects, thereby improving interaction efficiency and reducing processing required to detect the different types of inputs.

In some embodiments, the first type of input and the second type of input include user input directed to a mechanical input element in communication with the computer system (1008), such as a mechanical input element that is selected when input 980 is detected in FIGS. 9A and 9A1. For example, the computer system optionally includes and/or is in communication with a mechanical input element (e.g., a pushbutton, a rotational crown button that is optionally also configured to be pressed, a button coupled to and sliding along a rail, a switch, a mouse, a gear, and/or a trackball) that is at least partially configured to receive input for rearrangement operations. For example, the first and the second type of input optionally include different interactions with a same mechanical input element, described with reference to at least step(s) 1006. In some embodiments, the mechanical input element is coupled to circuitry configured to detect and/or encode a magnitude of the input (e.g., a duration, a degree of displacement, a force, a series of consecutive selection inputs), and the magnitude of the input is communicated (e.g., wirelessly, or via a wired connection) to the computer system. Classifying a type of input of the first input based on input directed to a same mechanical input element simplifies user interaction, thereby reducing computational complexity required to interface with additional input elements such as additional buttons, and reduces the structural or spatial complexity of requiring multiple mechanical input elements on and/or in communication with the computer system.

In some embodiments, while displaying, in the three-dimensional environment, virtual content with a first level of immersion, such as content 936 in FIG. 9F, the computer system detects (1010a), via the one or more input devices, a second input directed to the mechanical input element, such as input 980 in FIG. 9F. For example, the virtual content optionally corresponds to one or more objects and/or one or more virtual environments that are displayed with respective first levels of immersion relative to the three-dimensional environment of the user that are optionally, concurrently displayed with the plurality of virtual objects described with reference to step(s) 1002. In some embodiments, the virtual content is a virtual object of the plurality of virtual objects described with reference to step(s) 1002. In some embodiments, the computer system detects input directed to the mechanical input element (e.g., a pushbutton, a selectable rotational crown button) that is configured to receive input that causes the computer system to perform the recentering and gathering operations described with reference to step(s) 1002. In some embodiments, the input (e.g., the second input) corresponds to a request to modify the level of immersion of the virtual content (e.g., modify the respective first levels of immersion of a virtual environment).

For example, a level of immersion includes an associated degree to which the virtual content displayed by the computer system obscures background content (e.g., the three-dimensional environment including the physical environment) around/behind the virtual content, optionally including a number of items of background content displayed and the visual characteristics (e.g., colors, contrast, and/or opacity) with which the background content is displayed, and/or the angular range of the content displayed via the display generation component (e.g., 60 degrees of content displayed at low immersion, 120 degrees of content displayed at medium immersion, and/or 180 degrees of content displayed at high immersion), and/or the proportion of the field of view displayed via the display generation consumed by the virtual content (e.g., 33% of the field of view consumed by the virtual content at low immersion, 66% of the field of view consumed by the virtual environment at medium immersion, and/or 100% of the field of view consumed by the virtual content at high immersion). In some embodiments, at a first (e.g., high) level of immersion, the background, virtual and/or real objects are displayed in an obscured manner. For example, respective virtual content with a high level of immersion is displayed without concurrently displaying the background content (e.g., in a full screen or fully immersive mode). In some embodiments, at a second (e.g., low) level of immersion, the background, virtual and/or real objects are displayed in an obscured manner (e.g., dimmed, blurred, and/or removed from display). For example, virtual content with a low level of immersion is optionally displayed concurrently with the background content, which is optionally displayed with full brightness, color, and/or translucency. As another example, virtual content displayed with a medium level of immersion is optionally displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed.

In some embodiments, virtual content such as the plurality of virtual objects and/or the virtual environments are displayed with a level of visual prominence relative to the three-dimensional environment, including a level of opacity, saturation, brightness, contrast, with simulated blurring effects, with simulated lighting effects, and/or with a radius of the virtual content affected by the simulated effects. The computer system optionally varies the respective levels (e.g., magnitudes and/or radii) of the visual and/or simulated effects in accordance with a requested level of immersion; for example, the computer system optionally decreases opacity, saturation, brightness, contrast, and/or increases a magnitude of the simulated effects, and/or a radius of the simulated effects when "decreasing" the level of visual prominence of corresponding virtual content, and in response to a request to decrease the level of immersion. Additionally, the computer system optionally increases opacity, saturation, brightness, contrast, and/or decreases the magnitude of the simulated effects and/or the radius of the simulated effects when "increasing" the level of visual prominence of corresponding virtual content in response to a request to increase the level of immersion. It is understood that increasing or decreasing the level of visual prominence optionally includes some combination of the visual characteristics described herein, and that increasing or decreasing levels of visual prominence optionally differ from the arrangement expressly described herein (e.g., increasing visual prominence optionally includes increasing a magnitude of a simulated lighting effect and decreasing the magnitude of a simulated blurring effect). Moreover, it is understood that levels of visual prominence of the plurality of virtual objects and the virtual content (e.g., additional objects and/or environments) are optionally varied in levels of visual prominence concurrently, by a similar or a same amount, and/or independently.

In some embodiments, in response to detecting the second input, and in accordance with a determination that the second input is a third type of input, different from the first type of input and the second type of input, the computer system displays (1010*b*) the virtual content with a second level of immersion, different from the first level of immersion, in accordance with the second input, such as the level of immersion of content 936 in FIG. 9F. For example, in response to detecting a rotation of the mechanical crown, the computer system optionally modifies the level of immersion of the virtual environments in accordance with a direction and/or magnitude of the rotation. Turning the mechanical crown clockwise by a first degree of rotation, for example, optionally corresponds to increasing the level of immersion of the virtual environment by a first amount; turning the mechanical crown counter-clockwise by a second degree of rotation, for example, optionally corresponds to decreasing the level of immersion of the virtual environment by a second amount different from the first (e.g., greater or lesser). In some embodiments, rotating the crown by a greater degree of rotation corresponds to a greater change in level of visual prominence. For example, the virtual environment optionally consumes (e.g., is displayed within the three-dimensional environment replacing display of representations of the physical environment) a relatively larger portion of the three-dimensional environment visible from the first viewpoint in response to the first degree of rotation of the mechanical crown, and optionally consumes a relatively smaller portion of the three-dimensional environment in response to the second degree of rotation (e.g., counter-clockwise). In some embodiments, while varying the level of immersion of the virtual environment, the computer system maintains (optionally display of) the plurality of virtual objects at their respective positions within the three-dimensional environment and/or maintains the level of visual prominence of the plurality of virtual objects. In some embodiments, when such a virtual environment consumes a region of the three-dimensional environment including a virtual object of the plurality of virtual objects, the computer system ceases display of the virtual object. Changing a level of immersion of virtual content in accordance with second input directed to the mechanical input element simplifies user interaction patterns with the computer system, reducing computational complexity required to interface with additional input elements and improving efficiency of user interaction due to a more focused set of input modalities available by manipulating the mechanical input element, and reduces the structural or spatial complexity of requiring multiple mechanical input elements on and/or in communication with the computer system.

In some embodiments, the computer system detects (1012*a*), via the one or more input devices, a second input, different from the first input. In some embodiments, in response to detecting the second input, and in accordance with a determination that the second input is a third type of input, different from the first type of input and the second type of input, such as a type of input 980 in FIG. 9D, the computer system displays (1012*b*), via the display generation component, a home user interface associated with an operating system of the computer system, such as the home user interface 920*a*. For example, the second input has one or more characteristics of the first type of input and/or the second type of inputs described with reference to step(s) 1004. In some embodiments, the computer system detects the second input, corresponding to the third type of input, and displays a home user interface associated with the operating system that includes one or more selectable options selectable to initiate display of and/or change a currently displayed immersive virtual scene (e.g., virtual environment), selectable to initiate communication sessions with one or more users (e.g., contacts) of one or more other computer systems, selectable to launch software included in memory of the computer system (e.g., applications), selectable to initiate display of user interfaces for adjusting settings and preferences associated with the computer system, and/or selectable options that are interactable to modify virtual content displayed within the three-dimensional environment. For example, the home user interface optionally includes a menu including a plurality of selectable icons corresponding to different applications, such as e-mail, web browsing, communication (e.g., video conferencing, text messaging), artistic, note taking, and/or media consuming applications that are selectable to cause display of user interfaces of those applications in the three-dimensional environment. In some embodiments, the second input includes input directed to a mechanical input element, and the first input includes input directed to the same mechanical input. In such embodiments, characteristics of the second input (e.g., a duration of the second input) are used to differentiate between the first type of input, the second type of input, and/or the third type of input.

In some embodiments, while displaying the home user interface, the computer system maintains an arrangement of and/or display of the plurality of virtual objects at their respective positions (e.g., having the first spatial arrangement) relative to the first viewpoint of the user. Additionally or alternatively, the computer system optionally decreases the level of visual prominence of the plurality of virtual objects relative to the three-dimensional environment (described further with reference to step(s) 1010) concurrent with the display of the home user interface, optionally including ceasing display of portions of the plurality of virtual objects that are obscured by visual elements included in the home user interface. Displaying a home user interface in response to detecting a second input that is a third type of input provides efficient access to commonly used software applications and/or other navigational options associated with the operating system of the computer system, thereby reducing user input otherwise required to access such software applications, and/or navigational options.

In some embodiments, the determination that the first input is the first type of input includes a determination that the first input is maintained for a period of time greater than a first threshold amount of time (1014*a*), such as an amount of time of input 980 in FIGS. 9A and 9A1. In some embodiments, the determination that the second input is the third type of input includes a determination that the second input is maintained for a period of time greater than a second threshold amount of time, different from the first threshold amount of time (1014*b*), such as an amount of time of input 980 in FIG. 9B. For example, as described with reference to step(s) 1006, the computer system optionally determines a type of the input (e.g., the first and/or the second input) based on a duration of the input directed to a same mechanical input element, a virtual control user interface element, and/or performed using a portion of the user's body (e.g., a hand performing an air gesture). In some embodiments, the computer system determines the first input is the second type of input in accordance with a determination the first input is maintained for a period of timer greater than a third threshold amount of time. In some embodiments, the computer system determines non-overlapping intervals of durations of selection inputs, assigns the first, second, and/or third types of user input to respective intervals of time, and initiates rearrangement operations and/or display of the home user interface in accordance with a determination that a duration of a selection input corresponds to a corresponding interval of time. Determining whether the first input is the first type or the third type of input based on duration of maintenance of the first input simplifies user input, reducing the number of different sensing elements the computer system interfaces with to determine the type of input, thereby reducing computational complexity and simplifying hardware configurations of the computer system.

In some embodiments, the home user interface is concurrently displayed with the at least the portion of the plurality of virtual objects in response to detecting the second input (1016), such as the user interface 920*a* and virtual objects 906*a-e* in FIG. 9E. For example, as described with reference to step(s) 1012, the computer system optionally displays the portion of the plurality of virtual objects that correspond to positions within a field-of-view of the computer system (e.g., what's displayed by and/or visible via the display generation component) concurrent with the home user interface. In some embodiments, the home user interface includes one or more visual representations that are overlaid over the three-dimensional environment and/or other virtual content not included in the home user interface. For example, the home user interface optionally is displayed in "front" of (and/or closer than and/or overlaid on) objects within the three-dimensional environment and/or the plurality of virtual windows that are rearranged in response to the first input, relative to the first viewpoint of the user. Displaying the home user interface concurrent with the at least the portion of the plurality of virtual objects maintains consistency of presentation of the plurality of virtual objects and/or the environment while interacting with the home user interface, thus reducing the likelihood that after dismissing the home user interface, the user of the computer system erroneously interacts with the three-dimensional environment.

In some embodiments, the at least the portion of the plurality of virtual objects are displayed with respective first levels of visual prominence relative to the three-dimensional environment while concurrently displayed with the home user interface (1018*a*), such as the level of visual prominence of objects 906*a-e* in FIG. 9E. For example, as described further with reference to claim 5, the computer system optionally displays virtual objects that correspond to the first viewpoint of the user (e.g., those virtual objects corresponding to positions within a field-of-view of the user at the first viewpoint) with respective levels of visual prominence relative to the three-dimensional environment. In some embodiments, the home user interface is displayed concurrently with the plurality of virtual objects, and in some embodiments, the home user interface is displayed with a relatively higher level of visual prominence than the virtual object, In some embodiments, while concurrently displaying the at least the portion of the plurality of virtual objects and the home user interface, the computer system detects (1018*b*), via the one or more input devices, a third input corresponding to a request to cease display of the home user interface, such as input 980 in FIG. 9E. For example, the third input optionally has one or more characteristics of the second input that is the third type of input described with reference to step(s) 1012, such as a selection input directed to a pushbutton or mechanical crown button while the home user interface is displayed. In some embodiments, the third input is detected while the user has the first viewpoint relative to the three-dimensional environment. In some embodiments, in response to detecting the third input (1018c) the computer system ceases (1018d) display of the home user interface, such as the ceased home user interface in FIG. 9F. For example, the computer system optionally reduces the level of visual prominence of the home user interface (e.g., to a completely or partially transparent level of opacity).

In some embodiments, the computer system displays (1018d), via the display generation component, the at least the portion of the plurality of virtual objects with respective second levels of visual prominence relative to the three-dimensional environment, greater than the respective first levels of visual prominence relative to the three-dimensional environment, such as the level of visual prominence of objects 906a-e in FIG. 9F. For example, the computer system optionally displays the at least the portion of the plurality of virtual objects with a relatively increased level of visual prominence (e.g., more opaque, more saturated, brighter, and/or sharper) relative to a level of displayed visual prominence present before the third input is detected, and optionally concurrent with the decreasing of the level of visual prominence of the home user interface. In some embodiments, the computer system animates such transitions in levels of visual prominence, described with reference to this embodiment and herein, to gradually increase, decrease, fade in, and/or fade out virtual content with an updated level of visual prominence. Changing the levels of visual prominence of the at least the portion of the plurality of the virtual objects and the home user interface in response to a third input optionally reduces the number of user inputs required to perform such changes individually and visually indicates what virtual content will be target of future user interactions.

In some embodiments, the at least the portion of the plurality of virtual objects is not displayed when the second input is detected, and the at least the portion of the plurality of virtual objects is concurrently displayed with the home user interface in response to detecting the second input (1020), such as input 980 detected in FIG. 9D while objects 906a-e are not displayed. For example, the computer system optionally ceases display of and/or has already ceased display of the plurality of virtual objects (e.g., due to a request to view the physical environment described with reference to claim 11 and/or due to display of immersive virtual content described with reference to claim 12) when input to display the home user interface is detected. In some embodiments, the computer system initiates display of the home user interface and the plurality of virtual objects in response to the second input, optionally concurrently. In some embodiments, the plurality of virtual objects is displayed with a relatively reduced level of visual prominence as described with reference to claim 9. Displaying the home user interface and the at least the portion of the plurality of virtual objects concurrently in response to detecting the second input reduces the number of user inputs required to display such virtual content individually and indicates that virtual objects are included in the three-dimensional environment of the user.

In some embodiments, before the first input and the second input are detected, the computer system displays (1022a), via the display generation component, the at least portion of the plurality of virtual objects (e.g., with the first spatial arrangement), wherein the at least the portion of the plurality of virtual objects is at least partially obscuring visibility of a representation of a physical environment of the user of the computer system (e.g., a portion of the physical environment that would otherwise be visible via the display generation component via optical or virtual pass-through), such as the display of objects 906a-e in FIG. 9C overlaying representations of three-dimensional environment 902. For example, the at least portion of the plurality of virtual objects optionally are displayed at positions within the three-dimensional environment that are between the current viewpoint (e.g., the first viewpoint) of the user and representations of the physical environment. In some embodiments, the computer system displays virtual content that presents an apparent obscuring of the physical environment. For example, to simulate a physical obscuring of physical objects, the computer system optionally reduces a level of visual prominence of representations of the physical environment (e.g., images collected via one or more cameras of a wall, a sofa, and/or a table of the physical environment) and/or first virtual content that would be obscured by a physical object having a same size and same position of second virtual content displayed by the computer system at a position relatively closer to the current viewpoint of the user than the representations of the physical environment and/or the first virtual content. As an additional example, when the computer system displays a first virtual window occupying a portion (e.g., a left half) of the current viewpoint of the user, the computer system optionally forgoes display of any virtual content and/or representations of the physical environment that are placed within the portion of the current viewpoint of the user (e.g., displays the first virtual window, and does not display images of a sofa within the left hand of the current viewpoint) that are optionally further from the viewpoint of the user than the first virtual window.

In some embodiments, while displaying the at least the portion of the plurality of virtual objects at least partially obscuring visibility of the representation of the physical environment of the user of the computer system, the computer system detects (1022b), via the one or more input devices, a third input corresponding to increase the visibility of the representation of the physical environment of the user of the computer system in the three-dimensional environment, such as input 980 detected in FIG. 9C. For example, the third input has one or more characteristics of the first input described with reference to step(s) 1002. In some embodiments, the third input includes rotation of a mechanical crown button.

In some embodiments, in response to detecting the third input, the computer system ceases (1022c) display of the at least the portion of the plurality of virtual objects, such as shown in FIG. 9D, wherein the second input is received after detecting the third input and while display of the at least the portion of the plurality of virtual objects is ceased, such as input 980 in FIG. 9C. For example, the computer system optionally decreases respective levels of visual prominence of the at least the portion of the plurality of virtual objects, as described with reference to step(s) 1010, which optionally causes the visual prominence of the representations of the physical environment that were obscured by the virtual objects to increase (e.g., through the locations in the three-dimensional environment that are/were occupied by the virtual objects), such as via optical or virtual passthrough of the representation of the physical environment. In some embodiments, after reducing the level of visual prominence of the virtual objects (e.g., ceasing display of the virtual objects), the computer system detects the second input while level of visual prominence is reduced, and in response, initiates display of the home user interface described with reference to step(s) 1012. Ceasing display of the virtual objects obscuring the physical environment improves user awareness of their physical environment, and reduces the likelihood the user changes their viewpoint to an orientation that is suboptimal for interacting with virtual content.

In some embodiments, before the first input and the second input are detected the computer system displays (1024a), via the display generation component, the at least portion of the plurality of virtual objects (e.g., with the first spatial arrangement), such as the virtual objects displayed in FIG. 9C. In some embodiments, while displaying the at least the portion of the plurality of virtual objects, the computer system detects (1024b), via the one or more input devices, a third input corresponding to a request to display virtual content, such as content 936 in FIG. 9G at a first level of immersion greater than a threshold level of immersion relative to the three-dimensional environment, such as input 980 in FIG. 9F. For example, as described with reference to step(s) 1010, the computer system optionally detects input including a rotation of a mechanical crown button and changes the level of immersion of a virtual environment in accordance with the input. Rotating the crown in a first direction by a first amount, for example, optionally corresponds to a request to increase the level of immersion of a virtual scene to a first level of immersion (e.g., a size, scale, and/or opacity of the virtual scene). In some embodiments, the virtual scene includes a virtual representation of a beach, a campground, a forest, and/or an office environment. In some embodiments, the threshold level of immersion includes displaying the virtual content at a size and/or consuming a region of the three-dimensional environment greater than a threshold size and/or a threshold size of the region of the three-dimensional environment. For example, the third input optionally includes a request that the virtual content is displayed occupying a portion of the field-of-view of the user greater than a threshold portion (e.g., 5%, 10%, 15%, 20%, 30%, 50%, 70%, 80%, or 85% of the field-of-view). Additionally or alternatively, as described with reference to step(s) 1010, the threshold level of immersion optionally includes a threshold angle of the field-of-view of the current viewpoint that is consumed by the virtual content, wherein the threshold angle is optionally measured relative to a vector extending from the current viewpoint of the user (e.g., from the center of the current viewpoint). In some embodiments, in response to detecting a fourth input corresponding to a request to display the virtual content at a second level of immersion that is less than the threshold level of immersion relative to the three-dimensional environment, the computer system forgoes display of the virtual content, and/or forgoes the operations similar to those described below that are performed in response to detecting the third input.

In some embodiments, in response to detecting the third input (1024c), the computer system displays (1024d), via the display generation component, the virtual content at the first level of immersion, such as content 936 illustrated in FIG. 9G. For example, the computer system optionally increases the amount of the three-dimensional environment consumed by aspects of the virtual environment, optionally increases the opacity of the virtual environment, and/or optionally initiates display of virtual content included in the virtual environment. In some embodiments, in response to detecting the third input (1024c), the computer system ceases (1024c) display of the at least the portion of the plurality of virtual objects, such as ceasing display of objects 906a-e in FIG. 9F, wherein the second input is received after detecting the third input and while at least the portion of the plurality of virtual objects are not displayed, such as input received when objects 906a-e are not displayed. For example, optionally concurrently with the increasing the virtual content to the first level of immersion, the computer system optionally decreases a level of visual prominence of the virtual objects (e.g., ceases display of the virtual objects). While the computer system maintains a viewpoint following and at the time of the ceasing of the plurality of virtual objects and/or at a time thereafter, the computer system optionally detects the second input described with reference to step(s) 1012, and optionally initiates display of the home user interface and/or the plurality of virtual objects. Displaying the virtual content with the first level of immersion and ceasing display of the plurality of virtual objects reduces visual clutter and/or reduces the likelihood that virtual content is displayed presenting an apparent spatial or visual conflict with the plurality of virtual objects.

In some embodiments, displaying the at least the portion of the plurality of virtual objects, such as objects 906a-c and object 906e in FIG. 9B with the second spatial arrangement relative to the first viewpoint of the user includes (1026a) in accordance with a determination that the first virtual object was a first distance relative to the first viewpoint of the user, such as a distance between object 906a in FIGS. 9A and 9A1 and viewpoint 926, when, prior to the first input, input directed to the first virtual object was detected, such as input directed to object 906a in FIGS. 9A and 9A1, displaying, via the display generation component, the first virtual object at a second distance from the first viewpoint (1026b) (e.g., equal to and/or proportional to the first distance), such as the distance of object 906a in FIG. 9B. For example, the computer system optionally determines that the first virtual object was a first distance from the first viewpoint of the user when the user last-interacted with the first virtual object (e.g., moved the first virtual object, copied virtual content from the first virtual object, directed attention to the first virtual object, and/or provided other input directed to the first virtual object) prior to detecting the first input. In response to the first input, the computer system optionally displays the first virtual object at a second distance, based on the first distance (e.g., the same, or some scaled or modified distance based on the first distance). In some embodiments, the computer system concurrently arranges the other virtual objects of the plurality of virtual objects at respective distances that are based on the first distance. For example, the computer system optionally translates the respective positions of the plurality of virtual objects based on the first distance, optionally while maintaining a spatial arrangement between the plurality of virtual objects.

In some embodiments, displaying the at least the portion of the plurality of virtual objects, such as objects 906a-c and object 906e in FIG. 9B with the second spatial arrangement relative to the first viewpoint of the user includes (1026a) in accordance with a determination that the first virtual object was a third distance relative to the first viewpoint of the user, such as a greater or lesser distance of object 906a that as shown in FIGS. 9A and 9A1, different from the first distance, when, prior to the first input, input directed to the first virtual object was detected, displaying, via the display generation component, the first virtual object, at a fourth distance, different from the second distance, from the first viewpoint (1026c), such as a greater or lesser distance of object 906a than as shown in FIG. 9B (e.g., equal to and/or proportional to the third distance). For example, the computer system optionally displays the first virtual object at a fourth, relatively greater or lesser distance compared to the second distance when the first virtual object was a third distance when the user last-interacted with the first virtual object that is different from the first distance. Thus, the computer system optionally displays the first virtual object at a distance from the first viewpoint of the user that is based on a distance between the first virtual object and the viewpoint of the user when a previous interaction with the first virtual object is detected. It is understood that in some embodiments, the computer system additionally or alternatively detects a distance of another (e.g., the second) virtual object from the first viewpoint prior to detecting the first input at a time when the user last-interacted with the second virtual object, and in response to the first input, displays the other virtual object at a distance from the first viewpoint that is based on the distance at the time of the last interaction. In some embodiments, respective distances of recentered objects are based on a combination of distances measured between respective virtual objects and the viewpoint of the user, wherein respective distances have a value of the distance between the viewpoint of the user and the respective virtual object at a time when the user last interacted with the respective virtual object. Displaying virtual objects at distances from the current viewpoint based on a distance between a virtual object and the viewpoint of the user when a previous interaction was detected improves predictability of a simulated depth between the virtual object and the first viewpoint in response to rearranging the plurality of virtual objects, thereby reducing user input erroneously directed to positions within the three-dimensional environment that do not correspond to the updated depth of the virtual object.

In some embodiments, displaying the plurality of virtual objects at the second spatial arrangement includes, in accordance with a determination that one or more first criteria are satisfied, including a criterion that is satisfied when an orientation of the first viewpoint is a first orientation relative to the three-dimensional environment when the first input is received, such as an orientation of object 906a relative to viewpoint 926 in FIGS. 9A and 9A1, displaying, via the display generation component, the first virtual object with a respective first orientation relative to the three-dimensional environment (1028a), such as an orientation of object 906a in FIG. 9B (e.g., based on the first orientation). In some embodiments, the computer system determines orientations of the plurality of virtual objects based on an orientation of the current viewpoint of the user relative to the three-dimensional environment at a time when a recentering input is received. For example, the computer system optionally determines that the first viewpoint of the user is oriented at first one or more angles relative to the dimensions of the three-dimensional environment (e.g., a floor, a ceiling, and/or a wall or boundary of the three-dimensional environment) at a time leading up to or immediately before the first input is received. In response to the first input recentering the plurality of virtual objects, the computer system optionally displays the first virtual object and/or arranges and/or displays the remaining virtual objects of the plurality of virtual objects with an updated orientation relative to the three-dimensional environment, described further with reference to method 800. For example, the first virtual object is optionally moved to an updated orientation such that an interaction surface of the virtual object (e.g., a surface including virtual content with which the user will likely desire viewing and/or interaction) is oriented toward the current viewpoint of the user in response to the first input. Additionally or alternatively, as described with reference to method 800, the computer system optionally determines a recent one or more targets of user attention within a window of time leading up to when the first input is received, and in response to the first input, optionally displays the recentered plurality of virtual objects such that the recent targets of the user attention are centered on and/or visible at the updated orientation of the current viewpoint of the user. For example, when the current viewpoint of the user rotates along a vertical axis extending along the user's body (e.g., relative to the user's head, and/or relative to the user's body) by a first amount (e.g., 5, 10, 20, 30, 40, 50, 60, 70, 80, or 90 degrees) and the computer system detects the first input, the plurality of virtual objects are optionally rotated by a second amount that is based on the first amount (e.g., the same or different as the first amount).

In some embodiments, in accordance with a determination that one or more second criteria are satisfied, including a criterion that is satisfied when the orientation of the first viewpoint is a second orientation, different from the first orientation, relative to the three-dimensional environment when the first input is received, such as an orientation of object 906a different from as shown in FIGS. 9A and 9A1, displaying, via the display generation component, the first virtual object with a respective second orientation relative to the three-dimensional environment, different from the respective first orientation (1028b), such as an updated orientation different from as shown in FIG. 9B (e.g., based on the second orientation). Displaying virtual objects at updated orientations relative to the three-dimensional environment and based on an updated viewpoint of the user in response to input recentering the virtual objects improves interactability and/or visibility of the virtual objects relative to an updated viewpoint of the user, thereby reducing input required to manually orient the virtual objects to interact with the virtual objects at the updated viewpoint.

In some embodiments, the one or more first criteria include a criterion that is satisfied when user interaction with the first virtual object leading up to a time the first input is received includes first one or more interactions (1030a), such as one or more interactions with object 906a in FIGS. 9A and 9A1. For example, as described further with reference to method 800, the computer system optionally determines a pattern of previous user interaction with virtual objects, and determines an orientation of the virtual objects when recentering the plurality of virtual objects based on the previous user interaction (e.g., based on attention of user directed to the virtual objects and/or directed to a clustering or grouping of the virtual objects).

In some embodiments, the one or more second criteria include a criterion that is satisfied when the user interaction with the first virtual object leading up to the time the first input is received includes second one or more interactions, different from the first one or more interactions (1030b), such as one or more interactions with object 906b in FIGS. 9A and 9A1. Displaying virtual objects at updated orientations relative to the three-dimensional environment based on previous interaction with the virtual objects improves the likelihood relevant virtual content of interest is presented at a convenient position and orientation relative to the user's viewpoint, thereby improving interactability and/or visibility of the virtual objects relative to an updated viewpoint of the user, and reducing input required to manually to orient the virtual objects accordingly.

In some embodiments, the at least the portion of the plurality of virtual objects that is displayed with the first updated spatial arrangement from the first viewpoint of the user in response to detecting the first input was displayed, in the three-dimensional environment, from the first viewpoint of the user when the first input was detected (1032), such as the objects 906a-e in FIG. 9C. For example, when displaying the plurality of virtual objects with the first updated spatial arrangement (e.g., a gathered arrangement) the computer system optionally concurrently displays virtual objects that were previously visible before the gathering input was detected, in response to detecting the gathering input. For example, a plurality of virtual windows is optionally displayed at various orientations and positions prior to detecting the gathering input, and in response to detecting the gather input, the same plurality of virtual windows is optionally displayed (e.g., moved) with updated positions and/or orientations without ceasing display of a respective virtual window. In some embodiments, a virtual object is not moved in response to the input gathering the virtual objects, and in embodiments, a virtual object is moved to an updated position that is not visible relative to the current viewpoint of the user when providing the gathering input-accordingly, the virtual object is not displayed. Gathering the virtual objects that are visible when the first input is detected reduces user input required to manually gather the virtual objects individually and improves visual consistency of the arrangement and content of the visible virtual objects before and after gathering the visible objects, thereby reducing the likelihood the user erroneously interacts with the gathered virtual objects.

In some embodiments, the at least the portion of the plurality of virtual objects that is displayed with the first updated spatial arrangement, such as the arrangement of objects 906a-c in FIG. 9C, from the first viewpoint of the user in response to detecting the first input includes the first virtual object, and the first virtual object was not displayed, in the three-dimensional environment from the first viewpoint of the user, when the first input was detected (1034), such as if object 906a was not displayed in FIG. 9B when input 980 is received in FIG. 9B. Gathering the plurality of virtual objects optionally also includes displaying a third virtual object that was not displayed prior to gathering the plurality of virtual objects (e.g., because such virtual objects are at positions and/or orientations that are not visible at the first viewpoint of the user). As an example a third virtual object is optionally positioned behind the viewpoint of the user when the first input gathering the plurality of virtual objects is received. In response to the gathering input, the computer system optionally moves the third virtual object in the three-dimensional environment to a position that is visible from the viewpoint of the user, and displays the third virtual object within a field-of-view of the first viewpoint of the user. In some embodiments, gathering the plurality of virtual objects includes moving and/or displaying a plurality of virtual objects that were not displayed when the input requesting the gathering was detected. In some embodiments, similar to the first virtual object, one or more additional virtual objects included in the at least the portion of the plurality of virtual objects that is displayed with the first updated spatial arrangement were not displayed prior to the gathering of the plurality of virtual objects (e.g., not displayed when the first input was detected). Displaying one or more virtual objects in response to detecting the first input gathering the virtual objects reduces input and/or changes in viewpoint of the user required to move the virtual objects within the current viewpoint of the user, reduces inputs required to discover what virtual objects are available within the three-dimensional environment, and reduce inputs required to navigate the three-dimensional environment in search of such virtual objects.

In some embodiments, the at least the portion of the plurality of virtual objects that is displayed while the plurality of virtual objects has the first spatial arrangement, such as the arrangement of objects 906a-e in FIG. 9C, includes the first virtual object displayed with a third spatial arrangement relative to the first viewpoint of the user (1036a), such as an arrangement of object 906a relative to viewpoint 926 in FIG. 9C. For example, the first virtual object optionally has a first position and/or orientation relative to the first viewpoint of the user when the plurality of virtual objects have the first spatial arrangement relative to the first viewpoint.

In some embodiments, displaying the at least the portion of the plurality of virtual objects with the second spatial arrangement relative to the first viewpoint of the user includes displaying the first virtual object with an updated third spatial arrangement, different from the third spatial arrangement, relative to the three-dimensional environment (1036b), such as an updated position and/or arrangement of object 906a in FIG. 9C relative to viewpoint 926. For example, the computer system optionally displays the first virtual object at an updated position and/or orientation relative to the first viewpoint in response to detecting the input of the first type of input (e.g., a recentering input) based on the various rules and criteria described with reference to step(s) 1002.

In some embodiments, displaying the at least the portion of the plurality of virtual objects with the updated first spatial arrangement relative to the first viewpoint of the user includes maintaining display of the first virtual object with the third spatial arrangement relative to the first viewpoint of the user (1036c), such as maintaining the arrangement of object 906a relative to viewpoint 926 in FIG. 9C. For example, the computer system optionally maintains display of the first virtual object at the first position and/or orientation relative to the first viewpoint in response to detecting the input of the second type of input (e.g., a gathering input), while optionally concurrently moving a previously not displayed virtual object to an updated position such that the computer system optionally displays the other virtual object. Thus, in some embodiments, recentering virtual objects includes moving a virtual object that was displayed when a recentering input is received to an updated position, and in some embodiments, gathering the virtual objects includes not moving the virtual object. It is understood that in some embodiments, description of the first virtual object similarly applies to other virtual objects within the three-dimensional environment. For example, the computer system optionally maintains the position of the second virtual object in response to detecting the second type of input, and optionally updates the position of the second virtual object in response to detecting the first type of input. Updating or maintaining a spatial arrangement of a virtual object relative to a viewpoint of the user in response to the first or the second type of input improves consistency of presentation of the virtual objects when gathering the virtual objects.

It should be understood that the particular order in which the operations in method 1000 have been described is merely exemplary and is not intended to indicate that the described order is the only order in which the operations could be performed. One of ordinary skill in the art would recognize various ways to reorder the operations described herein.

In some embodiments, aspects/operations of methods 800 and/or 1000, may be interchanged, substituted, and/or added between these methods. For example, the virtual objects of methods 800 and/or 1000, the environments of methods 800 and/or 1000, the inputs for repositioning virtual objects of methods 800 and/or 1000, the viewpoints of methods 800 and/or 1000, and/or the arranging, recentering, and/or gathering operations of methods 800 and/or 1000 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, social media IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:

at a computer system in communication with one or more input devices and a display generation component:

while a three-dimensional environment is visible via the display generation component from a current viewpoint of a user, displaying, via the display generation component, at least a portion of a plurality of virtual objects that are available for viewing in the three-dimensional environment, the plurality of virtual objects including a first virtual object of a first set of two or more virtual objects and a second virtual object of a second set of one or more virtual objects, wherein the first set of two or more of virtual objects have a first spatial arrangement relative to the current viewpoint, and the second set of one or more virtual objects have a second spatial arrangement relative to the current viewpoint, different from the first spatial arrangement:

detecting, via the one or more input devices, an event corresponding to a request to arrange virtual content relative to the current viewpoint of the user; and in response to detecting the event while the three-dimensional environment is visible via the display generation component from the current viewpoint of the user:

in accordance with a determination that attention of the user of the computer system relative to the first set of two or more virtual objects satisfied one or more first criteria at a respective time corresponding to the event, moving at least two virtual objects in the first set of two or more virtual objects in the three-dimensional environment, and displaying, via the display generation component, at least a portion of the first set of two or more virtual objects at a position within the three-dimensional environment that has a first updated spatial arrangement relative to the current viewpoint, different from the first spatial arrangement, wherein:

the portion of the first set of two or more virtual objects includes at least a portion of the first virtual object from the first set of two or more virtual objects, the portion of the first set of two or more virtual objects includes at least a portion of a respective second virtual object from the first set of two or more virtual objects, and the respective second virtual object is not displayed when the event is detected; and in accordance with a determination that the attention of the user of the computer system relative to the second set of one or more virtual objects satisfied the one or more first criteria at the respective time corresponding to the event, displaying, via the display generation component, at least a portion of the second set of one or more virtual objects at a position within the three-dimensional environment that has a second updated spatial arrangement relative to the current viewpoint, different from the second spatial arrangement, wherein the position having the first updated spatial arrangement and the position having the second updated spatial arrangement are both in a same region of the three-dimensional environment relative to the current viewpoint.

2. The method of claim 1, wherein the attention of the user is based on a gaze of the user.

3. The method of claim 2, wherein:

the satisfaction of the one or more first criteria relative to the first set of two or more virtual objects includes satisfaction of a first criterion of the one or more first criteria that is satisfied when the gaze of the user was directed to the first virtual object of the first set of two or more virtual objects within a threshold amount of time of the respective time, and the satisfaction of the one or more first criteria relative to the second set of one or more virtual objects includes satisfaction of the first criterion that is satisfied when the gaze of the user was directed to the second virtual object of the second set of one or more virtual objects within the threshold amount of time of the respective time.

4. The method of claim 2, wherein:

the satisfaction of the one or more first criteria relative to the first set of two or more virtual objects includes satisfaction of a first criterion of the one or more first criteria that is satisfied when the gaze of the user was directed to the first set of two or more virtual objects for a first amount of time that is greater than a respective amount of time the gaze of the user was directed to the second set of one or more virtual objects, and the satisfaction of the one or more first criteria relative to the second set of one or more virtual objects includes satisfaction of the first criterion that is satisfied when the gaze of the user was directed to the second set of one or more virtual objects for a second amount of time that is greater than a respective amount of time the gaze of the user was directed to the first set of two or more virtual objects.

5. The method of claim 1, wherein the position within the three-dimensional environment corresponds to a center of the current viewpoint of the user.

6. The method of claim 1, wherein:

displaying the at least the portion of the first set of two or more virtual objects at the position within the three-dimensional environment that has the first updated spatial arrangement relative to the current viewpoint includes displaying the at least the portion of the first set of two or more virtual objects at a first distance from the current viewpoint of the user that is based on a distance of the first virtual object of the first set of two or more virtual objects from the current viewpoint when the event is detected, greater than respective distances of other virtual objects of the first set of two or more virtual objects relative to the current viewpoint, and displaying the at least the portion of the second set of one or more virtual objects at the position within the three-dimensional environment that has the second updated spatial arrangement relative to the current viewpoint includes displaying the at least the portion of the second set of one or more virtual objects at a second distance from the current viewpoint of the user that is based on a distance of the second virtual object from the current viewpoint when the event is detected, greater than respective distances of other virtual objects of the second set of one or more virtual objects relative to the current viewpoint.

7. The method of claim 1, wherein the first set of two or more virtual objects includes a third virtual object, different from the first virtual object and the second virtual object, and wherein displaying the at least the portion of the first set of two or more virtual objects at the position within the three-dimensional environment that has the first updated spatial arrangement relative to the current viewpoint includes:

in accordance with a determination that a first amount of user interaction with the first virtual object is greater than a second amount of user interaction with the third virtual object before the event is detected, displaying the first virtual object at the position that has the first updated spatial arrangement relative to the current viewpoint, and in accordance with a determination that the first amount of user interaction with the first virtual object is less than the second amount of user interaction with the third virtual object before the event is detected, displaying the third virtual object at the position that has the first updated spatial arrangement relative to the current viewpoint.

8. The method of claim 7, wherein the first amount of user interaction includes a first duration of interaction with the first virtual object detected within a window of time corresponding to the event, and the second amount of user interaction includes a second duration of interaction with the third virtual object within the window of time corresponding to the event.

9. The method of claim 1, wherein the plurality of virtual objects includes a third set of one or more virtual objects that have a third spatial arrangement relative to the current viewpoint of the user, the method further comprising:

in response to detecting the event while the three-dimensional environment is visible via the display generation component from the current viewpoint of the user, in accordance with a determination that the attention of the user of the computer system relative to the third set of one or more virtual objects satisfied the one or more first criteria at the respective time corresponding to the event displaying, via the display generation component, at least a portion of the third set of one or more virtual objects at a position within the three-dimensional environment that has a third updated spatial arrangement relative to the current viewpoint, different from the third spatial arrangement, wherein the position having the first updated spatial arrangement, the position having the second updated spatial arrangement, and the position having the third updated spatial arrangement are in the same region of three-dimensional environment relative to the current viewpoint.

10. The method of claim 1, wherein the first set of two or more virtual objects includes a first plurality of virtual objects and the second set of one or more virtual objects includes a second plurality of virtual objects that are different from the two or more virtual objects in the first plurality of virtual objects.

11. The method of claim 10, wherein the first plurality of virtual objects are included in the first set of two or more virtual objects in accordance with a determination that a first spatial relationship of the first plurality of virtual objects satisfies one or more second criteria, different from the one or more first criteria, relative to the three-dimensional environment, and wherein the second plurality of virtual objects are included in the second set of one or more virtual objects in accordance with a determination that a second spatial relationship of the second plurality of virtual objects satisfies the one or more second criteria relative to the three-dimensional environment.

12. The method of claim 11, wherein:

in accordance with a determination that the first plurality of virtual objects is a first distance from the current viewpoint of the user, the one or more second criteria include a criterion that is satisfied when the first plurality of virtual objects are within a first threshold angle of separation of each other relative to the current viewpoint of the user, and in accordance with a determination that the first plurality of virtual objects is a second distance, less than the first distance, from the current viewpoint of the user, the one or more second criteria include a criterion that is satisfied when the first plurality of virtual objects are within a second threshold angle of separation, greater than the first threshold angle of separation, of each other relative to the current viewpoint of the user.

13. The method of claim 1, wherein a relative first spatial relationship between the first set of two or more virtual objects and the second set of one or more virtual objects is maintained in response to detecting the event and displaying the at least the portion of the first set of two or more virtual objects at the position with the updated first spatial arrangement or displaying the at least the portion of the second set of one or more virtual objects at the position with the updated second spatial arrangement.

14. The method of claim 1, wherein:

before detecting the event, the first set of two or more virtual objects have a third spatial arrangement relative to each other, and the second set of one or more virtual objects have a fourth spatial arrangement relative to each other, and in response to detecting the event:

the first set of two or more virtual objects maintain the third spatial arrangement relative to each other, and the second set of one or more virtual objects maintain the fourth spatial arrangement relative to each other.

15. The method of claim 1, the method further comprising:

while displaying the at least the portion of the first set of two or more virtual objects at the position having the first updated spatial arrangement relative to the current viewpoint of the user and while the current viewpoint of the user is a first viewpoint, detecting, via the one or more input devices, a change in the current viewpoint of the user from the first viewpoint to a second viewpoint, different from the first viewpoint, wherein the second viewpoint differs from the first viewpoint along a first axis and along a second axis, different from the first axis;

while the current viewpoint of the user is the second viewpoint, detecting, via the one or more input devices, a second event, different from the event, corresponding to a request to arrange virtual content relative to the current viewpoint of the user; and in response to detecting the second event, and in accordance with a determination that the attention of the user of the computer system relative to the first set of two or more virtual objects satisfied the one or more first criteria at a respective second time corresponding to the second event:

updating a spatial arrangement of the first set of two or more virtual objects relative to the current viewpoint of the user along the first axis and along the second axis; and forgoing updating a spatial arrangement of the second set of one or more virtual objects along the first axis.

16. The method of claim 15, the method further comprising:

in response to detecting the second event and in accordance with the determination that the attention of the user of the computer system relative to the first set of two or more virtual objects satisfied the one or more first criteria at the respective second time corresponding to the second event, updating the spatial arrangement of the second set of one or more virtual objects along the second axis.

17. The method of claim 1, further comprising:

after displaying the at least the portion of the first set of two or more virtual objects at the position having the first updated spatial arrangement, detecting, via the one or more input devices, a second event, different from the event, corresponding to a request to arrange virtual content relative to the current viewpoint of the user; and in response to detecting the second event:

in accordance with a determination that the attention of the user satisfied the one or more first criteria relative to the first set of two or more virtual objects at a respective second time, different from the respective time, corresponding to the second event:

in accordance with a determination that the position that has the first updated spatial arrangement relative to the current viewpoint is further than a threshold distance away from a location corresponding to a floor of the three-dimensional environment, displaying, via the display generation component, at least a portion of the first set of two or more virtual objects at the position that has the first updated spatial arrangement relative to the current viewpoint; and in accordance with a determination that the position that has the first updated spatial arrangement relative to the current viewpoint is closer than the threshold distance from the location corresponding to the floor of the three-dimensional environment, displaying, via the display generation component, the at least the portion of the first set of two or more virtual objects at a position that has a third updated spatial arrangement, different from the position that has the first updated spatial arrangement, relative to the current viewpoint, wherein the position that has the third updated spatial arrangement relative to the current viewpoint is further than the threshold distance away from the location corresponding to the floor of the three-dimensional environment.

18. The method of claim 1, wherein the event includes an input directed to a hardware input element of the computer system, and the method further comprising:

in response to detecting the event, generating a respective non-visual output that corresponds to the input directed to the hardware input element, wherein the respective non-visual output is different from one or more non-visual outputs that are generated in response to different inputs directed to the hardware input element.

19. The method of claim 1, wherein the first updated spatial arrangement includes a first position of the first virtual object that is different from a second position of the respective second virtual object.

20. The method of claim 1, wherein the attention of the user when the event is detected is directed to a location that does not include the first set of two or more virtual objects and does not include the second set of one or more virtual objects when the event corresponding to the request to arrange virtual content relative to the current viewpoint of the user is detected.

21. A computer system in communication with one or more input devices and a display generation component, comprising:

one or more processors; and memory storing one or more programs configured to be executed by the one or more processors, the one or more programs including instructions for:

while a three-dimensional environment is visible via the display generation component from a current viewpoint of a user, displaying, via the display generation component, at least a portion of a plurality of virtual objects that are available for viewing in the three-dimensional environment, the plurality of virtual objects including a first virtual object of a first set of two or more virtual objects and a second virtual object of a second set of one or more virtual objects, wherein, the first set of two or more of virtual objects have a first spatial arrangement relative to the current viewpoint, and the second set of one or more virtual objects have a second spatial arrangement relative to the current viewpoint, different from the first spatial arrangement:

detecting, via the one or more input devices, an event corresponding to a request to arrange one or more virtual objects relative to the current viewpoint of the user; and in response to detecting the event while the three-dimensional environment is visible via the display generation component from the current viewpoint of the user:

in accordance with a determination that attention of the user of the computer system relative to the first set of two or more virtual objects satisfied one or more first criteria at a respective time corresponding to the event, moving at least two virtual objects in the first set of two or more virtual objects, and displaying, via the display generation component, at least a portion of the first set of two or more virtual objects at a position within the three-dimensional environment that has a first updated spatial arrangement relative to the current viewpoint, different from the first spatial arrangement, wherein:

the portion of the first set of two or more virtual objects includes at least a portion of the first virtual object from the first set of two or more virtual objects, the portion of the first set of two or more virtual objects includes at least a portion of a respective second virtual object from the first set of two or more virtual objects, and the respective second virtual object is not displayed when the event is detected; and in accordance with a determination that the attention of the user of the computer system relative to the second set of one or more virtual objects satisfied the one or more first criteria at the respective time corresponding to the event, displaying, via the display generation component, at least a portion of the second set of one or more virtual objects at a position within the three-dimensional environment that has a second updated spatial arrangement relative to the current viewpoint, different from the second spatial arrangement, wherein the position having the first updated spatial arrangement and the position having the second updated spatial arrangement are both in a same region of the three-dimensional environment relative to the current viewpoint.

22. The computer system of claim 21, wherein:

displaying the at least the portion of the first set of two or more virtual objects at the position within the three-dimensional environment that has the first updated spatial arrangement relative to the current viewpoint includes displaying the at least the portion of the first set of two or more virtual objects at a first distance from the current viewpoint of the user that is based on a distance of the first virtual object of the first set of two or more virtual objects from the current viewpoint when the event is detected, greater than respective distances of other virtual objects of the first set of two or more virtual objects relative to the current viewpoint, and displaying the at least the portion of the second set of one or more virtual objects at the position within the three-dimensional environment that has the second updated spatial arrangement relative to the current viewpoint includes displaying the at least the portion of the second set of one or more virtual objects at a second distance from the current viewpoint of the user that is based on a distance of the second virtual object from the current viewpoint when the event is detected, greater than respective distances of other virtual objects of the second set of one or more virtual objects relative to the current viewpoint.

23. The computer system of claim 21, wherein the first set of two or more virtual objects includes a third virtual object, different from the first virtual object and the second virtual object, and wherein displaying the at least the portion of the first set of two or more virtual objects at the position within the three-dimensional environment that has the first updated spatial arrangement relative to the current viewpoint includes:

in accordance with a determination that a first amount of user interaction with the first virtual object is greater than a second amount of user interaction with the third virtual object before the event is detected, displaying the first virtual object at the position that has the first updated spatial arrangement relative to the current viewpoint, and in accordance with a determination that the first amount of user interaction with the first virtual object is less than the second amount of user interaction with the third virtual object before the event is detected, displaying the third virtual object at the position that has the first updated spatial arrangement relative to the current viewpoint.

24. The computer system of claim 21, wherein the plurality of virtual objects includes a third set of one or more virtual objects that have a third spatial arrangement relative to the current viewpoint of the user, the one or more programs further including instructions for:

in response to detecting the event while the three-dimensional environment is visible via the display generation component from the current viewpoint of the user, in accordance with a determination that the attention of the user of the computer system relative to the third set of one or more virtual objects satisfied the one or more first criteria at the respective time corresponding to the event displaying, via the display generation component, at least a portion of the third set of one or more virtual objects at a position within the three-dimensional environment that has a third updated spatial arrangement relative to the current viewpoint, different from the third spatial arrangement, wherein the position having the first updated spatial arrangement, the position having the second updated spatial arrangement, and the position having the third updated spatial arrangement are in the same region of three-dimensional environment relative to the current viewpoint.

25. The computer system of claim 21, wherein the first set of two or more virtual objects includes a first plurality of virtual objects and the second set of one or more virtual objects includes a second plurality of virtual objects that are different from the two or more virtual objects in the first plurality of virtual objects.

26. The computer system of claim 25, wherein the first plurality of virtual objects are included in the first set of two or more virtual objects in accordance with a determination that a first spatial relationship of the first plurality of virtual objects satisfies one or more second criteria, different from the one or more first criteria, relative to the three-dimensional environment, and wherein the second plurality of virtual objects are included in the second set of one or more virtual objects in accordance with a determination that a second spatial relationship of the second plurality of virtual objects satisfies the one or more second criteria relative to the three-dimensional environment.

27. The computer system of claim 26, wherein:

in accordance with a determination that the first plurality of virtual objects is a first distance from the current viewpoint of the user, the one or more second criteria include a criterion that is satisfied when the first plurality of virtual objects are within a first threshold angle of separation of each other relative to the current viewpoint of the user, and in accordance with a determination that the first plurality of virtual objects is a second distance, less than the first distance, from the current viewpoint of the user, the one or more second criteria include a criterion that is satisfied when the first plurality of virtual objects are within a second threshold angle of separation, greater than the first threshold angle of separation, of each other relative to the current viewpoint of the user.

28. The computer system of claim 21, the one or more programs further including instructions for:

while displaying the at least the portion of the first set of two or more virtual objects at the position having the first updated spatial arrangement relative to the current viewpoint of the user and while the current viewpoint of the user is a first viewpoint, detecting, via the one or more input devices, a change in the current viewpoint of the user from the first viewpoint to a second viewpoint, different from the first viewpoint, wherein the second viewpoint differs from the first viewpoint along a first axis and along a second axis, different from the first axis;

while the current viewpoint of the user is the second viewpoint, detecting, via the one or more input devices, a second event, different from the event, corresponding to a request to arrange virtual content relative to the current viewpoint of the user; and in response to detecting the second event, and in accordance with a determination that the attention of the user of the computer system relative to the first set of two or more virtual objects satisfied the one or more first criteria at a respective second time corresponding to the second event:

updating a spatial arrangement of the first set of two or more virtual objects relative to the current viewpoint of the user along the first axis and along the second axis; and forgoing updating a spatial arrangement of the second set of one or more virtual objects along the first axis.

29. The computer system of claim 21, the one or more programs further including instructions for:

after displaying the at least the portion of the first set of two or more virtual objects at the position having the first updated spatial arrangement, detecting, via the one or more input devices, a second event, different from the event, corresponding to a request to arrange virtual content relative to the current viewpoint of the user; and in response to detecting the second event:

in accordance with a determination that the attention of the user satisfied the one or more first criteria relative to the first set of two or more virtual objects at a respective second time, different from the respective time, corresponding to the second event:

in accordance with a determination that the position that has the first updated spatial arrangement relative to the current viewpoint is further than a threshold distance away from a location corresponding to a floor of the three-dimensional environment, displaying, via the display generation component, at least a portion of the first set of two or more virtual objects at the position that has the first updated spatial arrangement relative to the current viewpoint; and in accordance with a determination that the position that has the first updated spatial arrangement relative to the current viewpoint is closer than the threshold distance from the location corresponding to the floor of the three-dimensional environment, displaying, via the display generation component, the at least the portion of the first set of two or more virtual objects at a position that has a third updated spatial arrangement, different from the position that has the first updated spatial arrangement, relative to the current viewpoint, wherein the position that has the third updated spatial arrangement relative to the current viewpoint is further than the threshold distance away from the location corresponding to the floor of the three- dimensional environment.

30. A non-transitory computer readable medium storing one or more programs configured to be executed by one or more processors of a computer system in communication with one or more input devices and a display generation component, the one or more programs including instructions for:

while a three-dimensional environment is visible via the display generation component from a current viewpoint of a user, displaying, via the display generation component, at least a portion of a plurality of virtual objects that are available for viewing in the three-dimensional environment, the plurality of virtual objects including a first virtual object of a first set of two or more virtual objects and a second virtual object of a second set of one or more virtual objects, wherein, the first set of two or more of virtual objects have a first spatial arrangement relative to the current viewpoint, and the second set of one or more virtual objects have a second spatial arrangement relative to the current viewpoint, different from the first spatial arrangement:

detecting, via the one or more input devices, an event corresponding to a request to arrange virtual content relative to the current viewpoint of the user; and in response to detecting the event while the three-dimensional environment is visible via the display generation component from the current viewpoint of the user:

in accordance with a determination that attention of the user of the computer system relative to the first set of two or more virtual objects satisfied one or more first criteria at a respective time corresponding to the event, moving at least two virtual objects in the first set of two or more virtual objects, and displaying, via the display generation component, at least a portion of the first set of two or more virtual objects at a position within the three-dimensional environment that has a first updated spatial arrangement relative to the current viewpoint, different from the first spatial arrangement, wherein:

the portion of the first set of two or more virtual objects includes at least a portion of the first virtual object from the first set of two or more virtual objects includes at least a portion of a respective second virtual object from the first set of two or more virtual objects, and the respective second virtual object is not displayed when the event is detected; and in accordance with a determination that the attention of the user of the computer system relative to the second set of one or more virtual objects satisfied the one or more first criteria at the respective time corresponding to the event, displaying, via the display generation component, at least a portion of the second set of one or more virtual objects at a position within the three-dimensional environment that has a second updated spatial arrangement relative to the current viewpoint, different from the second spatial arrangement, wherein the position having the first updated spatial arrangement and the position having the second updated spatial arrangement are both in a same region of the three-dimensional environment relative to the current viewpoint.

31. The non-transitory computer readable medium of claim 30, wherein:

displaying the at least the portion of the first set of two or more virtual objects at the position within the three-dimensional environment that has the first updated spatial arrangement relative to the current viewpoint includes displaying the at least the portion of the first set of two or more virtual objects at a first distance from the current viewpoint of the user that is based on a distance of the first virtual object of the first set of two or more virtual objects from the current viewpoint when the event is detected, greater than respective distances of other virtual objects of the first set of two or more virtual objects relative to the current viewpoint, and displaying the at least the portion of the second set of one or more virtual objects at the position within the three-dimensional environment that has the second updated spatial arrangement relative to the current viewpoint includes displaying the at least the portion of the second set of one or more virtual objects at a second distance from the current viewpoint of the user that is based on a distance of the second virtual object from the current viewpoint when the event is detected, greater than respective distances of other virtual objects of the second set of one or more virtual objects relative to the current viewpoint.

32. The non-transitory computer readable medium of claim 30, wherein the first set of two or more virtual objects includes a third virtual object, different from the first virtual object and the second virtual object, and wherein displaying the at least the portion of the first set of two or more virtual objects at the position within the three-dimensional environment that has the first updated spatial arrangement relative to the current viewpoint includes:

in accordance with a determination that a first amount of user interaction with the first virtual object is greater than a second amount of user interaction with the third virtual object before the event is detected, displaying the first virtual object at the position that has the first updated spatial arrangement relative to the current viewpoint, and in accordance with a determination that the first amount of user interaction with the first virtual object is less than the second amount of user interaction with the third virtual object before the event is detected, displaying the third virtual object at the position that has the first updated spatial arrangement relative to the current viewpoint.

33. The non-transitory computer readable medium of claim 30, wherein the plurality of virtual objects includes a third set of one or more virtual objects that have a third spatial arrangement relative to the current viewpoint of the user, the one or more programs further including instructions for:

in response to detecting the event while the three-dimensional environment is visible via the display generation component from the current viewpoint of the user, in accordance with a determination that the attention of the user of the computer system relative to the third set of one or more virtual objects satisfied the one or more first criteria at the respective time corresponding to the event displaying, via the display generation component, at least a portion of the third set of one or more virtual objects at a position within the three-dimensional environment that has a third updated spatial arrangement relative to the current viewpoint, different from the third spatial arrangement, wherein the position having the first updated spatial arrangement, the position having the second updated spatial arrangement, and the position having the third updated spatial arrangement are in the same region of three-dimensional environment relative to the current viewpoint.

34. The non-transitory computer readable medium of claim 30, wherein the first set of two or more virtual objects includes a first plurality of virtual objects and the second set of one or more virtual objects includes a second plurality of virtual objects that are different from the two or more virtual objects in the first plurality of virtual objects.

35. The non-transitory computer readable medium of claim 34 wherein the first plurality of virtual objects are included in the first set of two or more virtual objects in accordance with a determination that a first spatial relationship of the first plurality of virtual objects satisfies one or more second criteria, different from the one or more first criteria, relative to the three-dimensional environment, and wherein the second plurality of virtual objects are included in the second set of one or more virtual objects in accordance with a determination that a second spatial relationship of the second plurality of virtual objects satisfies the one or more second criteria relative to the three-dimensional environment.

36. The non-transitory computer readable medium of claim 35 wherein:

in accordance with a determination that the first plurality of virtual objects is a first distance from the current viewpoint of the user, the one or more second criteria include a criterion that is satisfied when the first plurality of virtual objects are within a first threshold angle of separation of each other relative to the current viewpoint of the user, and in accordance with a determination that the first plurality of virtual objects is a second distance, less than the first distance, from the current viewpoint of the user, the one or more second criteria include a criterion that is satisfied when the first plurality of virtual objects are within a second threshold angle of separation, greater than the first threshold angle of separation, of each other relative to the current viewpoint of the user.

37. The non-transitory computer readable medium of claim 30, the one or more programs further including instructions for:

while displaying the at least the portion of the first set of two or more virtual objects at the position having the first updated spatial arrangement relative to the current viewpoint of the user and while the current viewpoint of the user is a first viewpoint, detecting, via the one or more input devices, a change in the current viewpoint of the user from the first viewpoint to a second viewpoint, different from the first viewpoint, wherein the second viewpoint differs from the first viewpoint along a first axis and along a second axis, different from the first axis;

while the current viewpoint of the user is the second viewpoint, detecting, via the one or more input devices, a second event, different from the event, corresponding to a request to arrange virtual content relative to the current viewpoint of the user; and in response to detecting the second event, and in accordance with a determination that the attention of the user of the computer system relative to the first set of two or more virtual objects satisfied the one or more first criteria at a respective second time corresponding to the second event:

updating a spatial arrangement of the first set of two or more virtual objects relative to the current viewpoint of the user along the first axis and along the second axis; and forgoing updating a spatial arrangement of the second set of one or more virtual objects along the first axis.

38. The non-transitory computer readable medium of claim 30, the one or more programs further including instructions for:

after displaying the at least the portion of the first set of two or more virtual objects at the position having the first updated spatial arrangement, detecting, via the one or more input devices, a second event, different from the event, corresponding to a request to arrange virtual content relative to the current viewpoint of the user; and in response to detecting the second event:

in accordance with a determination that the attention of the user satisfied the one or more first criteria relative to the first set of two or more virtual objects at a respective second time, different from the respective time, corresponding to the second event:

in accordance with a determination that the position that has the first updated spatial arrangement relative to the current viewpoint is further than a threshold distance away from a location corresponding to a floor of the three-dimensional environment, displaying, via the display generation component, at least a portion of the first set of two or more virtual objects at the position that has the first updated spatial arrangement relative to the current viewpoint; and in accordance with a determination that the position that has the first updated spatial arrangement relative to the current viewpoint is closer than the threshold distance from the location corresponding to the floor of the three-dimensional environment, displaying, via the display generation component, the at least the portion of the first set of two or more virtual objects at a position that has a third updated spatial arrangement, different from the position that has the first updated spatial arrangement, relative to the current viewpoint, wherein the position that has the third updated spatial arrangement relative to the current viewpoint is further than the threshold distance away from the location corresponding to the floor of the three- dimensional environment.

\* \* \* \* \*